(12) United States Patent
Sammak et al.

(10) Patent No.: US 7,907,769 B2
(45) Date of Patent: Mar. 15, 2011

(54) IMAGE-BASED METHODS FOR MEASURING GLOBAL NUCLEAR PATTERNS AS EPIGENETIC MARKERS OF CELL DIFFERENTIATION

(75) Inventors: Paul J. Sammak, Pittsburgh, PA (US); Rami Mangoubi, Newton, MA (US); Mukund Desai, Needham, MA (US); Teresa M. Erb, Pittsburgh, PA (US); Nathan Lowry, Lexington, MA (US)

(73) Assignees: The Charles Stark Draper Laboratory, Inc., Cambridge, MA (US); University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 116 days.

(21) Appl. No.: 12/321,360

(22) Filed: Jan. 16, 2009

(65) Prior Publication Data
US 2010/0002929 A1 Jan. 7, 2010

Related U.S. Application Data

(63) Continuation-in-part of application No. 11/128,612, filed on May 13, 2005, now Pat. No. 7,711,174.

(60) Provisional application No. 60/570,650, filed on May 13, 2004, provisional application No. 61/021,513, filed on Jan. 16, 2008, provisional application No. 61/011,456, filed on Jan. 16, 2008, provisional application No. 61/143,399, filed on Jan. 8, 2009.

(51) Int. Cl.
*G06K 9/00* (2006.01)
*G01N 33/00* (2006.01)

(52) U.S. Cl. .......... 382/133; 382/274; 435/7.25
(58) Field of Classification Search .......... 382/100, 382/106, 107, 128, 129, 130, 131, 132, 133, 382/134, 168, 181, 191, 203, 232, 255, 260, 382/274, 276, 291, 317–321, 219, 220; 250/208.1; 703/2; 600/544; 119/421; 424/278.1; 702/19; 435/5, 6, 7.1, 7.25
See application file for complete search history.

(56) References Cited

U.S. PATENT DOCUMENTS

| 4,150,360 | A | * | 4/1979 | Kopp et al. .......... 382/133 |
| 4,905,296 | A | | 2/1990 | Nishihara |
| 5,526,258 | A | | 6/1996 | Bacus |
| 5,757,953 | A | | 5/1998 | Jang |
| 5,825,909 | A | | 10/1998 | Jang |

(Continued)

FOREIGN PATENT DOCUMENTS

WO WO-94/11841 5/1994

OTHER PUBLICATIONS

I Do et al., Wavelet-Based Texture Retrieval Using Generalized Gaussian Density and // Kullback-Leibler Distance. IEEE Transaction on Image Processin(:E vol. 11, No. 2. 146-158.*

(Continued)

*Primary Examiner* — Seyed Azarian
(74) *Attorney, Agent, or Firm* — Ropes & Gray LLP

(57) ABSTRACT

The invention provides methods for determining the differentiation state of cells. The methods include non-invasive, non-perturbing, automatable, and quantitative methods of analysis of cell colonies, individual cells, and/or cellular structures.

27 Claims, 50 Drawing Sheets

U.S. PATENT DOCUMENTS

| | | | |
|---|---|---|---|
| 5,919,464 A * | 7/1999 | Mann et al. | 424/278.1 |
| 5,989,835 A | 11/1999 | Dunlay et al. | |
| 6,103,479 A | 8/2000 | Taylor | |
| 6,128,587 A * | 10/2000 | Sjolander | 703/2 |
| 6,167,146 A | 12/2000 | Rogers et al. | |
| 6,385,332 B1 | 5/2002 | Zahalka et al. | |
| 6,555,802 B2 | 4/2003 | Osipchuk et al. | |
| 6,620,591 B1 | 9/2003 | Dunlay et al. | |
| 6,658,143 B2 | 12/2003 | Hansen et al. | |
| 6,727,071 B1 | 4/2004 | Dunlay et al. | |
| 6,753,965 B2 | 6/2004 | Kumar et al. | |
| 6,763,128 B1 | 7/2004 | Rogers et al. | |
| 6,799,066 B2 | 9/2004 | Steines et al. | |
| 7,085,765 B2 * | 8/2006 | Zock et al. | 702/19 |
| 7,086,350 B2 * | 8/2006 | Tecott et al. | 119/421 |
| 7,088,845 B2 | 8/2006 | Gu et al. | |
| 7,151,246 B2 * | 12/2006 | Fein et al. | 250/208.1 |
| 7,200,495 B2 | 4/2007 | Desai | |
| 7,299,088 B1 * | 11/2007 | Thakor et al. | 600/544 |
| 7,302,096 B2 | 11/2007 | Kim | |
| 7,383,237 B2 | 6/2008 | Zhang et al. | |
| 2002/0025514 A1 | 2/2002 | Jaworski et al. | |
| 2003/0077569 A1 | 4/2003 | Clausell et al. | |
| 2003/0100024 A1 | 5/2003 | Cassells et al. | |
| 2003/0149535 A1 | 8/2003 | Sudo et al. | |
| 2003/0185450 A1 | 10/2003 | Garakani et al. | |
| 2004/0018485 A1 | 1/2004 | Ravkin et al. | |
| 2004/0063162 A1 | 4/2004 | Dunlay et al. | |
| 2004/0072254 A1 | 4/2004 | Callamaras et al. | |

OTHER PUBLICATIONS

Aapoloa, U., et al., "Epigenetic Modifications Affet Dnmt3L expression," Biochem. J., 380:705-713 (2004).

Abeyta, M. J., et al., "Unique gene expression signatures of independently-derived human embryonic stem cell lines," Human Molecular Genetics, 13(6):601-608 (2004).

Adkins, M. W., et al., "The Histone Chaperone Asf1p Mediates Global Chromatin Disassembly in vivo," The Journal of Biological Chemistry, 279(50):52069-74 (2004).

Agustin, R. S., et al., "Robust Failure Detection for Reentry Vehicle Attitude Control Systems," Journal of Guidence, Control & Dynamics, 22(6):839-845 (1999).

Ahmad, K., et al., "Histone H3 variants specify modes of chromatin assembly," Proc Natl Acad Sci USA, 99(Suppl 4):16477-84 (2002).

Armstrong, J. A. "Negotiating the nucleosome: factors that allow RNA polymerase II to elongate through chromatin," Biochem. Cell Biol. 85:426-34 (2007).

Belotserkovskaya, R., et al., "FACT Facilitates Transcription-Dependent Nucleosome Alteration," Science, 301:1090-1093 (Aug. 22, 2003).

Bernstein, B. E., et al., "A Bivalent Chromatin Structure Marks Key Developmental Genes in Embryonic Stem Cells," Cell, 125:315-326 (Apr. 21, 2006).

Bhattacharya, B., et al., "Gene Expression in Human Embryonic Stem Cell Lines: Unique Molecular Signature," Blood, 103(8):2956-2964 (Apr. 15, 2004).

Bloom, K., "Centromere dynamics," Current Opinion in Genetics & Development, 17:151-156 (2007).

Bovik et al., "Multichannel Texture Analysis Using Localized Spatial Filters," IEEE Transactions on Pattern Analysis and Machine Intelligence, 12(1):55-73 (1990).

Burges, C., "A Tutorial on Support Vector Machines for Pattern Recognition," Data Mining and Knowledge Discovery, 2:121-167 (1998).

Cai, S., et al., "Tissue-specific nuclear architecture and gene expression regulated by SATB1," Nat Genet, 34(1):42-51 (2003).

Chang, T., et al., "Texture Analysis and Classification with Tree-Structured Wavelet Transform," IEEE Transactions on Image Processing, 2(4):429-441 (1993).

Cheutin, T., et al., "In vivo dynamics of Swi6 in yeast: evidence for a stochastic model of heterochromatin," Mol Cell Biol 24(8):3157-67 (2004).

Constantinescu, D., et al., "Lamin A/C Expression Is a Marker of Mouse and Human Embryonic Stem Cell Differentiation," Stem Cells, 24:177-185 (2006).

Cremazy, F. G. E., et al., "Imaging in situ protein-DNA interactions in the cell nucleus using FRET-FLIM," Exp Cell Res., 309:390-396 (2005).

Csiszar, I., "Why least squares and maximum entropy? An axiomatic approach to inference for linear inverse problems," The Annals of Statistics, 19(4):2032-2066 (1991).

Deckert, et al., "F-8 DFBW Sensor Failure Identification Using Analytic Redundancy," IEEE Transactions on Automatic Control, 22(5)795-803.

Desai, M., et al., "Adaptive Robust Constrained Matched Filter and Subspace Detection," Conference Record of the IEEE 36th Asilomar Conference on Signals, Systems and Computers, Monterey, Calif., 768-772 (2002).

Desai, M., et al., "Diffusion Tensor Model Based Smoothing," IEEE 705-708 (2002).

Desai, M., et al., "Dual Redundant Sensor FDI Techniques Applied to the NASA F8C DFBW Aircraft," Proc. AIAA Conference on Guidance and Control, 502-513(1976).

Desai, M., et al., "Functional MRI Activity Characterization Using Response Time Shift Estimates From Curve Evolution," IEEE Transactions on Medical Imaging 21(11):1402-1412 (Nov. 2002).

Desai, M., et al., "Functional MRI Activity Characterization: An Estimation and Decision Theoretic Approach," Medical Imaging Systems Technology, 5:251-295 (2005).

Desai, M., et al., "Model based Variational Smoothing and Segmentation for Diffusion Tensor Imaging in the Brain", NeuroInformatics, 4(3):217-233 (2006).

Desai, M., et al., "Non Gaussian Robust Matched Subspace Detectors and Signal Design Analysis for a Class of Separable Subspaces," Proceedings of the 3rd IEEE Sensor Array and Multichannel Signal Processing Workshop, Barcelona, Spain, 225-229 (Jul. 2004).

Desai, M., et al., "Non Gaussian Subspace Learning in the Presence of Interference," 3rd IEEE Sensor Array and Multichannel Signal Processing Workshop, Barcelona, Spain (Jul. 2004).

Desai, M., et al., "Robust Constrained Non Gaussian FMRI Detection," 3rd IEEE International Symposium on Biomedical Imaging, Arlington, Virginia, pp. 1076-1079 (2006).

Desai, M., et al., "Robust Gaussian and Non-Gaussian Matched Subspace Detection," IEEE Transaction on Signal Processing. 51(12):3115-3127 (Dec. 2003).

Desai, M., et al., "Robust Subspace Learning and Detection in Laplacian Noise and Interference," IEEE Transactions on Signal Processing, 55(7):3585-3595 (Jul. 2007).

Desai, M., et al., "Subspace Learning in Non-Gaussian Log-Concave Noise," IEEE, 2364-2369 (2004).

Dietterich, T. G., et al., "Solving Multiclass Learning Problems via Error-Correcting Output Codes," Journal of Artificial Intelligence Research, 2:263-286 (1995).

Do, M. N., et al., "Wavelet-Based Texture Retrieval Using Generalized Gaussian Density and Kullback-Leibler Distance," IEEE Transaction on Image Processing, 11(2):146-158 (Feb. 2002).

Ekwall, K., "Epigenetic Control of Centromere Behavior," Annu. Rev. Genet., 41:63-81 (2007).

Feuerbach, F., et al., "Nuclear architecture and spatial positioning help establish transcriptional states of telomeres in yeast," Nature Cell Biology, 4:214-21 (Mar. 2002).

Furuyama, T., et al., "Chaperone-mediated assembly of centromeric chromatin in vitro," Proc Natl Acad Sci USA, 103(16):6172-6177 (Apr. 18, 2006).

Galloway, M., "Texture Analysis Using Gray Level Run Lengths," Computer Graphics and Image Processing, vol. 4, Issue 2, pp. 172-179 (1975).

Gerlich, D., et al., "Global chromosome positions are transmitted through mitosis in mammalian cells," Cell 112(6):751-64 (Mar. 21, 2003).

Grewal, S. I. S., et al., "Heterochromatin and Epigenetic Control of Gene Expression," Science, 301:798-802 (Aug. 8, 2003).

Hanlon, S. E., et al., "Depletion of H2A-H2B dimers in *Saccharomyces cerevisiae* triggers meiotic arrest by reducing IME1 expression and activating the BUB2-dependent branch of the spindle checkpoint," Genetics Society of America, 164:1333-1344 (2003).

Haralick, R. M., "Statistical and Structural Approaches to Texture," Proceedings of the IEEE, 67(5):786-804 (May 1979).

Haralick, R. M., et al., "Textural Features for Image Classification," IEEE Transactions on Systems, Man, and Cybernetics, vol. SMC-3(6):610-621 (Nov. 1973).

Hassan, A. B., et al., "Replication and transcription sites are colocalized in human cells," Journal of Cell Science, 107:425-434 (1994).

Hattori, N., et al., "Epigenetic Control of Mouse Oct-4 Gene Expression in Embryonic Stem Cells and Trophoblast Stem Cells," The Journal of Biological Chemistry, 279(17):17063-17069 (2004).

Hermes, L., et al., "Feature Selection for Support Vector Machines," IEEE Computer Society, 2:712-715 (2000).

Hirschhorn, J. N., et al., "Evidence that SNF2/SWI2 and SNF5 activate transcription in yeast by altering chromatin structure," Genes Dev., 6:2288-2298 (1992).

Huang, S., et al., "A novel role for histone chaperones CAF-1 and Rtt106p in heterochromatin silencing," THe Embo Journal, 26(9):2274-83 (2007).

Huang, S., et al., "Rtt106p is a histone chaperone involved in heterochromatin-mediated silencing," Proc Natl Acad Sci USA, 102(38):13410-13415 (Sep. 20, 2005).

Iversen, P. W., et al., "A Comparison of Assay Performance Measures in Screening Assays: Signal Window, Z' factor; and Assay Variability Ratio," Journal of Biomolecular Screening, 11(3):247-52 (2006).

Jain, A. K., et al., "Unsupervised Texture Segmentation Using Gabor Filters," Pattern Recognition, 24(12):1167-1186 (1991).

Jeffreys, C., "Support Vector Machine and Parametric Wavelet-Based Texture Classification of Stem Cell Images," Masters thesis, Operations Research Center, MIT, Cambridge, Mass (2004).

Jenuwein, T., et al., "Translating the Histone Code." Science, 293:1074-1080 (Aug. 10, 2001).

Kim, H. J., et al., "Histone chaperones regulate histone exchange during transcription," The Embo Journal, 26:4467-4474 (2007).

Kimura, H., et al., "Kinetics of Core Histones in Living Human Cells: Little Exchange of H3 and H4 and Some Rapid Exchange of H2B," The Journal of Cell Biology, 153(7):1341-1353 (Jun. 25, 2001).

Kociolek, M., et al., "Discrete Wavelet Transform—Derived Features for Digital Image Texture Analysis," Proc. Of International Conference on Signals and Electronic Systems pp. 163-168 (2001).

Korber, P., et al., "SWRred Not Shaken: Mixing the Histones," Cell 117(1) 5-7 (Apr. 2, 2004).

Krouwels, I. M., et al., "A glue for heterochromatin maintenance: stable SUV39H1 binding to heterochromatin is reinforced by the SET domain," The Journal of Cell Biology, 170(4):537-49 (2005).

Krupadanam et al., Multivariable Adaptive Control Design with Applications to Autonomous Helicopters, Journal of Guidance Control and Dynamics, 25(5):843-851 (2002).

Lam, A. L., et al., "Control of gene expression and assembly of chromosomal subdomains by chromatin regulators with antagonistic functions," Chromosoma, 114(4):242-51 (2005).

Lam, A. L., et al., "Human centromeric chromatin is a dynamic chromosomal domain that can spread over noncentromeric DNA," Proc Natl Acad Sci USA, 103(11):4186-4191 (2006).

Laribee, R. N., et al., "H2B ubiquitylation in transcriptional control: a FACT-finding mission," Genes & Development, 21:737-743 (2007).

Laws, K., "Rapid Texture Identification," SPIE Image Processing for Missile Guidance, pp. 238:376-380 (1980).

Lee, J. H., et al., "Histone Deacetylase Activity is Required for Embryonic Stem Cell Differentiation," Genesis 38(1):32-38 (2004).

Li, K. et al., "Cell Population Tracking and Lineage Construction with Spatiotemporal Context," Medical Image Analysis, 12(5):546-566 (2008).

Lowry, N., et al., "Classification of Human Embryonic Stem Cell Colonies Using Multiresolution Non-Gaussian Statistical Texture Models," Submitted. (2009).

Ma, W. Y., et al., "A Comparison of Wavelet Transform Features for Texture Image Annotation," International Conference on Image Processing, pp. 256-259 (1995).

Mangin, J. et al., "A framework based on spin glass models for the inference of anatomical connectivity from diffusion-weighted MR data—a technical review," NMR in Biomedicine, 15:481-492 (2002).

Mangoubi, R. S., et al., A Robust Failure Detection and Isolation Algroithm, Proceedings of the 34th Conference on Decision & Control, pp. 2377-2382 (1995).

Mangoubi, R., et al., Performance Evaluation Of Multiresolution Texture Analysis Of Stem Cell Chromatin, Fifth IEEE International Symposium of Biomedical Imaging, Washington, D.C. (2008).

Mangoubi, R.S., et al., "Non-Invasive Texture-Based Classification of Stem Cell Colonies Using Support Vector Machine and Parametric Classifiers," for IEEE Trans. on Biomedical Engineering (2005).

Mao, J., et al., "Texture Classification and Segmentation Using Multiresoulution Simultanous Autoregressive Models," Pattern Recognition, 25(2):173-188 (1992).

Marshall, W. F., et al., "Interphase chromosomes undergo constrained diffusional motion in living cells," Current Biology, 7(12):930-939 (1997).

Meshorer, E., et al., "Hyperdynamic Plasticity of Chromatin Proteins in Pluripotent Embryonic Stem Cells," Developmental Cell, 10(1):105-116 (2006).

Mikkelsen, T. S., et al., "Genome-wide maps of chromatin state in pluripotent and lineage-committed cells," Nature, 448:553-560 (2007).

Misteli, T., "Concepts in nuclear architecture," BioEssays, 27:477-487 (2005).

Misteli, T., "Spatial Positioning: A New Dimension in Genome Function," Cell, 119:153-156 (Oct. 15, 2004).

Mizuguchi, G., et al., "ATP-Driven Exchange of Histone H2AZ Variant Catalyzed by SWR1 Chromatin Remodeling Complex," Science, 303:343-348 (Jan. 16, 2004).

Mousson, F., et al., "Structural basis for the interaction of Asf1 with histone H3 and its functional implications," Proc Natl Acad Sci USA, 102(17):5975-5980 (Apr. 26, 2005).

Mulkern, R. et al., Complementary aspects of diffusion imaging and fMRI; I: structure and function, Magnetic Resonance Imaging, 24(4):463-474.

O'Brien, T. P., et al., "Genome Function and Nuclear Architecture: From Gene Expression to Nanoscience," Genome Research, 13:1029-1041 (2003).

Oliver, B., et al., "A non-random walk through the genome," Genome Biology, 6(4):214-214.6 (2005).

Pal-Bhadra, et al., "Heterochromatic Silencing and HP1 Localization in *Drosophila* Are Dependent on the RNAi Machinery," Science, 303:669-672 (2004).

Parada, L. A., et al., "Tissue-specific spatial organization of genomes," Genome Biology, 5(7):R44 (2004).

Parada, L.A., et al., "Chromosome positioning in the interphase nucleus," Trends in Cell Biology, 12(9):425-432 (2002).

Parker, G., "Analysis of MR diffusion weighted images," British Journal of Radiology, 77, sp. iss. 2, pp. 176-185 (2004).

Peltz, S. W., et al., "Autogenous Regulation of Histone mRNA Decay by Histone Proteins in a Cell-Free System," Molecular and Cellular Biology, 7(12):4345-4356 (1987).

Randen, T., et al., "Filtering for Texture Classification: A Comparative Study," IEEE Transactions on Pattern Analysis and Machine Intelligence, 21(4):291-2310 (1999).

Recht, J., et al., "Histone chaperone Asf1 is required for histone H3 lysine 56 acetylation, a modification associated with S phase in mitosis and meiosis," Proc Natl Acad Sci USA, 103(18):6988-6993 (2006).

Reed, T. R., et al., "A Review of Recent Texture Segmentation and Feature Extraction Techniques," CVGIP: Image Understanding, 57(3):359-372. (1993).

Rennie, J. D. J., et al., "Improving Multiclass Text Classification with the Support Vector Machine," Lab-MIT (2001).

Renyi, A., "On Measures of Entropy and Information," Proc. 4th Berkley Symp.on Math Statistics and Probability, U. Calif. Press, 1:547-561 (1961).

Richardson, R. T., et al., "Nuclear Autoantigenic Sperm Protein (NASP), a Linker Histone Chaperone That Is Required for Cell Proliferation," Journal of Biological Chemistry, 281(30):21526-21534 (2006).

Rifkin, R., "Everything Old is New Again: A Fresh Look at Historical Approaches in Machine Learning," PhD thesis, Massachusetts Institute of Technology (2002).

Rodriguez, P., et al., "NAP-2: Histone Chaperone Function and Phosphorylation State Through the Cell Cycle," J. Mol. Biol., 298(2):225-238 (2000).

Rui, Y., et al., "Image Retrieval: Current Techniques, Promsing Directions, and Open Issues," Journal of Visual Communication and Image Representation, 10:39-62 (1999).

Sammak, P. J., et al., "Detection of Single Fluorescent Microtubules and Methods for Determining Their Dynamics in Living Cells," Cell Motility and the Cytoskeleton 10:237-245 (1988).

Sammak, P. J., et al., "Direct observation of microtubule dynamics in living cells," Nature 332):724-726 (1988).

Sammak, P. J., et al., High Content Analysis of Human Embryonic Stem Cell Growth and Differentiation. High Content Screening: Science, Techniques, and Applications. S. A. Hanney. Hoboken, NJ, John Wiley (2008).

Shah, J., "Grayscale skeletons and segmentation of shapes," Computer Vision and Image Understanding 99, 96-109 (2005).

Smith, J. R., et al., "Transform Features for Texture Classification and Discriminaion in Large Image Databases," I.E.E.E. International Conference on Image Processing (1994).

Takahashi, F., et al., "Decision-Tree-Based Multiclass Support Vector Machines," Proceedings of the 9th International Conference on Neural Information Processing, 3:418-1422.

Teixeira, M. T., et al., "Genome-wide nuclear morphology screen identifies novel genes involved in nuclear architecture and gene-silencing in *Saccharomyces cerevisiae*," J. Mol. Biol., 321(4):551-561 (2002).

Thomson, I., et al., "The Radial Positioning of Chromatin Is Not Inherited through Mitosis but Is Established De Novo in early G1," Current Biology, 14(2):166-172 (Jan. 20, 2004).

Tuceryan, M., et al., "Texture Analysis," Handbook of Pattern Recognition and Computer Vision (2nd Edition) pp. 207-248 (1988).

Unser, M., "Sum and Difference Histograms for Texture Classification," IEEE Tansactions on Pattern Analysis and Machine Intelligence. vol. Pami-8(1):118-125.

Vallier, L., et al., "Enhancing and Diminishing Gene Function in Human Embryonic Stem Cells," Stem Cells, 22:2-11 (2004).

Van de Wouwer, G., et al., "Statistical Texture Characterization from Discrete Wavelet Representations," IEEE Transactions on Image Processing, 8(4):592-598, (Apr. 1999).

van Driel, R., et al., "The eukaryotic genome: a system regulated at different hierarchical levels," Journal of Cell Science, 116(20):4067-4075 (2003).

van Steensel, B., et al., "Partial colocalization of glucocorticoid and mineralocorticoid receptors in discrete compartments in nuclei of rat hippocampus neurons," Journal of Cell Science, 109:787-792 (1996).

Wachsmuth, M., et al., "Analyzing Intracellular Binding and Diffusion with Continuous Fluorescence Photobleaching," Biophysical Journal, 84(5):3353-3363 (2003).

Walfridsson, J., et al., "A genome-wide role for CHD remodelling factors and Nap1 in nucleosome disassembly," The Embo Journal, 26(12):2868-2679 (2007).

Walter, J., et al., "Chromosome order in HeLa cells changes during mitosis and early G1, but is stably maintained during subsequent interphase stages," The Journal of Cell Biology, 160(5):685-697 (2003).

Williams, R. R., et al., "Neural induction promotes large-scale chromatin reorganisation of the Mash1 locus," J Cell Sci 119(Pt 1):132-40 (2006).

Willsky, A. S., "Multiresolution Markov Models for Signal and Image Processing," Proceedings of the IEEE, 90(8):1396-1458 (Aug. 2002).

Yang, L., et al., "Flex Controller Interaction During Space Station Reboost," Proc. AAS/AIAA Astrodynamics Specialists Conference, AAS Publications Office, Big Sky, Montana (Aug. 2003).

Zhang, J.-H., et al., "A Simple Statistical Parameter for Use in Evaluation and Validation of High Throughput Screening Assays," Journal of Biomolecular Screening, 4(2):67-73 (1999).

Zlatanova, J., et al., "Nap1: taking a closer look at a juggler protein of extraordinary skills," THe FASEB Journal, 21(7):1294-310 (2007).

* cited by examiner

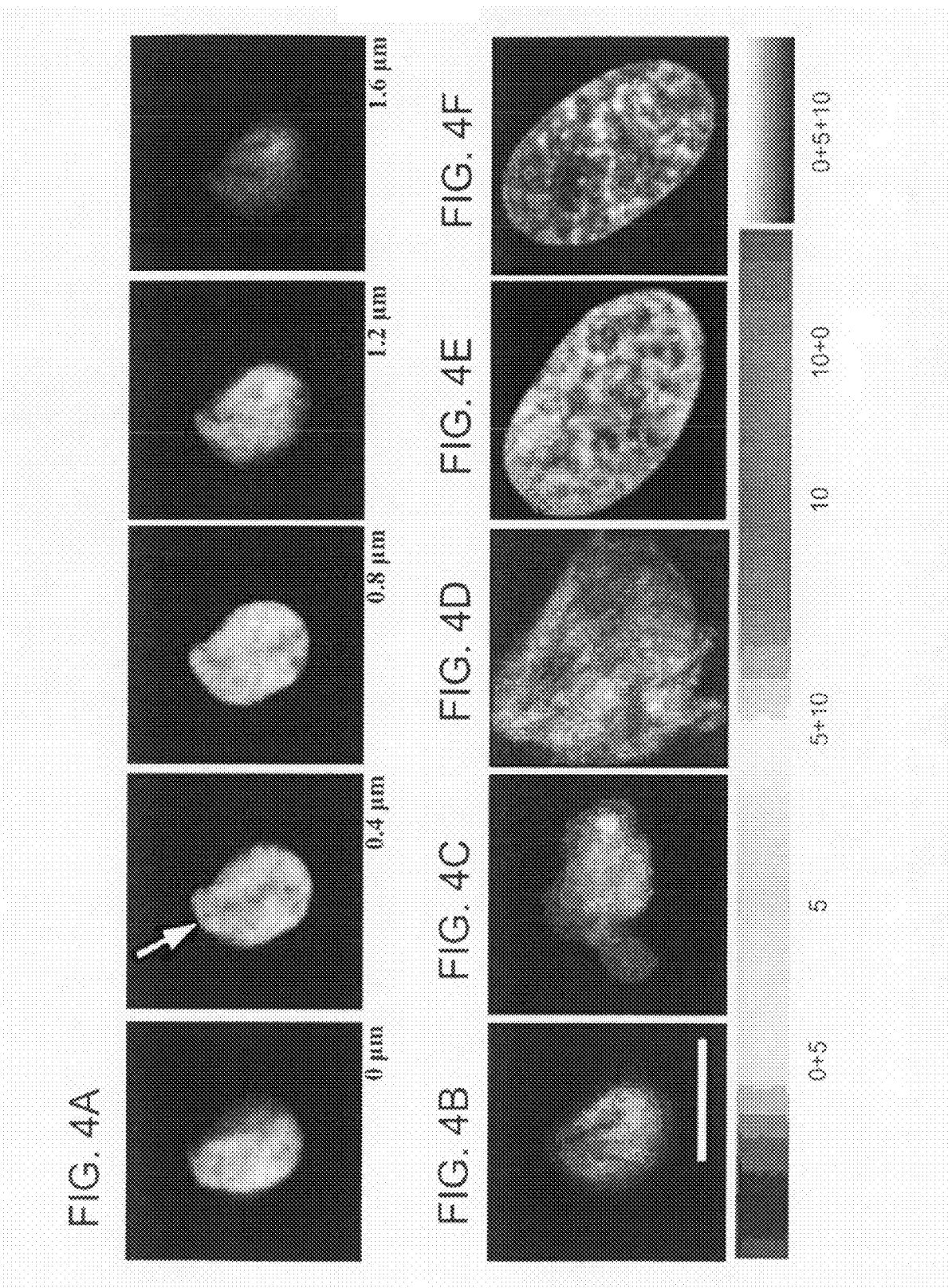

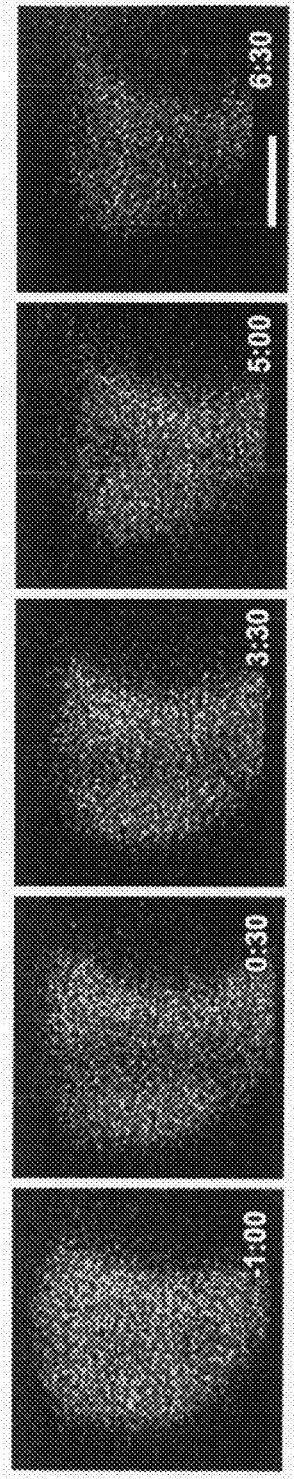
FIG. 6A
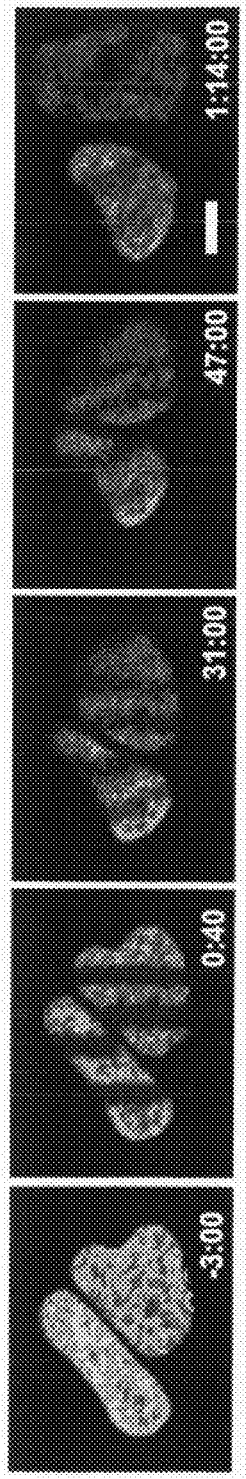
FIG. 6B
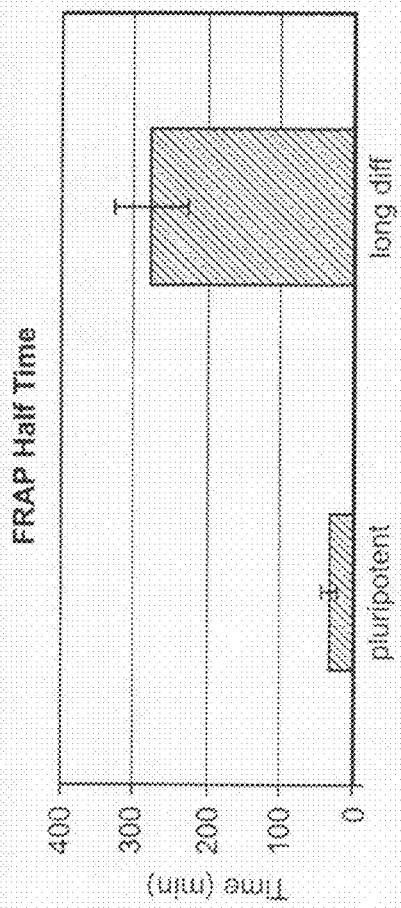

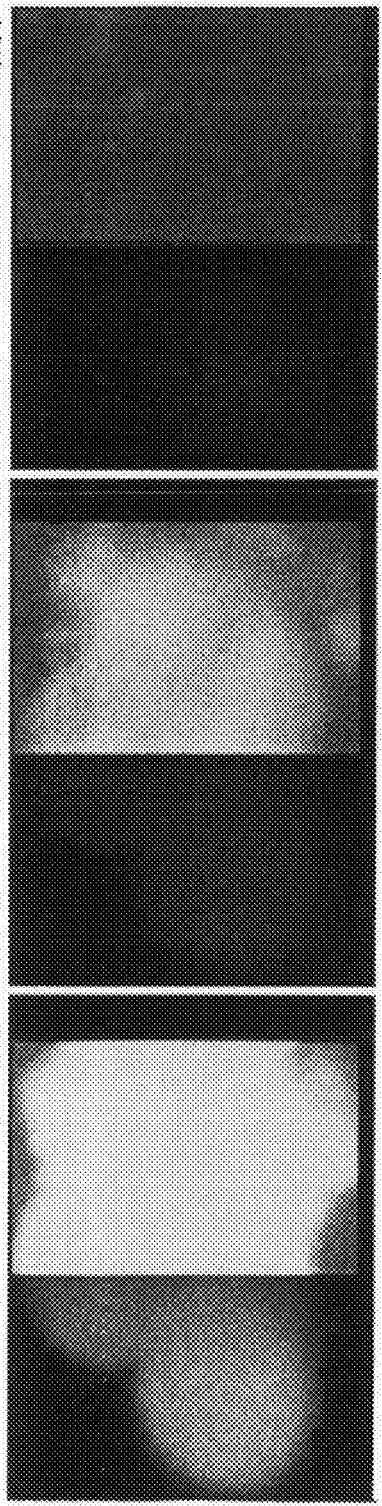
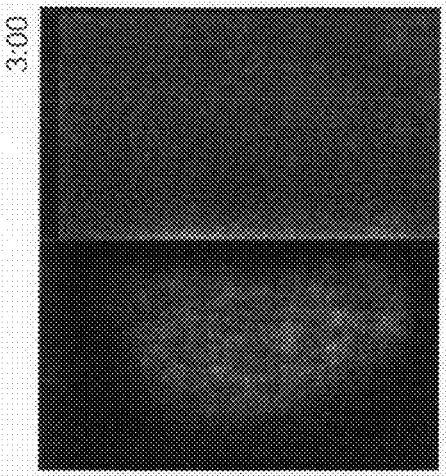
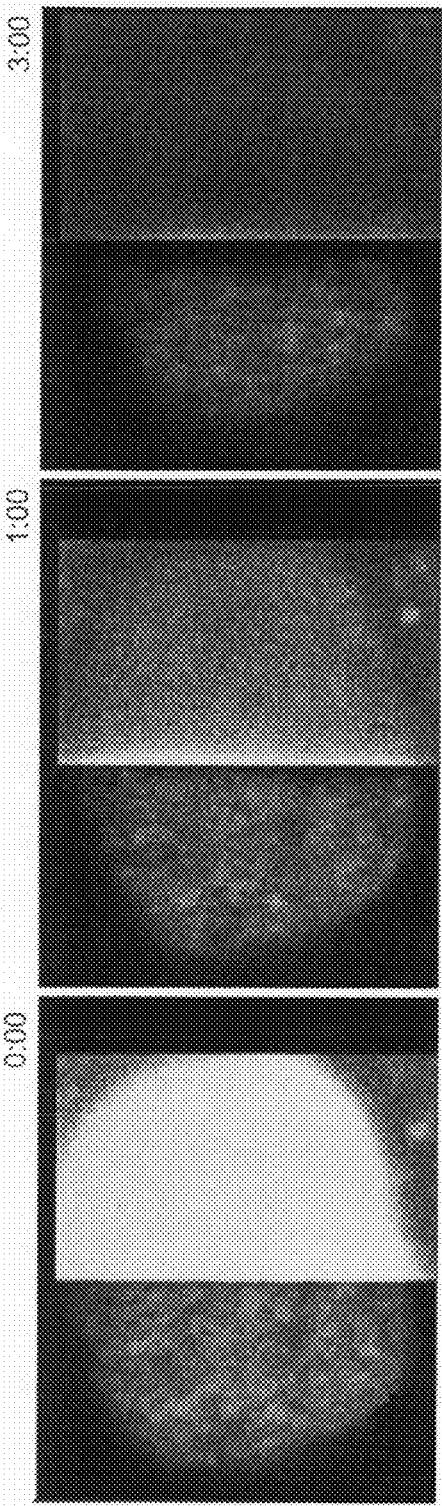

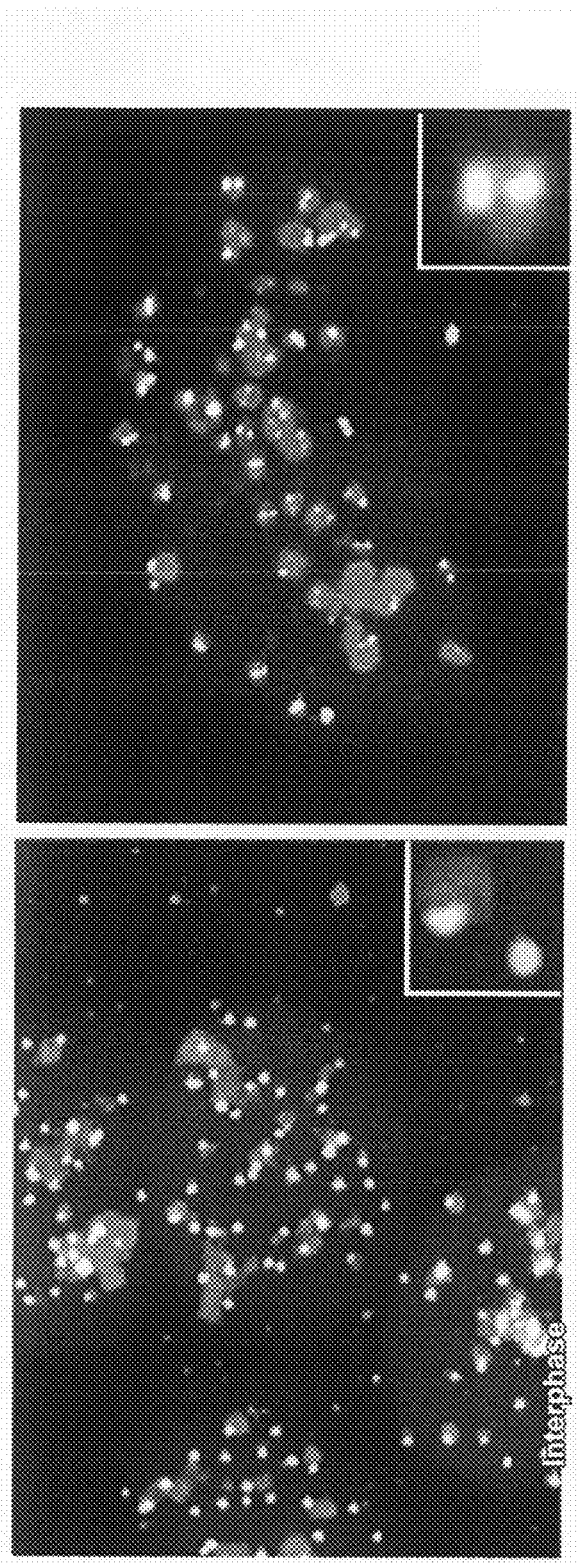
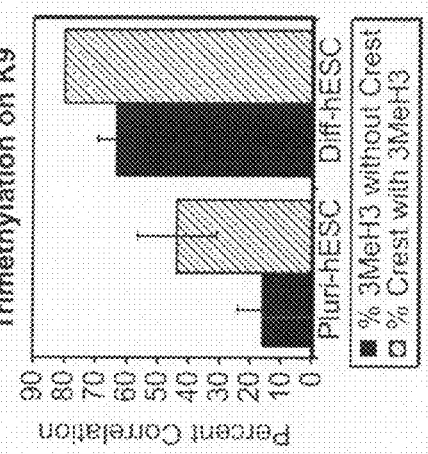
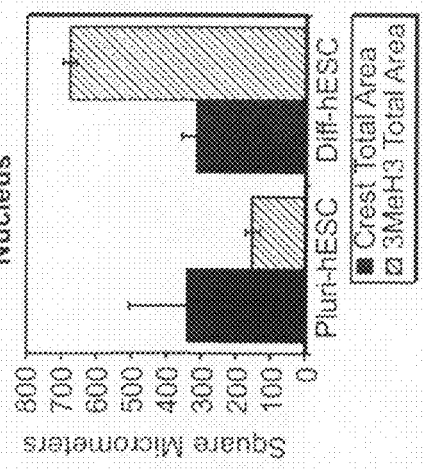
FIG. 10

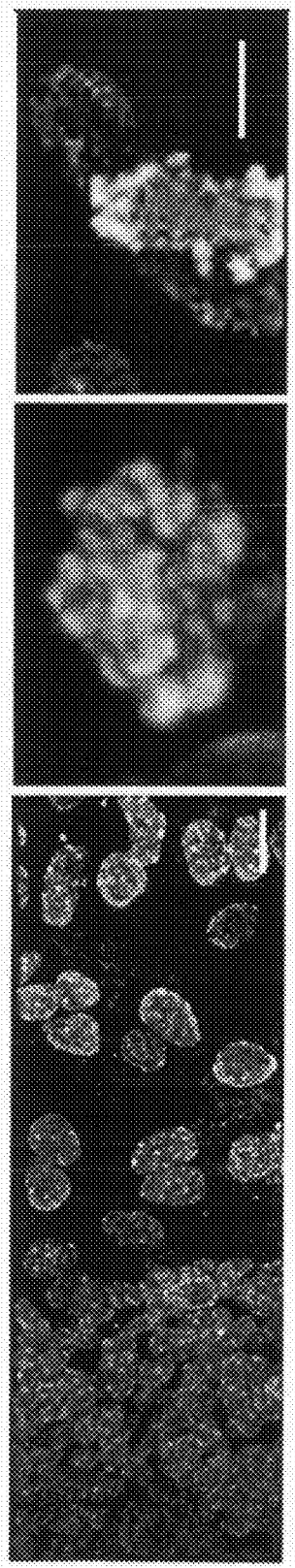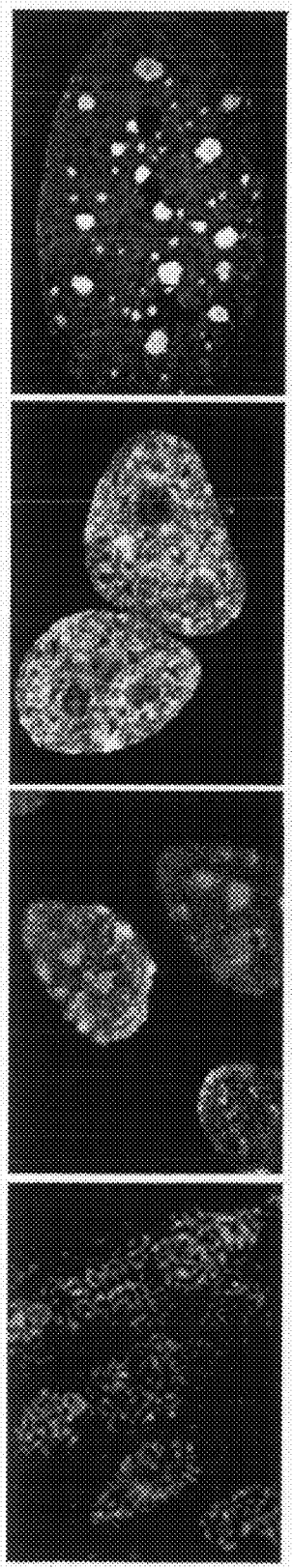

Unlysed

Lysed

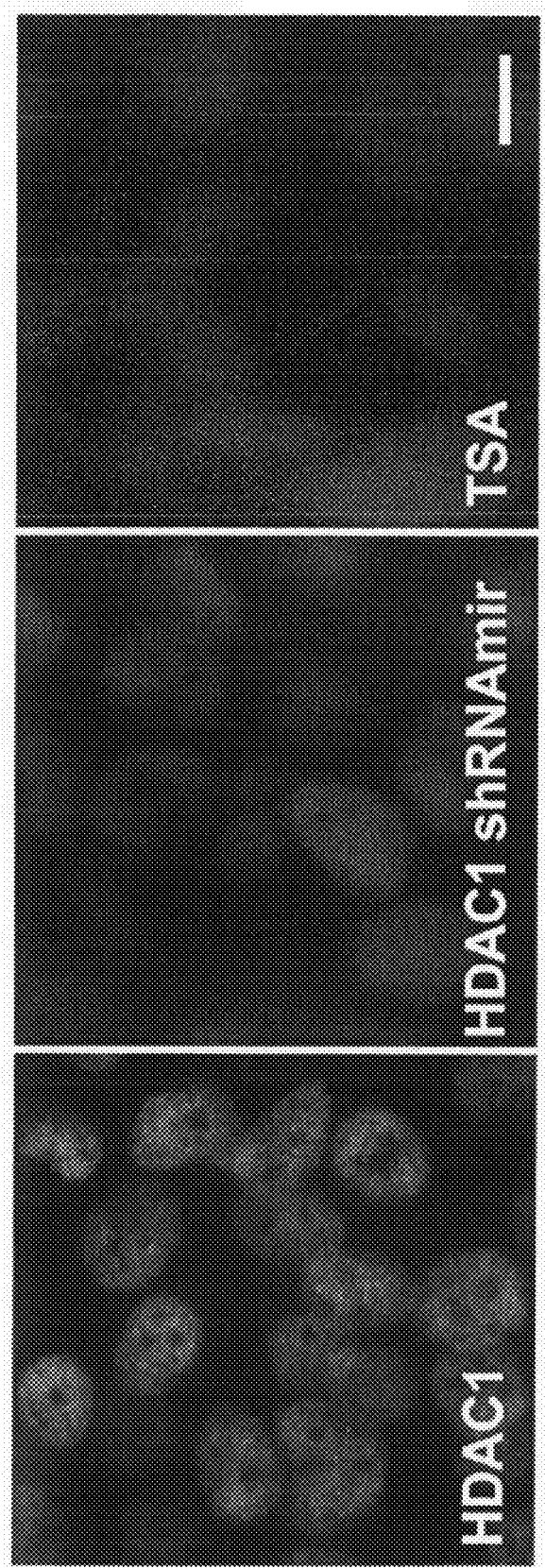

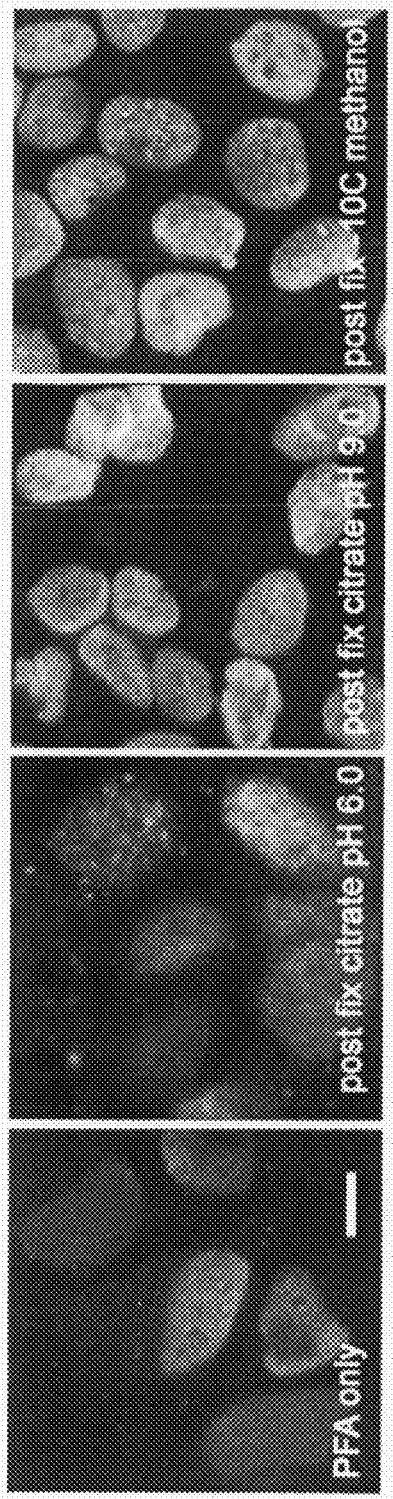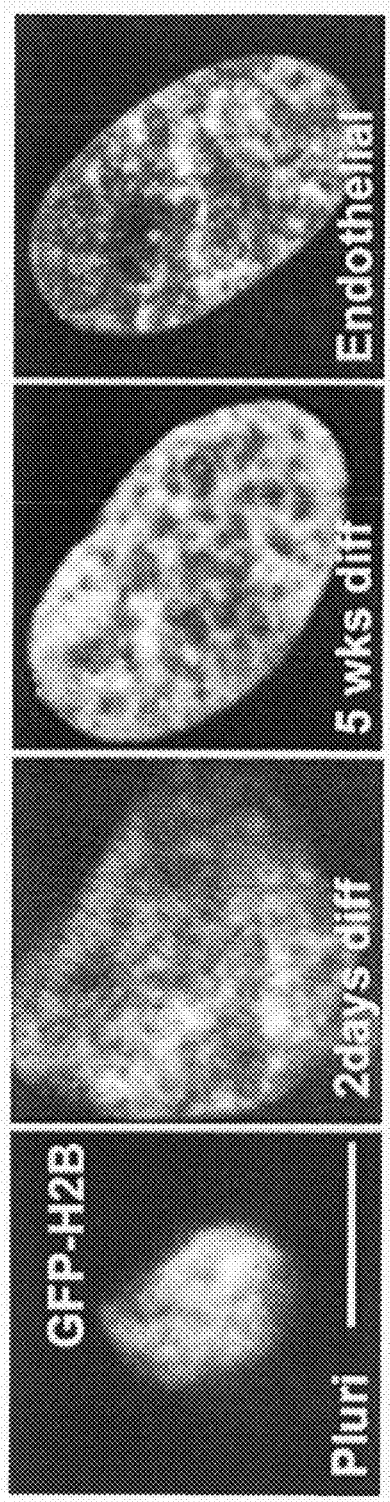

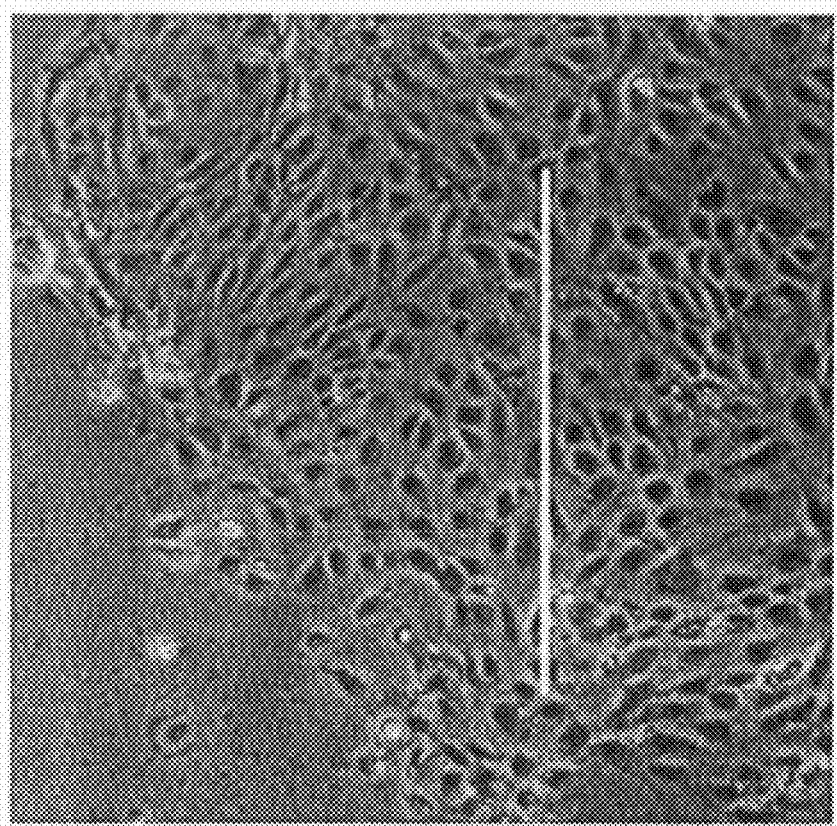
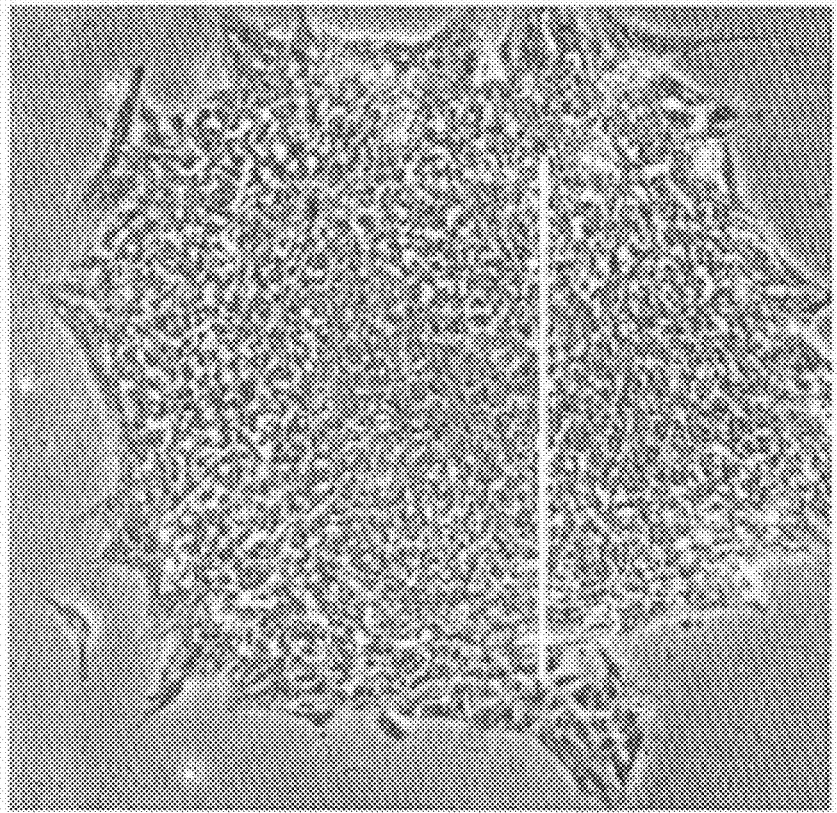
FIG. 21B Differentiated hESC Colony
FIG. 21A Pluripotent hESC Colony

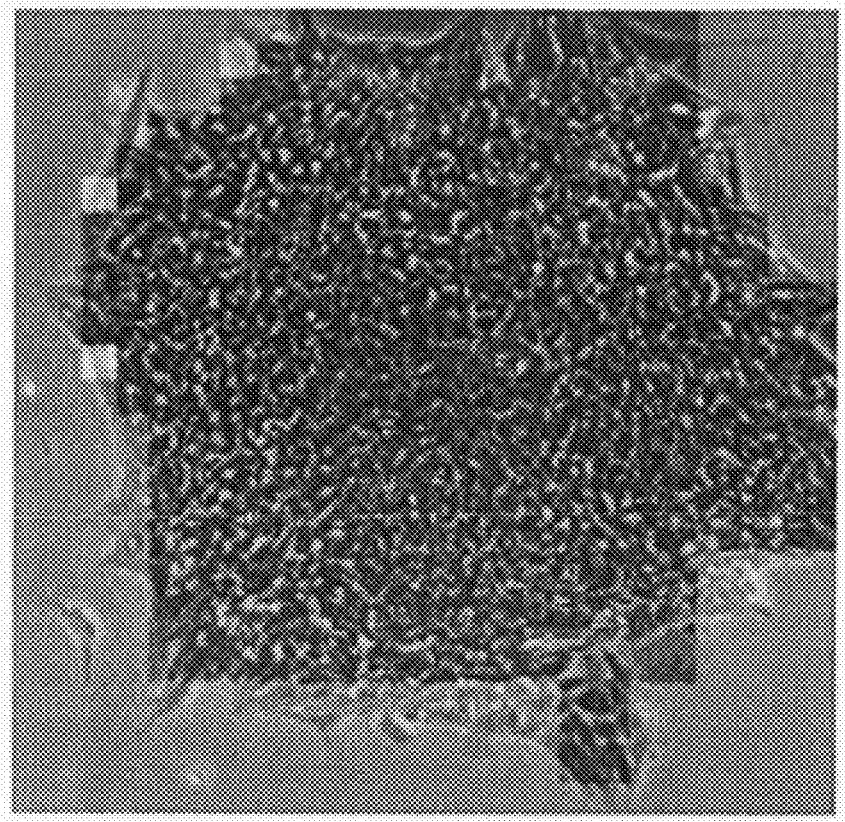
FIG. 24B Classified
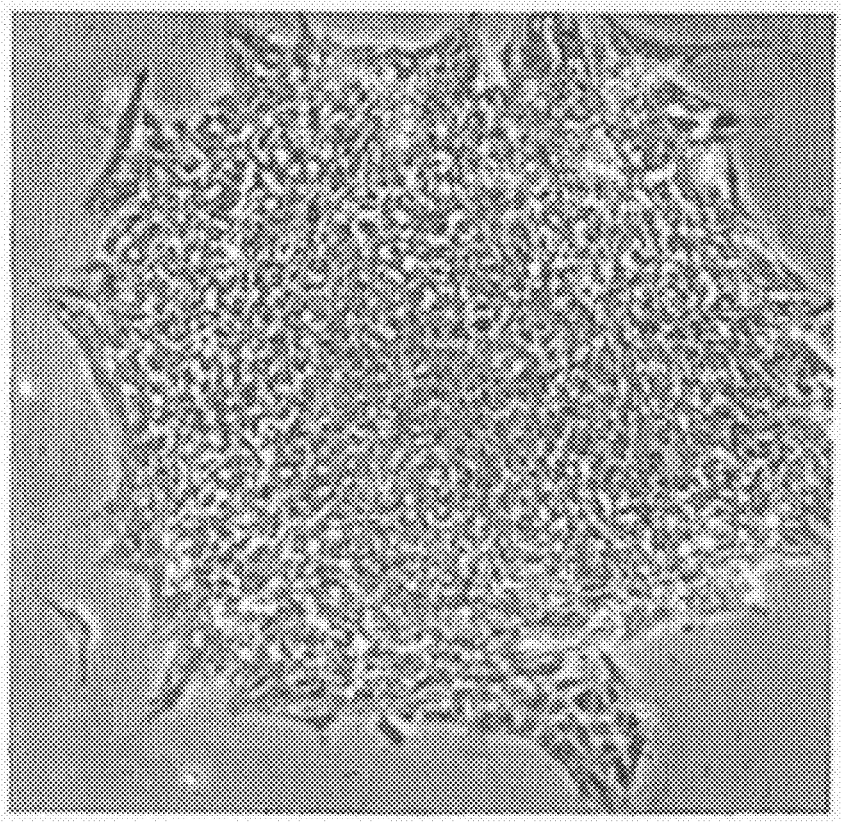
FIG. 24A Unclassified

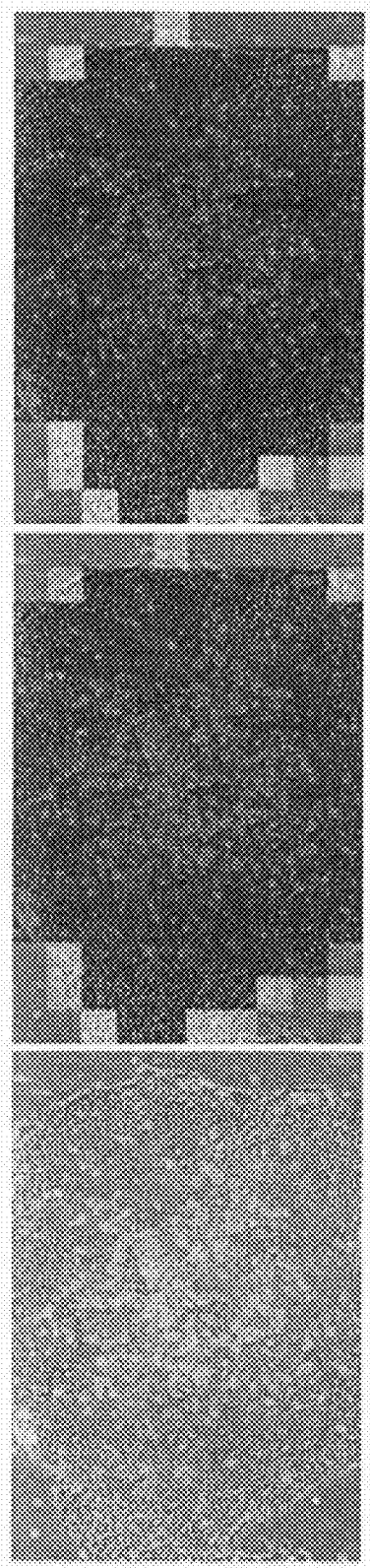
FIG. 25A Original
FIG. 25B First Pass After Step 4
FIG. 25C First Pass After Step 5
FIG. 25D Second Pass After Step 4
FIG. 25E Second Pass After Step 5
FIG. 25F Final — Third Pass After Step 4

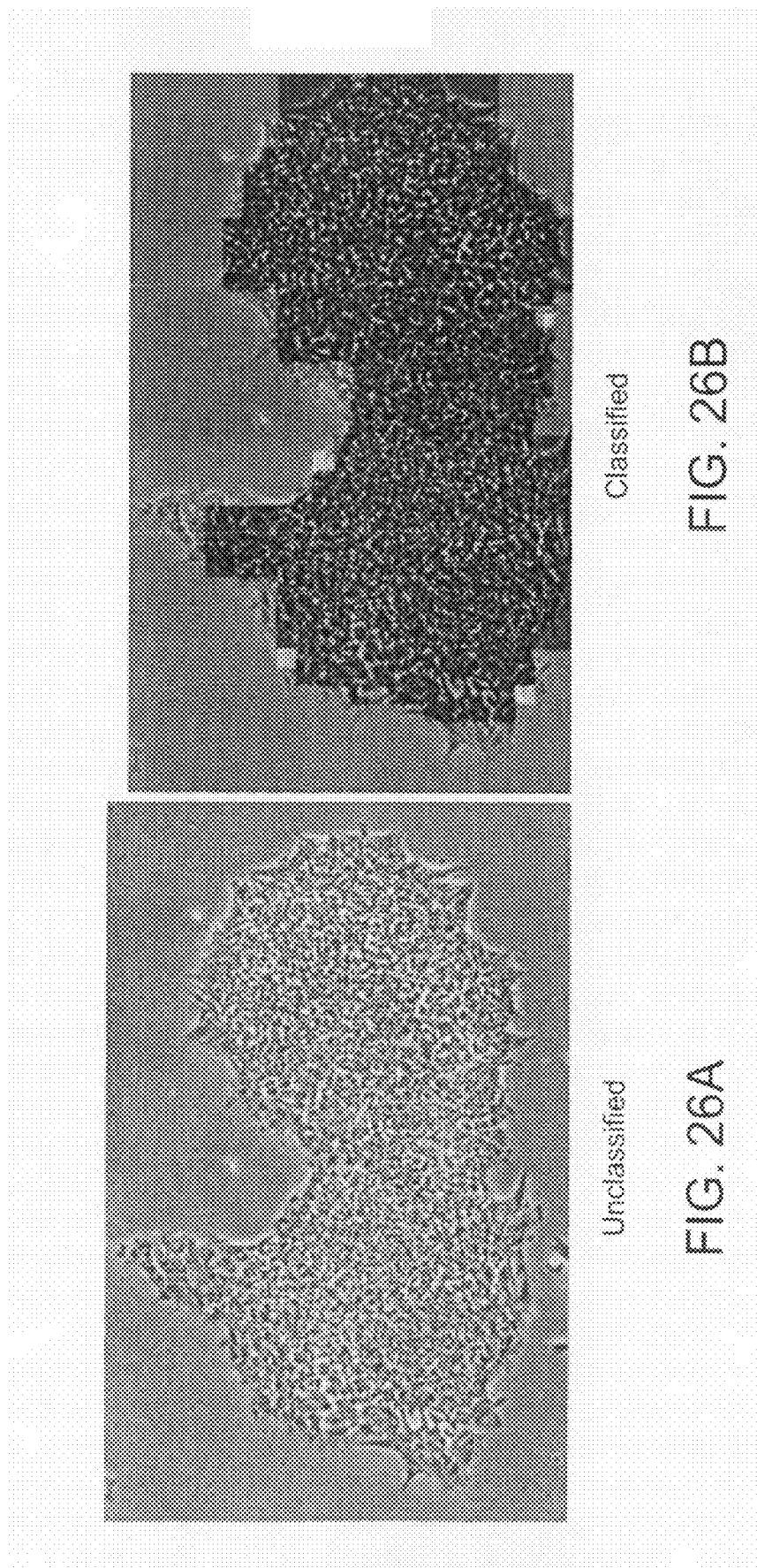

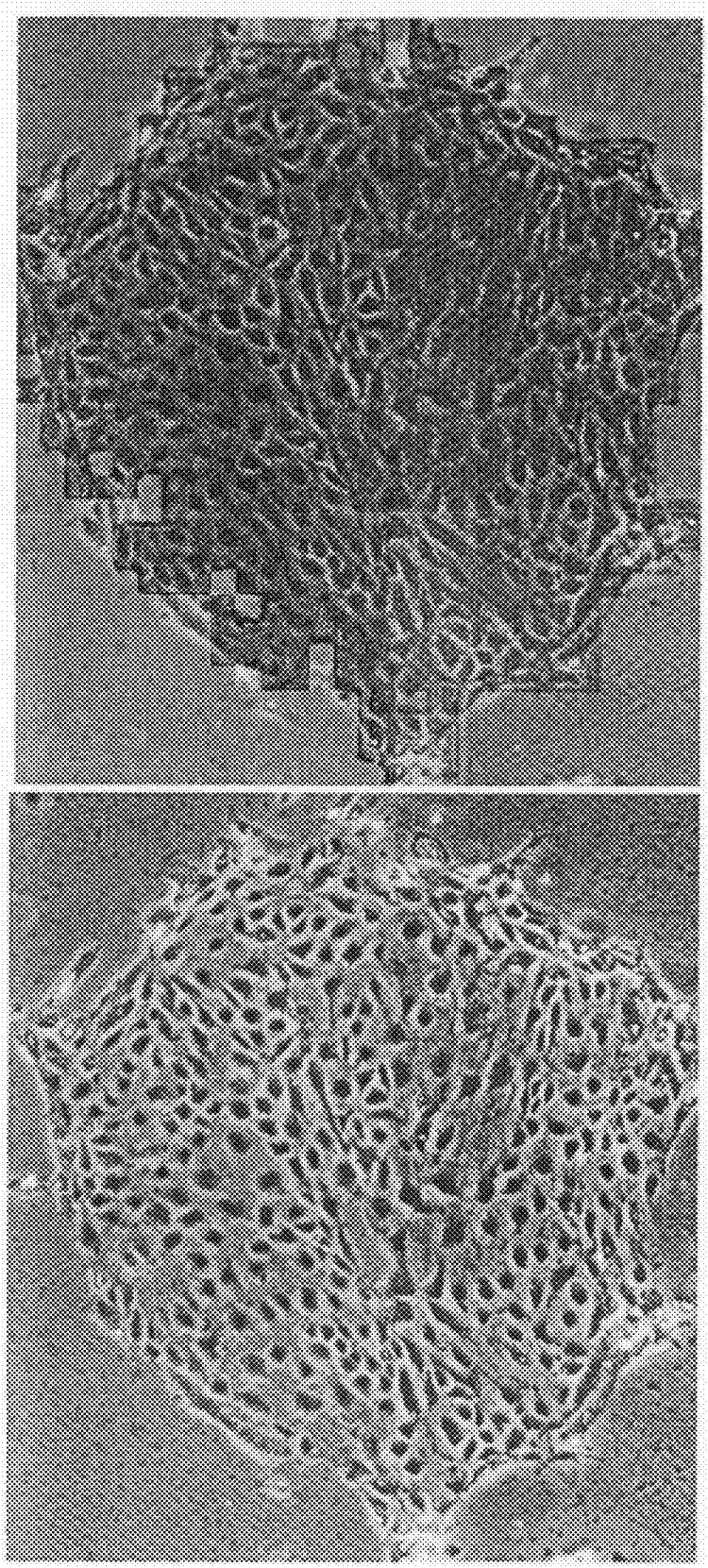

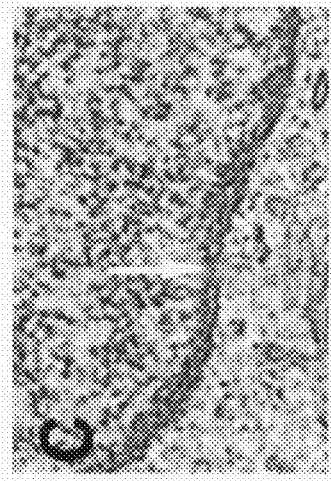
FIG. 37C
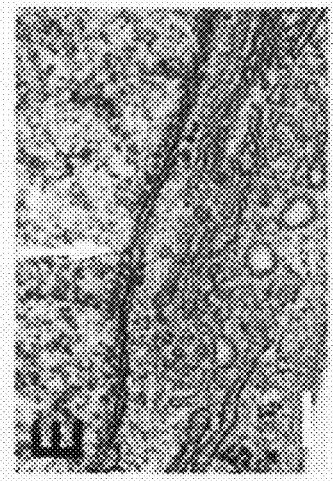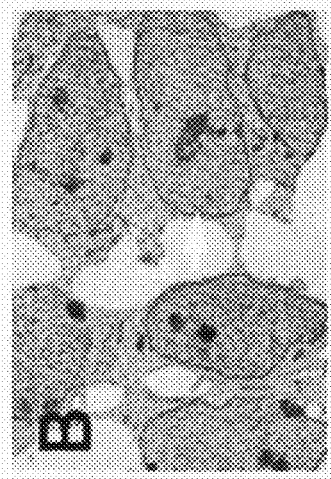
FIG. 37E
FIG. 37B
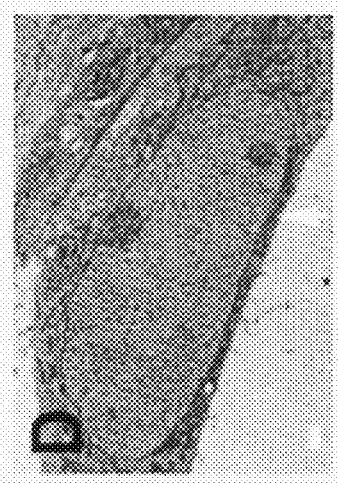
FIG. 37D
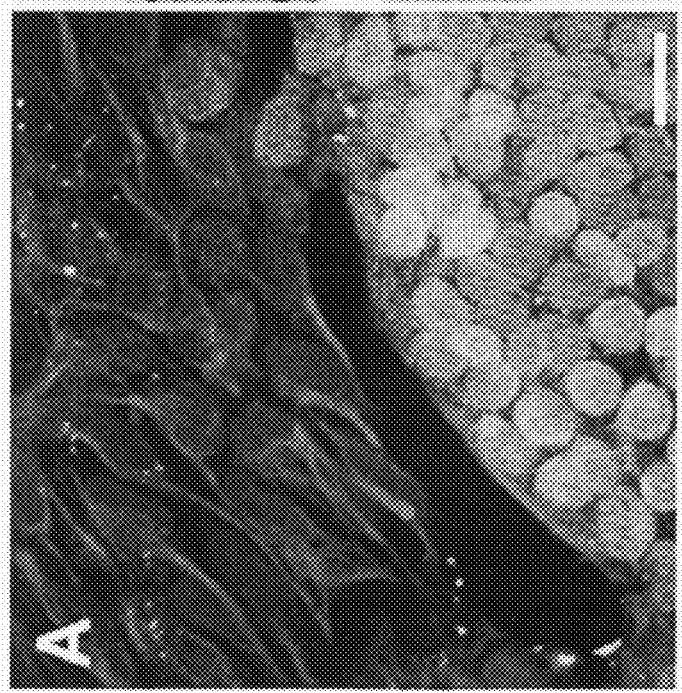
FIG. 37A

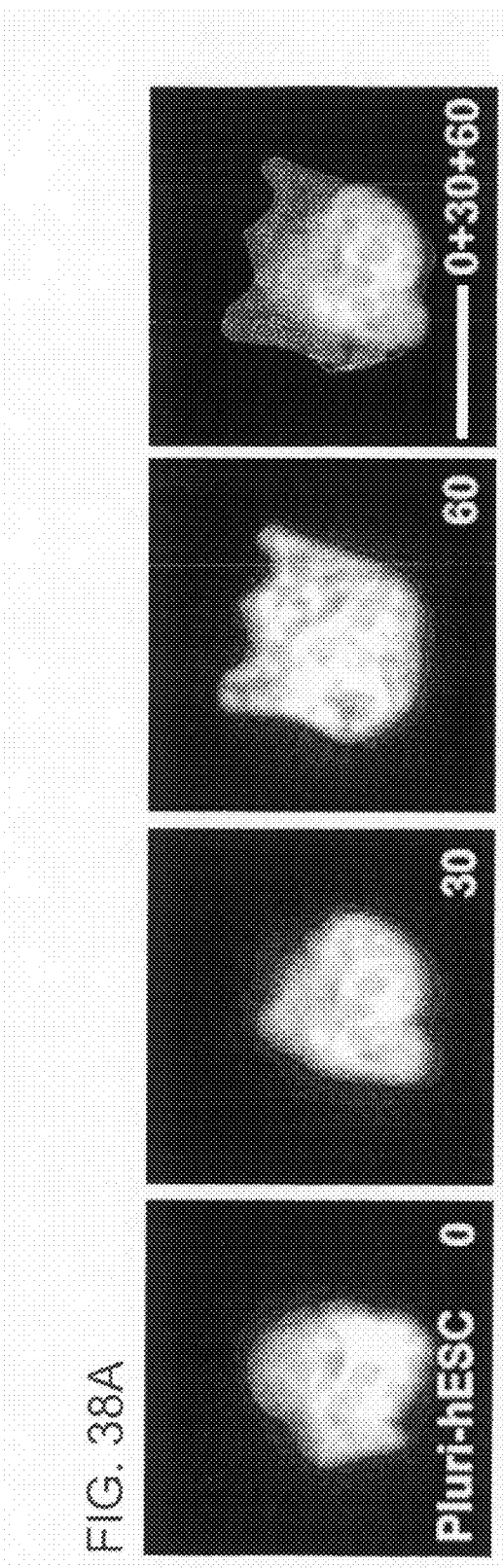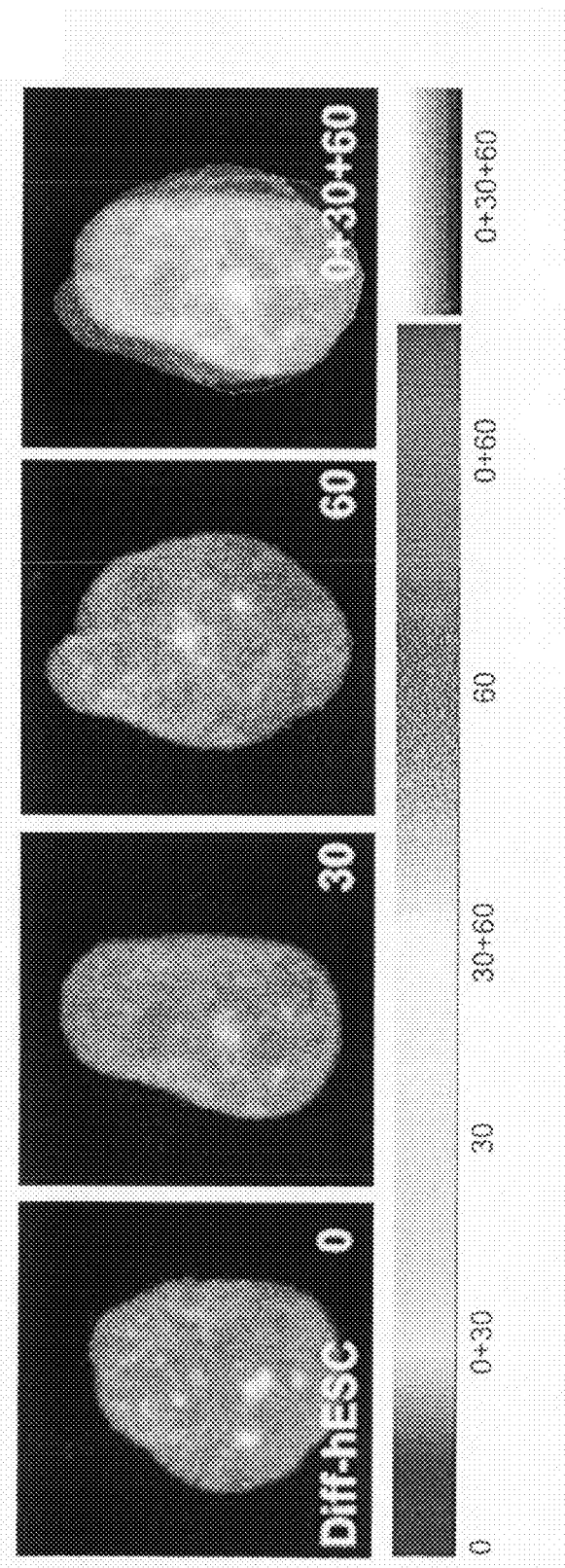

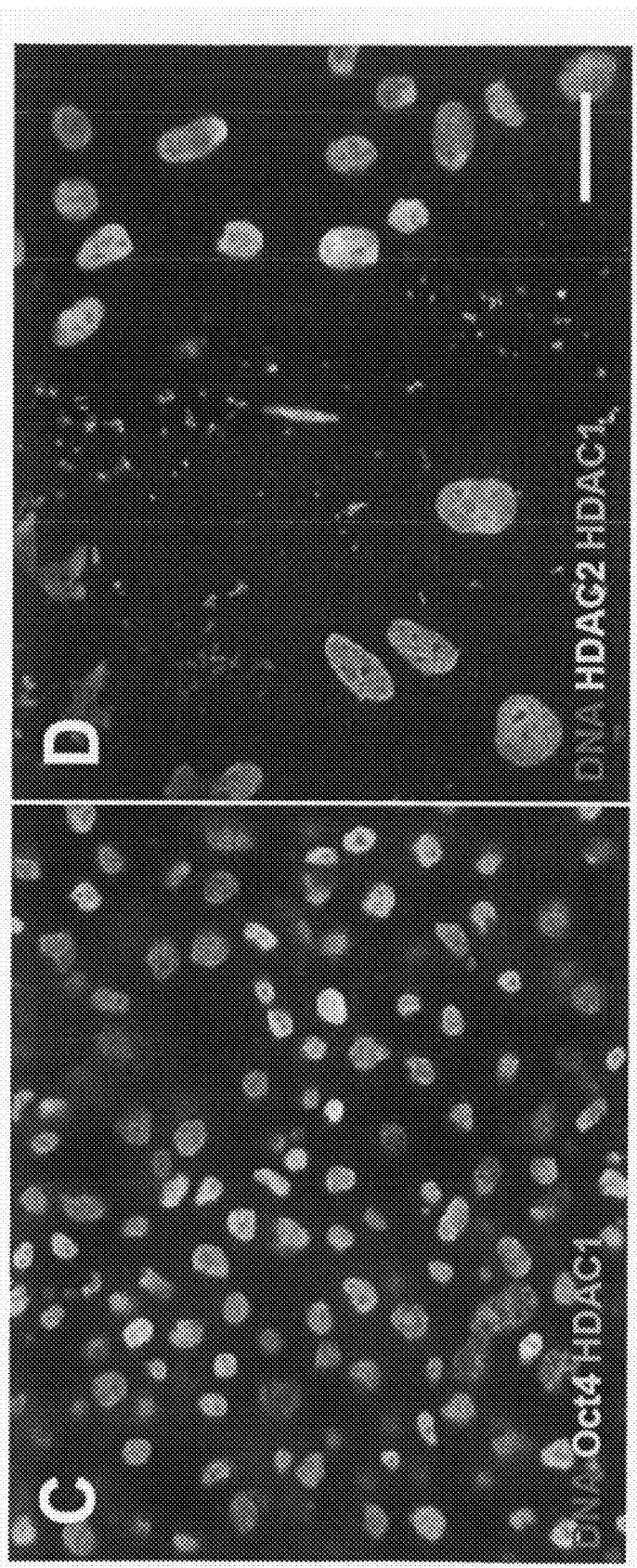

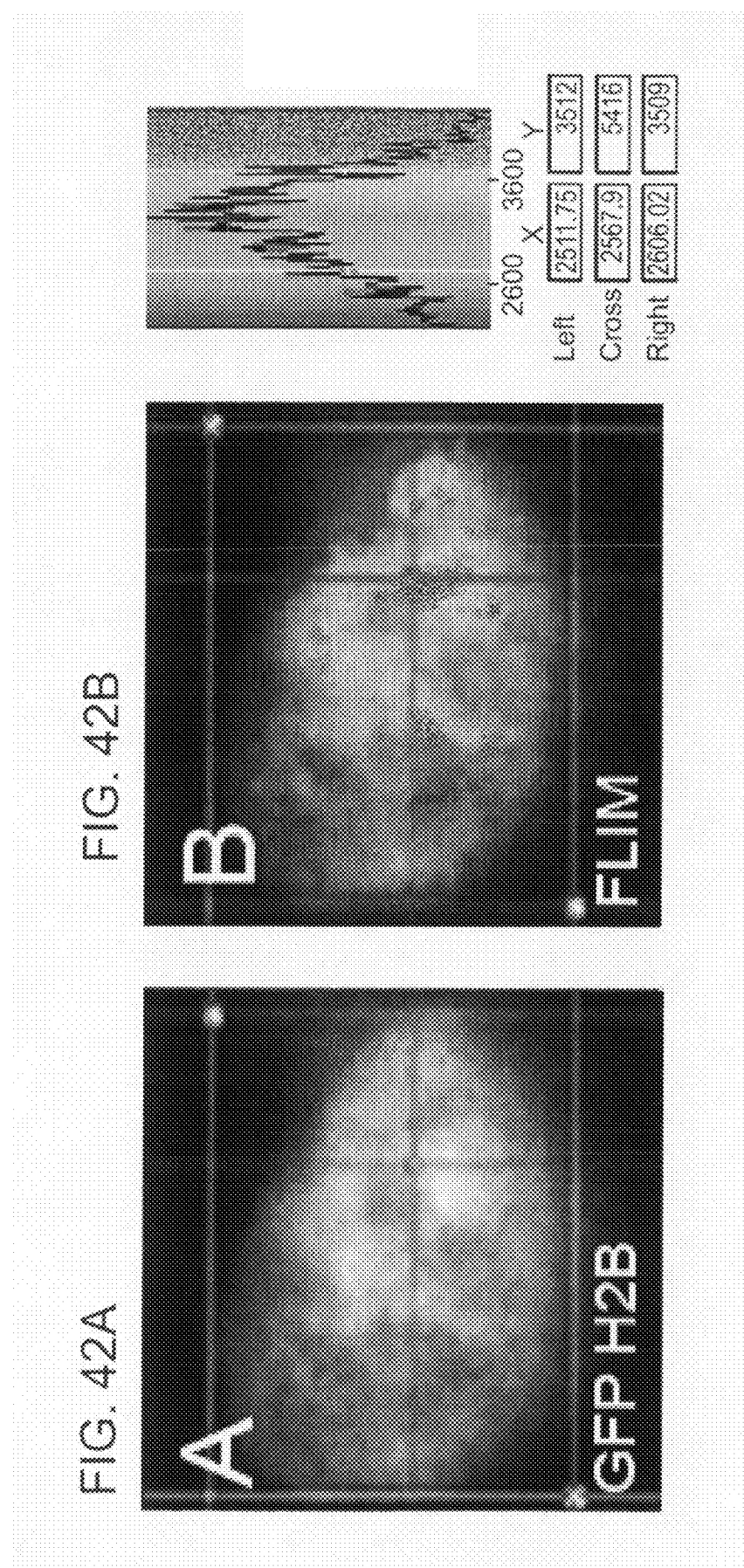

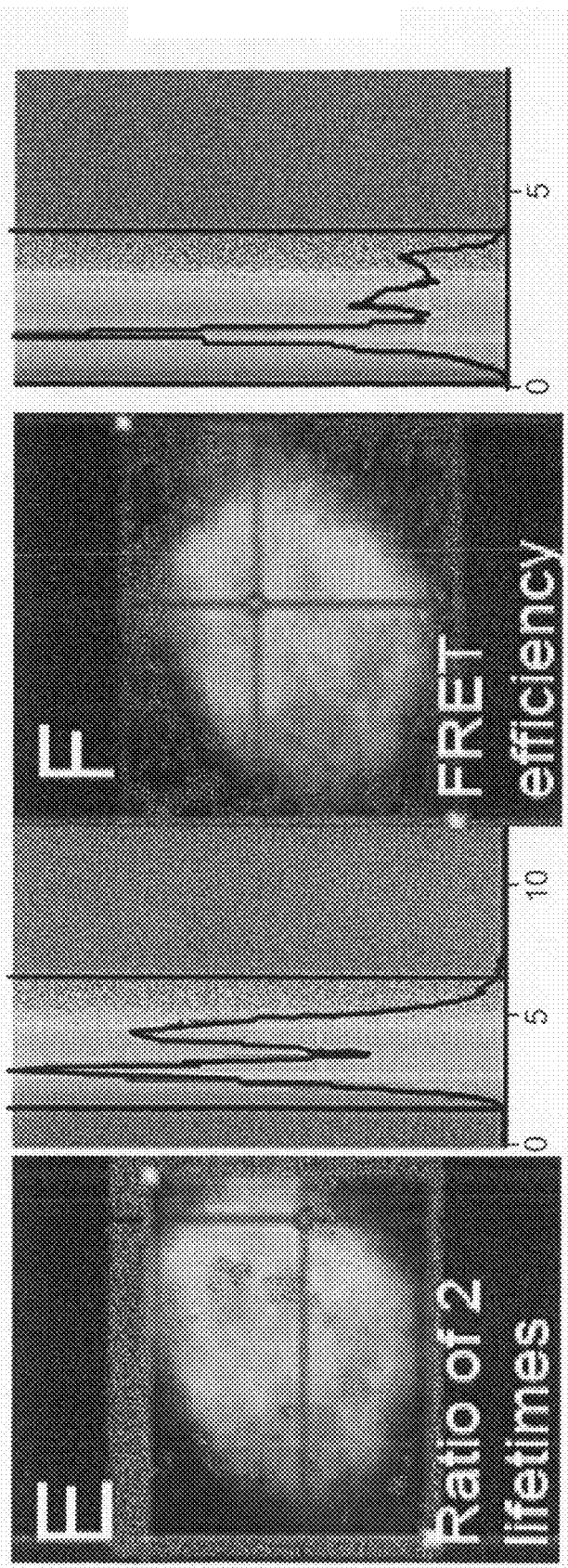

IMAGE-BASED METHODS FOR MEASURING GLOBAL NUCLEAR PATTERNS AS EPIGENETIC MARKERS OF CELL DIFFERENTIATION

CROSS-REFERENCE TO RELATED APPLICATIONS

The present application is a continuation-in-part of U.S. application Ser. No. 11/128,612, filed May 13, 2005, which claims the benefit of U.S. Provisional Application No. 60/570,650, filed May 13, 2004. This application also claims the benefit of U.S. Provisional Application Nos. 61/011,456, filed Jan. 16, 2008, 61/021,513, filed Jan. 16, 2008, and 61/143,399, filed Jan. 8, 2009, the disclosures of which are incorporated herein by reference in their entirety.

STATEMENT REGARDING FEDERAL FUNDING

Work described herein was funded, in whole or in part, by Grant No. 1 RO1 EB006161-01A2 awarded by the National Institutes of Health (NIH). The United States Government has certain rights in this invention.

BACKGROUND OF THE INVENTION

Changes in gene expression related to human development and related to development of cancer (tumorigenesis) are regulated by changes in the organization of chromatin. These mechanisms differ from gene mutations which occur by changes in the primary DNA sequence, and as a class are called epigenetic mechanisms of regulation. Genome-wide or global changes in nuclear organization occur during differentiation of human embryonic stem cells, both causing and signaling changes in cell function.

Genome-specific methods using arrays or PCR are common methods for determining genetic and, recently, epigenetic changes in specific genes. Gene-specific activity can be measured using genome wide arrays, and expression of specific markers can be detected by PCR. Unfortunately, these methods do not by themselves indicate nuclear organization. Imaging techniques have been used extensively in developmental biology and cancer pathophysiology, validating the general imaging approach. There is a need for quantitative measurement techniques and specific molecular markers of genome-wide organization in intact cells.

SUMMARY OF THE INVENTION

The present invention generally relates to devices and methods for analyzing images, and in particular for determining characteristics of cells.

In one aspect, the present invention provides a method for determining a differentiation state of a test cell, comprising some or all of the following acts: obtaining an image of a nucleus in the test cell, representing said image as a multiplicity of pixels, extracting one or more image features from said multiplicity of pixels, e.g., using a data-driven algorithm; and comparing said one or more image features with image features derived from one or more reference cells that are representative of predetermined differentiation states, wherein one or more statistical comparison methods and/or statistical classification methods are utilized to compare the image features.

The one or more statistical comparison methods may comprise a likelihood ratio statistic, a comparison of probability density functions, or an information divergence method. In certain embodiments, one or more spatio-frequency attributes represent said image features, and in certain embodiments the spatio-frequency attributes comprise wavelet coefficients.

In certain embodiments, the images can be simultaneously denoised and segmented into distinct regions, e.g., prior to extraction of image features or prior to comparison.

Comparing image features may include comparing a multiplicity of pixels in one or more initial regions of said image to another multiplicity of pixels in one or more non-neighboring regions. Such initial regions and non-neighboring regions may be substantially homogeneous or non-homogeneous.

Extraction of image features may be performed by using a wavelet decomposition algorithm or a data-driven algorithm, or any other suitable technique. In embodiments employing a data-driven algorithm, the algorithm can be a subspace learning algorithm, which may, for example, assume Gaussian noise, use principal component analysis, and/or assume non-Gaussian noise. Exemplary data-driven algorithms include Blind Source Separation or Independent Control Analysis algorithms.

Suitable statistical classification methods may include parametric or non-parametric methods. Parametric classification methods may estimate a probability density function, e.g., to determine a probability of a correct or an erroneous classification. The parametric classification mechanism may be an information divergence measure, such as the Kullback-Liebler Distance. An exemplary non-parametric classification system is a support vector machine (SVM).

In yet another aspect, the present invention discloses a method for determining a differentiation state of a test colony of stem cells, comprising defining one or more borders of said test colony according to border smoothness and border diffusivity, calculating parameters of said one or more borders, and comparing said parameters to reference parameters derived from one or more reference cells that are representative of predetermined differentiation states.

In another aspect, the present invention discloses a method for monitoring a differentiation state of a test population of stem cells, comprising some or all of the following acts: obtaining images of said test population at intervals (e.g., regular or irregular), extracting image features from said images, performing simultaneous smoothing and segmentation of said image features, and applying a statistical classification algorithm to compare changes in said image features with image features derived from one or more reference cells that are representative of predetermined differentiation states. In certain such embodiments, the changes in image features of the test population may be compared with changes in image features in the one or more reference cells.

Absorbing dyes, such as hematoxylin or cosin, can be used to detect nuclear proteins.

In certain embodiments, the cells being monitored are stably transfected with a fluorescent marker, such as GFP, associated with a cellular protein, such as a nuclear protein, e.g., Histone 2B.

In certain embodiments, fixed cells are labeled with an antibody directed against a nuclear protein. In certain such embodiments, the primary antibody is detected with a second fluorescently labeled antibody, e.g., that fluoresces at of any visible or otherwise detectable wavelength.

In yet another aspect, the present invention provides a method for determining a characteristic of one or more test cells, comprising some or all of the following acts: obtaining an image of one or more test cells, representing said image as a multiplicity of pixels, extracting one or more image features from said multiplicity of pixels, and comparing said one or more image features with image features derived from one or more reference cells that are representative of predetermined characteristics, e.g., by applying one or more statistical comparison methods to compare the image features.

In certain embodiments, the method further comprises one or more of: performing simultaneous smoothing and segmentation of said image, determining one or more boundaries of said cell, identifying a region or subregion proximal to said one or more boundaries; deriving one or more attributes of the region or subregion; and analyzing variation in said one or more attributes within the region or subregion and/or analyzing variation in said one or more attributes between different regions or subregions, wherein said one or more image features comprise indicators or components of said one or more attributes.

Exemplary attributes include shape aspects of said cell boundary, edge strength, image intensity attributes of the interior of said cell, and/or textural attributes of said cell. Shape aspects may comprise extent of shape deviation from a spherical shape or protuberances from smooth ellipticity.

In certain embodiments, the method further comprises defining one or more borders of said one or more test cells according to border smoothness and border diffusivity, wherein said one or more image features comprise parameters of said one or more borders.

In certain embodiments, the method further comprises obtaining a plurality of images of said one or more test cells at intervals (e.g., regular or irregular) and performing simultaneous smoothing and segmentation of said image features, whereby a characteristic of said one or more test cells is monitored over time.

In another aspect, the present invention provides a method for determining phase transitions of test cells, comprising some or all of the following acts: culturing said test cells in an environment, varying the environment of said test cells, collecting images of said test cells after varying the environment, measuring one or more feature dynamics of test cells in said images, modeling said one or more feature dynamics as a function of time, and comparing models of feature dynamics from said test cells with models of dynamics derived from reference cells undergoing phase transitions.

Feature dynamics may include a change in a level or a distribution of one or more proteins in said test cell. Phase transitions may be transitions in the epigenetic state and/or the differentiation state of the test cell.

In another aspect, the present invention provides a method for determining an epigenetic state of a test cell, comprising some or all of the following acts: obtaining an image (e.g., of the test cell or of a nucleus in said test cell), measuring one or more characteristics in said images, and comparing said one or more characteristics with corresponding characteristics derived from one or more reference cells which are representative of predetermined epigenetic states.

The test cell can be a pluripotent stem cell, multipotent stem cell, a terminally differentiated cell, a pluripotent cell induced to differentiate, a cancer cell, or a cancer stem cell which is dedifferentiated from the normal somatic state, or any other suitable cell of interest.

In certain embodiments, the test cells are stably transfected with a fluorescent marker associated with a cellular protein or labeled with an antibody directed against a nuclear protein, e.g., as described above.

In yet another aspect, the present invention provides a method for predicting phase transitions of test cells during differentiation, comprising some or all of the following acts: culturing said test cells in an environment, varying the environment (e.g., by varying culture media inputs and/or varying conditions such as temperature or humidity), collecting images of said test cells after varying said culture media inputs, measuring feature dynamics of test cells in said images, modeling said feature dynamics as a function of time, and comparing models of feature dynamics from said test cells with models of dynamics derived from reference cells undergoing phase transitions.

Test cells may be single cells or cell colonies.

Models of feature dynamics may account for phase transitions, cell regeneration, or cell death, or changes in other characteristics of the cells. Feature dynamics may include shape variation.

In certain embodiments, the method further comprises adjusting cell culture conditions on the basis of predictions of phase transition, e.g., allowing responsive control of the environment via a feedback mechanism. Such methods can be used, for example, to maintain cells in a predetermined state, or to guide cells along a predetermined differentiation pathway.

In certain embodiments, the feature dynamics are estimated as a power spectrum, e.g., using one or more power spectrum estimation methods.

In certain embodiments, the method further comprises applying realization theory to obtain linear state space dynamic models to represent each phase which said test cells transition to or from.

Hidden Markov models can be used to approximate said phase transitions, which may, for example, occur at a Poisson rate.

In another aspect, the present invention provides a method for determining a differentiation state of a test cell, comprising obtaining an image of a nucleus in said test cell, measuring one or more textural features in said images, and comparing said one or more textural features with corresponding textural features derived from one or more reference cells which are representative of predetermined differentiation states.

The test cell may be a pluripotent stem cell, multipotent stem cell, a terminally differentiated cell, or any other cell of interest. For example, the test cell may be a cancer cell or a cancer stem cell which is dedifferentiated from the normal somatic state.

Because more differentiated cells tend to have more granular features, the presence of textural features with high granularity may be used as an indicator of an advanced state of differentiation.

In another aspect, the present invention provides a method for determining a differentiation state of a test cell, comprising obtaining an image of a nucleus in said test cell, measuring chromatin condensation in said nucleus, and comparing measurements of chromatin condensation with corresponding measurements derived from one or more reference cells which are representative of predetermined differentiation states.

Typically, the presence of highly condensed chromatin correlates with an advanced state of differentiation, while highly uniform chromatin tends to correlate with a primitive state of differentiation or degree of transformation of a cancer cell. Suitable measures of chromatin condensation may include extent, distribution, and/or localization of chromatin condensation in the nucleus.

In yet another aspect, the present invention provides a method for determining a differentiation state of a test cell, comprising measuring one or more levels of methylation in said test cell and comparing measurements of histone methylation and DNA methylation from said test cell with corresponding measurements derived from one or more reference cells which are representative of predetermined differentiation states.

Measuring said one or more levels of methylation may include measuring the level of methylation on histones, e.g., the level of methylation on lysine 9 on histone 3 (H3K9). Typically, an increased level of methylation on H3K9 at the peripheral edge of the test cell relative to a pluripotent stem cell is indicative of cell differentiation. Thus, an increased level of methylation on H3K9 in test cells relative to a pluripotent stem cell may be indicative of cell differentiation, and a decreased level of methylation on H3K9 in test cells relative to a differentiated cell may be indicative of pluripotency.

Additionally or alternatively, measuring said one or more levels of methylation may include measuring the level of methylation on DNA, e.g., the level of methylation of cytosine on DNA. Methylation of DNA at distal chromosome arms during interphase, prophase, or during anaphase in the test cell tends to correlate with cell differentiation. Similarly, methylation of DNA at centromeric and pericentromeric domains on chromosomes during interphase prophase or during anaphase in the test cell may be used as an indicator of cell differentiation. Thus, an increased level of methylation of DNA in the test cell relative to a pluripotent stem cell may be indicative of cell differentiation, and a decreased level of methylation of DNA in the test cell relative to a differentiated cell may be indicative of pluripotency.

In certain embodiments, an increased level of colocalization of methylated DNA and methylated histones in the test cell relative to a pluripotent stem cell may be indicative of cell differentiation.

In another aspect, the present invention provides a method for determining a differentiation state of a test cell, comprising measuring a rate of chromatin movement in said test cell and comparing said rate of chromatin movement with reference rates of chromatin movement corresponding to one or more predetermined differentiation states. In certain embodiments, measuring the rate of chromatin movement comprises measuring movement of chromatin component molecules on and off a chromatin complex.

In yet another aspect, the present invention provides a method for determining a differentiation state of a test cell, comprising measuring a magnitude of chromatin intensity in said test cell and using a processor to compare said magnitude of chromatin intensity with reference magnitudes of chromatin intensity corresponding to one or more predetermined differentiation states.

In certain embodiments, the cell is transfected with a protein associated with a fluorescent label. Exemplary labeled proteins include GFP-Histone 2B (GFP-H2B) and GFP-Histone 3 (GFP-H3).

In certain embodiments, measuring a rate of chromatin movement comprises measuring chromatin component exchange and the method further comprises photobleaching the nucleus of the cell and measuring changes in fluorescence. Typically, a more rapid recovery of a photobleached region in the test cell relative to a differentiated cell is indicative of a pluripotent cell, while a more rapid loss of fluorescence outside of the photobleached region in a test cell relative to a differentiated cell tends to indicate a pluripotent cell.

Similarly, faster movements or an increased number of multi-directional movements of chromatin in a test cell as compared with a differentiated cell are suggestive of a pluripotent cell, while slower or more parallel movements of chromatin in a test cell as compared with a pluripotent cell are indicative of a differentiated cell.

In another aspect, the present invention provides a method for determining a differentiation state of a test cell, comprising mechanically deforming a nucleus in said test cell, measuring a magnitude of deformation (e.g., relative to the force applied) of said nucleus in response to the deforming force, and comparing the magnitude of deformation of said nucleus to corresponding measurements derived from one or more reference nuclei representative of predetermined differentiation states. Typically, increased mechanical deformability of the nucleus in a test cell as compared with a differentiated cell is indicative of a pluripotent cell, and decreased mechanical deformability relative to a pluripotent cell is indicative of a differentiated cell.

In yet another aspect, the present invention provides a method for determining a differentiation state of a test cell, comprising extracting chromatin components from said test cell in detergent and salt solution, ascertaining a stringency of salt solution required to extract said chromatin components (e.g., HP1α, HP1β, and GFP-H2B), and using a processor to compare the stringency of said salt solution required to extract said chromatin components from said test cell with corresponding stringency values associated with one or more predetermined differentiation states. Typically, a requirement for lower salt stringency to extract chromatin components from the test cell relative to a requirement for a differentiated cell is indicative of a pluripotent cell, and extraction that proceeds at a higher salt stringency relative to a pluripotent cell is indicative of a differentiated cell.

In another aspect, the present invention provides a method for determining a differentiation state of a test cell, comprising quantifying levels of chaperone proteins NAP1 and ASF1 in said test cell and comparing said levels of said chaperone proteins with levels of chaperone proteins derived from one or more reference cells representative of predetermined differentiation states. In certain embodiments, a higher level of chaperone proteins in a test cell relative to a differentiated cell is indicative of a pluripotent cell.

For any of the methods disclosed herein, images may be acquired optically, e.g., by a fluorescent microscope and by a light detector to detect fluorescence or by a brightfield microscope and by a light detector to detect absorbing dyes.

For any of the method disclosed herein, extraction of image features may comprise dividing said image into a plurality of windows and calculating frequency and/or spatial content within said plurality of windows. Such methods may further comprise identifying texturally inhomogeneous windows within said plurality of windows, dividing said texturally inhomogeneous windows into subwindows, and/or performing statistical comparison methods on the subwindows and/or further dividing the subwindows (e.g., after identifying texturally inhomogeneous subwindows in an iterative process, etc.).

One of skill in the art that all or part of the above methods may be performed using a processor or other suitable apparatus. Thus, one or more of extracting image features, representing an image as pixels, comparing features, etc. may be performed using a processor or other apparatus as may be desired by the practitioner.

One of skill in the art will recognize that the various embodiments described herein, including those only described under one of the many aspects of the invention, are capable of being combined with other embodiments described herein, even those described with respect to different aspects of the invention. Such combinations of features, wherever not mutually exclusive, are contemplated as embodiments of the invention.

BRIEF DESCRIPTION OF THE DRAWINGS

FIG. 1A shows one half of a differentiating hESC colony with fine grain cells at the colony center (bottom of image) representing pluripotent, self-renewing cells. The larger more distinct cells at the top have begun to differentiate.

Figure 1A:
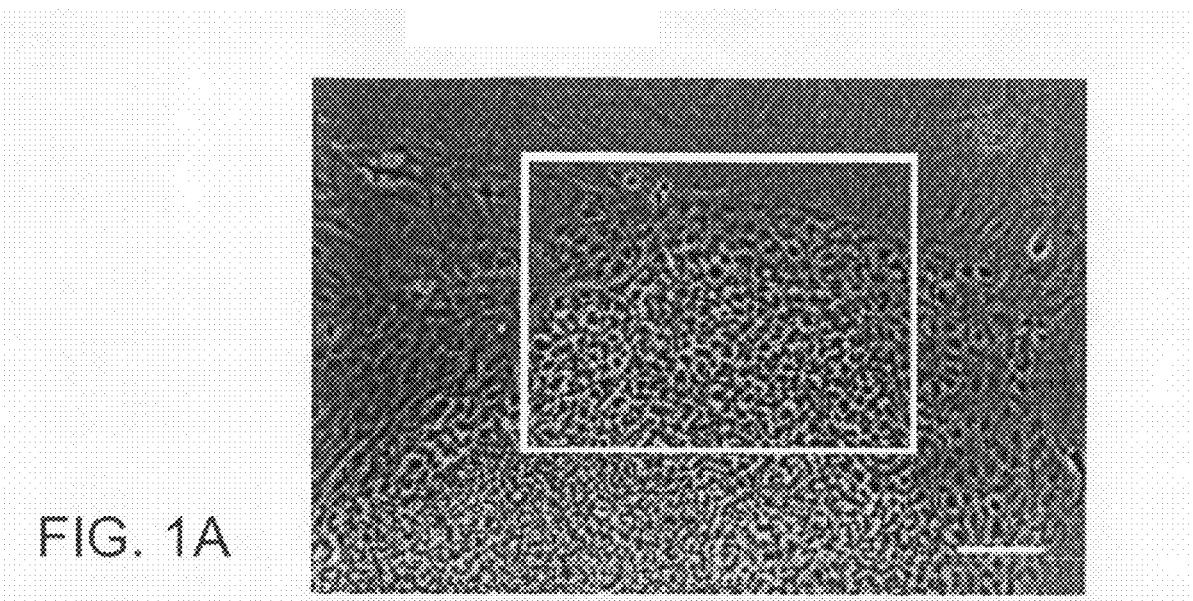
FIG. 1A shows hESCs, imaged at low magnification (10× objective, bar=100 µm) with phase contrast microscopy, a non-destructive white light method suitable for living cells in culture.
Figure 1B:
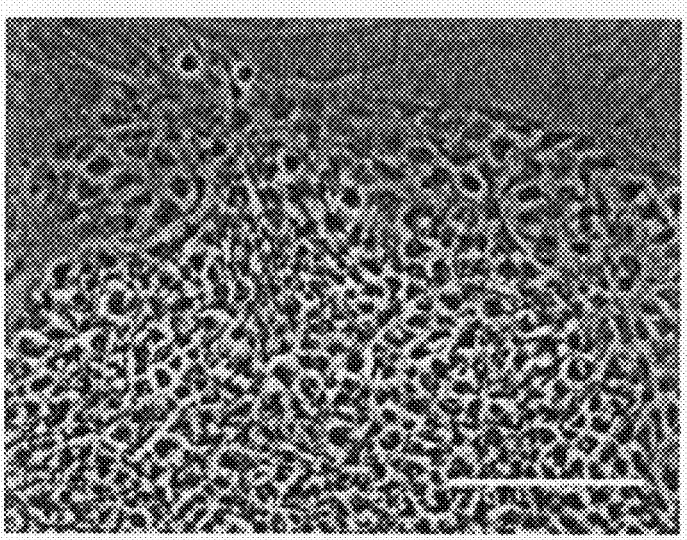
FIG. 1 shows the differentiation of human embryonic stem cells (hESCs).
Figure 1C:
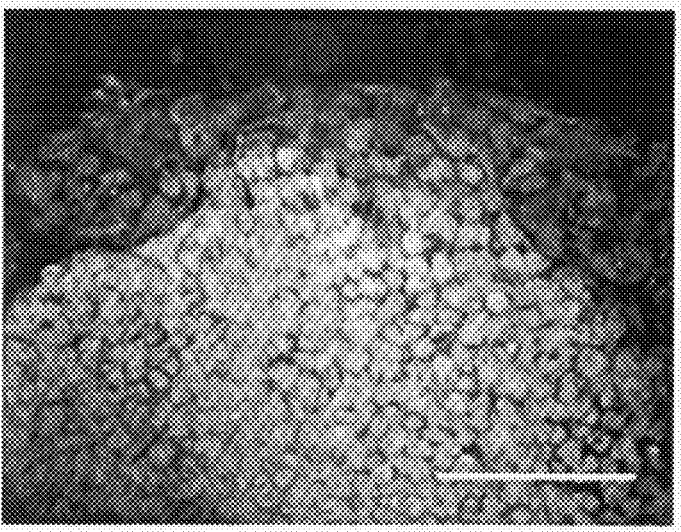

The white rectangle in FIG. 1A is enlarged in FIG. 1B and shown after immunocytochemistry in FIG. 1C. A single confocal section is shown in FIG. 1C with immuno markers of pluripotency (Oct 4 transcription factor in the nucleus), differentiation (the cytoplasmic filament protein, nestin characteristic of neurectoderm and neural stem cells), and Toto3, a DNA binding dye to show nuclei. Comparing B and C, it can be seen that pluripotent cells have a characteristic small size that at low magnification can be recognized by fine grained texture.

Figure 2:
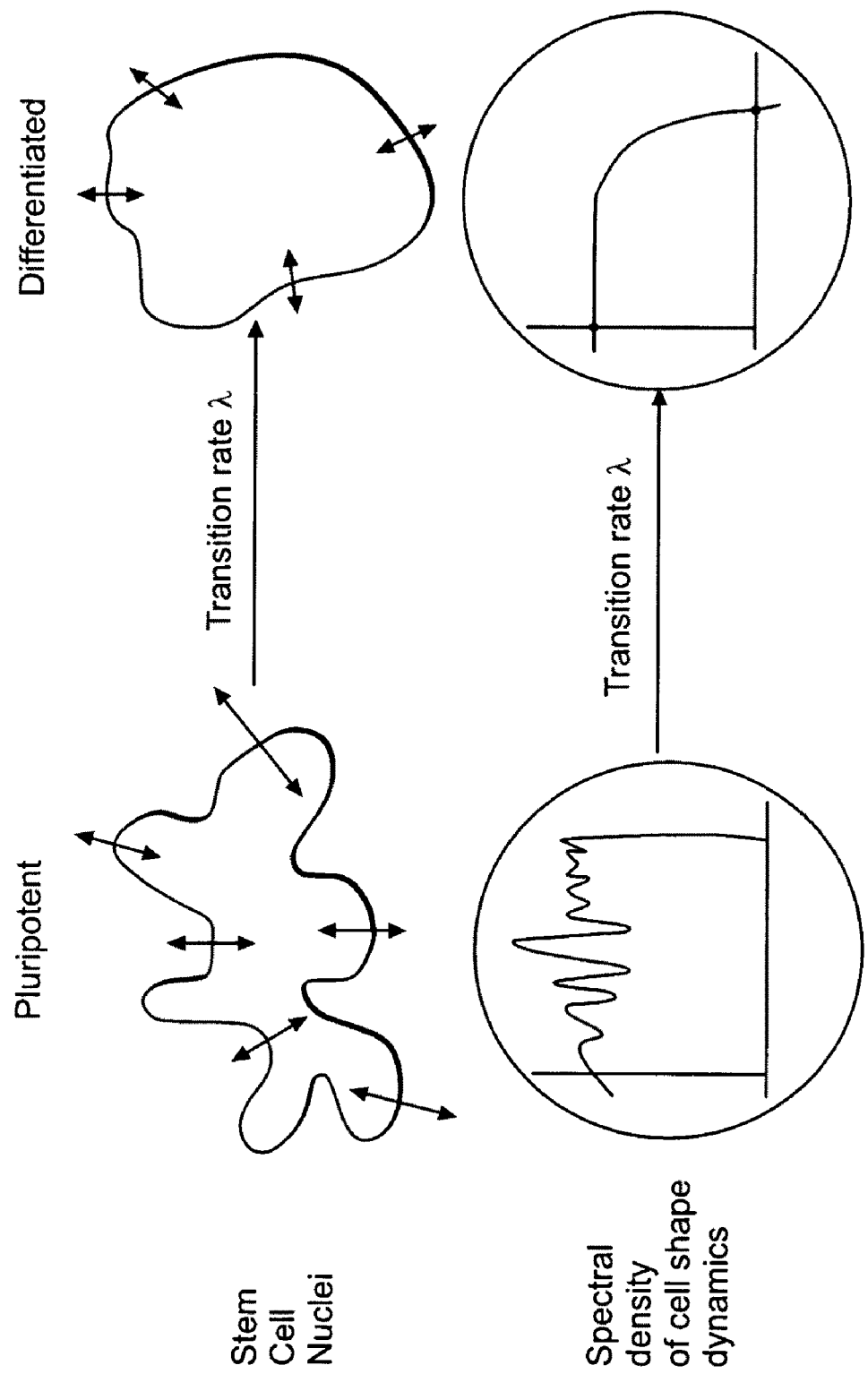

FIG. 2 shows the hierarchical modeling of stem cell behavior. At a higher level, a Markov chain models the transition between a pluripotent state and a differentiated one. Within each of these states, the cell's shape dynamics can be modeled by its power spectral density, which in turn, is realizable by a more detailed Gauss Markov model.

Figure 3:
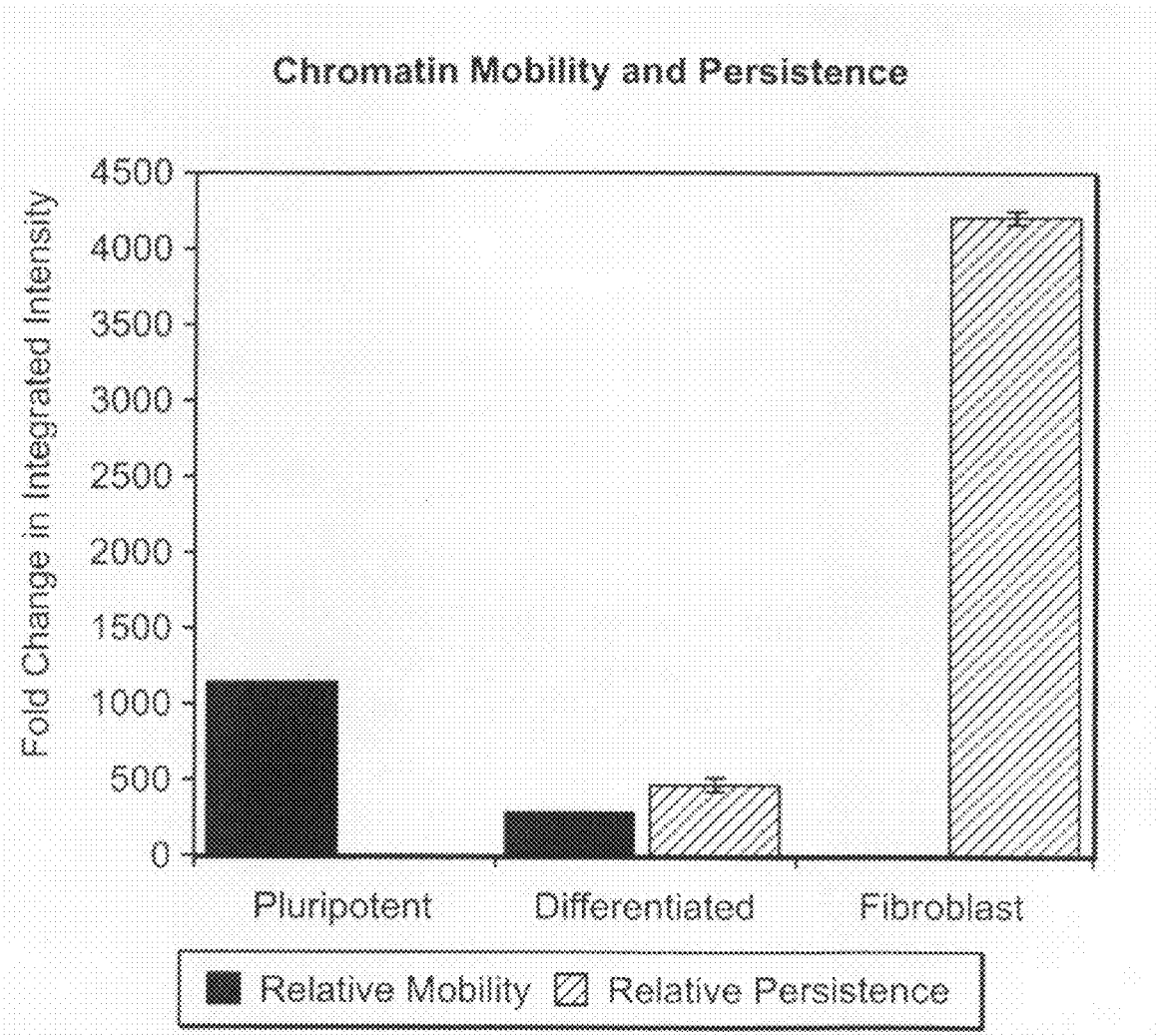

FIG. 3 shows that persistence of labeled DNA domains increases with differentiation. Quantitative analysis of chroomatin mobility (FIG. 3) was analyzed by measuring persistence of bright chromatin domains over a 60 min interval. Standard error of the mean is shown.

Figure 4G:
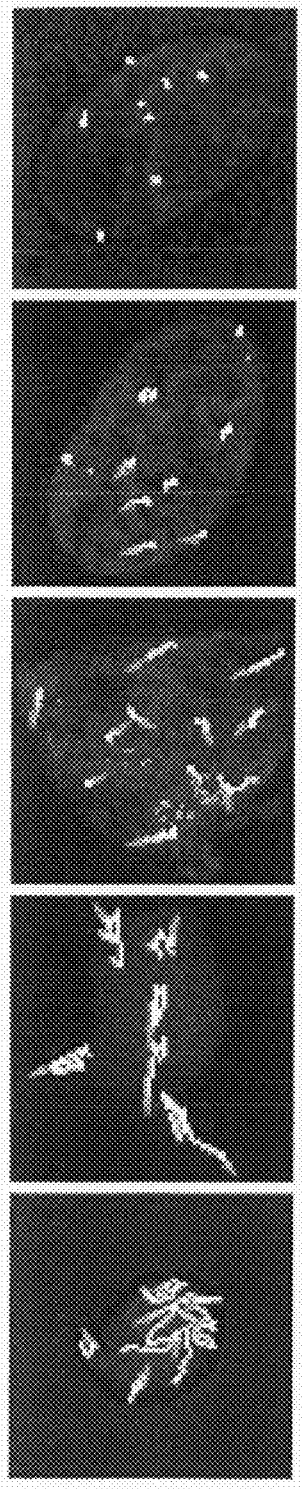
Figure 4H:
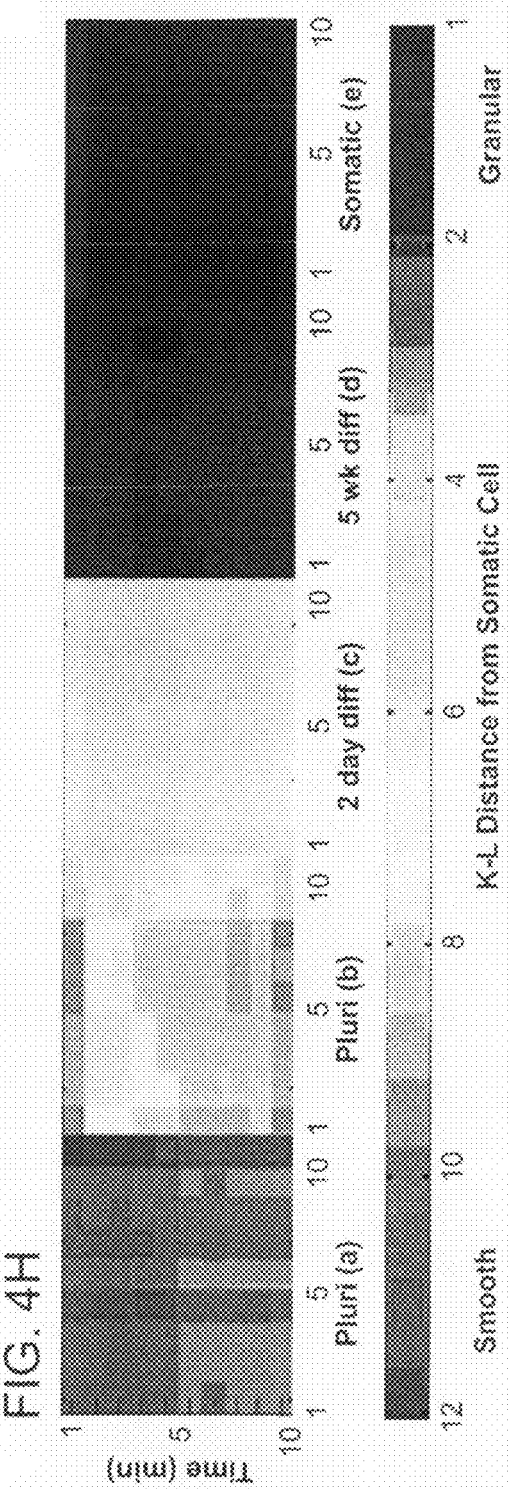
Figure 5A:
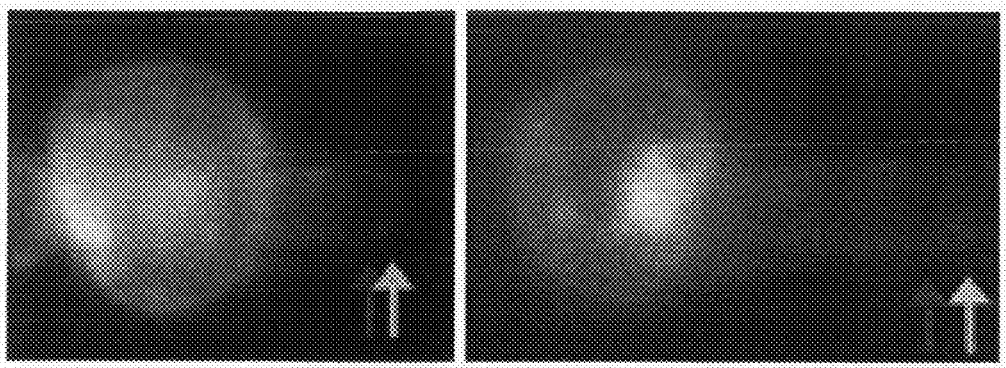
Figure 5B:
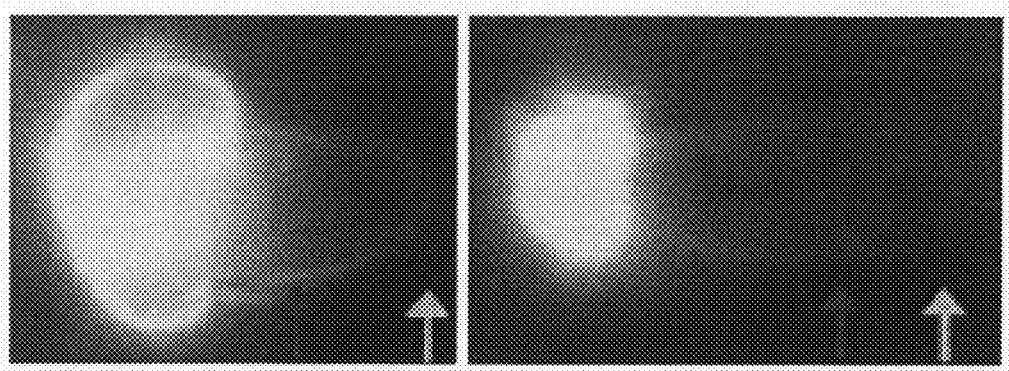
Figure 5C:
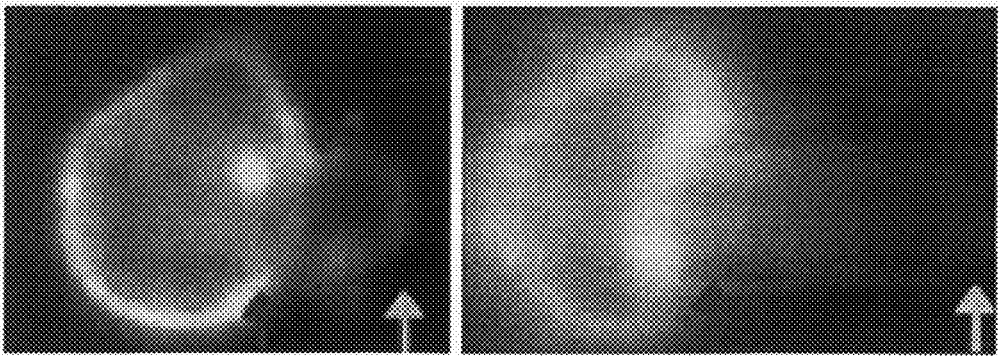
Figure 5D:
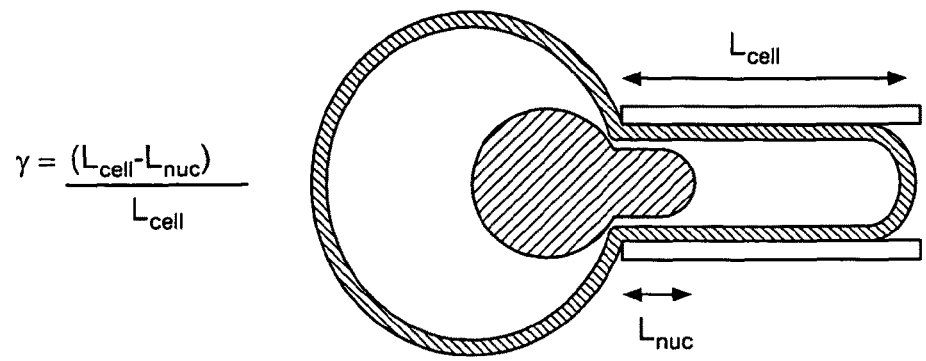
Figure 5E:
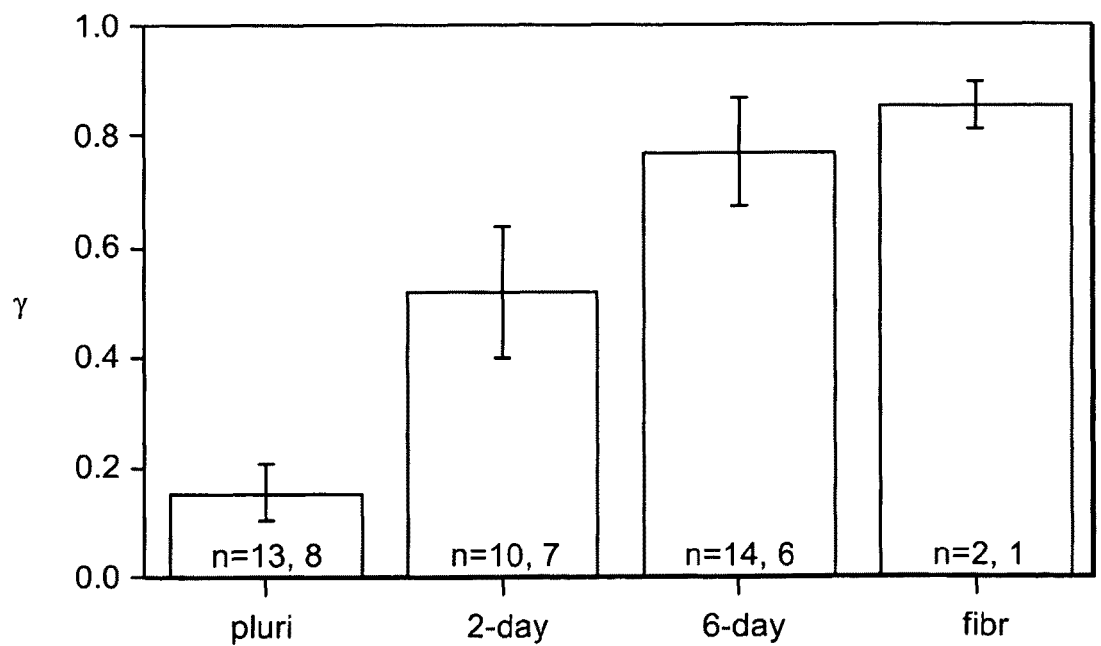

FIG. 4a shows a decrease in movement of GFP-Histone 2B during differentiation. Chromatin density variations are not stable, but change over an interval of minutes as shown for the slice at 1.2 mm in FIG. 4B. FIGS. 4B-F show chromatin dynamics during differentiation are shown in single confocal slices by overlays, and FIG. 4G shows vector analysis of chromatin domains. FIGS. 4B and 4C show overlays at 5 min intervals for pluripotent cells and FIGS. 4D and 4E show overlays for differentiated cells. FIG. 4F shows overlays for a somatic HIMVEC, with movement shown by fringing. In FIG. 4B, pluripotent cells show internal mixing of nucleoplasm, and envelope extrusion is shown in FIG. 4C. In FIG. 4G, nucleoplasmic streaming at reduced amplitudes is shown in differentiated cells. In FIGS. 4D and 4E, Color fringing in differentiated cells extends for several µm, suggesting cohesive chromatin movement. In contrast, FIG. 4F shows that fringing is uncoordinated and extends for less than 1 pm in somatic cells. In FIG. 4G, the first image of each cell is shown, overlaid by tracings of chromatin movement for selected spots by vector analysis of movement. Each displacement vector ends with a arrow showing the direction of movement. FIG. 4H shows the dynamic texture of each cell at 10, 1 min intervals, compared to the somatic HMVEC in a cross-correlation of texture of each image in the time series to the time series for the endothelial cell. Pluripotent cells have smoother textures than the granular somatic cell (KL distances between 7-12).

FIGS. 5A-5E shows that pluripotent hESCs demonstrate high mechanical deformability. Pipette aspiration of stem cells that are pluripotent shows fluid-like properties. Standard aspiration forces applied to plasma membrane (bright portion: wheat germ agglutinin) and nuclei (Hoechst 33342) shows less defomation under constant force during differentiation.

FIG. 6 shows the fast exchange of Histone H2B and the movement of dynamic chromatin, which both decrease upon differentiation. FIG. 6A shows FRAP in pluripotent hESC, line UCO6 occurring rapidly, between 5 and 20 min, while FIG. 6B shows that recovery in 2 day differentiated hESC is slowed to 1-2 hr. Chromatin movement within the nucleus is shown by deformation of the bleached zone in pluripotent hESC (FIG. 6A) and 2-day differentiated hESC (FIG. 6B). Bars in FIGS. 6A and B=5 µm FIG. 7 shows fluorescence loss induced by photobleaching (FLIP) of GFP H3. FLIP is reduced during differentiation. FIGS. 7A-7C show pluripotent cells, and FIGS. 7D-7E show 1-week differentiated cells.

FIGS. 7B-7F show that the imaged half of the pluripotent cell was reduced significantly more than the differentiated cell at 1 min. By 3 min the pluripotent cells had little fluorescence while the unbleached half of the differentiated cells retained most of its original intensity.

Figure 8:
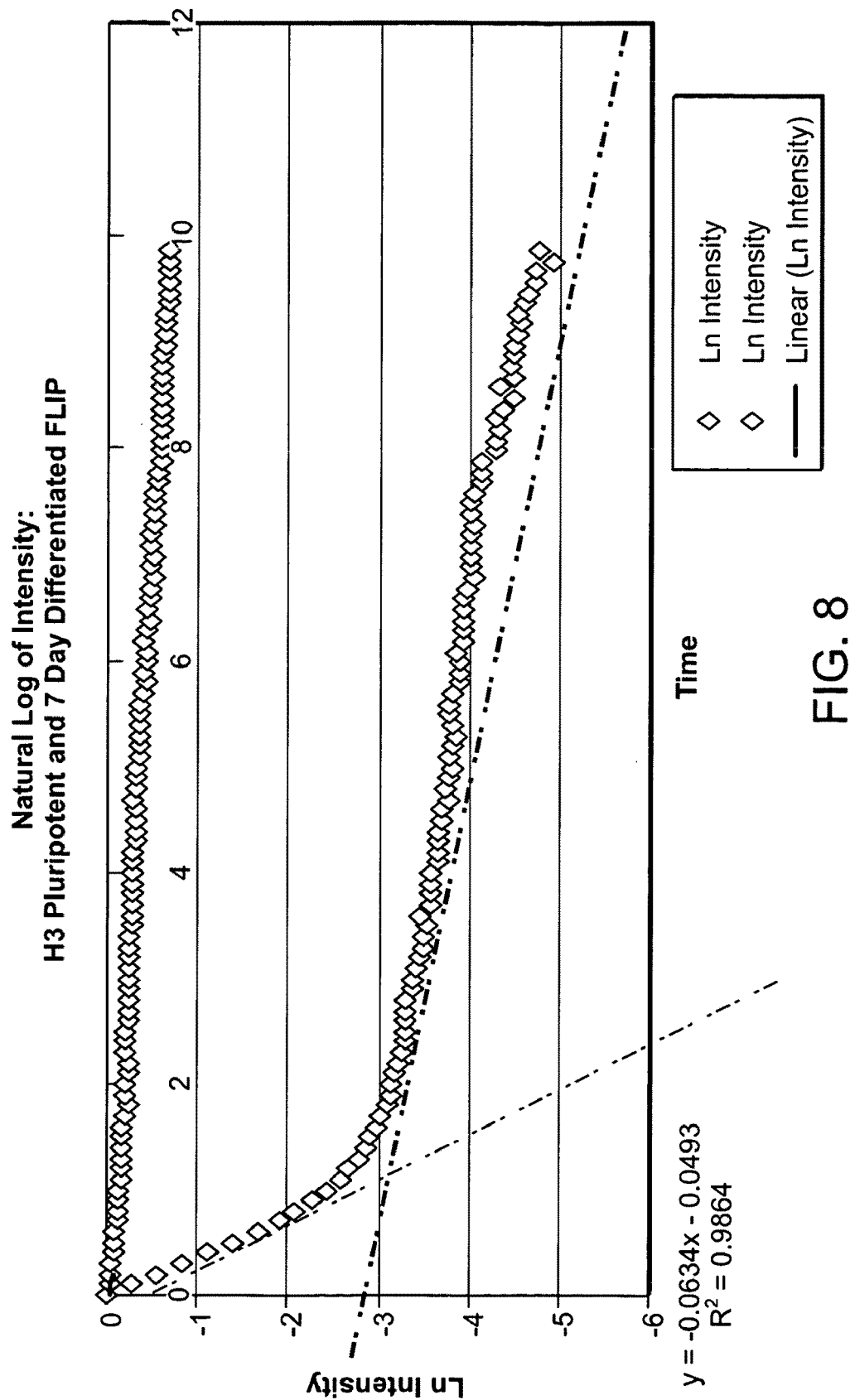

FIG. 8 summarizes results of fluorescence loss in photobleaching (FLIP) Experiments performed on two stem cells transfected with GFP-H3. The slope of the line on a semi-log plot is proportional to the binding half-time of the histone to chromatin. The top curve for a differentiated cell shows a half time of 10.9 min while the bottom curve, for a single pluripotent cell, shows a double exponential recover), with two half times (dashed lines), 0.32 and 3.7 min.

Figure 9A:
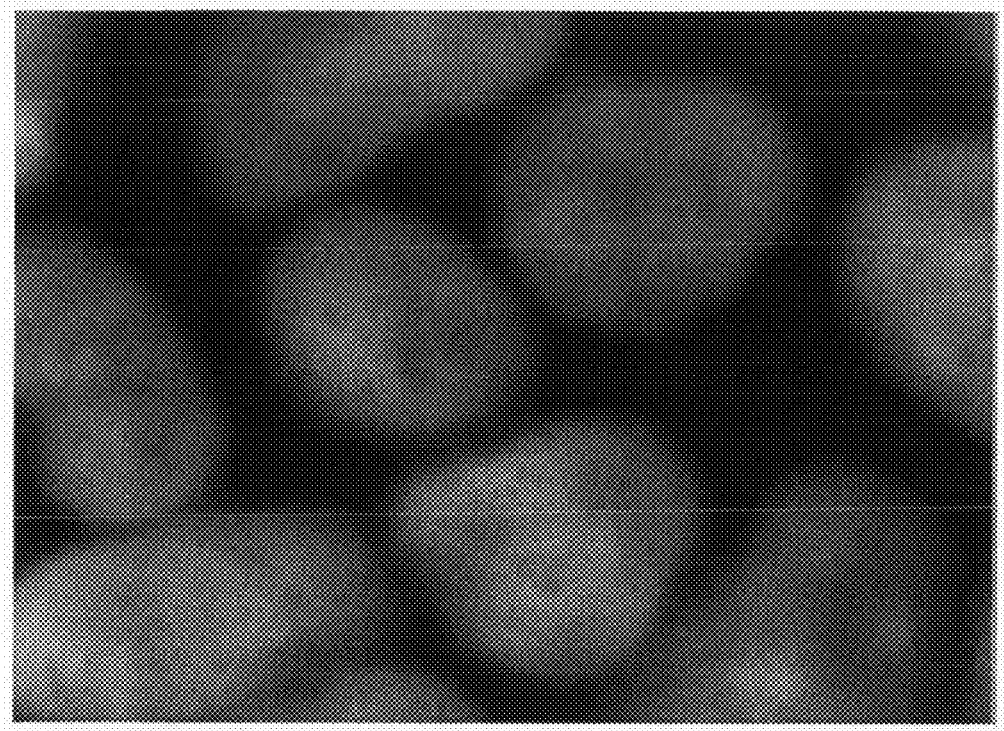
Figure 9B:
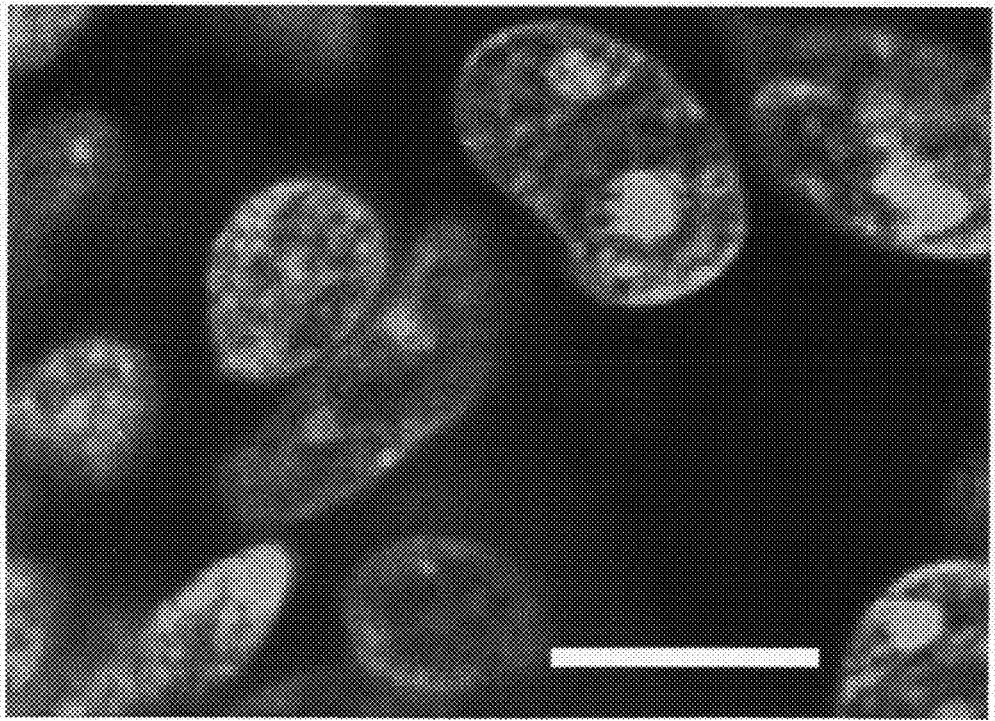
Figure 9C:
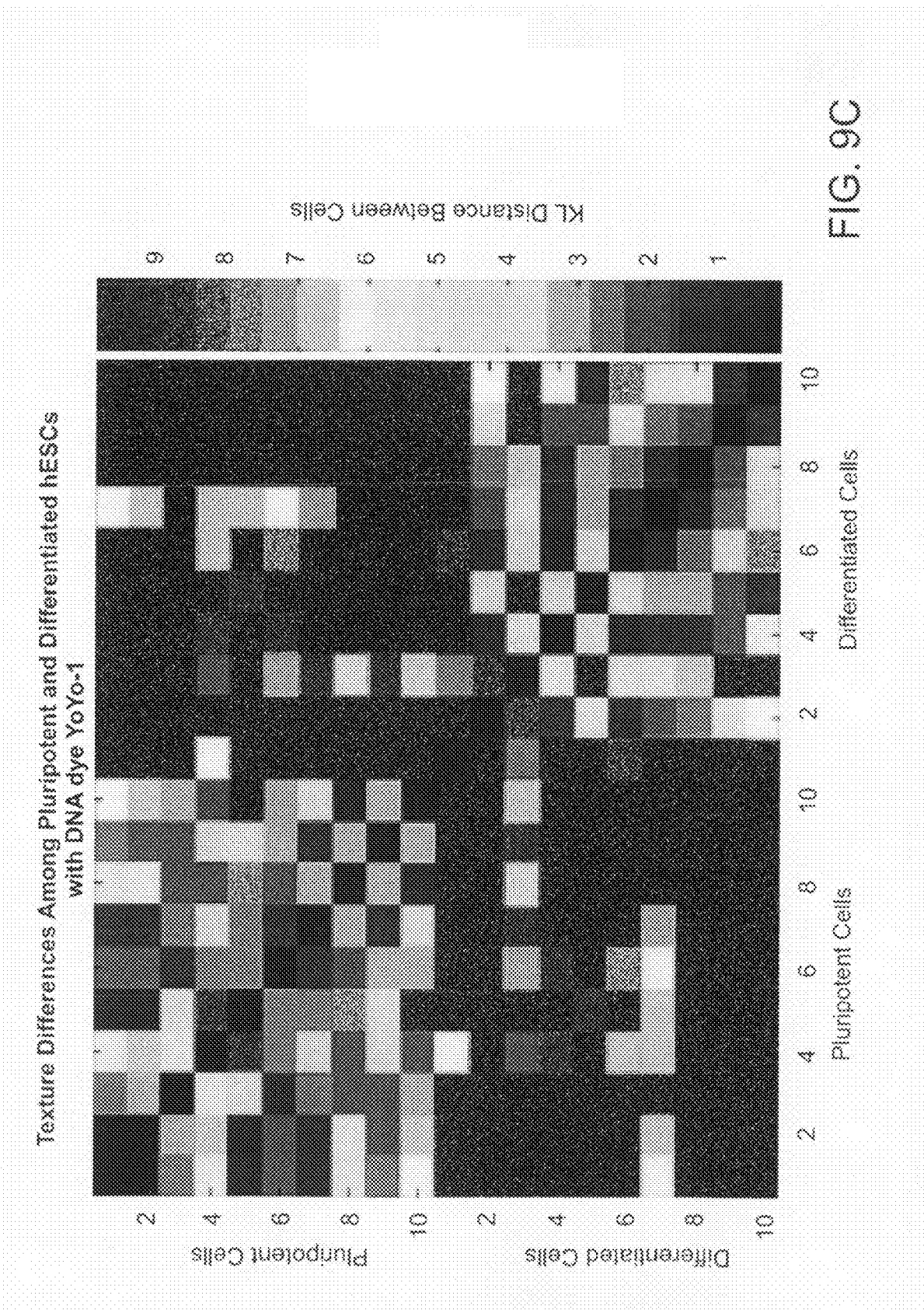

FIG. 9 shows DNA condensation into heterochromatin during differentiation. FIG. 9A shows chromatin condensation in pluripotent hESCs, observed away from colony edges. FIG. 9B shows chromatin in differentiated hESCs within neural rosettes. FIG. 9C shows the KL distance between all cells. The upper right and lower left quadrant are predominantly one shade, while the lower left and upper right quadrant are a different shade, showing that pluripotent and differentiated cell populations are distinct. The probability that textures of pluripotent and differentiated cells are distinguishable with a KL distance of 8.52 is over 92%.

FIG. 10 shows progressive histone methylation of centromeric loci during differentiation. Increased heterochromatin is immunostained with anti histone H3 tri-methyl on lysine 9 , centromeres with CREST serum and DNA stained with Hoechst 33342 in maximum projection images of pluripotent hESC (left panel) and differentiated hESC (right panel). Quantitation of heterochromatin formation is shown for 20 differentiated and pluripotent hESC nuclei. H3K9 trimethylation increased 5 fold during differentiation both on and away from centromeres. Centromeres with H3K9 trimethylation increased from 40% to 90% within 2 days of differentiation.

FIG. 11 shows formation of heterochromatin during hESC differentiation, Including methylation of Histone H3K9 and DNA at cytosines and increasing condensation. In FIG. 11A, a confocal section of a hESC at the edge of a differentiating colony shows increasing H3K9 trimethylation towards the colony edge. Other panels show DNA methylation upon differentiation. FIG. 11B shows that DNA is first methylated at distal chromosome arms in prophase and FIG. 11C shows DNA methylation in anaphase cells, away from centromeres containing trimethylated H3K9 . FIG. 11D shows interphase nuclei in pluripotent cells, which contain trimethylated H3K9 in small, low intensity spots. FIG. 11E shows small intensity spots coalescing into larger, brighter spots upon initiation of differentiation, along with the first appearance of peripheral DNA methylation. FIG. 11F shows DNA that becomes hyper methylated throughout the nucleus between 2-5 days after differentiation. FIG. 11G shows that methylated DNA and histone coincide in spots by 10 days after differentiation.

Figure 12:
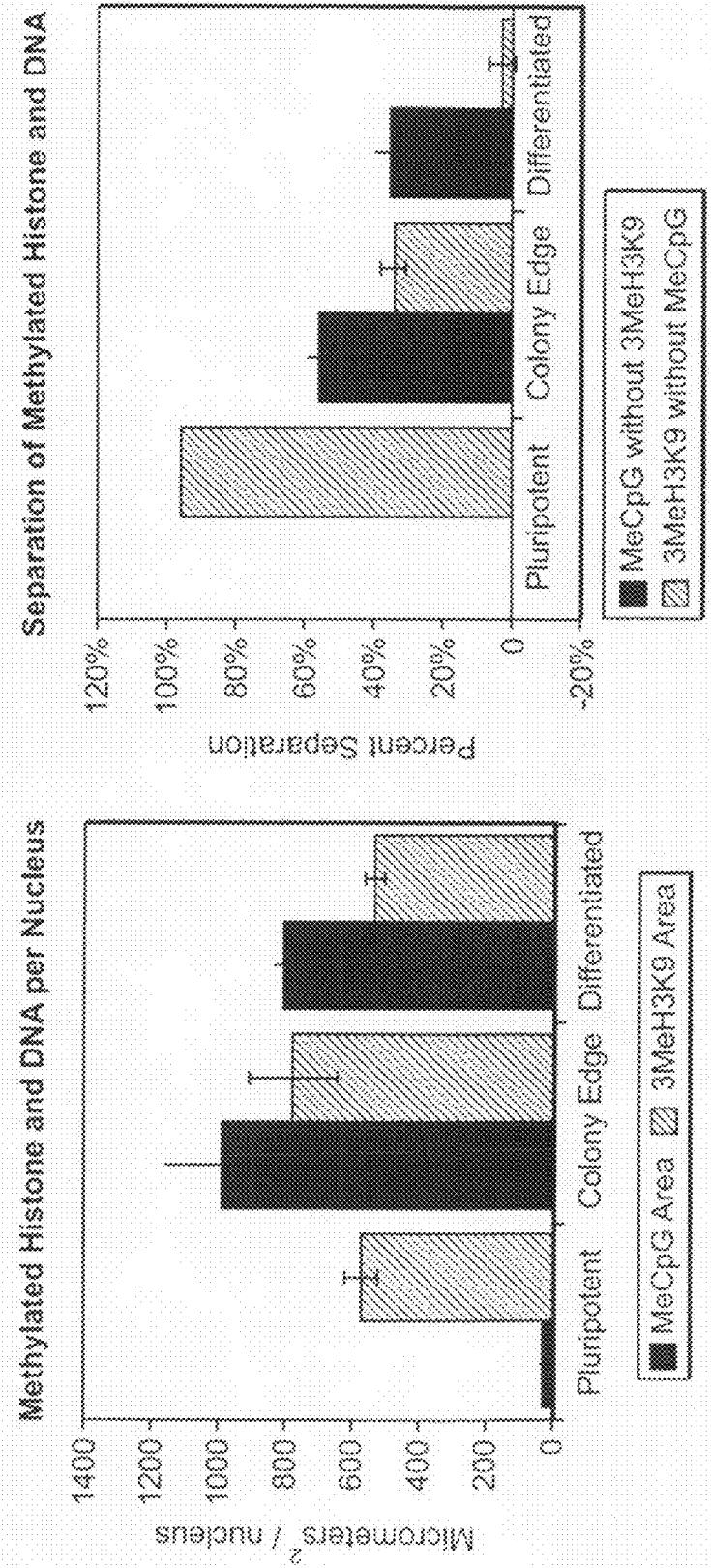
Figure 13A:
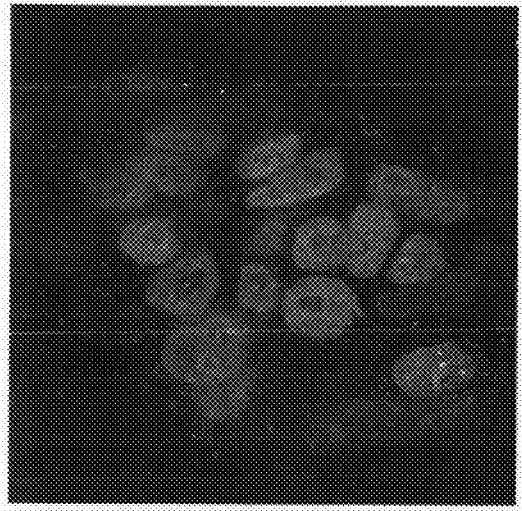
Figure 13B:
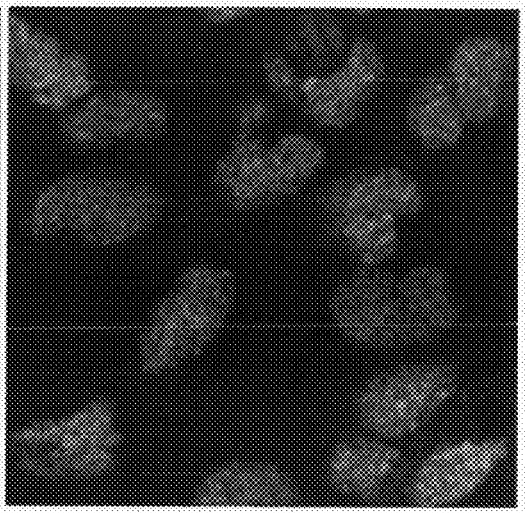
Figure 13C:
Figure 13D:
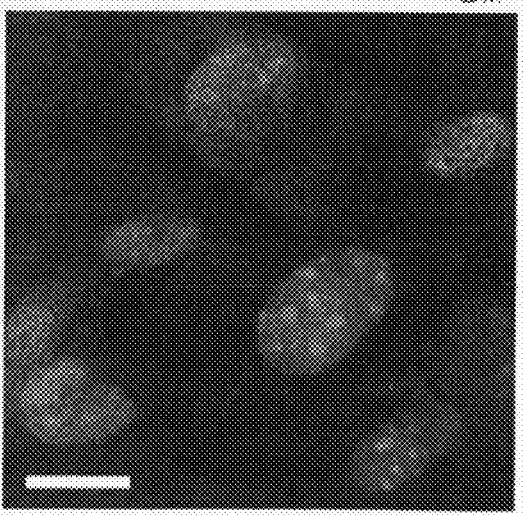

FIG. 12 shows that heterochromatin condensation includes increased coincidence of Histone H3K9 methylation and DNA cytosine methylation. Upon differentiation, the methylated histones increase 50% to 774 pixels$^2$/nuclei while methylated DNA increases from 28 to 987 pixels$^2$/nuclei. The separation of methylated histones from methylated DNA decreased during the formation of heterochromatin from 96% to 34% to 3%.

FIG. 13 shows differential extraction of HP1β from pluripotent hESCs, but not differentiated hESCs. FIG. 13A shows diffuse staining of HP1β within the nucleus in pluripotent cells. The intensity of immunostaining is not proportional to Oct-4 immunostaining or to DNA (Hoechst 33342) FIG. 13B shows that HP1β staining remains variable among nuclei in early differentiated hESCs (day 2) and is not co-localized with GFP-H2B in stably transfected hESC. FIG. 13C shows gentle lysis of live cells in 0.05% Tween-20 for 90s, which removes HP1β from pluripotent nuclei but not from punctuate staining in differentiated hESC (FIG. 13D. Bar in FIG. 13D=10 μm.

Figure 14B:
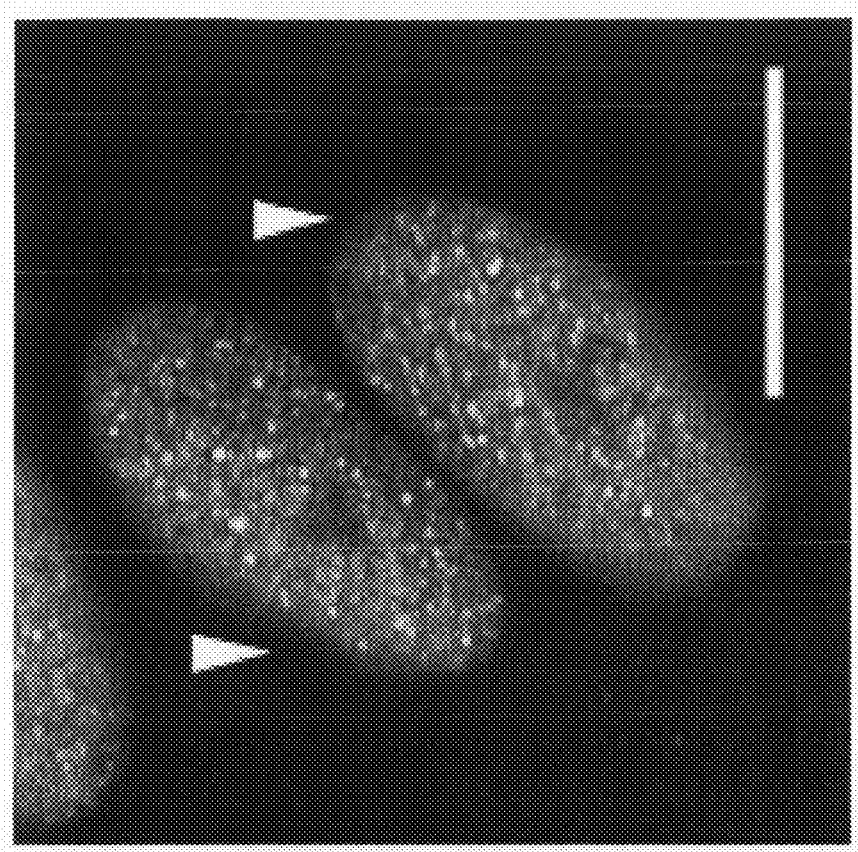
Figure 14A:
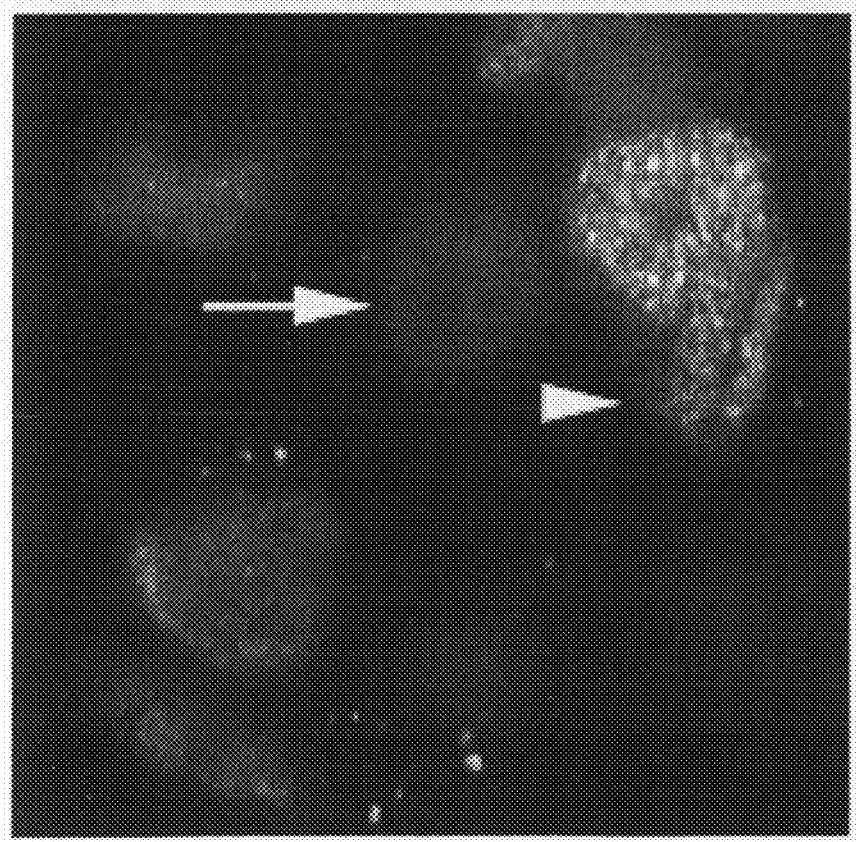
Figure 16A:
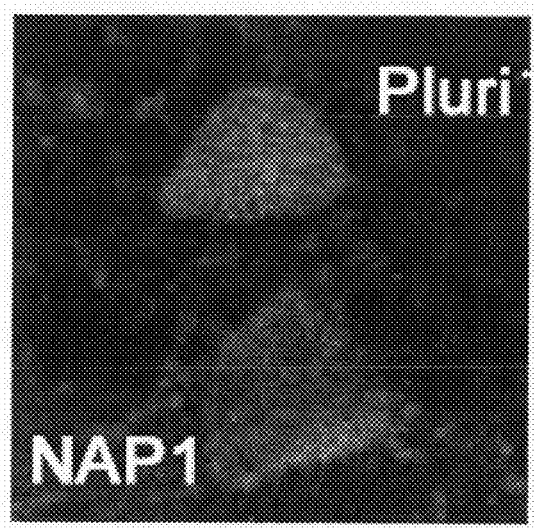
Figure 16B:
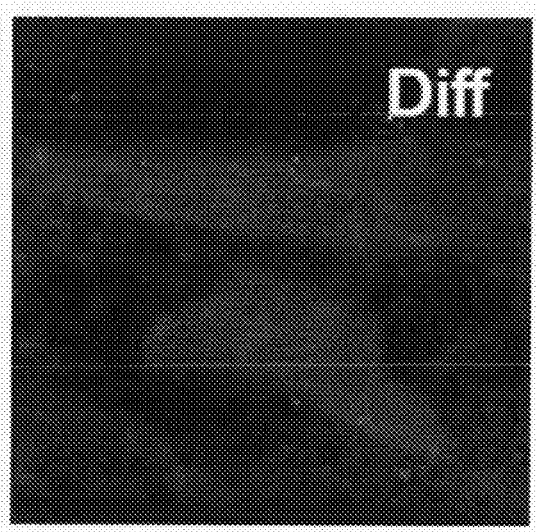
Figure 16C:
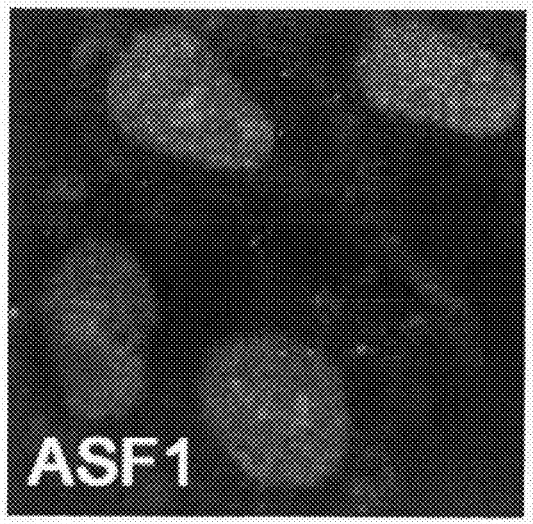
Figure 16D:
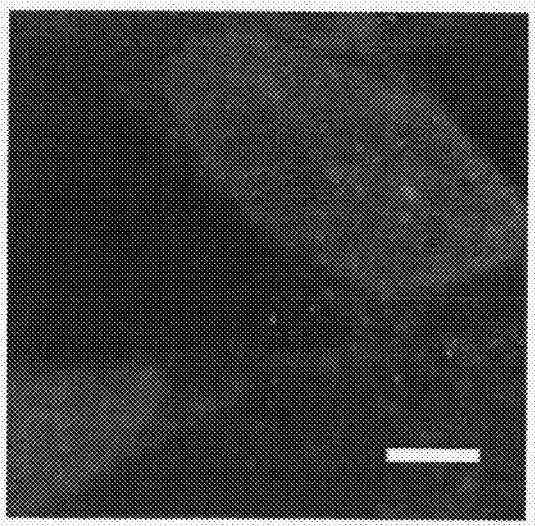

FIG. 14 shows increased HDAC-1 and -2 increase expression in hESCs during differentiation. FIG. 14A shows pluripotent hESCs, line WA07, (arrow) expressing little HDAC1 and HDAC2. FIG. 14A also shows differentiated cells (arrowheads) in mixed colonies, while FIG. 14B shows differentiated cells in fully differentiated monolayers, both of which show finely distributed dots in the nucleoplasm excluding the nucleolus. Bar in FIG. 14B =10 μm.

FIG. 15 shows HDAC-1 knockdown in HeLa Cells by shRNAmir. Confocal microscopy images in FIG. 15A shows excellent HDAC1 antigen retrieval in control conditions. FIG. 15B shows a qualitative reduction of HDAC1 staining after HDAC knockdown, and FIG. 15C shows a complete absence of HDAC1 staining after TSA treatment. Bar in FIG. 15C=10 μm.

FIG. 16 shows differential expression of histone chaperones in hESC. FIGS. 16A and 16B show expression of the chaperones NAP1. FIGS. 16C and 16D show expression of the chaperones ASF1, detected by immunostaining hESCs, line WA07. FIGS. 16A and 16C show pluripotent cells while FIGS. 16B and 16D show differentiated cells. Pluripotent cells exhibited higher staining intensity for both chaperones. Chaperone staining in differentiated cells tended to be in larger aggregates correlated with heterochromatin, as determined by Hoechst staining. Pluripotent cells were positive for Oct4.

FIG. 17 shows post fixation antigen retrieval is required for consistent immunostaining of heterochromatin markers in HeLa cells. FIG. 17A shows results from a standard immunostaining protocol of parafonmaldehyde fixation (2% for 10 m). Staining was variable and inconsistent for trimethylated H3K9 (H3K9me3) and HDAC1, potentially reflecting antigen masking due to protein folding or masking. FIG. 17B shows results from a protocol that includes a post fix incubation in acidic, low ionic strength citrate buffer without or with heat. This protocol worked well with HDAC1 immunodetection, although H3KOme3 immunostaining showed brighter but not more consistent staining. Better consistency of both antigen staining was produced by alkaline conditions, as shown in FIG. 17C or by post paraformaldehyde treatment with cold methanol, as shown in FIG. 17D. Methanol is modestly better than alkaline conditions and has worked with all chromatin antibodies tried to date.

Figure 18E:
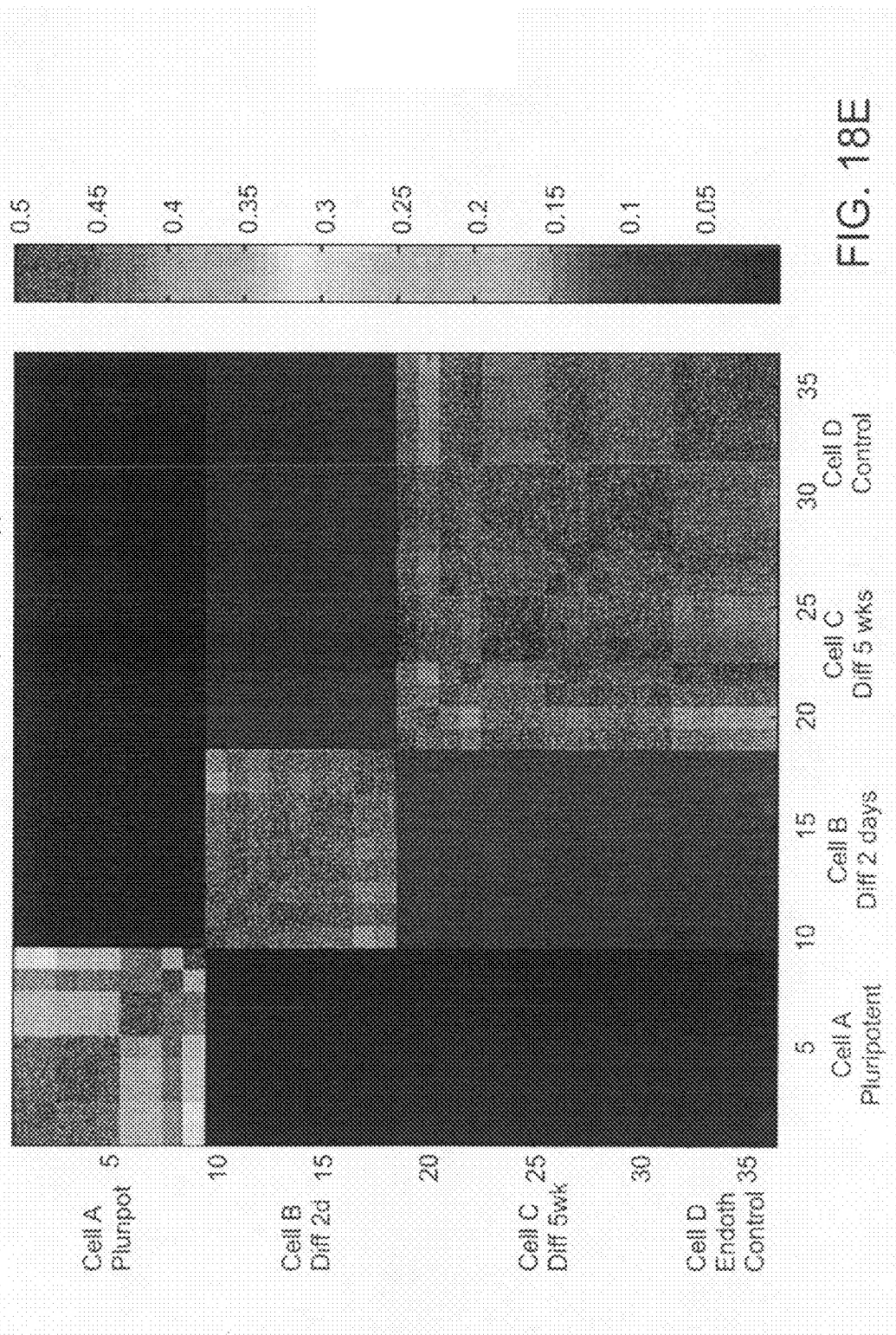

FIG. 18 shows chromatin visualized in living cells transfected with Histone GFP-H2B. 4-D movies were acquired with a spinning disk microscope (Perkin Elmer) using a 40×1.3NA Nikon objective with a resolution of 0.2 p.m. FIG. 18A shows that nuclei in pluripotent cells are small and chromatin is generally smooth textured. FIG. 18B shows that chromatin becomes more granular during differentiation and did not vary over time, unlike pluripotent cells. FIG. 18C shows differentiated stem cells by 5 weeks. These cells are nearly as granular as an adult human vascular endothelial cell (FIG. 18D). FIG. 18E shows pairwise hypothesis testing from the 4 classes. The dark, solid shading for a test between nuclei of different classes indicates the absence of false positives. The other shading for tests between nuclei in the same or similar classes indicates correct classification. The tests' significance level is 5%. The bar in FIG. 18A=10 μm.

Figure 19:
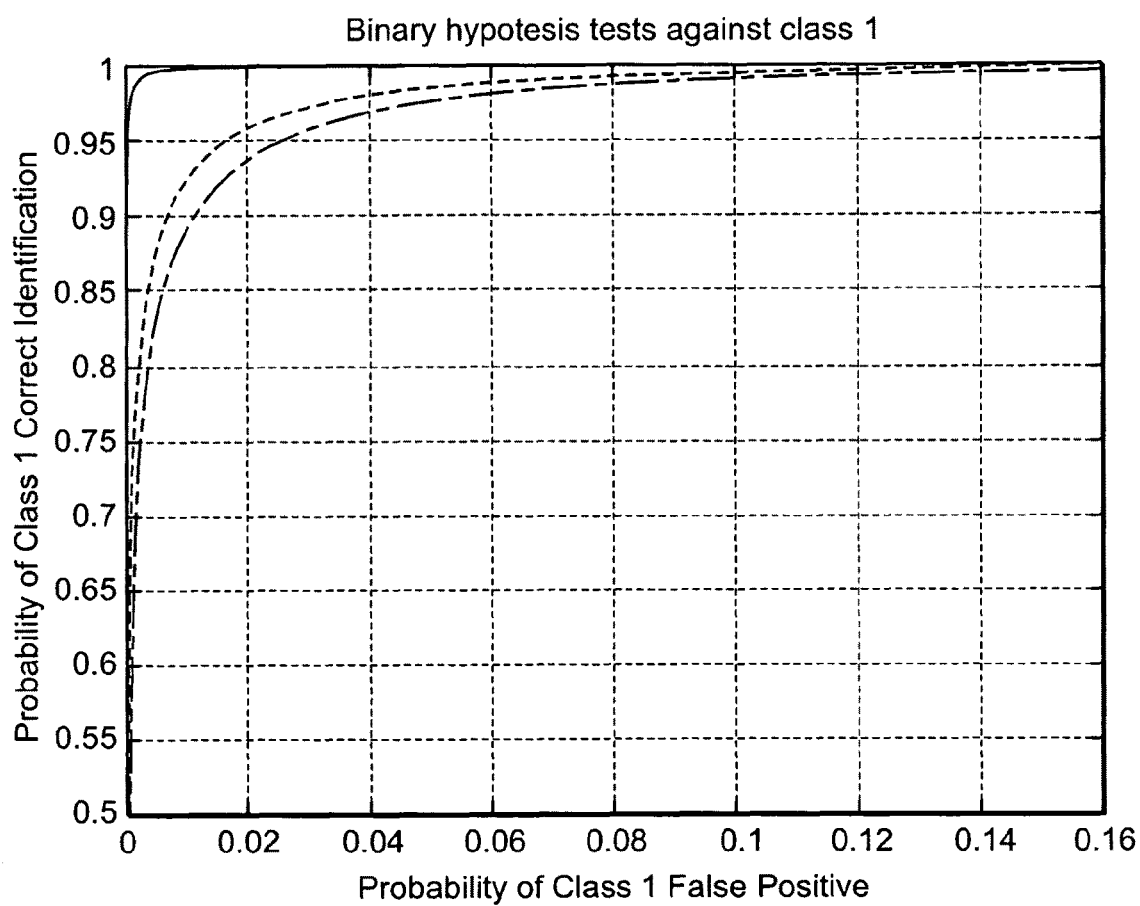

FIG. 19 shows the probability of correctly identifying a pluripotent nucleus (class 1) vs. probability of a false positive from partially or totally differentiated nuclei.

Figure 20:
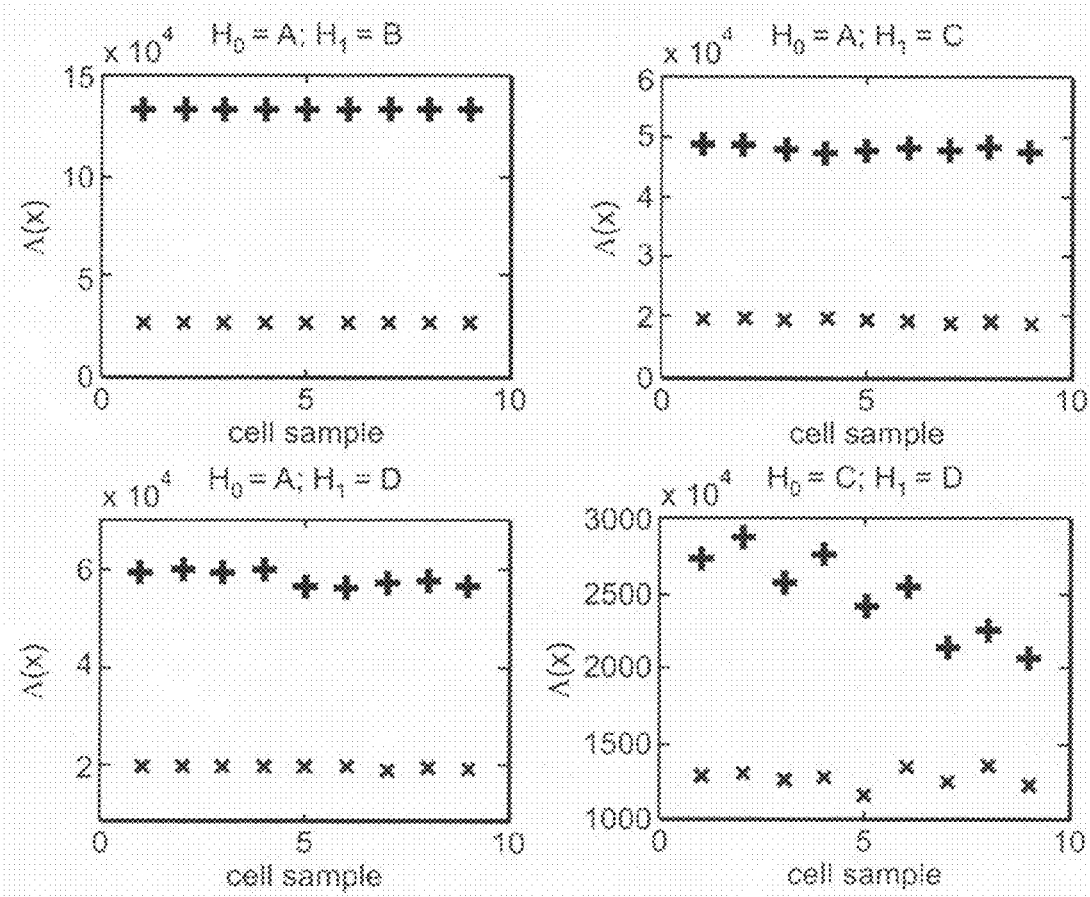

FIG. 20 shows pairwise hypothesis testing between differentiation classes A and B (top left), A and C (top right), A and D (bottom left), and C and D (bottom right). Cells for which the null hypothesis $H_0$ is true are plotted with X's, while cells for which the alternative hypothesis $H_1$ is true are plotted with +signs. Results indicate that the likelihood ratio statistics show clear separation between pairs of classes.

Figure 21D:
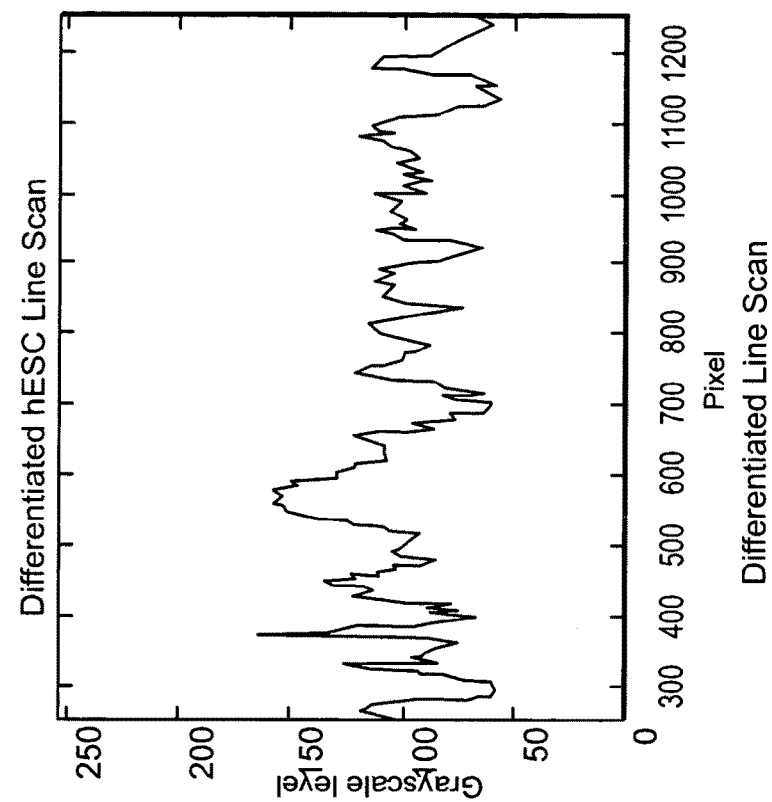
Figure 21C:
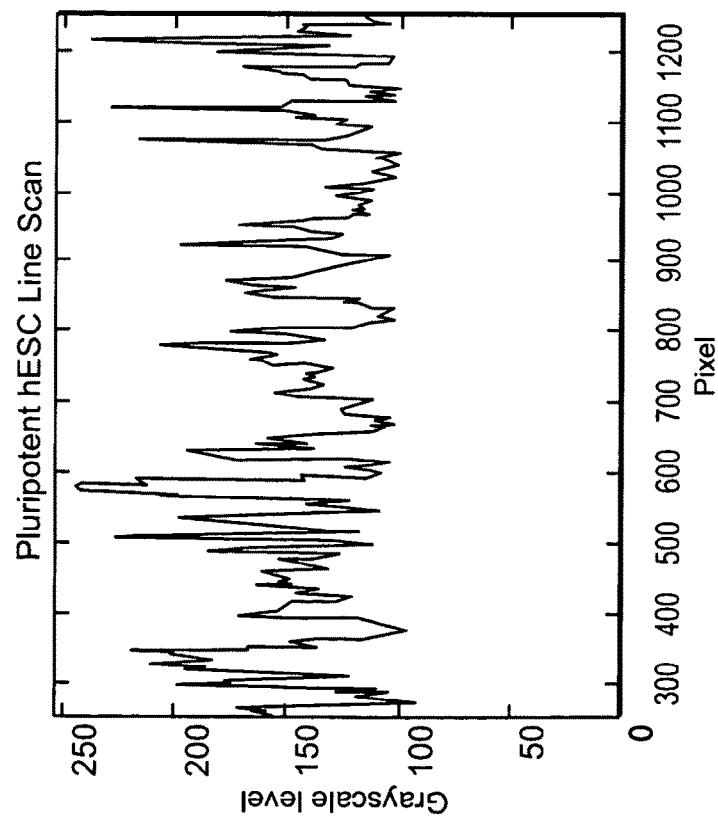

FIG. 21 shows a comparison on pluripotent and differentiated hESC colonies. The white bar indicates the location of the linescan.

Figure 22:
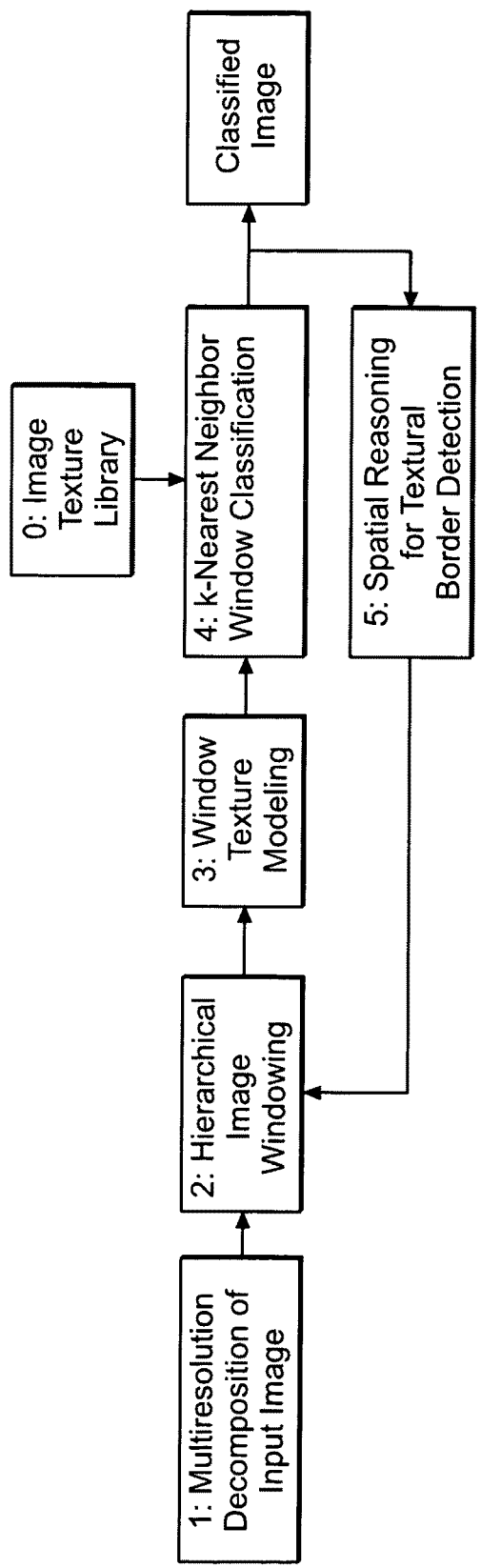
Figure 23:
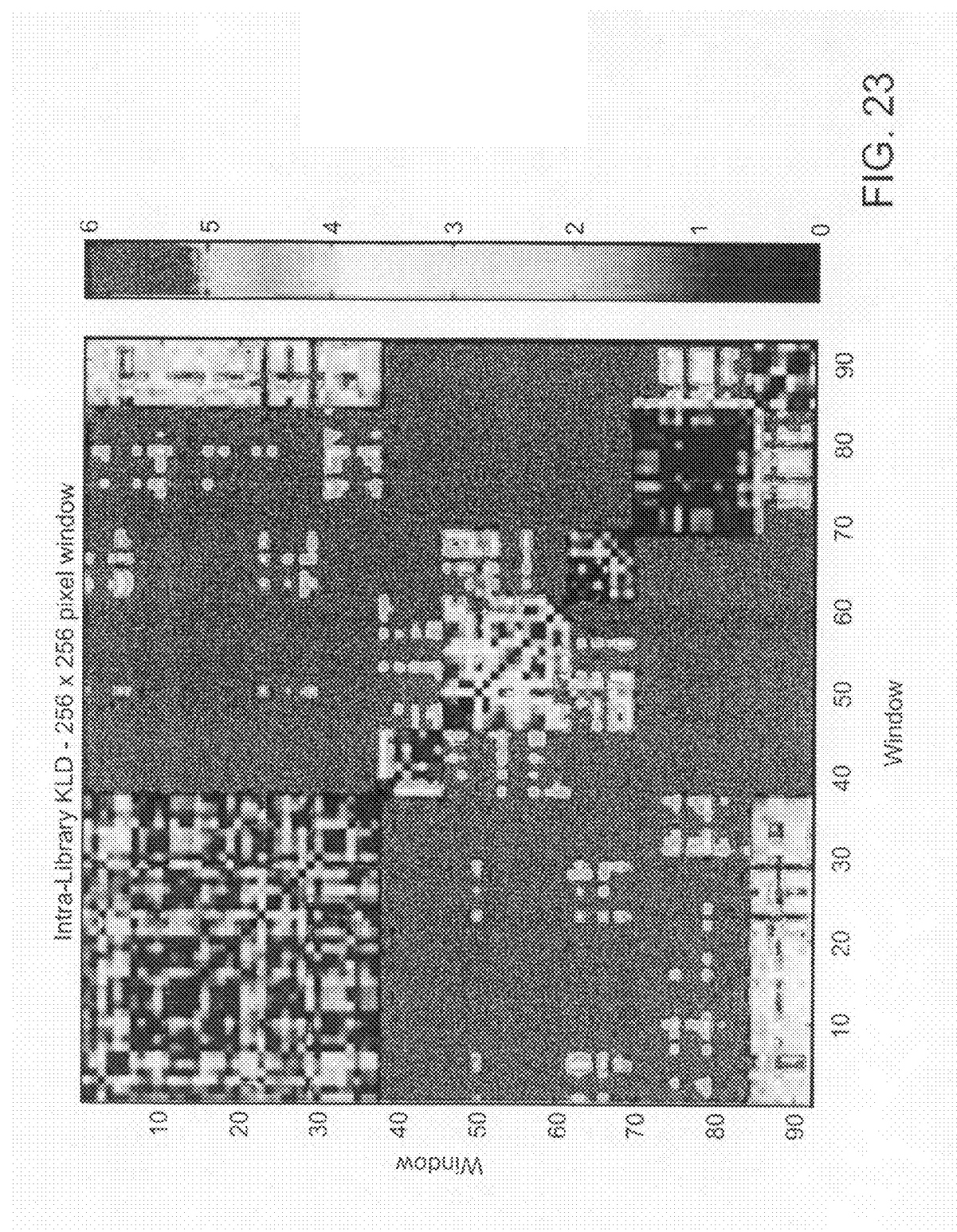

FIG. 22 shows the hierarchical classification of texturally inhomogeneous hESC colony images FIG. 23 shows an image texture library. The window size is 256×256 pixels FIG. 24 shows a typical classified image of a pluripotent hESC colony. FIG. 24A Shows an unclassified image and FIG. 24B shows a classified image. Classification parameters are as follows: k=7, $k_n$=5, Daubechies-4 wavelet, window size is 64×64 pixels. This image is a representative image collected from those used to construct an image texture library.

FIG. 25 shows a demonstration of the hierarchical algorithm for texture-based hESC colony classification. FIG. 25A shows the initial, heterogeneous image. FIG. 25B shows the image after a first pass through Steps 1-4 of the algorithm. FIG. 25C shows the image after a first pass through Step 5 of the algorithm. FIG. 25D shows the image after a second pass through Step 4 of the algorithm. FIG. 25E shows the image after a second pass through Step 5 of the algorithm. FIG. 25F shows the final output after the third pass through Step 4 of the algorithm.

FIG. 26 shows a pluripotent hESC colony. FIG. 26A shows an unclassified image. FIG. 26B shows a classified image. Here, the classification parameters are as follows: k=7, $k_n$=5, Daubechies-4 wavelet, window size is 64×64 pixels.

FIG. 27 shows a pluripotent hESC colony. FIG. 27A shows an unclassified image and FIG. 27B shows a classified image. Here, the classification parameters are as follows: k=7, $k_n$=5, Daubechies-4 wavelet, window size is 64×64 pixels.

Figure 28:
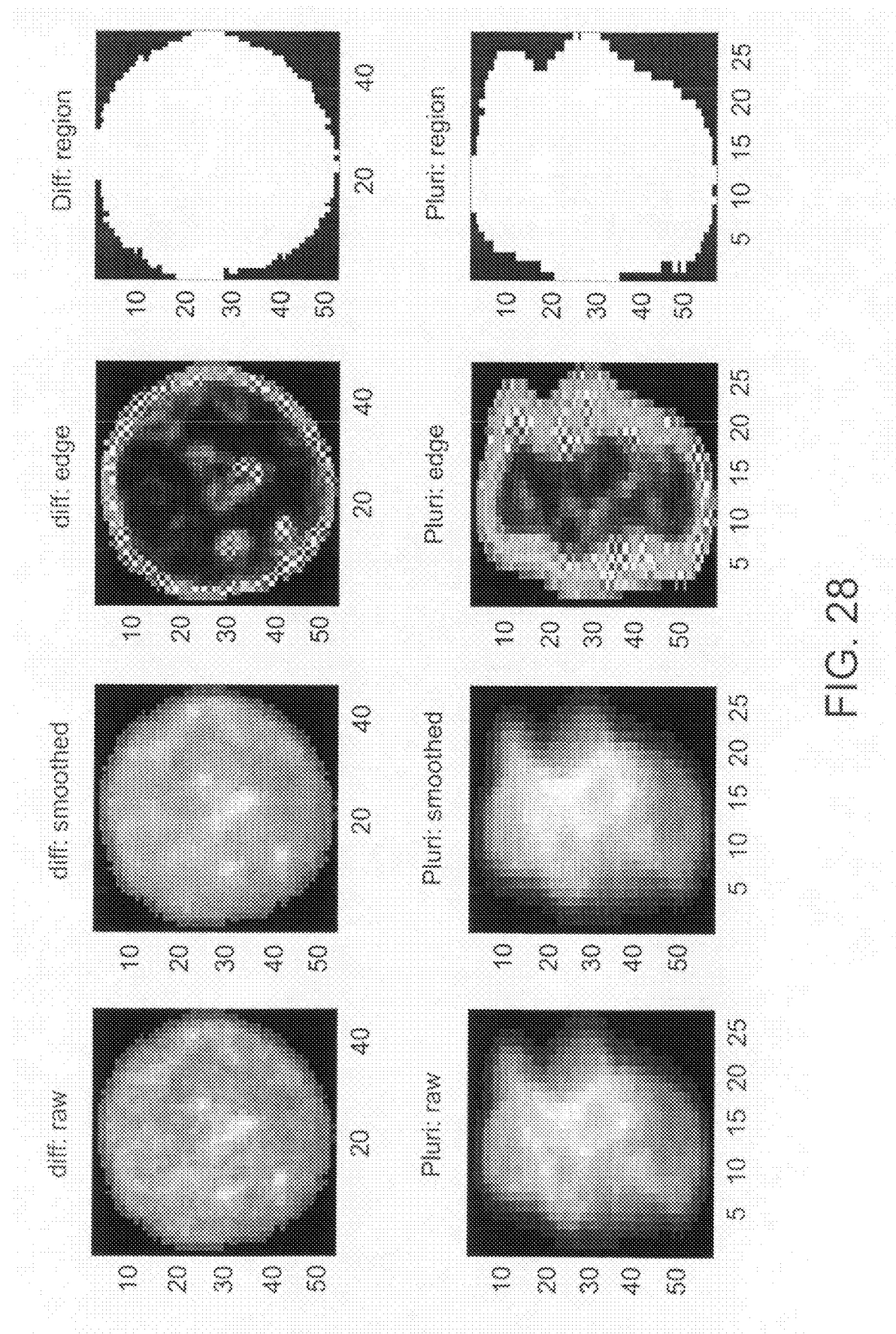

FIG. 28 shows segmentation, smoothing, and processing of pluripotent and differentiated cells, including extraction of edge strength map and boundary of cells.

Figure 29:
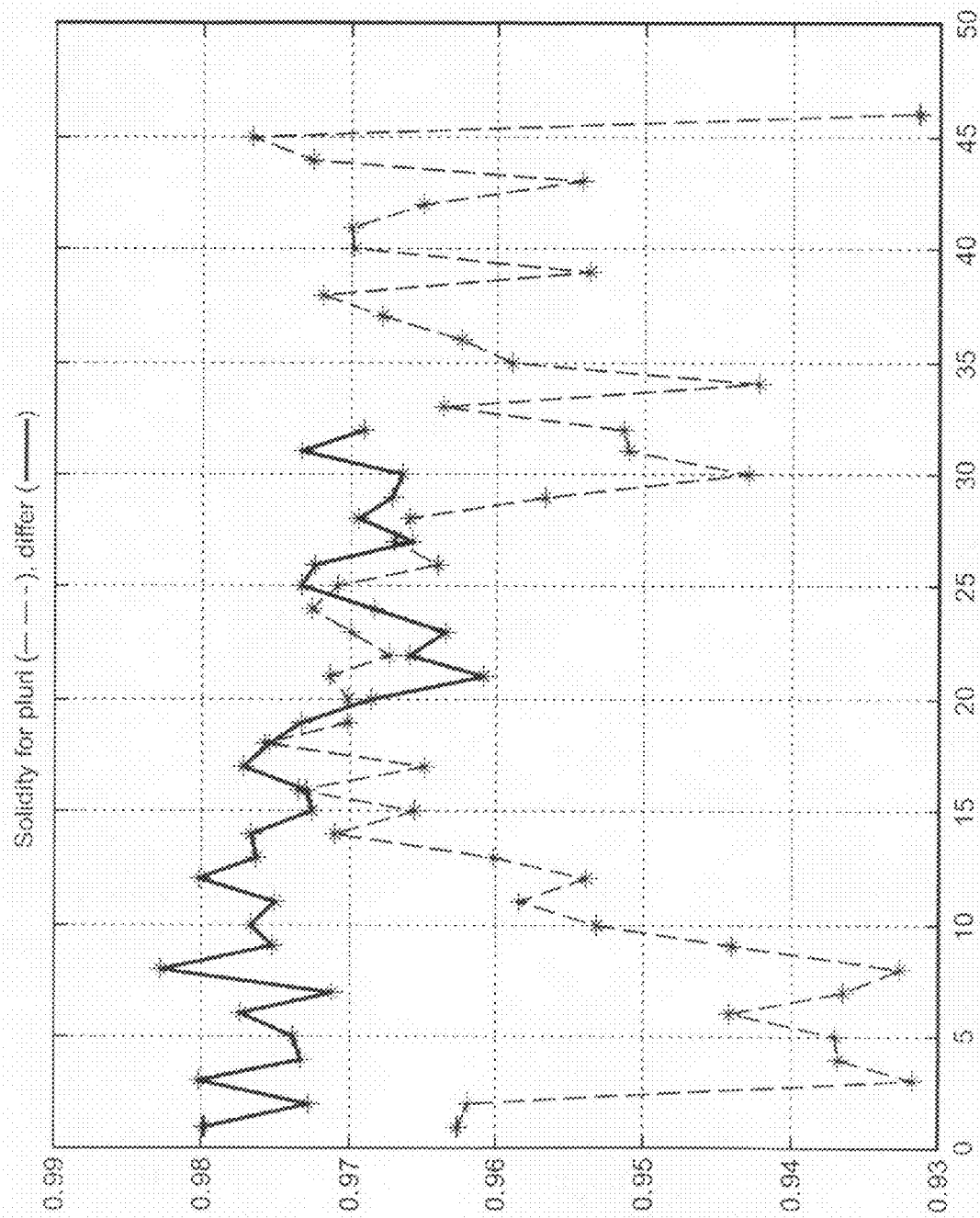
Figure 30:
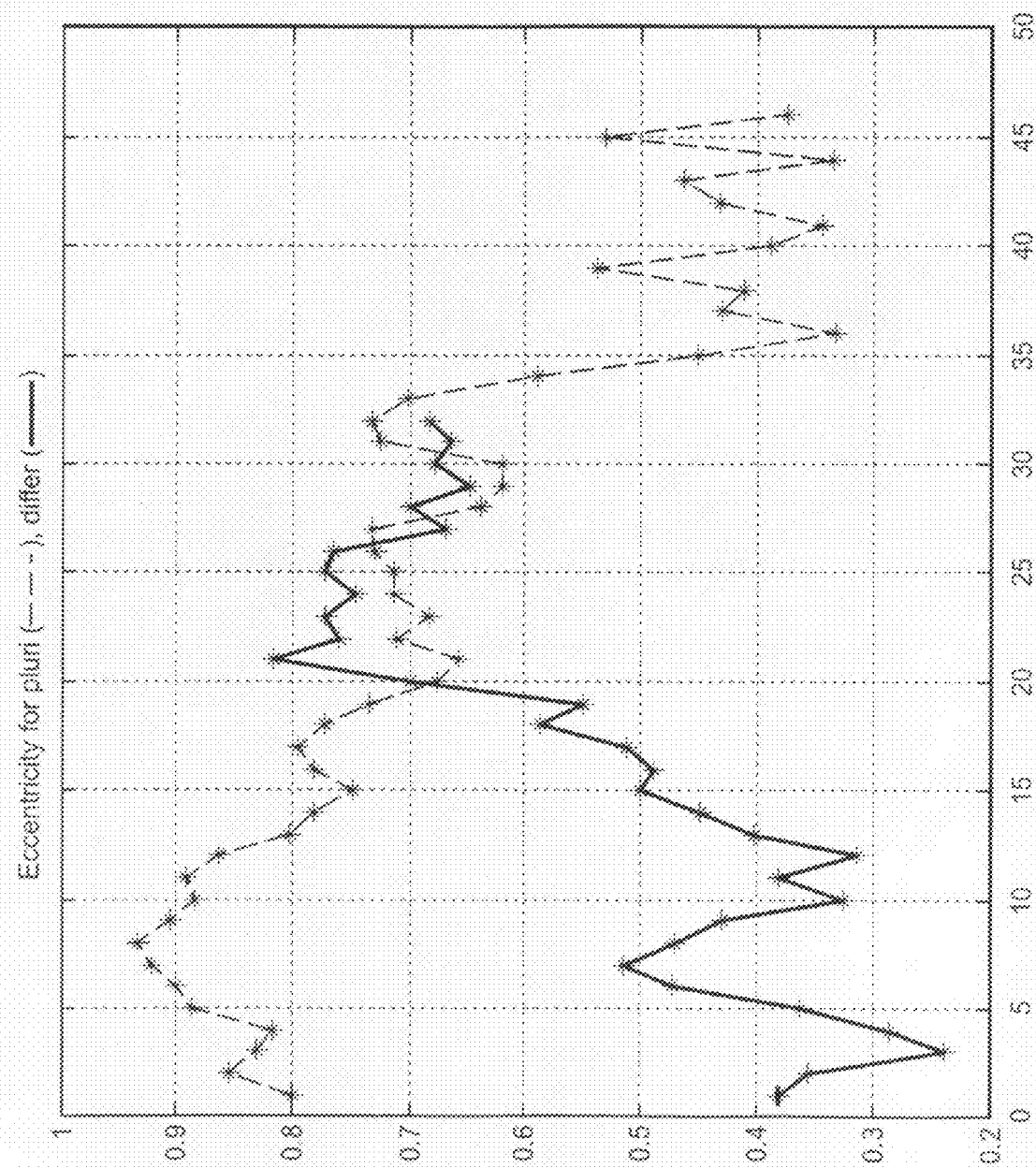
Figure 31:
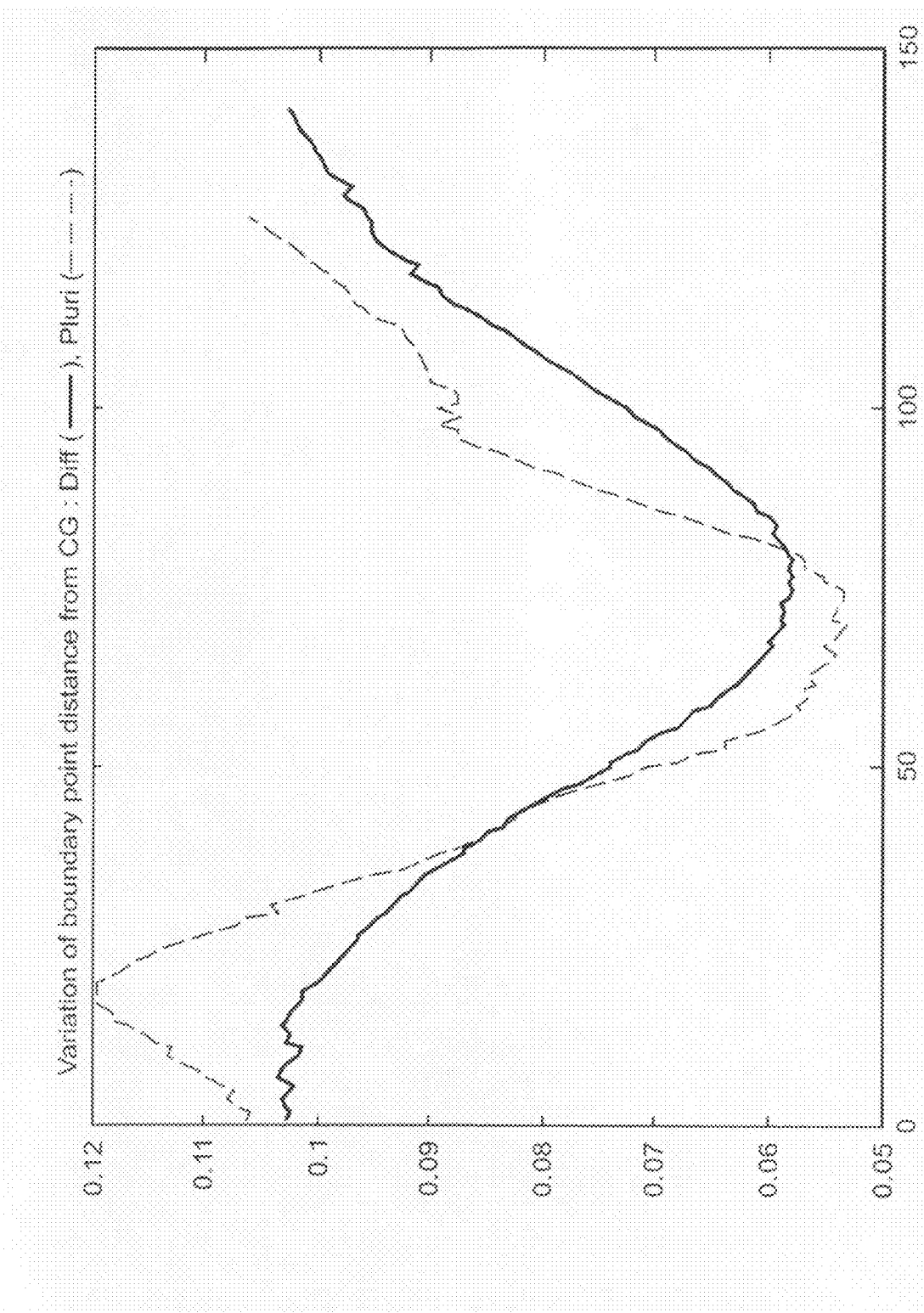
Figure 32:
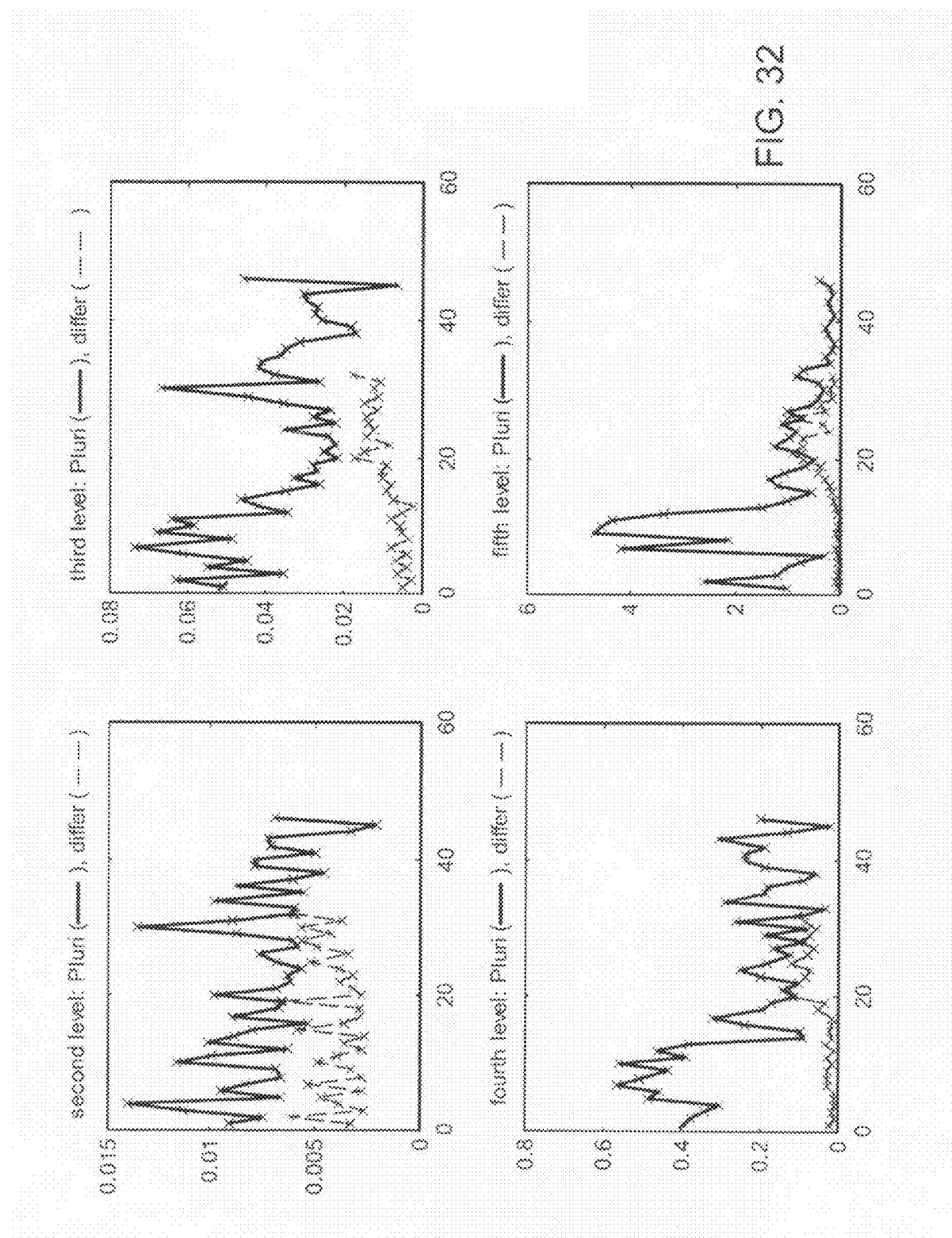
Figure 33:
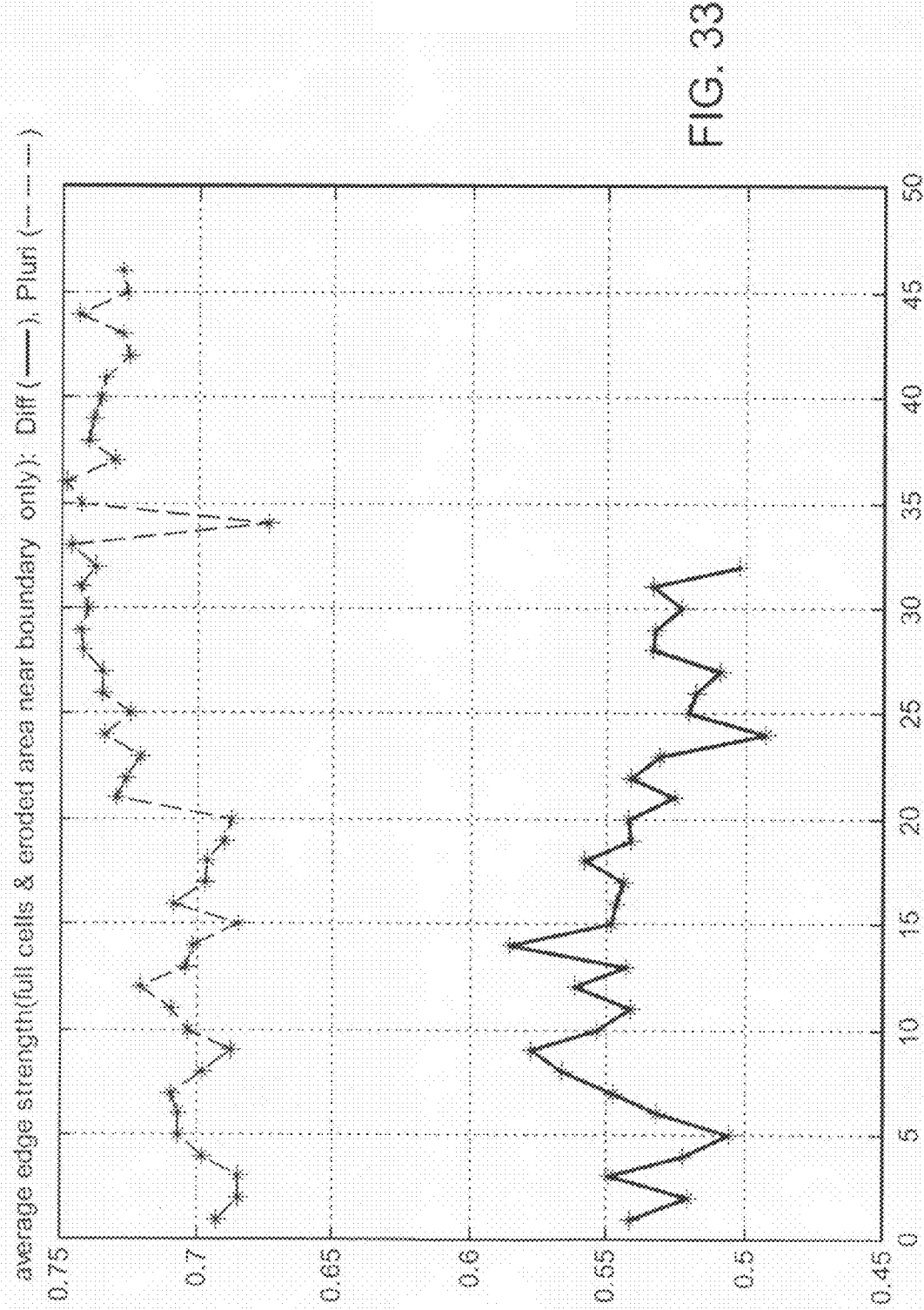
Figure 34:
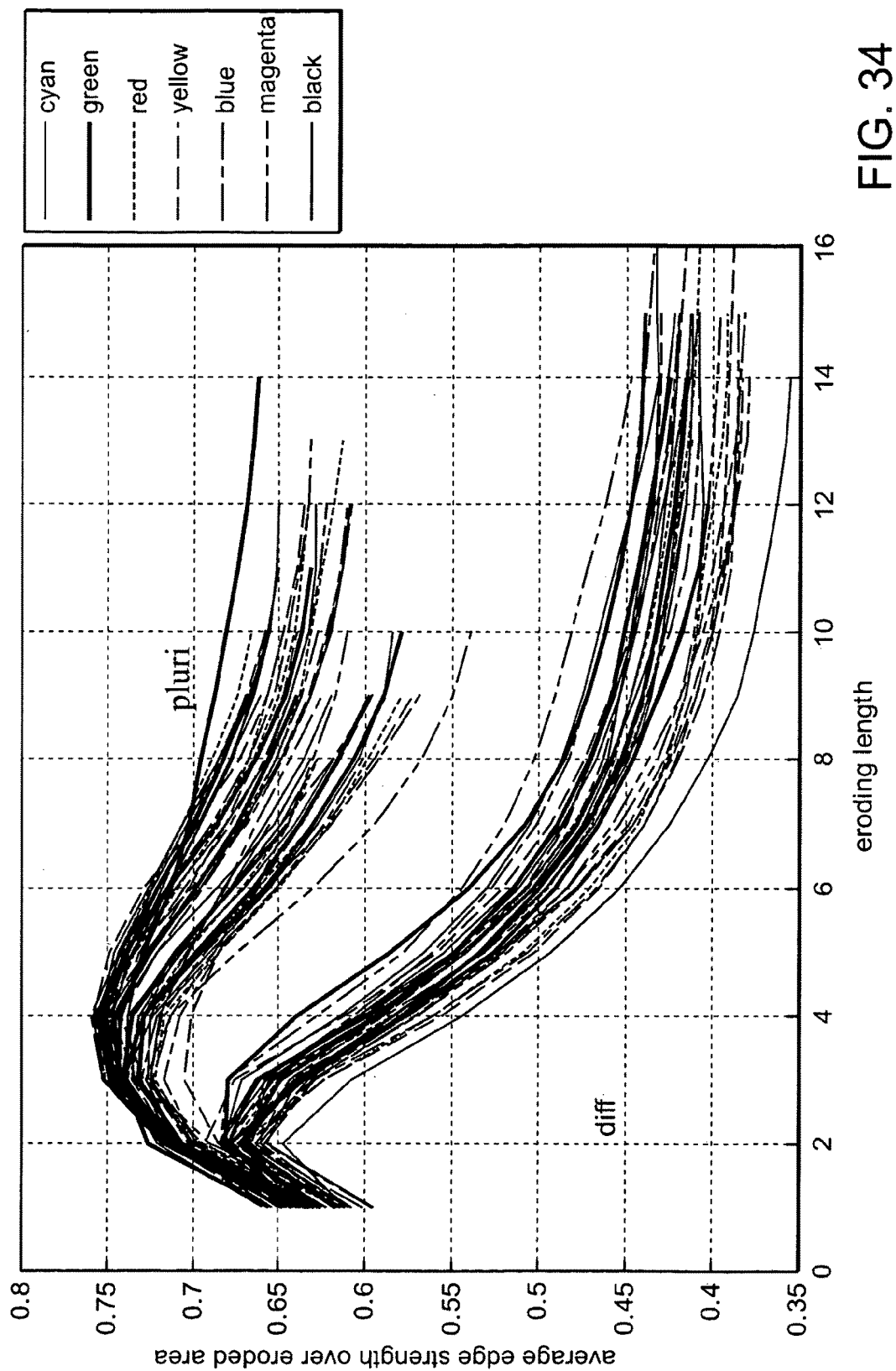

FIG. 29 shows solidity measures of movie images of pluripotent and differentiated cells FIG. 30 shows the eccentricity measures of movie images of pluripotent and differentiated cells FIG. 31 shows the distance from the center of boundaries of a pluripotent cell and a differentiated cell FIG. 32 shows the wavelet-based spatial variabilities of distance from center of movie images of pluripotent and differentiated cells FIG. 33 shows edge strength variations averaged over a narrow region near border of movie images of pluripotent and differentiated cells FIG. 34 shows onion-layer attributes. The eroding length is the depth of erosion from R to R'

Figure 35:
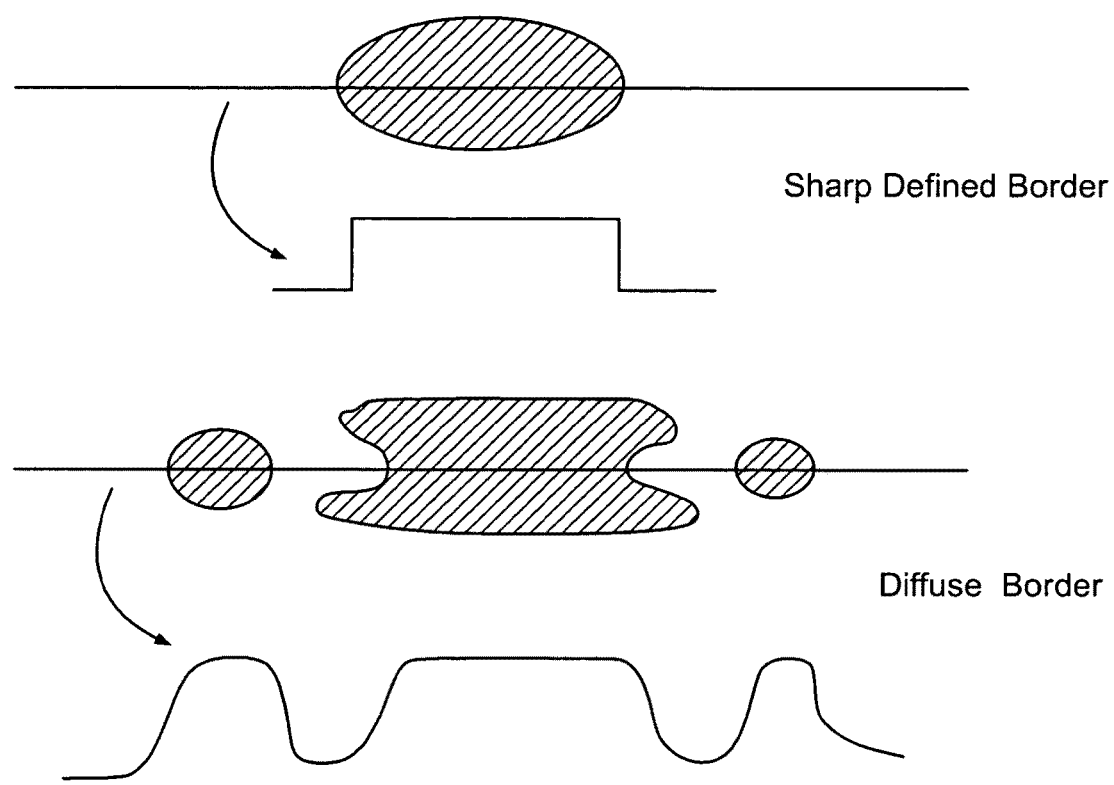

FIG. 35 shows two border analysis features: circularity (top), and diffusivity (bottom)

Figure 36:
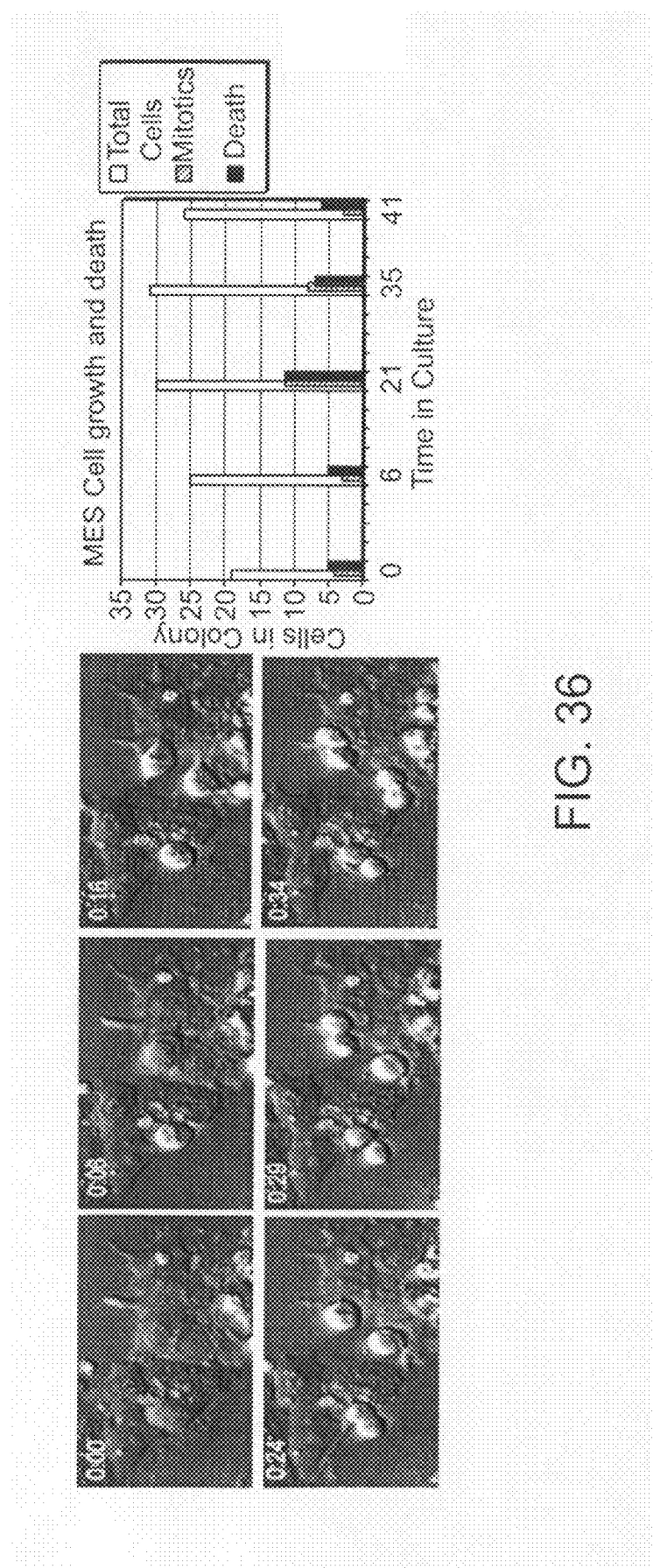

FIG. 36 shows brightfield time-lapse series of mESC colony growth and death. At higher magnification, cell growth and death can be measured cell-by-cell, in addition to morphological changes characteristic of differentiation. An excerpt from 34 min is shown, and division of rounded cells was observed. Mitotic cells from chromosome condensation to midbody formation progressed rapidly (28±7 min n=29 among 5 time lapse series of 6 hr duration). The right panel shows data for division and cell death, pooled at 6 hr intervals in the bar graphs.

Figure 37G:
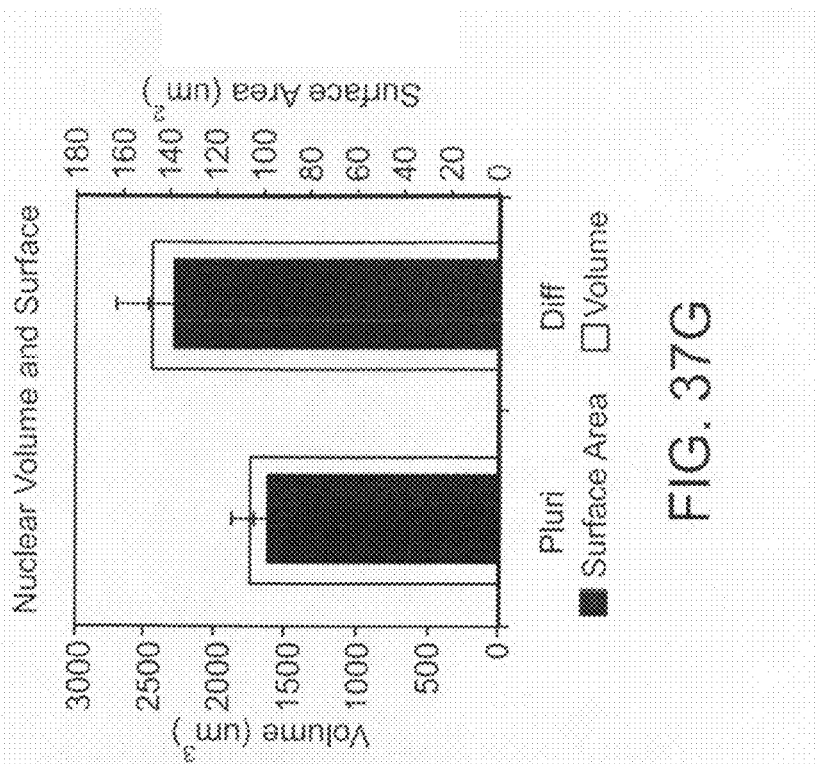
Figure 37F:

FIG. 37 shows changes in cell volume occurring during differentiation. FIG. 37A Shows the edge of a colony of cells. Pluripotent cells are identified by Oct-4 immunostaining (green). and differentiating cells are identified by nestin immunostaining (red). DNA is labelled with Toto-3 . FIGS. 37B and 37C show transmission electron microscopy of pluripotent hESCs, which have smaller nuclei and greater homogeneity than 2 day differentiated hESCs (shown in FIGS. 37D and E). FIG. 37F shows labeleing of hESCs with the DNA label Yoyo-1 and the plasma membrane marker Wheat Germ Agglutinin . FIG. 37G shows that pluripotent cells (n=29) have a volume of 103 $\mu m^3$ and a surface area of 1630 $\mu m^2$ (G). FIGS. 37B and 37D show that differentiated cells (n=16) at the colony edge have larger cross sectional area but are thinner. Overall volume and surface area increased by 1.4 fold immediately upon differentiation. Bar in FIG. 37A=10 $\mu$m, in FIG. 37D=2 um, in FIG. 37E=400 nm.

Figure 38C:
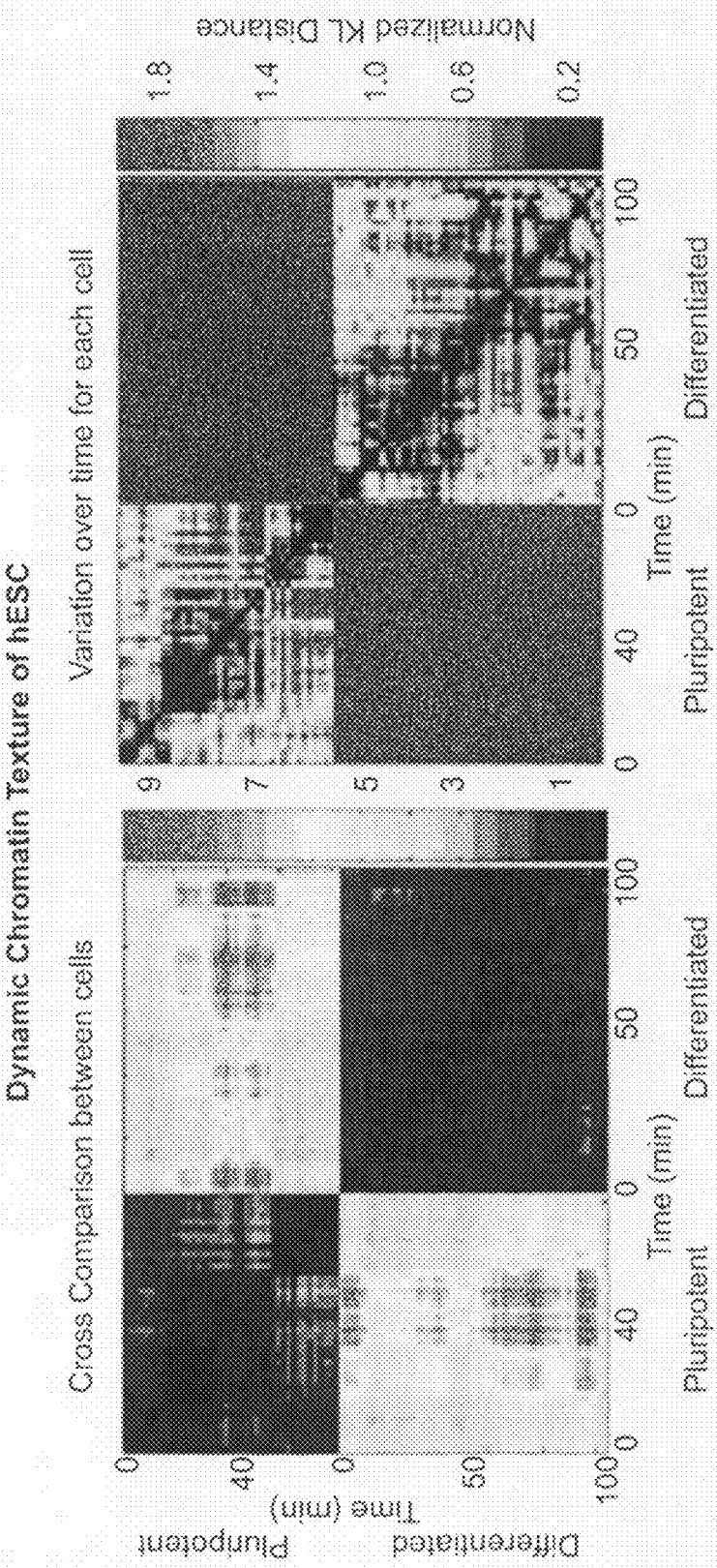

FIG. 38 shows confocal images of pluripotent and differentiated cells, acquired at time intervals in order to track the movement of nuclei and chromatin over time. Black and white images are shown at 0, 30 and 60 min and a follows where the three time-lapse images are assigned to channels. Movement is coded since domains that do not move are white, while areas that move are shown as illustrated in the time bar below FIG. 38B. The bar in FIG. 38A=10 $\mu$m. Graphs (FIG. 38C) show the dynamic texture analysis of cells imaged in FIGS. 38A and 38B at 2 min intervals. Both axes show the KL distance (texture) between images in the series. The diagonal shows KL distances of 1 for identical images. The first graph is scaled to show the cross comparison between pluripotent and differentiated cells(the upper right and lower left quadrants). The second graph shows the same data rescaled to show the variation over time for each cell. Chromatin dynamics is greater in the pluripotent cell (upper left quadrant) than in the differentiated cell (lower right quadrant). The difference between pluripotent and differentiated cells is even larger than the dynamics over time (off diagonal quadrants)

Figure 39A:
Figure 39B:
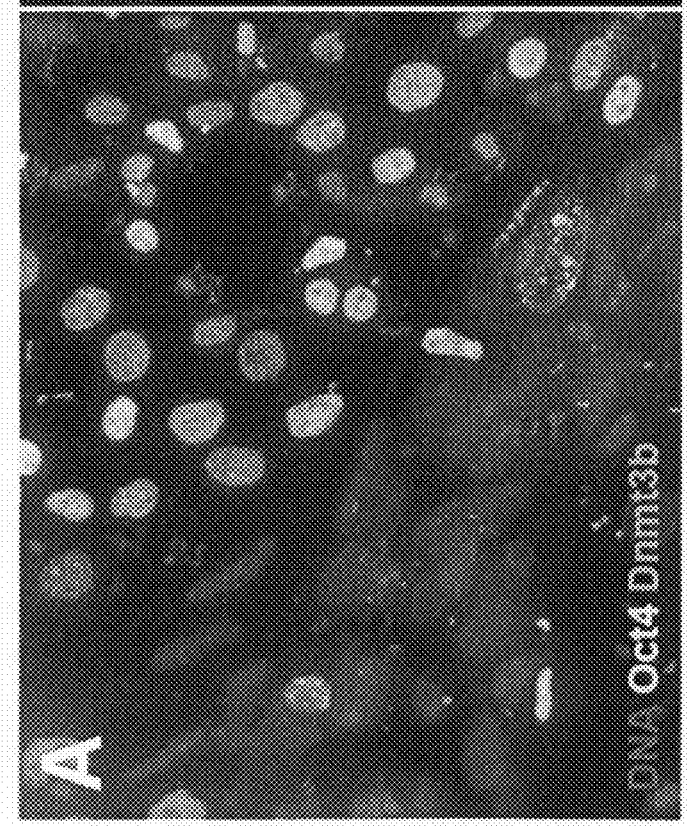

FIG. 39 shows changes in expression and localization of DNA methyltransferases And histone deacetylases upon neural differentiation. FIG. 39A shows DNMT3b and FIG. 39B shows DNMT 3a (red nuclei), which are present in pluripotent hESC expressing Oct 4 (top right), but absent in differentiated hESC (Hoechst, bottom left). FIG. 39C shows HDAC1, which is present in widely varying levels in pluripotent hESC compared to DNA and Oct4 levels. FIG. 39D shows that the ratio of HDAC1, HDAC2 and DNA are uncorrelated in pluripotent cells (top right) but highly correlated throughout the nucleus, except the nucleolus, in differentiated cells (bottom left). Bar in D, 10 $\mu$m.

Figure 40:
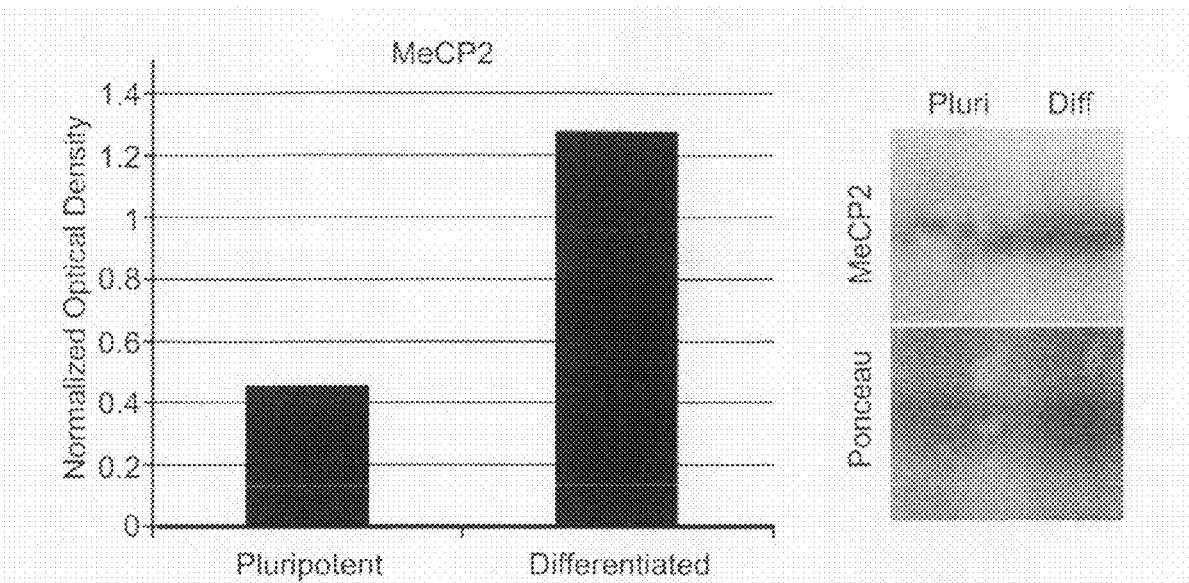

FIG. 40 shows the 3-fold increase in MeCP2 during hESC differentiation. hESC were collected before or after neural differentiation on low density feeders and immunoblots prepared against the methylated DNA binding protein MeCP2. The band optical density was normalized against protein loading by dividing by ponceau staining of the MeCP2 band.

Figure 41:
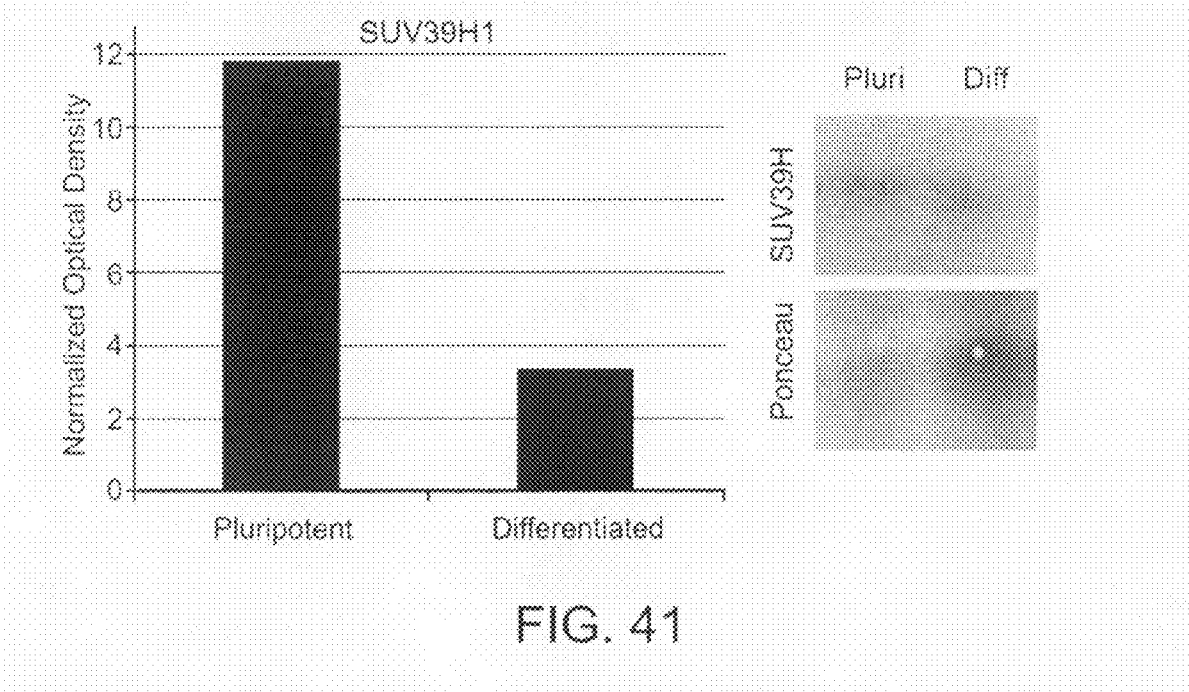

FIG. 41 shows the 3.5-fold decrease in SUV39H1 during hESC differentiation. hESC were collected before or after neural differentiation on low density feeders and immunoblots prepared against the methylated DNA binding protein MeCP2. The band optical density was normalized against protein loading by dividing by ponceau staining of the SUV39H1 band at 45 kD.

Figure 42D:
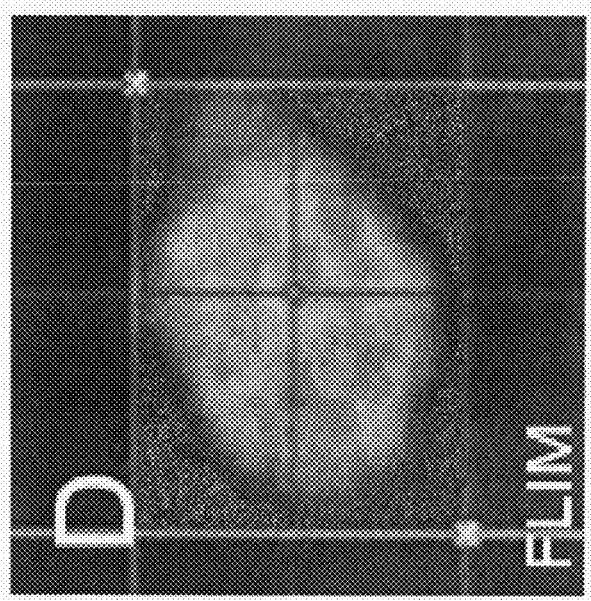
Figure 42C:
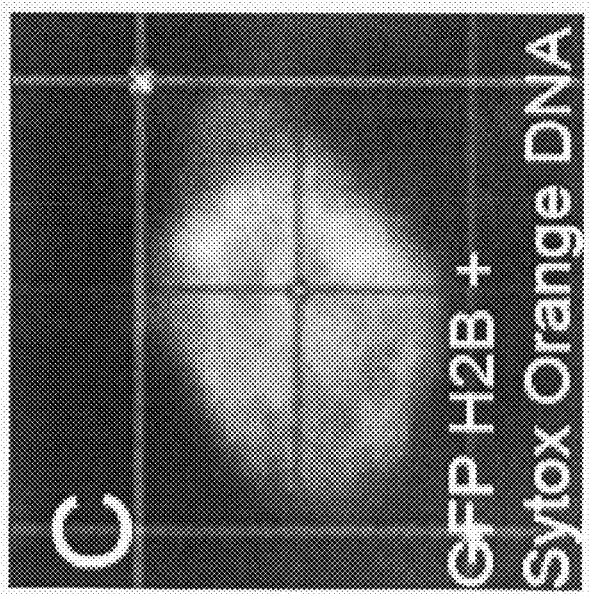

FIG. 42 shows detection of H2B density in heterochromatin and interaction with DNA by FLIM of GFP-H2B. Hela cells were transfected with GFP H2B, fixed permeabilized, and imaged with a Becker-Hick1 DCS-120 time correlated single photon counting confocal scanning FLIM. FIG. 42A shows confocal section of a nucleus displaying GFP-H2B intensity, including bright heterochronatin. FIG. 42B shows live cell imaging of the same section in FIG. 42A, showing variation in fluorescence lifetime, such as the longer fluorescence lifetime in denser chromatin areas. The mean halftime is 2.6 ns and a double exponential fit supports a single distribution (histogram in FIG. 42B) with increased lifetime in denser chromatin areas. FIG. 42C shows the nucleus after Sytox orange was added, and FIG. 42D shows the fluorescence lifetime calculation. The mean lifetime was reduced to 2.2 ns, suggesting interaction with sytox orange. Double exponential lifetime analysis of this cell produces lifetimes of 400 ps for the interacting GFP-H2B and 2.61 ns for the non-interacting GFP-H 2B. FIG. 42E shows the ratio of the lifetime components (t2/t1=t0/tfret). This ratio, t0/tfret is proportional to the interaction distance between donor and acceptor. The higher values of the lifetime distribution yellow in FIG. 42E correspond to bright areas in FIG. 42C, which are areas of condensed chromatin. FIG. 42F shows the plot of the ratio of the interacting and non-interacting donor fractions, or the FRET efficiency (E_fret=a1/a2). Here the interacting fraction is a1=62% and the non-interacting fraction a2=37%. The image in FIG. 42B shows that the fraction of interacting GFP does not vary widely across the nucleus, but that the fluorescence lifetime, which is related to the interaction distance between donor and acceptor does vary significantly, as demonstrated in FIG. 42E.

DETAILED DESCRIPTION OF THE INVENTION

This disclosure, in certain aspects, is generally directed to methods for determining the differentiation state of a cell, based on a combination of biological detection methods and image analysis methods. Biological detection methods comprise techniques used to detect biological changes in a cell, and may further comprise taking measurements or acquiring images of a cell or cellular structure in a non-invasive, non-perturbing and non-destructive manner. Methods of the present invention are not limited to biological changes in a particular type of cell or cellular structure. In one aspect, specific biological changes may be related to the chromatin in the nucleus of a cell, and characteristics of the chromatin may be used to determine the differentiation state of the cell.

In some embodiments, the image analysis methods comprise one or more of: statistical multiresolution texture analysis for classification of nuclei regions; variational unified energy functionals formulation for performing one or more of the following operations on images of nuclei: smoothing, segmenting, learning of features and parameters, or grouping of subtextures or shapes; robust non-Gaussian subspace detection and learning methods, and/or nonparametric Independent Component Analysis (ICA), for adaptive basis learning so as to permit compact representation of nuclei regions; and/or linear or nonlinear hierarchical dynamic modeling for representing the spatiotemporal variations of the features extracted using any of the methods listed.

In some embodiments, both the biological detection methods and the image analysis methods are automatable, and provide information about a stem cell's health status and/or pluripotency. Collected over time, images of stem cell colonies or nuclei of stem cells reflect biological changes. Attributes or features extracted from these images may be used to develop models that describe the spatiotemporal dynamics (e.g., the level of pluripotency, onset of mitosis) in stem cell colonies and nuclei, particularly after modifications of environmental conditions. The models based on extracted attributes or features may provide descriptions of transition mechanisms. Notably, the models may be data-driven, because they use information derived from direct measurements. Models based on extracted attributes or features predict and describe the differentiation process in stem cell nuclei and the regeneration and differentiation processes in entire colonies.

Accordingly, in some embodiments, modeling of stem cell processes enables a system of planned, controlled stem cell colony maintenance. The system may be a decision support system for research and industrial biologists, or clinicians interested in cell therapy.

Biological Detection Methods

Many studies of chromatin focus on the structure of DNA and nuclear protein complexes, or dissect the functions of individual proteins, e.g., histones or proteins which modify histone activity. The present disclosure provides additional information about chromatin biology, and establishes relationships between the morphology of the cell nucleus and the differentiation state of the cell. The disclosure further describes methods that use chromatin motility and/or morphology to determine the differentiation state of a cell.

Pluripotent stem cells are characterized by unlimited self-replication and the ability to contribute to all embryonic tissues. The developmental plasticity of embryonic stem cells (ESCs) has been established genotypically by studies that show tissue-specific expression is inactive but is not irreversibly silenced. Regulation of gene expression in ESCs is different from somatic cells, where the global control of tissue phenotype requires an enduring silencing of gene loci that are not appropriate for a specific type of differentiated cell or tissue. Silencing of inappropriate loci involves the differential formation of heterochromatin, chromosome positioning within the nucleus and other architectural features that are unique to each tissue type. Studies of Oct-4 and nanog regulation during differentiation suggest that epigenetic mechanisms, including progressive methylation of the Oct-4 promoter and chromatin remodeling, silence pluripotency genes that are no longer needed. During neuronal differentiation, the potentially available genome is narrowed from pluripotent to multipotent, finally to a committed, fully functional neuronal state. Thus, pluripotency may reflect not only an unrealized potential for alternate fates, but also a novel "soft-off state" for non-stem cell genes.

Human embryonic stem cells (hESCs) exhibit unusual nuclear structure and epigenetic characteristics that change during development. Initially, hESCs exhibit low levels of histone and DNA methylation and little heterochromatin. Physical characteristics of hESC nuclei include high mechanical compliance, intranuclear chromatin movement, and increased histone hyperdynamics, leading to a more fluid nucleus in the pluripotent state. During differentiation, nucleus-wide changes in chromatin mobility and envelope organization occur. Deformation of somatic nuclei is resisted by both the envelope and chromatin, with chromatin potentially acting as a force-bearing element, suggesting that chromatin mobility may serve as an indicator of transcriptome plasticity. Recent work suggests that chromosome domains and gene loci are silenced at multiple levels including the nucleus, chromatin, histones and DNA sequence. The unique organizational characteristics of hESC nuclei and histones may reflect global epigenetic factors that allow uncommitted cells to express different transcriptomes. As plasticity is progressively restricted during differentiation, epigenetic mechanisms at the level of the nucleus and chromatin may reduce the potential for cross-fate switches. Thus, nuclear plasticity in ESCs provides a novel structural foundation for pluripotency and maturation of the nucleus provides epigenetic mechanisms for fate commitment.

In certain aspects, a method for determining the differentiation state of a test cell may comprise obtaining an image of a nucleus in said test cell; measuring one or more textural features in said image; and comparing said one or more textural features with corresponding textural features derived from one or more reference cells which are representative of one or more corresponding predetermined differentiation states, whereby the differentiation state of the test cell is determined.

One exemplary textural feature of a cell nucleus is granularity. A recent study (Mangoubi, Desai, Lowry, and Sammak, 2008) provides evidence that granularity changes during differentiation. In pluripotent cells, nuclei are small and chromatin is generally smooth-textured. During differentiation, however, chromatin becomes more granular, and differentiated stem cells appear nearly as granular as adult human vascular endothelial cells. Pluripotent nuclei are physically very plastic and become less pliant during differentiation due in part to chromatin condensation. Condensed, compact chromatin supercoiling limits accessibility of DNA to soluble proteins. Chromatin condensation is biologically significant because transcription factors and activators need to have access to DNA in order to express genes. The granularity of chromatin therefore reflects the segregation of the nucleus into domains of high density and low density. Since heterochromatin, which is compact and dense, generally contains silenced genes, analysis of granularity or any other textural feature may provide a direct measure of the degree of gene silencing by chromatin remodeling. High levels of granular chromatin in the nucleus are indicative of an advanced state of differentiation.

Because granularity reflects chromatin condensation, measurements of chromatin condensation may be used to determine the differentiation state of a cell. In certain aspects, a method for determining a differentiation state of a test cell comprises obtaining an image of a nucleus in said test cell; measuring chromatin condensation in said nucleus; and comparing measurements of chromatin condensation with corresponding measurements derived from one or more reference cells which are representative of one or more corresponding predetermined differentiation states, whereby the differentiation state of the test cell is determined. Here, the presence of highly condensed chromatin correlates with an advanced state of differentiation, while the presence of highly uniform chromatin correlates with a primitive state of differentiation, or, alternately, with a primitive degree of transformation of a cancer cell.

In certain aspects of the present disclosure, test cells may be pluripotent stem cells, multipotent stem cells, or terminally-differentiated cells. In some embodiments, the test cell may be a cancel cell or a cancer stem cell, which may be dedifferentiated from the normal somatic state. Cancer aggressiveness may be determined by evaluating the number and density of tumor cells with dense smooth chromatin, which is typical of dedifferentiated tissue. Such cells have been identified as stem-cell-like, and are believed to serve as a core source of mature tumor cells, in a situation directly analogous to normal stem cells which provide a source of new cells for normal tissue repair and maintenance in the body.

Regulation of Gene Expression

Gene expression is regulated by a hierarchy of genetic, epigenetic and nuclear mechanisms (O'Brien, Bult et al. 2003; van Driel, Fransz et al. 2003). In somatic nuclei, active transcription and replication domains are limited to discrete euchromatic foci and are not distributed throughout the nucleus (Hassan, Errington et al 1994; Ahmad and Henikoff 2002). Gene silencing is regulated by nuclear architecture which controls histone modification, chromatin compaction and access to activators or repressors (Feuerbach, Galy et al. 2002; Teixeira, Dujon et al. 2002; Cai, Han et al. 2003). Silencing within heterochromatin by histone H3 lysine 9 (H3-K9) methylation (Grewal and Moazed 2003) and substitution of histone variants (Mizuguchi, Shen et al. 2004) is an important mechanism for gene inactivation. H3-K9 methylation recruits heterochromatin proteins 1 and 2 (HP1 and 2) to large-scale neighborhoods of inactive chromatin (Cheutin, McNaim et al. 2003; Pal-Bhadra, Leibovitch et al. 2004) that are condensed and maintained dynamically (Cheutin, Mcairn et al. 2003). Recruitment of H3K9-specific methyltransferases, Suv39H1, to heterochromatin is partly dependent on HP1 which transiently interacts with Suv39H1 at heterochromatin (Krouwels, Wiesmeijer et al. 2005). FRAP studies of Suv39H1 show that a substantial population of Suv39H1 is immobile at pericentromeric heterochromatin, suggesting that Suv391-11 may also play a structural role at pericentromeric regions (Krouwels, Wiesmeljer et al. 2005). Methylation of H3K27 is associated with facilitative heterochromatin. H3K27 trimethylation discriminates between genes that are expressed, poised for expression, or stably repressed, and therefore reflect cell state and lineage potential. Lysine 36 trimethylation marks primary coding and non-coding transcripts, facilitating gene annotation. Trimethylation of lysine 9 and lysine 20 is detected at centromeric satellite, telomeric and active long-terminal repeats, and can spread into proximal unique sequences. Lysine 4 and lysine 9 trimethylation marks imprinting control regions (Mikkelsen, Ku et al. 2007). The methyltransferases that are responsible in pluripotent or early differentiated hESC has not been determined, but Suv39h1,2 are responsible for H3-K9tme3 in mouse pericentromeric heterochromatin, G9A for Human H3K9me2 pericentromeric heterochromatin and G9a for methylation of H3K9 in euchromatin (Lam, Pazin et al. 2005; Lam, Boivin et al. 2006). Another hypothesis has been developed that H3K27 and H3K4 methylation act in a bivalent manner at conserved noncoding sequences to control expression of coding sequences within pluripotent cells (Bernstein, Mikkelsen et al. 2006).

Accordingly, in certain aspects, a method for determining a differentiation state of a test cell comprises measuring histone methylation in said test cell; measuring DNA methylation in said test cell; and comparing measurements of histone methylation and DNA methylation from said test cell with corresponding measurements derived from one or more reference cells which are representative of predetermined differentiation states; whereby the differentiation state of the test cell is determined. Histone methylation may be measured by methods known in the art. One exemplary method comprises using antibodies directed against methylated histone epitopes, followed by quantification of antibody binding using standard immunohistochemistry methods. Measurements of histone methylation may further comprise measuring methylation on lysine 9 on histone 3 (H3K9).

When the overall levels of H3K9 methylation and DNA methylation change, the localization of H3K9 methylation and DNA methylation also changes. Increased levels of H3K9 methylation in test cells, as compared to levels in pluripotent stem cells, are indicative of cell differentiation, while increased levels of H3K9 methylation at the peripheral edge of a test cell, as compared to levels in pluripotent stem cells, are also indicative of cell differentiation. Increased levels of DNA methylation in a test cell relative to a pluripotent stem cell are indicative of cell differentiation, while DNA methylation at distal chromosome arms during interphase, during prophase, or during anaphase in the test cell, as compared with a pluripotent stem cell, is also indicative of cell differentiation. In some embodiments, an increase in the incidence of colocalization of methylated DNA and methylated histones in a test cell, as compared to a pluripotent stem cell, is indicative of cell differentiation. In some embodiments, methylation of DNA at centromeric and pericentromeric domains on chromosomes during interphase, prophase and/or during anaphase in the test cell is indicative of cell differentiation.

Movement of Chromatin

In somatic mammalian cells, photobleaching studies show that global positions of interphase chromosomes are surprisingly stable and localization of chromosomes to defined territories is tissue-specific (Parada and Misteli 2002; Misteli 2004; Parada, McQueen et al. 2004; Misteli 2005; Oliver and Misteli 2005). Chromosome position is set up early in G1 when nuclei show maximal plasticity and are stable thereafter (Walter, Schermelleh et al. 2003; Thomson, Gilchrist et al. 2004). Nuclear positioning of chromosomes and chromatin global organization has significance for regulation of gene loci (Misteli 2004; Misteli 2005). Chromosomes containing active gene loci are positioned centrally within the nucleus, while chromosomes containing inactive gene loci are positioned peripherally and are enriched in heterochromatin domains (Parada, McQueen et al. 2004).

In somatic cells, movement of interphase chromosomes is described as constrained Brownian movement (Marshall, Straight et al. 1997). Movement varies from a few μm in mitosis and early G1 to 1 μm in late G1 through G2 (Walter, Schermelleh et al. 2003). In some instances, overall chromosome position is heritable, through mitosis, from one generation to the next. (Gerlich, Beaudouin et al. 2003). Histone binding in nucleosomes has high affinity for DNA, and there is little free nuclear histone protein (Peltz and Ross 1987). Exchange of core histones in somatic cells has been measured by fluorescence recovery after photobleaching (FRAP) of GFP-tagged protein. H3 and H4 do not measurably exchange (Kimura and Cook 2001), while there is some exchange of H2B with a mobile fraction of a few percent (Kimura and Cook 2001; Wachsmuth, Weidemann et al. 2003). Binding of the H2B/H2A dimer to DNA has lower affinity than H31H4 tetramer and H2B/H2A is actively displaced during transcription by regulatory proteins (Hirschhorn, Brown et al. 1992; Belotserkovskaya, Oh et al. 2003; Hanlon, Norris et al. 2003).

Histone H2A/H2B dimers can be removed by chromatin remodeling complexes in an ATP dependent mannner. These studies suggest that when interpreting GFP-H2B movement, we should not exclude mechanisms of H2B exchange that involve unbound protein complexes, constrained movement on DNA, movement of chromatin filaments or of whole interphase chromosomes.

Thus, in certain aspects, the rate of chromatin movement is more rapid in a pluripotent cell than in a differentiated cell. Accordingly, a method for determining a differentiation state of a test cell comprises measuring a rate of chromatin movement in said test cell; comparing said rate of chromatin movement with reference rates of chromatin movement corresponding to one or more predetermined differentiation states; whereby the differentiation state of said test cell is determined.

To measure chromatin movement, chromatin may be labeled and the persistence of labeled domains over a given time period can be measured. Chromatin may be labeled using DNA dyes, such as the vital DNA dye, Syto-16. Alternatively, the test cell may be transfected with a protein associated with a fluorescent label.

Exemplary proteins associated with a fluorescent label that may be suitable for measuring chromatin movement include GFP-Histone 2B (GFP-H2B) or GFP-Histone 3 (GFP-H3).

When chromatin proteins are associated with fluorescent labels, photobleaching experiments provide another means to measure movement of the labeled proteins. In fluorescence recovery after photobleaching (FRAP), a small portion of the fluorescent area is photobleached, and movement of labeled protein into the photobleached spot mediates "recovery." The time interval before the photobleached portion becomes fluorescent again is measured. In a similar paradigm, called fluorescence loss in photobleaching (FLIP), the loss of fluorescence in the region that has not been photobleached is measured. Both FRAP and FLIP result in quantifiable measures of movement of labeled chromatin and/or rate of chromatin component exchange.

Because chromatin movement is more rapid in a pluripotent cell than in a differentiated cell, a more rapid recovery of a photobleached region in the test cell relative to a differentiated cell is indicative of a pluripotent cell. Similarly, a more rapid loss of fluorescence outside of the photobleached region in a test cell relative to a differentiated cell is indicative of a pluripotent cell.

In addition to changes in the rate of chromatin movement during differentiation, the direction of chromatin movement also changes. Thus, in certain aspects, faster movements or an increased number of multi-directional movements of chromatin in a test cell as compared with a differentiated cell are indicative of a pluripotent cell. In some embodiments, slower or more parallel movements of chromatin in a test cell as compared with a pluripotent cell are indicative of a differentiated cell.

In some embodiments, the magnitude of chromatin intensity may be used to determine the differentiation state of a test cell. In some embodiments, a method for determining the differentiation state of a test cell comprises measuring a magnitude of chromatin intensity in said test cell and comparing said magnitude of chromatin intensity with reference magnitudes of chromatin intensity corresponding to one or more predetermined differentiation states; whereby the differentiation state of said test cell is determined. An increase in the magnitude of chromatin intensity may reflect increased levels of condensed heterochromatin in differentiated cells.

The images used to measure chromatin movement or chromatin intensity may be acquired over time, and two or more images may be acquired at intervals of 0 minutes, 30 minutes, or 60 minutes.

In some aspects, proteins levels and protein distribution changes during differentiation. Fluorescent imaging techniques may be used to measure the decay of fluorescence on a picosecond timescale. These measurements may report the interaction of a fluorophore with another fluorophore or with its environment. Accordingly, the levels and distribution of GFP-H2B or any other fluorescent marker associated with a protein, cell, or cell structure, or protein, may be assessed by fluorescence imaging methods.

In some aspects, fluorescently labeled cells and/or cells transfected with nuclear proteins associated with fluorescent markers may be imaged using fluorescence lifetime imaging (FLIM). FLIM may be used for live cells in confocal or two-photon microscopy systems. In FLIM, the images produced from a fluorescent sample are based on differences in the exponential decay rate of fluorescence. The lifetime of the fluorophore signal, rather than its intensity, is used to create the image in FLIM.

In some aspects, the interaction of a fluorophore with another fluorophore may be measured using Förster resonance energy transfer (FRET). In FRET, energy is transferred between a donor chromophore in its excited state to an acceptor chromophore in close proximity. The distance between the chromophores may be 1, 2, 5, 7, 10 nm or more. Similarly, a molecule associated with a donor fluorophore may be located near to a second molecule associated, with an acceptor fluorophore. When the two molecules are dissociated and the fluorophores are far apart then donor emission is detected upon donor excitation. When the molecules are associated or at least located closely enough to bring the fluorophores in close proximity (1-10 nm), acceptor emission is predominantly observed because of intermolecular FRET from the donor to the acceptor. FRET may be used to monitor the interactions between proteins, proteins and DNA, as well as interactions occurring within a protein as a result of conformational changes.

Mechanical Deformability

Nuclear organization and structure correlates with mechanical stiffness. The nucleus of a pluripotent cell is more flexible than the nucleus of a differentiated cell, and shows a higher degree of mechanical deformability. In certain aspects, this difference in mechanical deformability may be used to determine the differentiation state of a test cell. Such a method comprises deforming a nucleus in said test cell; measuring a magnitude of deformation of said nucleus in response to a mechanical force (or any other suitable deforming force); and comparing the magnitude of deformation of said nucleus (e.g., relative to the magnitude of the applied force) to corresponding measurements derived from one or more reference nuclei representative of predetermined differentiation states; whereby the differentiation state of said test cell is determined. In some embodiments, relative deformability may be determined by aspirating cells in a pipette and calculating the distance that aspirated cells move into the pipette.

Extraction of Chromatin

Using techniques known in the art, histones and heterochromatin binding proteins can be extracted with detergents or salts. In these experiments, the strength of protein-DNA interaction for some chromatin elements, such as histones and histone binding proteins, may be weaker in undifferentiated cells than in differentiated ones. Thus, some chromatin components can be extracted from hESCs at lower salt stringency than the stringency required for extraction of the same components from differentiated cells.

Based on this difference, certain aspects of the present disclosure provide a method for determining a differentiation state of a test cell. In some embodiments, the method comprises extracting chromatin components from said test cell in detergent and salt solution; ascertaining a stringency of salt solution sufficient to extract said chromatin components; and comparing the stringency of said salt solution required to extract said chromatin components from said test cell with corresponding stringency values associated with one or more predetermined differentiation states; whereby the differentiation state of said test cell is determined. In some embodiments, a requirement for lower salt stringency to extract chromatin components from the test cell relative to a requirement for a differentiated cell is indicative of a pluripotent cell. In some embodiments, the chromatin components may be selected from a list comprising HP1α, HP1β, or GFP-H2B.

Modification of Histone Activity

Chromatin dynamics, motility, and morphology change when a pluripotent cell undergoes differentiation. Coincident with these changes, expression of proteins that modify the activity of histones also changes. For example, the histone deacetylases HDAC1 and HDAC2 are absent from pluripotent hESCs, and expression of these proteins begins early in differentiation.

In addition to well-studied post translational histone modifications, histone variants and histone chaperones are important in the epigenetic control of gene expression (Korber and Horz 2004; Armstrong 2007). The chaperone, Nap-1, and the remodeling protein, CHD-1 in yeast, play a global role at transcriptionally active promoters to regulate nucleosome density and DNA binding (Walfridsson, lthorosjutinia et al. 2007). Nap-1 is well studied and has a role in nucleosome assembly and disassembly (Zlatanova, Seebart et al. 2007). Nap-2 binds histones in a DNA-independent complex and can regulate DNA supercoiling in an ATP-dependent manner (Rodriguez, Pelletier et al. 2000; Abeyta, Clark et al. 2004). Anti-silencilg function protein 1(ASF-1) chaperone for H3 interferes with H3 binding to the H3/H4 nucleosome complex (Mousson, Lautrette et al. 2005; Recht, Tsubota et al. 2006) and its deletion in yeast leads to increased supercoiling and, paradoxically, increased acetylation of H3K9 (Adkins and Tyler 2004). Nucleosome assembly stimulated by ASF-1 is opposed by another chaperone, HIR, and the pair work together during transcription to expose DNA, to polymerase II and then repackage DNA (Kim, Seol et al. 2007). Chromatin assembly factor 1 (CAF-1) and Rtt 106p are chaperones for H3 and H4 that may be necessary for heterochromatin formation at telomeres in C. cerevisiae (Huang Thou et al. 2005; Huang, Thou et al. 2007). The linker histone H1 is essential for mouse differentiation (Meshorer, Yellajoshula et al. 2006) and its chaperone, NASP, is essential for embryonic development and human cell proliferation (Richardson, Alekseev et al. 2006). Assembly of centromeric variant CenH3 into heterochromatin domains requires a specific chaperone, RbAp48, that acts independently of chaperones for non centromeric H3 variant CenH3 (Furuyama, Dalal et al. 2006; Bloom 2007; Ekwall 2007). Centromeric heterochromatin is also maintained by the chromatin remodeling complex, and facilitates chromatin transcription (FACT), independently of RNAi (Laribee, Fuchs et al. 2007)

Accordingly, the presence and/or the activity level of proteins that modify histone activity may serve as an indicator of the differentiation state of a call. In certain aspects, a method for determining a differentiation state of a test cell comprises quantifying levels of chaperone proteins NAP1 and ASF1 in said test cell; and comparing said levels of said chaperone proteins with levels of chaperone proteins derived from one or more reference cells representative of predetermined differentiation states; whereby the differentiation state of said test cells is determined.

Immunostaining of Nuclear Proteins

Immunostaining of nuclear proteins is a technique that may be used to evaluate heterogeneous hESC colonies for chromatin reorganization during differentiation. Not all immunostaining methods are optimized for detection of chromatin and other nuclear proteins. In some embodiments, a method for detecting chromatin proteins or chromatin binding proteins in a cell comprises prefixing the cell with paraformaldehyde; immunostaining said chromatin proteins or chromatin binding proteins, postfixing the cell, e.g., under alkaline conditions or in methanol; and detecting said chromatin proteins or chromatin binding proteins. In some embodiments, the pH and the temperature of the immunostaining solutions may be varied. Exemplary antibodies for immunostaining nuclear proteins may be selected from H3K9me3, H3K9ach, HDAC1, HDAC2, Lamin, Crest, Oct-4, Nestin, HP1α, HP1β, NAP1, ASF1, lamin or emerin.

Detection of Protein-DNA Binding

In some embodiments, the binding of proteins to chromatin may be detected using fluorescence resonance energy transfer (FRET) between proteins labeled with GFP and DNA labeled with fluorescent dyes. Exemplary DNA labels include syto orange 83 and Sytox orange. In fixed, lysed cells FRET has been demonstrated with Sytox orange, a membrane impermeable dye (Cremazy, Manders et al. 2005). The dynamics of chromatin-protein interactions may be measured in living cells using the membrane permeable dye Syto 83. Patterns of FRET intensity may be distinguished within the nucleus, depending on the physical distance between protein and DNA, rather than the concentration of a fluorescent reporter.

Image Analysis Methods

As illustrated above, stem cell pluripotency correlates with smoothness and homogeneity of the stem cell colony and of the cell nuclei. Crisp borders lie between stem cell colonies and surrounding feeder cells. In stem cells, the nucleus-to-cytoplasm ratio typically approaches a value of 1, and tight cell-cell junctions create a cuboidal cell shape and a smooth apical colony surface, giving hESC colonies a fine granulated appearance. Pluripotent colonies that begin to differentiate tend to do so at the periphery. Differentiated cells initially have an epitheloid morphology, with larger nuclei (relative to pluripotent ESC), a much larger cytoplasm (such that the nuclear to cytoplasmic ratio is less than 1), and apical surfaces that are crowned over the nucleus and thin at the margins between cells. These cellular characteristics produce definitive colony textures in pluripotent and early differentiated hESC. Further differentiation ultimately produces lineage-specific morphologies.

These changes in cell morphology can be observed and characterized manually. However, although manual observation and characterization of stem cell colonies is adaptable and versatile, reproducibility and objectivity are limited. Accordingly, in aspects of the present disclosure, statistical analysis methods enable automated classification of stem cell colonies. Automation of the classification process confers several advantages when compared to human manual procedures or chemical tests. Stem cell colony classification, even by a highly trained microscopist, is subjected to both inter and intra observer variability. Chemical testing is a more consistent classification method, but typically damages colonies to the point of making them unusable after characterization. Moreover, large-scale and rapid classification efforts may not be possible due to human limitations, whereas using images and computers can be easier. Furthermore, because stem cells have their own biological dynamics, automation permits the monitoring of these dynamics at a higher resolution, both temporally and spatially.

Thus, in certain aspects, automated classification of stem cells includes quantification of morphological changes in stem cell colonies and stem cell nuclei during differentiation. Stem cells may be evaluated at different scales and with different optical techniques. For example, brightfield techniques, such as phase contrast, may be used at low magnification to evaluate large numbers of stem cell colonies for growth and self-renewal. Alternately, fluorescent techniques may be used to evaluate stem cell colonies at the single cell level. Using both approaches, data on differentiation and self-renewal of stem cells may be collected. Collectively, these measurements provide information about the basic biology of hESC kinetics and may be used to optimize cell culture conditions for self-renewal or differentiation or to evaluate the efficacy and toxicity of drug candidates.

Thus, in certain aspects, non-destructive imaging methodologies may be used as a quality assurance tool for large-scale stem cell production or for screening drug efficacy or toxicity. As described herein, texture analysis is useful for quantifying the kinetics of single cell nuclei, chromatin dynamics and condensation as pluripotent cells differentiate into neuronal lineages. More generally, this type of texture and border analysis, which is based on both static and dynamic image processing, may find other uses in cell biology research or technology. Texture analysis provides an amorphous measurement of granularity, as well as a measurement of the regularity of ensembles of components, both of which are well suited to biological research or technology or commercial settings.

Samples and Cellular Structures

The methods of the present invention are not limited to any particular type of cellular structures. Specific biological samples evaluated include, without limitation, the developmental potential of human and animal eggs, embryos and stem cells. In some embodiments, the cellular structure used in the methods described herein may be eukaryotic or prokaryotic, from a metazoan or from a single-celled organism such as yeast. In some preferred embodiments the cellular structure is a mammalian cell, such as a cell from a rodent, a primate or a human. The cell may be a wild-type cell or a cell that has been genetically modified by recombinant means or by exposure to mutagens. The cell may be a transformed cell or an immortalized cell. In some embodiments, the cell is from an organism afflicted by a disease. In some embodiments, the cell comprises a genetic mutation that results in disease, such as in a hyperplastic condition.

In another embodiment, the cellular structure is a stem cell, an egg cell, an embryo, colon, breast, lung, prostate, pancreas, kidney, endometrium, cervix, ovary, or thyroid cell. In another embodiment, the cell is a tumor cell, such as a cell derived from a fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothellioma, Ewing's tumor, leiomyosarcoma, rhabdomyosarcoma, colon carcinoma, pancreatic cancer, uterine cancer, breast cancer including ductal carcinoma and lobular carcinoma, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, inedullary carcinoma, bronchogenic carcinoma, renal cell carcinoma, hepatoma, bile duct carcinoma, chorlocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharynigioma, ependymoma, pinealoma, hemangioblastoma, acoustic neuroma, oligodendroglioma, meningioma, melanoma, neul-oblastoma, leukemias, lymphomas, and multiple myelomas.

In some embodiments, the cellular structure may be mature, fully mature, or differentiated. In another embodiment, the cells may be stem cells and/or progenitor cells that may be pluripotent or multipotent (i.e., giving rise to a plurality or multiplicity of mature cell types), or unipotent (i.e., committed to a particular lineage path yielding a single type of mature cell). Where either term is used separately herein, it is to be understood that unless specifically stated otherwise, both stem cells and progenitor cells may potentially be used or derived and that samples or solutions of "stem cells" may potentially also include progenitor cells. "Fully mature cells" as used herein refers to differentiated cells that represent a final or near final stage of development for a given cell lineage. "Differentiated cells" as used herein refers to cells of a particular lineage that are more mature than stem cells and progenitor cells but are not necessarily at their final developmental stage. The term "mature cells" as used herein encompasses fully mature (i.e. fully developed and terminally differentiated) cells and can also include, in some embodiments, differentiated cells that are not fully mature. Mature cells are not typically capable of self-replication.

The stem cell containing suspensions useful in the context of the present invention may be derived from a variety of sources including, but not limited to, bone marrow, mobilized or unmobilized peripheral blood, umbilical cord blood, fetal liver tissue, other organ tissue, skin, nerve tissue, solid tumors, etc. A variety of stem/progenitor cell types may be evaluated according to the methods of the invention, including but not limited to, lympho-hematopoietic stem cells, multipotent or pluripotent stem cells, mesenchymal stem cells, epithelial stem cells, gut stem cells, skin stem cells, neural stem cells, liver progenitor cells, and endocrine progenitor cells.

Samples are routinely grown in transparent plastic or glass vessels that can be viewed in a microscope to evaluate the appearance, distribution and morphology of cells. When evaluating the cellular phenotype of a sample of cells in a high-throughput manner, arrays of cells may be prepared for parallel handling of cells. Standard 96-well microtiter plates, for example those that are 86 mm by 129 mm, with 6 mm diameter wells on a 9 mm pitch, may be used for compatibility with current automated loading and robotic handling systems. Microtiter plates in other well configurations may also be used. The microplate is typically 20 mm by 30 mm, with cell locations that are 100-200 microns in dimension on a pitch of about 500 microns. Methods for making microplates are described in U.S. Pat. No. 6,103,479, incorporated by reference herein in its entirety. Microplates may consist of coplanar layers of materials to which cells adhere, patterned with materials to which cells will not adhere, or etched 3-dimensional surfaces of similarly pattered materials. For the purpose of the following discussion, the terms 'well' and 'microwell' refer to a location in an array of any construction to which cells adhere and within which the cells are imaged. Microplates may also include fluid delivery channels in the spaces between the wells. The smaller format of a microplate increases the overall efficiency of the system by minimizing the quantities of the reagents, storage and handling during preparation and the overall movement required for the scanning operation. In addition, the whole area of the microplate can be imaged more efficiently.

Image Input

In certain embodiments of methods of the present invention, images required for performing or carrying out the methods may be obtained using any suitable imaging device. For example, in certain embodiments, images may be obtained using an image input device which optionally includes an image capture device. In certain such embodiments, an image capture device may include a microscope or other high magnification optical system having an objective lens, an XY stage adapted for holding a plate containing a cell sample or an array of samples, a means for moving the plate to align the samples with the microscope objective and for moving the sample in the direction to effect focusing, a digital camera, a detection system with a light source for directing light to cells in the sample locations, a means for directing light emitted from the cells to the digital camera, and a computer means for receiving and processing digital data from the digital camera. Any optical method may be used, such as bright field, dark field, phase contrast and interference contrast. For illustrative purposes, phase contrast images of human embryonic stem cells and Hoffman Modulation contrast images of non-human primate eggs have been selected. The computer means may include: i) a digital flame grabber for receiving the images from the camera, ii) a display for user interaction and display of assay results, iii) digital storage media for data storage and archiving, and iv) means for control, acquisition, processing and display of results. When the sample contains live cells, the imaging system may further include a chamber and control system to maintain the temperature, pH, $CO_2$ and/or oxygen concentration, and humidity surrounding the samples.

The image of the sample may be a still photo or a video in any format (e.g., bitmap, Graphics Interchange Format, JPEG file interchange format, TIFF, or mpeg). In other implementations, the image of the sample may be captured by an analog camera and converted into an electronic form by computer means.

In other implementations, the image capture device may include imaging systems, confocal or light microscopes, or cell screening systems known in the art, such as those described in U.S. Pat. Nos. 6,727,071, 6,620,591, 5,526,258, 5,989,835, 4,905,296, 6,658,143 and 6,555,802 and U.S. Patent Publication Nos. 2003/0100024, 2003/0149535, 2003/0185450, 2004/0072254, 2004/0018485, 2003/0077569, 2002/0025514, 2004/0063162 and International PCT application No. WO94/11841, the entire teachings of which are incorporated by reference herein. For example, U.S. Pat. No. 5,989,835 describes the identification of cells on microtiter plates based on the staining with a fluorescent dye while U.S. Pat. No. 4,905,296 describes a system for shape recognition.

For image acquisition, the camera's exposure time may be separately adjusted to ensure a high-quality image. Software procedures may be called, at the user's option, to correct for registration shifts between wavelengths by accounting for linear (X and Y) shifts between wavelengths before making any further measurements. Each image may contain a single cellular structure or multiple cellular structures.

In other implementations, the image input may alternatively include a data source that stores images, such as an internal or external drive, a network connection to an external drive, a flash memory card or any other device capable of storing images.

For data visualization, a "quality movie" concept may be used. A quality movie is a graphical output of a series of images that shows the emergence of characteristic changes in a cellular structure. The quality movie may include a dynamic representation of the locally normalized confidence reclassified image. The frames may be created by imposing various thresholds on the locally normalized confidence reclassified image. As the movie is played, the changes in the cellular structure are visualized.

In some embodiments, time lapse confocal microscopy may be used to image live cells. Colonies of cells may be maintained for up to 2 days of continuous observations with up to 20,000 images per confocal sequence. Movement of cells or cellular structures may be determined by recording position changes in naturally occurring density variations. Bulk nuclear movement may require fiducial marks to distinguish waves vs. flow, but streaming of nucleoplasm may be clearly distinguished by time lapse alone. Apparent chromatin dynamics may be due to nuclear rotation and to cytoplasmic streaming or forces applied primarily to the nuclear lamina. Rotational movement of the nucleus may be detected by scanning image movies as a function of Z. Movement of the nucleus due to cytoplasmic movement may be detected by live cell staining with wheat germ agglutinin (FIG. 1) to stain the plasma membrane. Examples of unperturbed cells may be screened on the basis of visual examination of nuclear rotation and cytoplasmic deformation. Selected nuclei may be evaluated for movement by pseudocolor time maps. In some embodiments, color hue and intensity may provide an estimate of pattern auto-correlation that can be quantified. In addition, cells may be classified to determine the frequency of unperturbed movement due to cytoplasmic and nuclear movement. In some embodiments, a method for comparing coincidence frequency with random occurrence may be used, e.g., using 3D translocation of one image to create patterns with controlled movement.

In certain aspects of the present disclosure, images may be acquired optically by a fluorescent microscope and by a light detector to detect fluorescence. In some embodiments, the images are acquired optically by a brightfield microscope and by a light detector to detect absorbing dyes. In some embodiments, absorbing dyes are used to detect nuclear proteins. Exemplary absorbing dyes include hematoxylin and eosin.

Image Analysis Module

In certain embodiments of methods of the present invention, images required for performing or carrying out the methods may be analyzed using any suitable analysis module. The image analysis module receives images from the image input and extracts these images into features which can be used for statistical cellular structure classification. More particularly, image features may be extracted by a texture analysis module, a border analysis module, or both. The image analysis module may be implemented as computer readable program codes (e.g., software). In other implementations, the image analysis module may be implemented into a digital signal processor (DSP), application-specific processor (ASP), or other integrated circuits.

An image is analyzed according to image features contained within an image. In the case of stem cell colony features, cellular structure textures can be characterized, for example, as homogenous or heterogeneous, smooth, fine, or tight or loose. Cellular structure borders may be sharp or undefined. Exemplary image features may be single or multicellular in nature and include cell texture, colony texture, cellular border, colony border, cell membrane, neural rosettes, blood islands, cell colonies or aggregates, or any discernible two- or three-dimensional cellular structure or feature. In some implementations, image features include components of cell cytoplasm or cellular organelles, or portions thereof, such as a nucleus, cell membrane, cell wall, mitochondria, golgi, chromatin, DNA, cytoskeleton, or endoplasmic reticulum. Image features may include biomolecular markers (e.g., Oct-4 or Nestin distribution) or the expression pattern of biomarkers or recombinant proteins that emit a signal (e.g., Green Fluorescent Protein). Features can be modeled statistically for use with a parametric classifier, or can be used as is with non-parametric classifiers such as neural networks, and support vector machines (SVM). Both parametric and non-parametric methods may be combined. Border crispness, another feature that testifies to the quality of a stem cell colony, can be estimated using simultaneous segmentation and smoothing techniques.

A third level of analysis is done to specific interfaces between heterogeneous domains in the sample. Domains may be components of cell cytoplasm, or may be multi-cellular domains of cell aggregates, colonies or embryos. Biological domains within images are defined by delineating borders. Borders themselves have qualities such as linear, curvilinear or stochastic in the circumferential direction as is well known. Borders can also be described as crisp or diffuse, with specific granularity or texture (applicable to border domains, or annuli around each biological domain). The border qualities are of special biological interest since the interface between different domains is a rich source of high quality information about state changes in biological differentiation and development.

Borders can be defined for the purpose of segmentation in the following way: an ensemble of pixels, in which the neighborhood of every pixel contains both pixels that are inside the region and pixels that are outside the region. Specific qualities of border for the purpose of evaluating domain transitions can be measured in the following way: border smoothness, border crispness, and border regions pixel intensity statistics.

The quantitative characterization of the concept of stem cell border crispness intends to characterize the percentage of pixels belonging to the border region that contain both texture pixels and non-texture pixels as neighbors on both sides. The variational segmentation/curve evolution approach, by yielding the strength and spatial density of the edge field, can also yield an additional measure of crispness. Other quantitative characteristics of borders include smoothness. These rely on variational curve evolution segmentation techniques, and a subsequent analysis, based for instance, on Fourier descriptors. Multiresolution extensions using wavelets are also possible.

Another feature of the invention is the heuristic, hierarchical architecture to determining texture classifiers. First, images are analyzed on the pixel level and at the pixel neighborhood (Tier 1). This data is presented graphically in a way that biologist can evaluate biological qualities of the sample being imaged. Second, domains within the sample are defined by separate, non-textural methods to aid in producing textural evaluations in heterogeneous samples (Tier 2). At Tier 2, it is also possible to incorporate additional useful information such as: border quality, prior information, and even subjective evaluations. Texture, border, and other measurements specific to domains in the image provide discriminating information about different spatially distinct biological domains found in heterogeneous samples.

In one aspect, the hierarchical architecture integrates known tools and information to yield system demonstrating superior classification and characterization performance. This method includes the fusion of information from images of different resolution and modalities together with the incorporation of prior information (past history of the same and other colonies, etc.) and the generation, selection and combining of various features.

The texture analysis module that is included with in the image analysis module may extract image texture on a local image window extracted from a full image, rather than being defined on the entire image or on each individual pixel. As used herein, texture is a neighborhood operator. Other common neighborhood operations include convolution, dilation and median filtering.

In certain aspects, the image analysis module may optimize the local image windows for a given image. The boundary of a local image window may be adjusted to selectively encompass regions of the image that comprise texture data with a desired characteristic. In some embodiments, the window is altered such that the texture within a local region of the image may be substantially homogeneous. For example, the size of the image window may be decreased or increased, and/or the shape of the window altered (e.g., to any regular or irregular shape), in order to extract local image texture within such a region. Additionally, the local image window is preferably selected such that the area within the window includes sufficient textural information that the texture can accurately and reliably be assessed. Thus, in certain embodiments, the image analysis module may perform a window optimization routine (i.e., hierarchical image windowing) to arrive at windows of appropriate size(s) and shape(s) such that each window (or at least each of a majority of the windows) contains sufficient image information for analysis, yet is sufficiently homogeneous in texture to permit accurate assessment of the texture within the defined region.

Analysis with neighborhood operators may be performed in a number of ways such as for example a distinct block and sliding neighborhood method. In the distinct block method, the full image is divided into non-overlapping windows. The neighborhood operator is then applied to each window and the resulting output assigned to all pixels in the analyzed window. In the sliding neighborhood method a window is defined around an individual pixel and the neighborhood operator's applied to that window and the resulting output is assigned to the individual pixel itself. This method allows the one to assign neighborhood features to specific pixels.

To further illustrate, the sliding neighborhood method can be used to pinpoint regions of good and bad quality in stem cell colonies. By using the sliding neighborhood method, each pixel in stem cell colony images can be classified as good or bad, thus creating higher resolution segmentations of the images. As would be apparent to the skilled artisan, the use of the non-over-lapping distinct block method would assign, all pixels within a given window block the same textural representation.

Once a window is extracted around a specific pixel, that window can be analyzed to calculate its textural feature representation. Common textural feature representations are highlighted below by grouping them into four major paradigms: statistical, structural, model-based and signal processing methods. More in-depth surveys of the methods and further references can be found in the literature.

Onion-layer Analysis of Concentrically Ordered Textures

In certain aspects, analysis may be performed on non-homogeneous textures that vary along a radial axis. Such patterns can be seen, for example, in cross-sections of bones and teeth, cross-sections of tree trunks and branches, cell colonies, and other living and non-living samples. Such patterns may arise, for example, from layered biological growth around an axis (e.g., growth rings in a bone or tree trunk), diffusion or reaction from an exterior environment surrounding a closed system (e.g., corrosion of a buried metal pipe), or accretion of material around a core (e.g., the growth of a pearl in an oyster, or growth of a crystal from a supersaturated solution). Images of such patterned objects may benefit from this analytical approach to image analysis.

Such analysis methods may comprise several steps. First, the analysis steps may comprise determining the shape of an image window that circumscribes a region of interest; simultaneously smoothing and segmenting the image window using all energy functional; applying a threshold edge function to obtain sharp transitions; and using region filling to obtain a dominant region R of interest, which is enclosed by the threshold edge functions.

The energy functional $$\min_{u,v} = \int_{\Omega} \left\{ \alpha(1-v)^2 \|u_x\|_2^2 + \beta(g-u)^2 + \frac{1}{21}\left(\rho\|v_x\|_2^2 + \frac{v^2}{\rho}\right) \right\} dx \quad (1)$$

may be used to smooth and segment the image. Equations useful to solve for smoothed data u and an edge function v may comprise:

$$v_{xx} - \frac{v}{\rho^2} + 2\alpha(1-v)\|u_x\|_2^2 = 0$$

$$[(1-v)^2\|u_x\|]_x + \frac{\beta}{\alpha}(g-u) = 0$$

$$\frac{\partial v}{\partial \eta} = \frac{\partial u}{\partial \eta} = 0 \text{ on } \partial\Omega, \text{ boundary of } \Omega$$

where η is the direction normal to ∂Ω.

Thresholding of the edge function v and "region filling" of the resulting thresholded image yields boundary B of the cell in the image.

Subsequently, the region R may be shrunken down to obtain a new shrunken region R'. The difference between R and R' is a so-called onion-layer region, in recognition of the topologically ring-shaped region and the potential to have iterative nested topologically concentric regions, similar to the layers visible in the cross-section of an onion or in the rings of a tree trunk, although an onion-layer region need not be round, elliptical, or otherwise of any regular geometric shape. Typically, the contours of the onion-layer region will be similar to the boundary of the object being assessed (e.g., the boundary of the cell colony, the boundary of the cell nucleus, the boundary of the tree trunk, etc.). Thus, for example, for an object with a generally rectangular outer boundary, onion-layer regions for that object are likely to have a substantially rectangular shape. The contours of the onion-layer region may be optimized as discussed above (e.g., using hierarchical image windowing), e.g., such that the texture within the region is substantially homogeneous, yet contains sufficient textural information to accurately and reliably characterize the texture. Such optimization may include altering the contours and/or the thickness of the region.

The image contained within the boundary B of region R may be analyzed, e.g., to identify the texture of the region as disclosed herein. Here, the spatial variation of high spatial frequency content (texture) inside boundary B may assessed, e.g., using a method based on the probabilistic nature of textural attributes inside the cell. Boundary attributes may be characterized using 1D signal conversion or wavelets may be used to assess frequency content. Such a method may be suitable for cases in which textural probabilistic models are spatially nonstationary, and yet may be able to accommodate smaller number of pixels inside the cell. Notably, the analysis of image content in region R may focus on spatial variation in the textural content. The textural content may be obtained from wavelet decomposition of image content in R or based on an edge map. Analysis may also be based on an edge function map in region R. A given edge function v may be near the boundary. In some embodiments, an erosion function may be used to determine radial distribution edge function strength.

In certain aspects, region and boundary attributes can separate pluripotent cells and differentiated cells, while edge function distribution may enhance the capacity to differentiate between these classes of cells.

Unified Variational Smoothing, Segmentation, and Learning

For extracting information from image data, certain aspects of the present disclosure consist of denoising an image, and/or segmenting the image into distinct regions. Denoising is accomplished by smoothing, while segmentation is accomplished by edge detection. Smoothing alone may smoothe edges and blur them, which may render segmentation difficult. Segmentation in the absence of denoising or smoothing, meanwhile, may lead to many pixels being declared as region edges when they are not. Traditionally, these two tasks, denoising or smoothing and segmentation, have been reconciled by implementing a sequential back-and-forth or trial and error approach, but this approach may not be generalizable to all samples. Thus, a simultaneous denoising and segmentation method is appropriate, and certain aspects of the present disclosure describe a formulation whose objective function balances the competing desires to rid the image of the noise while at the same time preserving the edges.

The following segmentation functional, when minimized, embraces these objectives simultaneously (Desai, Kennedy, Mangoubi, et al. 2002):

$$E_f(u,v) = \int_{\Omega} \left( \begin{array}{c} \alpha(1-v)^2\|f_x(u)\|_2^2 + \beta h(u,g) + \\ \frac{\rho_v}{2}\|v_x\|_2^2 + \frac{1}{2\rho_v}v^2 \end{array} \right) dx \quad (1)$$

This energy functional is minimized with respect to u and v, where u(x) is a vector or scalar field, and v(x) is a vector or scalar edge strength fields, and both are defined on Ω in $R^n$. The scalar or vector g is the observed input data, f(u) is generally a function of u with respect to which the segmentation is desired, and h(u, g) is the measurement model. The notation $\|z\|_2$ for an arbitrary vector z represents the Euclidean norm. The terms $f_x(u)$ and $v_x$ represent, respectively, the gradient of f and v with respect to the spatial variable x. The constants α, β and $\rho_v$ represent scalar weights, which balance the various effects. v takes a value between 0 and 1. As such, it can be interpreted as the probability that the particular pixel is an edge pixel. Note that if v is 1, the first term in the integrand vanishes, meaning that no smoothing needs to occur across this pixel since it is an edge pixel; this is the key to segmentation. The third term smoothes the edge function itself, while the fourth term penalizes edges so as to avoid data overfitting.

The functions f and h may be selected so that continuity can be with respect to attributes such as scale, shape, or orientation, or combinations thereof. For instance, for h, we can have:

$$h(u,g) = \|u-g\|_1 \quad (2)$$

where $\|z\|_1$ represents the 1-Norm of z (Desai, Kennedy, Mangoubi, et al. 2002). The 1-Norm is particularly appropriate when the measurement is corrupted by fatter tail noise as found in images, such as Laplacian noise. This norm is also appropriate when the data contains abrupt changes, such as edges. Finally, when f is the identity function then we are simply smoothing the gradient of u. If u is a vector function, then f(u) can be a norm of this vector.

The minimization of this energy functional provides a smoothed, segmented field together with an associated smoothed edge field. Depending on the objective, the observation model h(u, g) and the smoothing criterion function f(u) can be selected to focus on various effects. This technique has been applied to other imaging situations including functional magnetic resonance images (MRI) (Desai, Mangoubi, et al. 2002), structural MRI, and diffusion-weighted imagery (DWI) (Desai, Kennedy, Mangoubi et al. 2002). The ability to select f and h to satisfy various continuity and data fidelity requirements is an important advantage. For instance it permits viewing and processing of the same DWI data from different perspectives. The energy functional above has also been generalized to include cases where the process and measurement noise properties need to be learned, thus making it invariant to spatial variations. It has proven to be effective in low signal-to-noise situations, as is the case for instance with fMRI (Desai, Mangoubi, et al. 2002 and 2005).

In some embodiments, the new unified energy functional E to be minimized with respect to its arguments is $$E(u, v, v_m, v_u, v_c, \theta_u, \theta_m) = \tag{3}$$
$$\int \begin{Bmatrix} \beta M(u, g, \theta_m, v)(\text{data fidelity}) + \\ \alpha_m L_m(\theta_m, v_m)(\text{data fid. spatial corr.}) + \\ \alpha_u C_u(u, \theta_u, v_u)(\text{process } u \text{ spatial corr.}) + \\ \alpha_c L_c(\theta_u, v_c)(\text{process param. corr.}) \\ \pi(u, w, v_m, v_u, v_c, \theta_u, \theta_m)(\text{unknowns' priors}) \end{Bmatrix} dx$$

where M, p, are parametric functions, Lm, Cu, and Lc are spatial operators. The energy functional E to be minimized given data g has now 7 scalar or vector arguments. The first two, u, and v, are well known from fMRI (Desai, Mangoubi, 2002 & 2006, enclosed) and DWI (Desai, Kennedy, Mangoubi, et al, 2006); they represent the smoothed image and the associated edge fields, respectively. The additional variables represent the measurement and image model characteristics. Specifically, $\theta_m$ and $v_m$, represent the measurement model parameters and its edge field respectively, while, $\theta_u$, and $v_u$ represent the image model parameters and its edge field, respectively. The data fidelity and correlation model parameter continuity expressions ($1^{st}$ and $3^{rd}$ term) can now depend on unknown parameters to be learned, $\theta_m$ and $\theta_u$. For these, we impose the two learning models, Lm and Lc ($2^{nd}$ and $4^{th}$ term). Finally, the last term incorporates prior information. Priors on edge can also include information on shape future and orientation. The energy functional above may enable learning in the context of (1) the measurement function embodied in the data fidelity term M(u,g,w,$\theta_m$) for both scalar and vector measurements g, (2) the spatial correlation operator of the process u, embodied in $C_u$(u,$\theta_u$, $v_u$) applicable to scalar and vector input data, and (3), the spatial correlation operators $L_m$, $L_c$, for the parameters ,$\theta_m$ and ,$\theta_u$, respectively. In previous segmentations effort, the stationarity of the texture field over the area of interest has been assumed. The new fomulation may handle adaptive learning of the spatially varying textures as well as segmentation of regions of homogeneity of texture, where the variations may be due to noise or the texture itself. As such, it permits the adaptation of both the neighborhood size and shape throughout texture at each pixel throughout the image.

In some embodiments, some of the regions in the image to be segmented may be small. Notably, in differentiated colonies, small isolated regions may exist near the edges of a stem cell colony, where the borders loose their sharpness. Accordingly, pixels may be treated on an individual basis near the colony border. Pixels in non-homogeneous regions may be compared to non-neighboring pixels in larger regions.

In certain aspects, a computational burden of performing the calculations may be relieved through work that speeds up the level set method for solving curve evolution problems (Osher and Paragios 2003).

Statistical Paradigm

In certain embodiments of the disclosed methods, the window extracted around a specific pixel in an image may be analyzed in order to calculate its textural feature representation. In some embodiments, a statistical paradigm may be used for the analysis. The statistical paradigm describes texture in terms of the statistical distribution of the grayscale pixel values within an image. Haralick's co-occurrence matrix approach is the most common of these methods, and we outline his method briefly here to provide insight into this class of feature representations.

Let $s_1=(x_1, y_1)$ and $s_2=(x_2, y_2)$ be two pixels in the image, and let $s_1$ and $s_2$ be separated by a displacement of d=($d_x$, $d_y$) pixels so that $$s_2=(x_2,y_2)=(x_1+d_x,y_1+d_y)=s_1+d \tag{2.5}$$

For a fixed displacement d, statistical methods assume that the probability that $s_1$ and $s_2$ take on grayscale values of i and j, respectively, is governed by the joint probability mass function (PMF) P(i, j; d). We may equivalently reference the separation displacement between $s_1$ and $s_2$ by an absolute distance d and angle θ relative to the horizontal axis. The PMF of the spatial grayscale values becomes in this case P(i, j; d, θ).

Since the true grayscale distribution P(i, j; d, θ) is not known, it is estimated from empirical data. Haralick accomplishes this with the so-called co-occurrence matrices. For an image 1 of size $N_x \times N_y$ with the set of distinct grayscale values G={1, 2, . . . , $N_g$}, Haralick's method creates symmetric co-occurrence matrices P(i, j; d, θ) with i, j ∈ G specifying grayscale values, θ∈{0°, 45°, 90°, 135°} defining an angular direction and d representing the user-defined pixel distance. The (i, j) entry of P(i, j; d, θ) holds the total number of pixel pairs in the image, normalized by the total numiiber of pixels in the image, with grayscale values i and j such that the two pixels in the pairs lie d pixels apart in the angular direction θ. Thus, for any specified d value, the method produces four co-occurrence matrices, one for each of the four θ values specified above. The value of d specifies the size of the neighborhood over which it is feasible to estimate the PMF of the grayscale distribution. The resulting co-occurrence matrices serve as an estimate of the true grayscale distribution of the image.

From these co-occurrence matrices, Haralick defines 14 textural features. Table 2.1 shows the four most common features. In the table, $\sigma_x$, $\mu_x$, $\sigma_y$, $\mu_y$ are the standard deviations and means of the marginal distributions P(i; d, θ)=$\Sigma_j$(i, j; d, θ) and P(j; d, θ)=$\Sigma_i$P(i, j; d, θ), respectively.

TABLE 2.1

Haralick's Statistical Texture Features

| Textural Feature Name | Formula |
| --- | --- |
| Angular Second Moment | $\Sigma_i \Sigma_j (\hat{P}(i, j; d, \theta))^2$ |
| Contrast | $\sum_{n=0}^{N_g-1} n^2 \left\{ \sum_i \sum_{j \|i-j\|=n} \hat{P}(i, j; d, \theta) \right\}$ |

TABLE 2.1-continued

Haralick's Statistical Texture Features

| Textural Feature Name | Formula |
|---|---|
| Correlation | $\dfrac{\sum_i \sum_j (ij)\hat{P}(i, j; d, \theta) - \mu_x \mu_y}{\sigma_x \sigma_y}$ |
| Entropy | $-\sum_i \sum_j \hat{P}(i, j; d, \theta) \log(\hat{P}(i, j; d, \theta))$ |

In an attempt to speed up the implementation of Haralick's method by replacing the double summations in the co-occurrence features of Table 2.1 with single summations, Unser proposes using sum and difference histograms to estimate the joint grayscale distribution. These sum and difference histograms allow for the exact computation of nine of Haralick's 14 textural features and the estimation of the remaining five features.

Another statistical method is Galloway's gray level run length approach. The basic idea of this approach is that texture can be characterized by first identifying strings of adjacent pixels having the same grayscale value. After calculating the length of these strings for various grayscale values and spatial orientations, five textural features can be calculated.

Structural Paradigm

In certain embodiments of the disclosed methods, the window extracted around a specific pixel in an image may be analyzed in order to calculate its textural feature representation. In some embodiments, a structural paradigm may be used for the analysis. The structural paradigm measures the spatial distribution of blocks of pixels called textural primitives. The underlying assumption of structural methods is that the image texture is indeed composed of these distinct textural primitives, rather than simply exhibiting a continuous distribution of grayscale values. The structural approach consists of two steps:

1. Identify and extract the textural primitives; and
2. Infer the placement rule that governs the distribution of the primitives across the image In general, specific methods of the structural paradigm do not receive as much attention as those of other paradigms. The main reason for this is that many textures do not actually satisfy the assumption of the presence of repeating primitives and those that do are often of little real-world interest. Texture classification and segmentation using multiresolution simultaneous autoregressive models. For example, a texture that is composed of regularly-placed textural primitives and a structural feature representation would be useful for such a texture. In contrast, a more irregular texture is not well-suited for the structural paradigm since it is not composed of clear primitives.

Details on various structural methods can be found in the literature. In fact, Haralick even describes methods that combine the statistical and structural paradigms. One benefit of the structural paradigm is that if accurate primitives can be identified, texture synthesis reduces to the relatively simple task of replacing the primitives according to the inferred placement rule.

Model-Based Paradigm

In some embodiments of the disclosed methods, the space around a specific pixel in an image may be analyzed to calculate its textural feature representation. In some embodiments, a model-based paradigm may be used. The model-based paradigm assumes an image texture model, fits that model to the image being analyzed, and uses the model parameters as the textural features of the image. One of the most prevalent model-based approaches involves extracting the multi-resolution autoregressive (AR) features of Mao and Jain. In this method, multiple neighborhoods of various sizes are defined about a pixel, the AR model is fit to those neighborhoods and the model parameters are estimated. The feature representation for the pixel consists simply of all the resulting model parameters.

Another more complex model-based method involves modelling an image as a Markov random field (MRF). This approach basically involves defining two Markov processes. The label process $\{L_s \in N\}$ defines the pixel class label within a neighborhood N around the pixels. The intensity process $\{Y_s, s \in N\}$ governs the distribution of grayscale values about s.

Signal Processing Paradigm

In certain embodiments of the disclosed methods, the window extracted around a specific pixel in an image may be analyzed in order to calculate its textural feature representation. In some embodiments, a signal-processing paradigm may be used for the analysis. Signal processing, or filtering, methods depart from the previous spatially-oriented paradigms by attempting to incorporate features from the frequency domain of the textural image. These methods generally follow the same two basic steps. First, a filter is applied to the original image to produce a frequency-domain representation of the image. Then the energies across the frequency subbands are calculated and used to represent the texture of the image.

The classic approach to extracting frequency information from a signal is via the Fourier transform. The Discrete Fourier Transform (DFT) of an $N_x \times N_y$ image I is defined as $$F_I(p, q) = \sum_{x=1}^{N_x} \sum_{y=1}^{N_y} I(x, y) e^{-j(2\pi/N_x)px} e^{-j(2\pi/N_y)qy} \quad (2.6)$$

for $p=1, 2, \ldots, N_x$ and $q=1, 2, \ldots, N_y$, where j is the imaginary number square root of −1. The Fourier coefficients $F_1(p, q)$, or some energy measures extracted from them can then be used as textural features.

The main drawback of the Fourier approach is that the resulting frequency information reflects global characteristics of the image. We note this by observing that the summations in Equation 2.6 are taken over the entire image, thus blurring any spatial variation of the texture. So while we gain frequency information by applying the DFT, we lose spatial information. It would be useful if we could obtain both frequency and spatial information.

One means of retaining spatial information in the frequency domain is to use the window Fourier transform (WFT), also called the short-time Fourier transform. This method isolates a portion of the original signal and performs a Fourier transform on that spatially isolated window. By repeating this process over various windows across the entire signal, the method extracts frequency information from the Fourier analysis and maintains spatial information due to the windowing. The width of the window determines the spatial resolution of the analysis. For a one-dimensional signal f(x), this window Fourier transform is $$F_w(u, \xi) = \int_{-\infty}^{\infty} f(x)w(x-\xi)e^{-j2\pi ux}\,dx \qquad (2.7)$$

where u and $\xi$ represent the frequency and spatial components of the transformed signal $F_w(u, \xi)$. Equation 2.7 becomes the Gabor transform when the window function w(.) is Gaussian. Applying similar ideas to a two-dimensional image yields the two-dimensional Gabor filter method. For example, the impulse response of an even-symmetric (i.e., real part only) two-dimensional Gabor filter with a 0° orientation to the horizontal axis is, $$h(x,y) = \exp\left\{-\frac{1}{2}\left[\frac{x^2}{\sigma_x^2} + \frac{y^2}{\sigma_y^2}\right]\right\}\cos(2\pi u_0 x) \qquad (2.8)$$

where $u_0$ is the frequency along the horizontal axis and $\sigma_x$, and $\sigma_y$ govern the Gaussian envelope (window) that modulates the frequency sinusoid. Different orientations can be analyzed via axis rotation of the x and y coordinates.

Gabor filters have enjoyed much attention and success in the texture classification field. For instance, good performance of the Gabor filter has been reported for the task of unsupervised texture segmentation. They extract textural features for each pixel s by first passing an image through Gabor filters with various orientations and frequencies. They then pass the filtered images through a nonlinearity function and calculate an energy measure—based on the mean absolute deviation—about a local window centered around s, yielding the textural features for the pixels.

While quite successful in practice, the Gabor filter has an important drawback. Once a specific window with a specific width is chosen, that window is applied across the entire signal. The result is a single resolution analysis of the image. A multi-resolution analysis, where the image is analyzed over windows of varying widths, would provide a more detailed and accurate analysis of the signal. This is precisely what the wavelet transform achieves. The window Fourier transform uses a fixed window width for all frequencies in the image. However, in the wavelet approach, higher frequency regions are analyzed over smaller windows in order to more accurately localize these fast-changing regions. Conversely, larger windows are needed to adequately capture information in the slowly-varying lower frequency regions.

In addition to the methods discussed above, in a preferred embodiment the method employs wavelet analysis which captures both the frequency and spatial content of image texture in a multi-resolution framework.

Texture Analysis Utilizing Wavelet Energy Features

Thus, in one aspect, the systems and methods described herein employ wavelet analysis for texture analysis. The n-level two-dimensional discrete wavelet transform (DWT) iteratively extracts low and high frequency information from an image. At the first level, it decomposes the original image I into one set of approximation coefficients, denoted $cA_1$, and three sets of detail coefficients, denoted $cD_1^{(h)}$, $cD_1^{(v)}$ and $cD_1^{(d)}$, where h, v and d refer to the horizontal, vertical and diagonal directions, respectively. At the next iteration, the first-level approximation output, $cA_1$, is further decomposed into its approximation and detail coefficients $cA_2$, $cD_2^{(h)}$, $cD_2^{(v)}$ and $cD_2^{(d)}$. The process continues to the nth level of decomposition, forming a wavelet pyramid structure.

From the schematic, we note that the approximation coefficients result from the application of two low-pass filters. Thus, the approximation coefficients hold low frequency information, and we can alternatively denote $cA_j$ as $LL_j$. Similarly, the detail coefficients result from the use of either one high-pass and one low-pass filter or two high-pass filters. Thus, they hold the high frequency information, and we can denote $cD_j^{(h)}$, $cD_j^{(v)}$ and $cD_j^{(d)}$ as $LH_j$, $HL_j$ and $HH_j$, respectively. While the standard wavelet pyramid method shown here only decomposes the approximation, or LL coefficients, it is also possible to iteratively decompose the detail coefficients as well. The resulting decomposition is called the wavelet packet structure.

Each set of coefficients of an n-level wavelet decomposition represents an image subband. When using the wavelet coefficients to characterize texture, it is common practice to disregard the $cA_n$, or $LL_n$, subband as most interesting textural information has been lost due to the iterative low-pass filtering at that subband. Thus, an n-level wavelet pyramid decomposition will yield a coefficient set for 3n=B subbands, and we denote the bth subband coefficient set as cD[b] for b=1, 2, . . . , B.

Along with the decomposition level, the type of wavelet used in the decomposition will affect the resulting wavelet coefficients, and hence the resulting classification performance. Common wavelets and wavelet families include the Haar, Daubechies, Biorthogonal, Coiflets, Symlets, Morlet, Mexican Hat and Meyer wavelets. In one implementation of the invention, the Daubechies 4 wavelet is used.

After filtering the textural image and extracting the wavelet coefficients at each subband, features are created that actually represent the texture. Laws first suggested that energy measures of the filtered image should be used as these textural features. If we have $N_b$ wavelet coefficients at subband b, for b=1, 2, . . . , B, then the energy at that subband is defined as $$E_b = \frac{1}{N_b}\sum_{i=1}^{N_b}(cD[b]_i)^2 \qquad (2.9)$$

wavelet representation. IEEE Transactions on Image Processing, 8(4):592-598, April 1999).

In stem cell applications, the highly-related variance of the wavelet coefficients is used at each subband as the energy measure, $$E_b = \frac{1}{N_b}\sum_{i=1}^{N_b}(cD[b]_i - \mu_b)^2 \qquad (2.10)$$

where $$\mu_b = \frac{1}{N_b}\sum_{i=1}^{N_b}cD[b]_i \qquad (2.11)$$

is the mean value of the coefficients at the both subband. Similarly, the mean deviation, or absolute mean, is defined as, $$MD_b = \frac{1}{N_b}\sum_{i=1}^{N_b}|cD[b]_i| \qquad (2.12)$$

Applying Equations 2.10 and 2.12 across all B subbands in the wavelet decomposition of an image yields the wavelet energy signature of that image. Thus, the vector, $$x = [E_1, E_2, \ldots, E_B, MD_1, MD_2, \ldots, MD_B] \quad (2.13)$$

is the resulting wavelet energy textural feature representation.

Wavelet energy features from the standard wavelet pyramid structure have been applied successfully by many researchers. Others have used this approach for the task of image classification and achieve a success rate of 92.14%, or performed image classification with wavelet energies with a high success rate.

Wavelet energy features from the wavelet packet structure could be useful for texture classification. Energies in the wavelet packet structure were used and the use of the packet structure as opposed to the standard pyramid structure is better suited for textures with energies concentrated in the lower frequencies. The wavelet pyramid structure performs just as well as the wavelet packet structure and does so with a smaller feature vector yielding a lower computational complexity.

Moving beyond the strict use of wavelet energies, Wouwer et al. explored a rich set of wavelet histogram features. G. Van de Wouwer, P. Scheunders, and D. Van Dyck. Statistical texture characterization from discrete wavelet representation. IEEE Transactions on Image Processing, 8(4):592-598, April 1999. Vetterli and Do then estimated a probabilistic distribution on the actual wavelet coefficients for the task of content-based image retrieval. Minh N. Do and Martin Vetterli. Wavelet-based texture retrieval using generalized Gaussian density and Kullback-Leibler distance. IEEE Transactions on Image Processing, 11(2): 146-158, February 2002.

In one preferred embodiment for textural feature representation using wavelet analysis, energy measurements were employed from the standard wavelet pyramid structure. However, other implementations may include the use of other methods of texture analysis (e.g., wavelet decomposition, dilate and erode, co-occurrence matrices, Fourier spectral analysis, Gabor methods, wavelet packet decomposition, statistical analysis of wavelet coefficients, Markov Random fields, autoregression models, spatial domain filters, Fourier and Wavelet domain filters, and texture segmentation). In some embodiments, spatio-frequency attributes are used.

Data Driven Basis Selection and Subspace Learning Algorithms

In certain aspects, data driven basis selection or subspace learning algorithms may be used to extract image features. In particular, these approaches may be used to represent textures in Gaussian and non-Gaussian environments. Data driven basis selection may lead to improved, more compact representation of the different classes of stem cell colonies or stem cell nuclei.

Current subspace learning algorithms may be limited by the Gaussian assumption. In a recent study (Desai and Mangoubi 2004), a theory for subspace learning in non-Gaussian noise has been developed. Specifically, if the set of I measurements are given by $$x_i = S\theta_i + n_i \quad i=1,\ldots,I \quad (4)$$

where $x_i$ is the Ith measurement, S is the subspace or data representation of interest, $\theta_i$ is the intensity of the signal of interest in the Ith measurement, and $n_i$ is the noise contribution. If the noise is Gaussian, then conventional subspace estimation methods, such as principal component analysis (PCA), may be used. In some embodiments, we expect the noise to be non-Gaussian. For non-Gaussian noise, we have formulated a Generalized Likelihood Ratio (GLR) approach as follows $$\max_S \max_{\theta_1 \ldots \theta_i} \prod_{i=1}^{I} p(x_i - S\theta_i) \quad i=1,\ldots,I \quad (5)$$

where $p(x_i - S\theta_i) = p(n_i)$ is the probability density function of the noise. In a recent study (Desai and Mangoubi 2004 and 2004-2), the necessary optimality conditions have been derived for the above optimization problem for a large class of noise density functions.

In some embodiments, this theory may be exploited after first estimating the noise parameters. Next, algorithms may be developed for the solution of these necessary conditions, meaning extensions of PCA to a large class of non-Gaussian noise. In some embodiments, the noise characteristics may be estimated. The subspace estimation approach, by virtue of being data-driven, may lead to more compact representation. The non-Gaussian subspace estimation approach offers several benefits. First of all, noise is non-Gaussian in most situations, and the Gaussian assumption is a convenience. As such, non-Gaussian subspace estimation will lead to more accurate compact subspace estimates. Secondly, in the Gaussian approach, the subspaces are always orthogonal, which may not correspond to reality. Non-Gaussian subspace learning methods do not necessarily yield orthogonal results, and the expectation is that they will track the actual data better.

In certain aspects, an alternate approach for subspace estimation may be found in Blind Source Separation and Independent Component Analysis (ICA) (Hyvaerinen, Karhunen, and Erki 2001) algorithms. These algorithms are non-parametric in the noise. In some embodiments, these algorithms may require large training sets, and while the algorithms may or may not take advantage of known noise properties, they may nevertheless be adapted to image analysis of stem cells. This approach combines the strength of parametric and non-parametric learning, and provides a novel contribution to non-Gaussian subspace estimation.

Accordingly, in certain aspects of the present disclosure, a method for determining a differentiation state of a test cell comprises (a) obtaining an image of a nucleus in the test cell; (b) representing said image as a multiplicity of pixels; (c) extracting one or more image features from said multiplicity of pixels using a data-driven algorithm; and (d) using statistical classification methods to compare one or more image features derived from the image with image features derived from one or more reference cells that are representative of predetermined differentiation states; whereby the differentiation state of the cell is determined.

In certain aspects, borders and shapes serve as measurable criteria for pluripotent and differentiated cells or cell nuclei. Suitable shape characterization features may be identified at different spatial scales. In some embodiments, border characterization may comprise one or more aspects, such as (i) border diffusivity or (ii) border smoothness (FIG. 35). Border diffusivity relates to the difficulty in the definition of border and may be characterized by the statistics of the peaks and valleys of the edge function v obtained from the segmentation functional of Equation (1). A diffuse border where data contrast across the border is not consistent at different points of the border thus would have more peaks and valleys in the spatial variation of edge function.

For border smoothness, which is a feature of the spatial shape of border, several options exist, such as the distance transform methods, which were proven to be successful in many segmentation techniques. For a global description of shapes, it may also be possible to use the concept of skeletons as described in (Shah 2005).

Notably, measurable criteria used to analyze textures and borders may be first developed for pluripotent and differentiated cells or cell nuclei that have been identified with markers of pluripotency (Oct-4 and Nanog) and neuronal differentiation (nestin and Pax 6).

Classification Module

In certain embodiments of the disclosed methods, a statistical comparison method may be used to compare the image features in a test cell with image features in a reference cell. The statistical comparison may comprise methods that measure information divergence. In some embodiments, the information divergence methods may directly compare probability density functions. In some embodiments, a classification module may use texture and/or border features that are extracted from the image analysis module to classify images of the cellular structure. In the case of cellular structures that are stem cells, stem cells may be classifed as totipotent, pluripotent or as a mature differentiated cell. The classification module includes a training module and a classification method.

In one aspect, a training model may be used to minimize errors in the classification module. This training module includes data such as image features of known cellular structures. In the case of stem cell analysis, a training module may be applied to stem cells that are known to be undifferentiated or mature. One particular classification model that may be used is a support vector machine, although other implementations may include the application of models such as Bayes classifiers, discrimination analysis, Parzen windows, multiple hypothesis testing, neural networks, k-nearest neighbors, decision trees, hierarchical clustering, fuzzy methods, and component analysis.

As is known in the art, classification methods can be partitioned into two groups based on the risk minimization principle employed. Classifiers that implement the empirical risk minimization (ERM) principle minimize errors on the training set. Classifiers implement the structural risk minimization (SRM) principle to minimize both training error and generalization error. In a preferred embodiment, the SRM principle is employed. Other ERM-based classification methods that may be used are described below.

Common Non-Parametric Classification Methods

Exemplary ERM-based classification methods include neural networks and k-nearest neighbor. The basic neural network architecture is described herein. The input to the network is a d-dimensional feature representation. The two outputs represent the two classes of the binary classification problem. The wrinkle in the network is the presence of the m nodes of the hidden layer. The hidden layer allows for interactions among the input features in a manner similar to the basis function expansion found in regression. While the neural network as described contains only one hidden layer, it is possible to design networks with multiple hidden layers. Here, $w_{ji}$ represents the weight assigned to the arc from input feature i to hidden layer node j. Similarly, $w_{kj}$ represents the weight of the arc from hidden layer node j to output class k. Essential to the neural network classifier, are nonlinear activation functions that govern the interaction between the inputs, the hidden layer and the outputs.

Thus, in a neural network, the output classification is related to the input point via the hidden layers and the specified activation functions. Training a neural network involves using training data to estimate the arc weights and the form of the activation functions. The so-called backpropagation algorithm is the standard method of training. Advantages of the neural network classifier include its ability to learn the form of the nonlinear activation functions from the training data, the flexibility of the hidden layer architecture to model many complex problems and its strong empirical performance in many applications. As is apparent to the skilled artisan, the main difficulty of the method involves regularization, or controlling the complexity of the classifier. If the model contains too many hidden layers or too many nodes within each layer, it will be overly complex and tend to overfit the training data at the expense of generalization performance.

The k-nearest neighbor algorithm is a simpler classifier than the neural network; it has only one parameter that needs to be specified, namely k, and has no explicit training step. Given a test point x, the algorithm finds the k nearest training points to the test point. The test point is then assigned the label of the class most represented by those k nearest neighbors. The Euclidean metric is a standard choice for defining the distance between the test and training points. The k-nearest neighbor classifier is also easy to implement.

The Support Vector Machine

In addition to the ERM-based classification methods discussed above, the SRM-based support vector machines are a preferred embodiment of the systems and methods described herein.

Theoretical Basis for the SVM

Implementing the SRM principle involved minimizes not only the empirical error but also the generalization error. It can be shown that for a classifier f, parameterized by α, for some $\lfloor 0 \ldots \lfloor \ldots 1$, the following bound on generalization error holds. C. Burges. A tutorial on support vector machines for pattern recognition. Data Mining and Knowledge $$R(\alpha) \leq R_{emp}(\alpha) + \sqrt{\left(\frac{v(\log(2N/v)+1) - \log(\eta/4)}{N}\right)}, \quad (2.14)$$

with probability $1 - \eta$

Discovery, 2(2):121-167, 1998:

In Equation 2.14, $R(\alpha)$ is the generalization error, $R_{emp}(\alpha)$ is the empirical error based on a training set of N data points and $\lfloor$ is the Vapnik Chervonenkis dimension (VC-dimension) of the family of classifiers F that contains f. The VC-dimension is a measure of the complexity of the family of classifiers F, and thus of the specific classifier f. The generalization error is bounded by the sum of the empirical error and a complexity term. Thus minimizing both the empirical error and VC-dimension of the family of classifiers allows one to generalize well.

We have one step remaining to tie the support vector machine to the SRM principle. Consider N data points from two classes that are constrained to lie within a hypersphere of radius v. Vladimir Vapnik (2000) showed that a certain type of classifier, namely maximally separating hyperplanes, applied to this set of data points has a VC-dimension bounded as, $$v \leq \min\left(\frac{\varphi^2}{\Delta}, N\right) + 1 \quad (2.15)$$

where Δ is a measure of the separation achieved between the two classes. Maximizing this separation measure Δ can yield a smaller VC-dimension, which in turn yields a tighter upper bound on the generalization error. The support vector machine creates just such a maximally separating hyperplane.

SVM Formulation

To derive the formulation of the SVM, consider two sets of training data points, each point described by its d-dimensional input vector, with the points distributed among the +1 and −1 classes. Support vector machines creating a maximally separating hyperplane by separating the two classes with a d-dimensional hyperplane w x+b=0 where w∈$\Re^d$, b∈$\Re$. If a set of points can be separated without error by such a hyperplane, the set is termed linearly separable. Generally many different hyperplanes will separate a linearly separable set of training data and achieve zero empirical error. The ERM principle would not distinguish among such hyperplanes. However, the SRM principle defines the optimal, or maximally separating hyperplane as the one that maximizes margin where the margin is defined as the distance from the nearest point of either class to the hyperplane. By finding a hyperplane that achieves both zero empirical error and a large separation between classes, we expect to have low generalization error according to the SRM principle.

The SRM bounds in Equations 2.14 and 2.15 are generally not tight for a given implementation of the SVM. Despite this, the concept of simultaneously achieving low empirical error and maximizing margin as implemented by the SVM has a strong foundation in the SRM principle and represents a significant improvement over methods that simply minimize empirical error.

In practice, the support vector machine finds the maximally separating hyperplane by solving a quadratic optimization problem. First, let $y_i$=1 for all points $x_i$ in class +1 and $y_i$=−1 for all points $x_i$ in class −1. Assuming that the training data is indeed linearly separable, we define a hyperplane by the pair (w, b) such that, $$w \cdot x_i + b \geq 1 \; \forall \; i \text{ such that } y_i = +1 \quad (2.16)$$

$$w \cdot x_i + b \leq -1 \; \forall \; i \text{ such that } y_i = -1 \quad (2.17)$$

where w∈$\Re^d$, b∈$\Re$ is a scalar bias term (Osuna, 1998) We can write the above expressions more compactly as, $$y_i(w \cdot x_i + b) \geq 1 \; \forall \; i = 1, 2, \ldots, N \quad (2.18)$$

(Edgar Osuna. Support Vector Machines: Training and Applications. PhD thesis, Massachusetts Institute of Technology, 1998). This expression represents the constraint that all training points must be correctly classified by the hyperplane.

The distance from a point $x_i$ to the hyperplane is $$\frac{|w \cdot x_i + b|}{\|w\|}.$$

If we impose the normalization $\min_{i=1,\ldots,N} |w \cdot x_i + b| = 1$, the distance from the hyperplane to the nearest point of either class, or the margin, is simply $$\frac{1}{\|w\|}.$$

In order to maximize this margin while ensuring that all points are correctly classified according to Equation 2.18, the following optimization problem may be posed:

$$\text{maximize}_{w,b} \frac{1}{\|w\|}$$

$$\text{s.t.} \; y_i(w \cdot x_i + b) \geq 1 \; \forall \; i = 1, 2, \ldots, N$$

(Edgar Osuna. Support Vector Machines: Training and Applications. PhD thesis, Massachusetts Institute of Technology, 1998), Noting that maximizing ‖W‖ is equivalent to minimizing ½‖w‖², we have the following equivalent quadratic optimization formulation:

$$\text{minimize}_{w,b} \frac{1}{2}\|w\|^2$$

$$\text{s.t.} \; y_i(w \cdot x_i + b) \geq 1 \; \forall \; i = 1, 2, \ldots, N$$

Solving this problem returns the optimal pair (w, b) from which the classification functions h(x)=w·x+b and f(x)=sign(w·x+b) are created for a new data point x. The formulation above is the linear primal formulation and is generally useful for data that is linearly separable in its original d-dimensional space. Using the duality theory, an equivalent linear dual formulation may be found that is easier to solve than the primal. Furthermore, by allowing some training points to be misclassified (violating Equation 2.18), the soft margin primal formulation and soft margin dual formulation may be created. Finally, projecting the data into a higher-dimensional space provides a flexible and powerful SVM formulation: the nonlinear soft margin dual formulation.

SVM Features and Terminology

As mentioned above, a preferred SVM formulation is the nonlinear soft margin dual formulation. This formulation serves as a useful vehicle for discussing the terminology and features of the support vector machine as used herein. It is formulated as, $$\text{maximize}_{\{\lambda_1, \lambda_2, \ldots, \lambda_N\}} \sum_{i=1}^{N} \lambda_i - \frac{1}{2} \sum_{i=1}^{N} \sum_{j=1}^{N} \lambda_i \lambda_j y_i y_j K(x_i, x_j) \quad (2.19)$$

$$\text{s.t.} \; \sum_{i=1}^{N} \lambda_i y_i = 0 \quad (2.20)$$

$$\lambda_i \leq C \; \forall \; i = 1, 2, \ldots, N \quad (2.21)$$

$$\lambda_i \geq 0 \; \forall \; i = 1, 2, \ldots, N \quad (2.22)$$

where $\lambda_i$ is the Lagrange multiplier associated with the training point $x_i$, K(.,.) is a kernel function and C is a cost penalty. Solving this quadratic optimization problem returns the $\lambda_i$ values that defines the maximally separating hypeiplane.

The optimization problem above scales with the number of data points N rather than the dimensionality d of the input points. Thus, support vector machines handle data with high-dimensional feature vectors.

Furthermore, the ith Lagrange multiplier $\lambda_i$ tells us how influential the ith training point is in defining the separating hyperplane. If $\lambda_i$=0, then the input point $x_i$ has no influence in characterizing the hyperplane, and we can disregard such points without consequence. Conversely, those points $x_i$ for which $\lambda_i$>0 are called support vectors. The set S={$x_i$:$\lambda_i$>0) is defined as the support vector set. The separating hyperplane is fully characterized by only those points in S. The cardinality of S is generally less (and never more) than the number of input points N; thus, the SVM actually scales with only a subset of the original input points.

The kernel function $K(x_i, \ldots x_j)$ is a function in the original d-dimensional input space that calculates the inner product of the two input vectors $x_i$ and $x_j$ in some higher-dimensional feature space. The use of the kernel function allows us to find the optimal hyperplane in the high-dimensional feature space and map that hyperplane back into the original input space as a non-linear separator. Two common kernel functions are the polynomial kernel of degree p, $$K(x_i, x_j) = (x_i \cdot x_j + 1)^p \qquad (2.23)$$

and the radial basis function kernel with width σ, $$K(x_i, x_j) = e^{-\|x_i - x_j\|^2 / 2\sigma^2} \qquad (2.24)$$

Finally, the cost penalty C controls the tradeoff between empirical error and margin. A large C will sacrifice some margin width for better empirical performance (less misclassified training points), while a small C will attempt to create a larger margin at the expense of more misclassified training points.

Once we have solved for the optimal multipliers $\{\lambda_1, \lambda_2, \ldots, \lambda_N\}$ we can create the classification functions h(x) and f(x) for a new input point x as, $$h(x) = \sum_{i \in S} \lambda_i y_i K(x_i, x) + b \qquad (2.25)$$

$$f(x) = \text{sign}\left(\sum_{i \in S} \lambda_i y_i K(x_i, x) + b\right) \qquad (2.26)$$

where $$b = y_i - \sum_{j=1}^{N} y_i \lambda_i K(x_j, x_i), \quad \text{for } i \text{ such that } x_i \in S \qquad (2.27)$$

Geometrically, h(x) returns the signed Euclidean distance from the test point x to the optimal hyperplane, and f(x) returns the binary +1 or −1 classification of x. We interpret h(x) as the confidence in the binary decision. Larger positive/negative values of h(x) show higher confidence in the corresponding +1/−1 decision.

SVM Performance

One of the beneficial properties of SVM is that the SVM attempts to minimize not only empirical error but also the more appropriate generalization error by maximizing margin. Thus it may be preferred over methods such as the neural network and nearest neighbor classifiers that only minimize training error.

In addition, the SVM is naturally regularized in two senses. First, by adjusting the cost penalty C, the complexity can be controlled. A proper setting of C allows for the misclassification of some training points in exchange for a larger margin and better generalization performance. Secondly, Ryan Rifkin (2002) shows that the standard SVM formulation can actually be derived directly from the deep and well-known concepts of regularization theory.

The concise and flexible formulation of the SVM as a quadratic optimization problem is also useful. SVM further allows one to work with either the primal or dual version of the problem. The convexity of both formulations guarantees a globally optimal solution. This convexity property, along with duality theory, also allows for the derivation of Osuna's (1998) active set algorithm, a fast solution method for the dual problem. Edgar Osuna. Support Vector Machines: Training and Applications. PhD thesis, Massachusetts Institute of Technology, 1998. The kernel function allows one to find a linear separator in a high dimensional feature space without actually mapping the input points into that space. Thus, while the resulting decision boundary may be highly nonlinear in the original space, its linearity in the feature space results in a concise classification function that is easily expressed in the original space.

As mentioned above, the size of the SVM scales with a generally small subset of the number of training points rather than with the dimensionality of the inputs. This allows the SVM to solve problems with high dimensional inputs.

Parametric Classification The Kullback-Leibler Distance Classifier

In certain aspects, a parametric classification method estimates a probability density function, and thereby determines a probability of a correct or erroneous classification. In certain such embodiments, the method comprises an information divergence measure such as the Kullback-Leibler Distance Classifier. As discussed above, the cellular classification model is considered in two separate and unrelated steps, feature representation and classification. Splitting up the machine learning tasks allows various available feature representations to be paired with the many classification algorithms to produce a vast amount of experimental work that can be performed. Given n feature representations for a problem and m classification methods, n–m different experiments can be run and analyzed to find the optimal pairing of feature representation and classification method for a given problem.

In other embodiments, the feature representation and the classification models may be combined. For example, if the data to be classified follows a certain probability distribution, the one would design a parametric classification method that takes that knowledge into account. This is precisely the goal of the Kullback-Leibler distance (KLD) classifier. This classifier is an adaptation of a method proposed by Martin Vetterli and Minh Do for the task of content-based image retrieval. The Generalized Gaussian Distribution for Wavelet Coefficient Modelling Vetterli and Do made the assumption that the wavelet coefficients at each subband extracted from a textural image follow a generalized Gaussian distribution (GGD), $$p(x; \alpha, \beta) = \frac{\beta}{2\alpha \Gamma(1/\beta)} e^{-(|x|/\alpha)^\beta} \qquad (2.28)$$

where $$\Gamma(z) = \int_0^\infty e^{-t} t^{z-1} dt \qquad (2.29)$$

is the Gamma function defined on z>0. The two GGD parameters α and β control the width and decreasing rate of the distribution's peak. The GGD reduces to the Laplacian and Gaussian distributions for β=1 and β=2, respectively. Minh N. Do and Martin Vetterli. Wavelet-based texture retrieval using generalized Gaussian density and Kullback-Leibler distance. IEEE Transactions on Image Processing, 11(2):146-158, February 2002. In fact, as β→∞, the GGD approaches the uniform distribution. As described, GGD is a general, unimodal and symmetric distribution method able to model a large range of data through the estimation of two parameters.

The applicability of the GGD for modelling wavelet coefficients has been demonstrated by showing that estimated GGD's fit well the actual wavelet coefficient histograms. Vetterli and Do justified this by performing texture synthesis using the estimated GGD's to generate synthesized sets of wavelet coefficients which are used to create an estimated textural image via the inverse wavelet transform. The visual similarity between the original and synthesized images demonstrates the accuracy of the GGD model of wavelet coefficients.

At each level of wavelet decomposition extracted three sets of coefficients, each representing a different subband. Thus, for an n-level decomposition, we have coefficients for 3n=B subbands. By modelling each set of coefficients as a GGD and estimating the two parameters for each ($\alpha^b$ and $\beta^b$ b=1, 2, ..., B), 2B parameters can be extracted for each image.

The Kullback-Leibler Distance

After extracting the GGD parameters, Vetterli and Do turned to designing a classification method that took advantage of the parametric feature representation. They concluded that a test point should be classified to the class whose wavelet coefficient distribution is closest to the distribution of the test point as measured by the Kullback-Leibler distance metric. While Vetterli and Do used their KLD classification method for the task of imagewise classification, this adapted method may be used for image segmentation as discussed below.

Let $p^b_k(x; \alpha^b_k, \beta^b_k)$, k={+i, −1}, b=1, 2, ..., B, represent the GGD of the wavelet coefficients of the kth class at the bth subband. Let $p^b_t(x; \alpha^b_t, \beta^b_t)$ be the corresponding GGD of a test point to be classified. Vetterli and Do showed that one should choose the class that satisfies the KLD decision rule, $$k_{opt} = \arg\min_{k \in \{+1,-1\}} D(p^b_t(x; \alpha^b_t, \beta^b_t) \| p^b_k(x; \alpha^b_k, \beta^b_k)) \quad (2.30)$$

where $$D(p^b_t(x; \alpha^b_t, \beta^b_t) \| p^b_k(x; \alpha^b_k, \beta^b_k)) = \quad (2.31)$$
$$\int p^b_t(x; \alpha^b_t, \beta^b_t) \log \frac{p^b_t(x; \alpha^b_t, \beta^b_t)}{p^b_k(x; \alpha^b_k, \beta^b_k)} dx$$

is the Kullback-Leibler distance operator at the both subband (Minh N. Do and Martin Vetterli. Wavelet-based texture retrieval using generalized Gaussian density and Kullback-Leibler distance. IEEE Transactions on Image Processing, 11(2):146-158, February 2002).

Vetterli and Do showed that for a GGD, Equation 2.31 can be simplified to the closed form expression, $$D(p^b_t(x; \alpha^b_t, \beta^b_t) \| p^b_k(x; \alpha^b_k, \beta^b_k)) = \quad (2.32)$$
$$\log\left(\frac{\beta^b_t \alpha^b_k \Gamma(1/\beta^b_k)}{\beta^b_k \alpha^b_t \Gamma(1/\beta^b_t)}\right) + \left(\frac{\alpha^b_t}{\alpha^b_k}\right)^{\beta^b_k} \frac{\Gamma((\beta^b_k + 1)/\beta^b_t)}{\Gamma(1/\beta^b_t)} - \frac{1}{\beta^b_t}$$

From Equation 2.32, one can calculate the Kullback-Leibler distance between a test point and the kth class using only the estimated GGD parameters of the kth class and the test pixel.

Furthemore, under the assumption that the wavelet coefficient distributions are independent across the B subbands of the decomposed image, Vetterli and Do showed that Equation 2.30 expands to, $$k_{opt} = \arg\min_{k \in \{+1,-1\}} \sum_{b=1}^{B} D(p^b_t(x; \alpha^b_t, \beta^b_t) \| p^b_k(x; \alpha^b_k, \beta^b_k)) \quad (2.33)$$

That is, with the independence assumption, one can sum up the KLD's across all subbands.

For notational consistency, the KLD decision rule of Equation 2.33 is posed in the manner of the SVM decision rules as described above. If x is some test point, then $$KLD(x, +1) = \sum_{b=1}^{B} D(p^b_t(x; \alpha^b_t, \beta^b_t) \| p^b_{+1}(x; \alpha^b_{+1}, \beta^b_{+1})) \quad (2.34)$$

and $$KLD(x, -1) = \sum_{b=1}^{B} D(p^b_t(x; \alpha^b_t, \beta^b_t) \| p^b_{-1}(x; \alpha^b_{-1}, \beta^b_{-1})) \quad (2.35)$$

are the Kullback-Leibler distances between the test point's wavelet coefficient distribution and the +1 and −1 classes' wavelet coefficient distributions, respectively. Then one can write Equation 2.33 as the KLD classification function, $$f(x) = \text{sign}(KLD(x,-1) - KLD(x,+1)) \quad (2.36)$$

Additionally, we introduce a KLD confidence measure, $$h(x) = KLD(x,-1) - KLD(x,+1) \quad (2.37)$$

Texture Classification the Likelihood Ratio Test and its Probability Density Function In certain embodiments, the likelihood ratio statistics and their respective distributions may be derived for texture analysis. The distributions may be used to obtain the performance of the likelihood ratio based classifier. This approach may be used on a variety of samples, comprising generic textures, egg cells, individual stem cells, stem cell colonies or individual nuclei.

The values of the coefficients at each wavelet subband have a generalized Gaussian distribution, or $$f(x; \omega, p) = \frac{p}{2\omega\Gamma(1/p)} e^{-(|x|/\omega)^p} \quad (6)$$

where x is the random variable for a particular wavelet subband of the texture, ω is a width parameter proportional to the standard deviation, and p is a tail thickness shape parameter. A third parameter, the location or mean, is found to be zero in (1) for the subbands of interest. The term Γ(1/p) represents the Gamma function. Note that when (p, ω)=(2, √2), we have a standard Gaussian density. Each texture would have a representative density function (1) at each decomposition level. Thus, given a texture decomposition that provides B wavelet bands, the characterizing pdf for that texture is $$f(x_1, \ldots, x_B; \omega_1, \ldots, \omega_B, p_1, \ldots, p_B) = \quad (7)$$
$$\prod_{b=1}^{B} \frac{p_b}{2\omega_b \Gamma(1/p_b)} e^{-(|x_b|/\omega_b)^{p_b}}$$

The above texture characterization is an approximation; it assumes that the wavelet coefficients are statistically independent across resolution levels. Though it may be approximate, this statistical model of texture decomposition has been validated on many types of textures.

The Kullback-Leibler distance may used as a basis for classifying the texture. The KL distance between two density functions f1 and f2 is given by $$D_{KL}(1,2) = \int f_1(x) \ln\left(\frac{f_2(x)}{f_1(x)}\right) dx. \quad (8)$$

That is, given a new texture that needs to be assigned to one class from among C classes, we compute the wavelet coefficients from samples for the new texture, and we use these sample decompositions to estimate the generalized Gaussian parameters. We now have knowledge of the new texture's pdf, $f_{new}$, and can select the class c* whose pdf has the shortest KL distance from the new texture's pdf.

$$c^* = \underset{c}{\arg\min} D_{KL}(f_{new}, f_c) \quad (9)$$

As noted in Do & Vetterli, KL distance based classification is equivalent to maximum likelihood classification only in the asymptotic sense. For finite samples, however, this equivalence does not hold, except for the unrealistic case where the shape parameters have the same value in (2), when $p_1 = p_2 = \ldots = p_B$.

Subsequently, we formulate a likelihood ratio test, derive the statistics, and their density functions for the purpose of classifying textures. The probability density function (pdf) of this statistic is derived next and is used for evaluating the performance of maximum likelihood texture classification as applied to the evaluation of stem cell pluripotency level.

Consider the problem of assigning a texture to one of two classes characterized by different generalized Gaussian density parameters for their wavelet decomposition. Assume we have B subbands and S samples for this texture. Denote the associated random variables by $x_{sb}$, $s=1, \ldots, S$, and $b=1, \ldots, B$. We assume that the subband decompositions are independently distributed. Let $X_s$ be the vector of random variables from each of these samples $s=1, \ldots, S$. We formulate the following binary hypothesis test $$H_0: X_1, \ldots, X_b, \ldots, X_S \sim f_0 = \prod_{b=1}^{B} \prod_{s=1}^{S} f_{0b}(x_{sb}) \quad (10)$$

$$H_1: X_1, \ldots, X_b, \ldots, X_S \sim f_1 = \prod_{b=1}^{B} \prod_{s=1}^{S} f_{1b}(x_{sb}) \quad (11)$$

where each of the densities $p_{0b}$ and $p_{1b}$, $b=1, \ldots, B$ is a generalized Gaussian density function given in (1), with respective parameters $(\omega 1, p1), \ldots, (\omega B, pB)$.

To derive the log-likelihood ratio statistic for the above test and its density functions, we need to generalize the $\chi^2$ random variable. For a generalized Gaussian random variable x with parameters $\omega$ and p, define $$\chi^p = \left|\frac{x}{\omega}\right|^p \quad (12)$$

For p=2, we have the $\chi^2$ random variable, which is the square of a standard normal variable. Likewise, $\chi^p$ is a generalization of $\chi^2$ with respect to the generalized Gaussian variable with width parameter $\omega=1$, raised to the power p, whose pdf is $$f_{\chi^p}(x) = \frac{1}{\Gamma(1/p)} e^{-x} |x|^{-1+1/p}, \quad x \geq 0 \quad (13)$$

The $\chi^2_N$, or the $\chi^2$ random variable with N degrees of freedom, is simply the sum of N independent $\chi^2$ random variables. Likewise, we can define the $\chi^p_N$ random variable to be the sum of N independent $\chi^p$ random variables.

To go a step further, if the shape parameters are different for each of the random variables in the sum, we can define, with $p=(p_1, \ldots, p_N)$, the random variable $$\chi^{\vec{p}} = \sum_{i=1}^{N} \chi_i^{p_i} \quad (14)$$

The density function of the above random variable is obtained by convolving the density functions of (8)

$$f_{\chi^{\vec{p}}}(x) = \frac{1}{\Gamma\left(\sum_{i=1}^{N} 1/p_i\right)} e^{-x} |x|^{-1+\sum_{i=1}^{N} 1/p_i}, \quad x \geq 0 \quad (15)$$

The log-likelihood ratio for the hypothesis test (5-6) is expressed in terms of these new random variables. With N=SB, where S is the number of samples for the texture and B the number of wavelet bands per sample, we have $$\Lambda(X_1, \ldots, X_s) = \ln \frac{\prod_{b=1}^{B} \prod_{s=1}^{S} f_{1b}(x_{sb})}{\prod_{b=1}^{B} \prod_{s=1}^{S} f_{0b}(x_{sb})} \quad (16)$$

$$= \sum_{i=1}^{N} \chi_{i0}^{p0i} - \chi_{i0}^{p1i} + K$$

$$= \chi_0^{\vec{p}0} - \chi_1^{\vec{p}1} + K$$

where K is a constant dependent on the scale and shape parameters. Now we have the test $$\chi_0^{\vec{p}0} - \chi_1^{\vec{p}1} \underset{H_0}{\overset{H_1}{\gtrless}} T \quad (17)$$

Here, T denotes the classification threshold that absorbs K. The above methodology has been validated on generic textures as well as images of various stem cell nuclei.

Accordingly, in certain aspects, basic features for texture classification may be coefficients from learned subspaces, or, alternately, from blind separation and independent control analysis. The new set of basic features may represent the coefficients of the learned subspaces. The basis would be different for each class, and the basis representation itself may be considered as a feature. The generalized angle between these classes is an additional measure of the distance between classes (Desai and Mangoubi 2004-2).

Both statistical parametric and non-parametric classification methods based oil the new features or coefficients may be applied. For the statistical methods, the probability density function of the coefficients may be estimated, so that the probability of correct and erroneous classification, as shown in Equations (18) and (19), may be obtained. This will provide a means for evaluating both the K-L distance and the more general information divergence, including Renyi's (Caiszar, Renyi). It will also permit the application of likelihood ratio tests.

In other embodiments, the support vector machine algorithm (SVM) may be applied to our new features, and a large separation between classes will lead to better confidence maps.

This approach may yield a larger separation between classes of stem cells for a given size of image samples, and hence larger confidence in the classification.

In other embodiments, wavelet basis may be used. In some instances, the same structured noise or interference may be hidden in all images, or the interference may vary from one sample to the next. Here, the method of robust non-Gaussian detection, originally developed for fMRI (Desai, Mangoubi, et al., 2002 and 2005) may be used. In some embodiments, simultaneous estimation of same structure noise as well as distinct signal subspace structure for each class may be implemented for finer discrimination between two classes.

In some embodiments, the noise or uncertainties are non-Gaussian, and the structured noise or interference resides in an unlearned, unknown subspace. Robust non-Gaussian detectors are generalizations of the ChiSquare, t, and F statistics matched filter and subspace based detectors (Desai and Mangoubi 2003). Here, use of a t-statistic may not be appropriate because it demands the Gaussian assumption that does not apply to textures. Meanwhile, nonparametric statistics require larger samples than needed when a non-Gaussian model is available.

Thus, certain aspects of the present disclosure describe a new likelihood ratio statistic that confers at least two advantages over older models. First, the new likelihood ratio statistic is based on a statistically accurate model (Do and Vetterli 2002) for the coefficients wavelet-based texture decomposition (generalized Gaussian). In addition, the new likelihood ratio statistic is derived from closed forms for its density functions, thus obviating the need for Monte Carlo runs. In such cases, critical values of the likelihood ratio statistic may be numerically determined. For illustration, consider the wavelet coefficients $x_i$, $i=1, \ldots, N$ that describe one band from a wavelet decomposition of a nucleus or colony texture. These coefficients have a generalized Gaussian density function whose width and shape parameters w and p, respectively, determine the stem cell class. Using these coefficients in a hypothesis test between two classes with width parameter 1 (the data can be normalized by its width factor), and shape parameters p1, p2, respectively, the log=likelihood ratio statistic is given by $$L(p_1 \cdot p_2) = \sum_{i=1}^{N} |x_i|^{p_1} - |x_i|^{p_2} \quad (18)$$
$$= \chi(p_1, N) - \chi(p_2, N) \underset{<}{\overset{>}{\gtrless}} T_c(p_1, p_2)$$

where $\chi(p,N)$ is a Generalized Gaussian-based generalization of the Chi Square (when p=2) statistic with N degrees of freedom, and $T_c(p_1 p_2)$ is a threshold for significance level c.

As with the Chi Square variable, $\chi(p, N)$ is the sum of N one degree of freedom $\chi(1, p)$ variables. These have unnormalized density functions $$f(\chi(p,1)) = \exp(-\chi(p,1))(\chi(p,1))^{(1-p)/p} \quad (19)$$

When p=2, we have the un-normalized Chi Square density. The probability density for the likelihood ratio (1) can thus be obtained by convolving numerically densities of the form (2) (see Desai and Mangoubi, 2003, for the difference between two Chi Square variables with different degrees of freedom). By numerically integrating the resultant density of the log-likelihood ratio (1), we obtain the critical values for significance levels without Monte Carlo runs.

The robust detection test shows superior performance when compared to a conventional test. The robust detector trades off nominal performance in the absence of interference in exchange for superior performance in the presence of interference. Moreover, the robust detector is insensitive to the interference. With increasing interference magnitude, the robust detector's false alarm probability rises much slower than the conventional detector's. For instance, when the magnitude of the interference rises from 0 to 10, the robust detector yields a false alanm probability of less than 0.05, vs. 0.9 for the conventional detector. In the absence of interference, the robust detector gives a probability of detection that is only slightly lower than that of the conventional detector. Enhancement in detection performance using robust non Gaussian detectors has been demonstrated on fMRI data. (Desai and Mangoubi 2003, Desai, Mangoubi, Pien 2005).

In certain aspects, confidence levels in the classification process described above may be established. For the standard Gaussian problem, the traditional method for determining such confidence level is the t-statistic based p-value. As mentioned earlier, this statistic implicitly assumes Gaussian random variables, and compares the difference between classes to the difference within classes. In some embodiments, an enhancement of this test accounts for 1) the non-Gaussian nature of the noise, and 2) the presence of unknown interference. The test may be implemented sequentially (continue testing/stop testing), so as to minimize the sampling effort. Other robust sequential probability ratio tests (Desai, Deckert, et al. 1976) and sequential detection techniques (Mangoubi 1998, and Agustin, Mangoubi, et al. 1999) have been used for other purposes. Thus, the performance of such tests may be evaluated and further enhanced. In some embodiments, Monte Carlo methods may be used for obtaining the tail probabilities of any density functions.

Validation of Algorithmic Measurements

As with any quantitative measurement or calculation, it may be beneficial to validate the algorithmic measurements of pluripotency and differentiation of cells. In certain aspects, whole colonies scored with algorithmic measurements may be compared to whole colonies that have been categorized using molecular markers Oct-4 and nestin.

In some embodiments, nuclei may be evaluated for pluripotency by first acquiring single images or time-lapse sequences of H2B-GFP in living cells. After fixation, the same cells may be evaluated by immunofluorescence by several markers for cellular pluripotency or differentiation (i.e., Oct-4, nestin) and also for markers of condensed heterochromatin or less condensed euchromatin. Condensed chromatin may be silenced DNA that is no longer needed after differentiation, and may contain histone H3, trimethylated on lysine 9, while less dense DNA may be actively expressed and acetylated on lysine 9 of histone H3 on lysine 9.

Progressive changes in H3 post-translational modifications by acetylation or methylation have been documented during differentiation. In addition to post-fixation identification of heterochromatin by immunostaining, the heterochromatin domains in living cells may be evaluated. Evaluation in vivo may be accomplished by transfecting cells with cDNAs for the heterochromatin binding protein, HP1-GFP. Further, measurement of potential changes in volume and surface area may be used to interpret chromosome condensation, as measured by texture analysis.

In certain aspects, volume measurements determined by confocal sectioning may be used in border and shape analysis. In some embodiments, the algorithms may be tested on changes in nuclear structure in tumor formation. This test provides independent testing of the application on data not used for algorithm development. Granular heterochromatin and nuclear texture of lung tumor cells vary from cell to cell, and smooth-textured nuclei are characteristic of cancer stem cells. Thus, in some embodiments, the process of nuclear texture analysis aids in identifying cancer stem cells and/or provides measures of the amorphous chromatin structure characteristic of these cells.

Accordingly, data sets of several hundred colonies (or nuclei) may be prepared and the degree of differentiation determined by expert opinion and immunofluorescence measurement of differentiation markers. In the case of two state data sets (pluripotent vs. differentiated), the difference in expert and algorithmic measurement may be evaluated statistically using T tests with a P value of 0.05 or less, depending on the size of the data set. In the case where multiple degrees of differentiation can be provided, such as combinations of Oct-4 and nestin staining in cells as they transition from pluripotent to neurectoderm, ANOVA approaches may be used.

In some embodiments, the evaluation is an interactive process in which simpler algorithmic approaches may be statistically evaluated with validation data sets and subsequently more subtle measurements may be added. Thus, improvements in the agreement with validated data may be determined.

Kinetic Methods of Analysis

A cell or a colony of cells may be monitored over time, in order to determine the differentiation state or growth of the cells or colonies. In some embodiments, image analysis may extend from the spatial domain to the spatiotemporal domain, so that kinetic images may be analyzed.

In certain aspects, kinetic methods of image analysis use time-lapse images of whole colonies or cell nuclei. Kinetic data may be obtained in a non-invasive manner from a microscope that permits time-lapse phase contrast imaging from within a standard $CO_2$ incubator. Thus, growth curves of a cell colony may be determined, so that colony expansion over time may be mechanistically connected to single cell observation of cell division, cell death and differentiation. In some embodiments, live cells may be stably transfected with a fluorescent marker associated with a cellular protein. The fluorescent marker may be GFP, or other fluorescent markers known in the art. The cellular protein may be a nuclear protein, and may be Histone 2B. In other embodiments, single cells may be stably transfected with lentiviral constructs for H2B-GFP, and imaged in 4-dimensional image sets with high numerical aperture oil immersion objectives. Confocal imaging provides stacks (Z) of images (X, Y) over time (T). Movement at the most rapid pace occurs over a period of minutes. Accordingly, sampling frequency may be evaluated at different intervals. In some embodiments, stacks may be acquired every 30 to 300 seconds. Approximately 20,000 images can be acquired over hours without causing detectable photodamage or measurable perturbation to the movement of fluorescent nuclei.

In certain aspects, the borders, texture, velocity, coherence, and size of mobile chromatin domains may be evaluated. Chromatin mobility is unusually high in pluripotent stem cells and progressively slows during differentiation when measured by displacement vector analysis or by persistence of chromatin subdomains over time. Qualitative estimation of the "character" or phenotype of chromatin movement suggests that pluripotent cells are more deformable than differentiated cells, and may undergo a viscoelastic phase transition during development, eventually behaving most like a solid. Thus, changes in movement are concomitant with a reduction in the aptitude of mobility. Where subdomains of densely packed chromatin (heterochromatin) are formed, genes may not be expressed in the specific tissue type under development. In addition, cell division is clearly distinguished by chromosome condensation during mitosis and death is recognized by nuclear fragmentation. Therefore, in some embodiments, chromatin mobility may be mechanistically connected to gene silencing and fate determination during development.

Kinetic image analysis also makes use of kinetic algorithms that extend the capabilities of the algorithms described for static images. For analysis of static images, the curve evolution method was described for simultaneous smoothing and segmentation. This technique has been successfully applied to spatio-temporal processes in fMRI analysis (Desai, Mangoubi, et al. 2002 and 2005). In certain aspects, the variational formulation is an extension to the time and space domain, described by:

$$E_f(u,v) = \int_\Omega \begin{pmatrix} \alpha(1-v)^2(\alpha_1\|\nabla_x u\| + \alpha_2 \|u_t\|_1) + \\ \beta\|u-g\|_1 + \\ \frac{\rho_v}{2}\|v_x + v_t\|^2 + \frac{1}{2\rho_v}v^2 \end{pmatrix} dxdt \quad (20)$$

The 1-norm is particularly appropriate for detecting sharp transition. Here we use the 1-norm of the time derivative of the field function, or $\|u_1\|_1$, to help detect transitions in time. This algorithm can be used at the learning stage to segment transition in time say, from one class of differentiation stage to the next. It can also be used to identify the time at which phase transition of the viscoelastic nuclei. In some embodiments, each picture in the kinetic data movie may be segmented. Beyond this segmentation, image feature extraction methods described above may be applied to each picture. Thus, a time history of image features may be derived.

In certain aspects, the variational approach may be used to address variations in time.

In certain aspects, algorithmic measurements of colony texture or nuclear GFP-2B dynamics are statistically correlated to molecular markers of pluripotency and to levels of heterochromatin. Accordingly, after 4-D time lapse confocal microscopy has been performed, samples may be fixed and immunostained for markers of pluripotency (Oct-4 and Nanog) and heterochromatin (histone H3, trimethylated on K9 and HP1α and HP1β). These immunostains are canonical markers for differentiation state and may be used to validate any analysis of texture and kinetic movement. Correlative live cell time lapse and fixed cell immunofluorescence enables identification of individual pluripotent cells and intranuclear heterochromatic domains in cells that were imaged for kinetic behavior just before fixation (Sammak and Borisy 1988;

Sammak and Borisy 1988; Sammak, Hinman et al. 1997). Further, algorithms may be tested with measurements of the differentiation of neuronal stem cell cultured with glioblastoma tumor cells.

In some embodiments, cells may be fixed and labeled with an antibody directed against a nuclear protein. In some embodiments, the antibody may be a primary antibody that is detected with a second fluorescently labeled antibody of one of several visible wavelengths.

Use of Prediction Models

In certain aspects, dynamic models and control models predict and maintain the quality of pluripotent stem cells. Information obtained from image analysis of stem cells may be used to predict the transition of either cell nuclei or cell colonies from one stage of differentiation, or to measure the effects of the cell culture environment on transition from one stage to the next. In some embodiments, the transition of cell nuclei or cell colonies through stages of differentiation may be predicted using models based on kinetic image data of cells. In some embodiments, prediction models may be used in a decision and planning paradigm for the purpose of monitoring in automated fashion the health of cell colonies.

Information gained from the smoothing and segmentation, image feature extraction, classification, and validation steps may be used in models that predict the transition of either (a) cell nuclei or (b) cell colonies from one stage of differentiation to another.

(a) Cell Nuclei

In some embodiments, the dynamic of cell nuclei is a function of the cell's differentiated state. When the cell is undifferentiated, the cell nuclei are more elastic, and exhibit more shape deformation. With differentiation, the nuclei are less elastic. The process of differentiation is a phase transition phenomenon. As such, modeling may be performed at two levels. At a lower level, the feature (such as shape variation) dynamics of the nuclei are modeled within each phase as a function of time in response to various culture media inputs such as composition, temperature, $O_2$, etc. These dynamics are represented by a power spectrum to be estimated using power spectral estimation methods (Kay 1999). This spectrum can be realized as a Gauss Markov process.

In some embodiments, the statistical parameters of the nucleus texture decomposition for each class may be described as a first order Gauss Markov model. Thus, for class i and decomposition band j, we have the following discrete time model for spatial shape parameter p the generalized Gaussian density function $$p_{ij}(k+1) = \alpha_{ij} p_{ij}(k) + \sigma_{ij} r_{ij}(k) \quad (21)$$

where $\alpha_{ij}$ and $\sigma_{ij}$ are the band width and the standard deviation (or spectral height), respectively, and $r_{ij}(k)$ is a white noise process with unit standard deviation. Similar models were estimated for the width parameters wij. This model is a scalar discrete time and stochastic version of Equation 24, described below.

At a higher level, the transition between phases is modeled as a hidden Markov model, having two or more chains. FIG. 2 illustrates the hierarchical representation for a two-phase model. The nodes or circles in the lower row of FIG. 2 are the higher level Hidden Markov Model (Koski 2002, Li and Gray 2000), and transitions from the pluripotent to the differentiated state occurs at a Poisson rate (Drake 1967) of say, X, while the spectrum inside the node is a Gauss Markov model.

To obtain lower level models, the spectrum of the feature dynamics may be estimated. For this, spectral estimation techniques are used, similar to techniques used for the estimation of the motion of flexible structures like the Space Shuttle's arm or the Space Station (Yang and Griffith 2003). Next, realization theory (Brockett 1970) may be used to obtain equivalent linear state space dynamic models. If successful, each phase of the system can be associated to a linear dynamic system of the form $$dx/dt = A_i x(t) + B_i u(t) + G_i w(t) \quad (22)$$

where x(t) represents the features of interest at time t, u(t) is the media input, and w(t) is random noise. The subscript i represents the state of differentiation. For instance, if i=1, then the nucleus is pluripotent. If i=2, 3, . . . , it is differentiated to various degrees. Intermediate stages are also possible. This time varying dynamic system can help predict the evolution of different features such as connectivity and nuclei shape deformation within each phase. Note that the image observation data are a function of the state x(t). Thus, we have at time tk an image representation of the form $$y(tk) = hi(x(tk)) + v(tk) \quad (23)$$

where v(tk) is an observation noise. In some embodiments, the observation in Eq. (11) may be used to estimate in real time the evolution of Eq. (10). Kalman filtering (Poor 1998, Mangoubi 1998) may be used, and if the model Eq. (10) is not adequately known, then more advanced robust filtering (see, e.g., Mangoubi 1998) may be appropriate. At the higher level, the transition between phases may be modeled as a discrete state continuous time Markov Chain. Thus, we have the Hidden spatio-temporal Markov Model, $$dp(t)/dt = Tp(t) \quad (24)$$

where $p(t) = [p1 \ldots, pI]$ is the probability vector for each state i at time t, and T is the transition probability matrix. In some embodiments, the transition probability matrix is a function of the environmental conditions. Also, since differentiation is a unidirectional process, T is upper triangular.

Thus, in certain aspects, we have a Hidden Markov Model as shown in FIG. 2. Note that the above equation implicitly assumes a memoryless Poisson process for the occurrence of transition. Estimating this parameter would give an ensemble average for the mean time to transition from one state to the next.

(b) Cell Colonies

The modeling task for colony feature dynamics is similar to the modeling task for cell nuclei, but with a larger spatial scale and a longer temporal one. Moreover, at the colony level, proper magnification of collected images results enables accounting not only for the differentiation process, but also for cell regeneration and death. Accordingly, the state of the system could be the proportion of cells that are pluripotent, differentiated, dividing or dead. Such a model would be similar in nature to that of Equation (24), except that the transition matrix is not upper triangular, since regeneration means the number of pluripotent cells is not decreasing due to the birth and death process. In some embodiments, the characterization of stem cell colonies may comprise spatio-temporal modeling of coherence in behavior among cells within a neighborhood.

In certain aspects, the models may be hierarchical and account for multiscale phenomena, as the paradigm of FIG. 2 indicates. The models rely on the image processing work described earlier to make a rich set of features available. In other embodiments, for a control task, models for different operating conditions may be used to account for temperature, humidity, and other environmental conditions.

In some embodiments, bilinear finite capacity models may be used to predict and maintain the quality of pluripotent stem cells. Here, the finite capacity bilinear (Desai, 2003) may be compared to a linear model:

Bilinear model: $dx(t)/dt = c_1(1-x(t))u(t) - c_2 x(t)$

Linear model: $dx(t)/dt = c_1 u(t) - c_2 x(t)$ where $c_1$ and $c_2$ are positive constants and u is an input function such as environmental conditions. The first model is bilinear where the input function multiplies the state, and we have saturation at steady state. In the second model, we have a linear model that does not saturate at steady state. Specifically, at steady state, we have Bilinear model: $x_{ss} = c_1 u/(c_2 - c_1 u)$ Linear model $x_{ss} = c_1 u/c_2$ In brief, bilinear models can predict the saturation effect due to the finite capacity of the medium and interacting entities over finite space. These models have successfully predicted the behavior of chemical sensors in finite capacity interactive setup environments.

In some embodiments, a transition requires several events, and a memoryless Poisson model may be replaced with an Erlang model (Drake 1967). In other embodiments, a non-homogeneous Poisson process may be used, where the parameter $\lambda$ is no longer constant. These models may be appropriate when a memoryless Poisson model does not adequately represent the transition phenomena from one stage of the stem cell life to the next.

Validation of Measurements of Colony Texture or Nuclear Dynamics

In certain aspects, algorithmic measurements of colony texture or nuclear GFP-H2B dynamics are statistically correlated to molecular markers of pluripotency and to levels of heterochromatin. The correlations provide validation of the algorithmic measurements. Here, image data of phase contrast hESC colonies and fluorescence images of H2B-GFP may be collected in order to determine whether the modeling methods developed for colonies and nuclei agree and whether they can be used to anticipate colony differentiation, growth and death. The experiments may be repeated in multiple lines of hESCs (WA01, WA07, WA09) to compare line specific growth characteristics and evaluate whether colony morphology, and colony expansion are quantitatively similar. In general, comparative studies are necessary to establish that characteristics of one pluripotent line can be more broadly applied to pluripotent hESC in general. In addition, colony morphology may be evaluated on both mouse and human feeder cells slight differences in colony morphology may be observed.

Algorithmic results from phase contrast images may be validated for accuracy and precision against independent measures of pluripotency (Oct-4 immunostaining of fixed samples). Both repetitions of independent, pluripotent colonies as well as differences among distinct culture conditions for differentiated cells may be measured. While model parameters will be determined using one set of experimental data, a separate set will validate them by comparing to model outputs. The validation criteria are determined in conjunction with biologists and model experts, and others with skill in the art. The widely used statistical evaluation of algorithm reproducibility (coefficient of variance) and dynamic range (Z factor) (Zhang, Chung et al. 1999; Iversen, Eastwood et al. 2006) assumes Gaussian distributions they illustrate a useful measure of reproducible differences between the most distinct categories. In some embodiments, different model structures will be built for different cell lines.

Multiresolution Model

In certain aspects, an overarching Markov Model (Willsky 2002) explains stem cell behaviors at all resolutions. This may be accomplished by a series of steps, comprising first correlating the relationship between the texture and border features of nuclei and those stem cell colonies. For this, the characterization of the coherence in behavior among cells within a neighborhood may be pursued. This would be possible if the image magnification level enables tracking of several nuclei. The time history of the ensemble average of these nuclei's texture and border features should resemble that of the colonies. As such, this ensemble average can be a predictor of a colony's destiny. In some embodiments, these models can also be used to capture variation in space and time at either the colony level or the nucleus level. In some embodiments, a multiplicity of data points on nuclei may be collected, in order to note a reliable correlation and build a hierarchical model.

In some embodiments, planning decision and control rules determine which colonies have undesired fates during hESC maintenance and should be discarded or have desirable fates and are ready for sequential addition of differentiation media. In this way, prediction models and measurements may be used to automate some aspects of the colony maintenance process. For instance, a fusion of information from the model prediction and the measurement can help determine the time when some regions of the colony need to be extracted.

In other embodiments, the differentiation process may be influenced. Here, predictive control methods (Maciejowski 2002) may be used, as the prediction models help predict in the short horizon the behavior of the system's state. The actual behavior of a cell colony may be compared to a desired state trajectory. Differences between the desired and predicted state trajectories may serve as the basis of altering cell control variables, such as fluid, temperature, etc. In other embodiments, advanced predictive control methods provide robustness to model uncertainties. In addition or alternatively, adaptive control methods (Astrom 1994, Krupadanam, Anaswamy, and Mangoubi 2002) may be used.

In certain embodiments of methods of the invention, one or more portion(s) of the method may be carried out using or with the assistance of a processor, such as a microprocessor. For example, comparisons (e.g., comparisons of textural features, comparisons of measurements, comparison of rates, comparisons of stringency, or comparisons of protein levels), extractions (e.g., extractions of image features), and models (e.g., modeling feature dynamics) may be obtained or accomplished in part or in whole using a processor, such as a microprocessor.

One of skill in the art will recognize that the various image processing techniques, analytical approaches, and assessment paradigms described herein are not mutually exclusive, and can be advantageously used together in a method for analyzing an image. Thus, in certain embodiments of the present invention, various methods and steps as identified herein may be used in combination with one another. In certain such embodiments, the multiple measurements obtained using the combination of methods as described herein may be combined to more accurately and/or reproducibly determine the status of a cell.

Commercial Applications

Various embodiments of the invention are image-based and measure, for example, quality of adherent stem cells under conditions favorable for their growth. Additionally, the systems and methods of the invention are suitable for scale-up for large quantities of stem cells that will be needed for therapy and research. They are also suited to evaluation of eggs and embryos where improving the outcome of egg and embryo development is of utmost importance in fertility clinics.

According to another feature, the invention uses the output of the classification and image processing, meaning the information extracted to develop models that explain the biology and medicine of stem cells and their products.

The hierarchical approach integrates all the known tools and information to yield a superior classification and characterization performance. This includes the fusion of information from images of different resolution and modalities, the incorporation of prior information, and the generation, selection and combining various features.

Other commercial applications include, without limitation, evaluation of the quality and suitability of cells in culture is important when they are used in biological experiments, when they are to be used in vitro fertilization, cell therapy or tissue engineering, or when cells are used as indicators or reporters of drug activity or detectors of environmental quality. Cells are routinely evaluated and selected by experts based on experience, but there is an increasing need for large scale, rapid, reproducible and quantitative evaluation of cells that is not possible by investigators. Several companies provide these capabilities to the pharmaceutical industry, hospitals and academic laboratories with the use of instrumentation that analyses molecular characteristics but that requires destroying a representative sample. A few providers of testing tools use non-invasive technologies such as measuring the components of spent culture media or by using physical or chemical probes, such as electrical, optical, or mechanical characteristics. A burgeoning market segment uses optical methods to microscopically evaluate cells used for medical therapy drug screening or for evaluating large-scale quantitative biological experiments where the number or complexity of conditions exceeds the capabilities of manual investigation. Drug discovery is currently a multibillion-dollar market. The fields of tissue engineering and cell therapy are projected to have rapid growth and to become the major methodology of repairing injured or low functioning tissue and have applications in cancer therapy, and for maintaining the integrity of tissue after damage or degeneration. In all of these applications, the ability to evaluate cell quality and suitability is an under served need that promises to have major impact on the quality of patient care.

Such techniques may be highly useful in in vitro fertilization and stem cell therapy. In Vitro Fertilization is a 3-decades-old use of cell therapy applied to patients with compromised fertility and it requires detailed evaluation of egg and embryo quality. In stem cell therapy, stem cells require high volume cell production in vitro for experimental determination of basic biological characteristics and for producing adequate numbers of cells for tissue engineering. The first therapeutic use of embryonic cells is likely to be in neurodegenerative diseases such as Parkinsons, Multiple Sclerosis, Lou Gherigs (ALS) disease, and possibly Alzheimer's disease. Many groups are working on producing neurons from hES cells and the work to date is very encouraging, showing success in mouse models to date with Parkinsons, Multiple Sclerosis and ALS. Diabetes is another very important target disease that hES cells may possibly treat by differentiating into beta islet cells that produce insulin. Another very critical target disease is cardiovascular disease. To date, hES have been used in animal models of heart disease. In culture, hES have been used to recreate intact blood vessels. All of these therapeutic applications require the routine evaluation of undifferentiated cells during scale up of raw material that can be used to produce the differentiated cell type desired for therapy. In both the propagation and expansion of undifferentiated stem cells, and in the controlled differentiation of stem cells to the selected cell fate needed for therapy, the routine evaluation of cells in a non-destructive way will promote the product quality demanded for FDA approval and for therapeutic-grade cells.

The subject methodology is well suited for evaluating consistency and quality of eggs and embryos in fertilization clinics and research labs for the scale-up of stem cell production for therapeutic tissue engineering, and in screening campaigns where visible changes of cells can be used to detect changes to their environment in response to known or unknown added factors. Most current methods evaluate cells on the basis of molecular determinants and require killing samples or added potentially perturbing reporter molecules.

Additionally, this architecture can be used to develop and enhance the environmental conditions of stem cells, that can help predict stem cell growth, their maintenance, and the controlled production of specific differentiated cell lineages for therapeutic, investigational, screening or other medically beneficial purposes, or products of these cells including but not limited to proteins, nucleotides and carbohydrates that have therapeutic or investigational value.

Expanding the sensory component based on an integration of multiple inputs from imaging and other non-invasive techniques such as thermal, electrical or chemical sensing of media, gases or metabolites would produce a sensitive non-destructive and measure of cell conditions. The detection could be discrete, or combined over multiple dimensions including input variable, time and location. Kinetic measures could be expanded to real-time sensing of cell state for the purpose of monitoring or controlling cell state.

The sensing component of an illustrative embodiment of the invention may be interactive, for example, changing media, killing unwanted cells, protecting and passaging stem cells or differentiated lineages to fresh containers, collecting metabolites, secreted products or measuring reactants for desired biochemical outcomes. Such interaction may produce a fully integrated system based on specific sensory technologies. The interactive potential of such a sensory-control circuit provides for adaptability, self-correction or user-guided changes for producing the desired outcomes for cells, their environment or their products. Sensing methods of the invention may, for example, be adapted to provide decision for altering cell state, and physical or chemical environment including chemical composition of the culture media, gas composition and concentration, or biological environment, including the addition of helper-cells or cell products for the benefit of the user. The ability to sense the condition of cells and their chemical and physical environment adds high value to the decisions on how to manipulate cells.

The benefits of producing an automated system for production of stem cells and their products is critical to overcoming a rate-limiting step in cell therapy and tissue engineering, the reproducible, qualified production of stem cells and stem cell products that are difficult to produce manually in large quantities with required consistency from batch to batch and over time.

In addition, the current disclosure may have commercial applications to cancer diagnostics. Diagnostics of cancer aggressiveness is often made by pathologist in tissue samples from patients by evaluating the number and density of tumor cells with dense smooth chromatin, typical of de-differentiated tissue. These cells are now being identified as stem cell like and may serve as a core source of mature tumor cells, in analogy to normal stem cells which provide a source of new cells for normal tissue repair and maintenance in the body.

Tissue engineering is another commercial application of the techniques disclosed herein. Tissue engineering involves a combination of scaffolds to provide spatial organization of a tissue and various cell types that work in combination with scaffolds to provide chemical and mechanical function. For example scaffolds organize cardiomyocytes into functional arrays that together provide mechanical contraction in the heart. Beta islet cells in the pancreas produce insulin for chemical regulation of glucose levels in the blood. Neurons and support cells in the brain interact to produce neurotransmitters and electrical signals for systemic control of the body. In each of these examples, replacement cells can be prepared by inducing differentiation of adult or embryonic stem cells that serve as a natural reservoir for maintenance of the body. In the field of tissue engineering, specific cell types are produced from stem cell precursors that are differentiated to desired lineages by epigenetic mechanisms that control the expression of cell type specific proteins. Our approach for detecting and analyzing epigenetic markers of differentiation can be used to determine which cells are appropriate for tissue engineering, to optimize processes for cell production and for quality control in a non-destructive manner for cells that are to be used for cell therapy and tissue engineering.

EXAMPLES

Having generally described the invention, Applicants refer to the following illustrative examples to help to understand the generally described invention. These specific examples are included merely to illustrate certain aspects and embodiments of the present invention, and they are not intended to limit the invention in any respect. Certain general principles described in the examples, however, may be generally applicable to other aspects or embodiments of the invention.

Differentiated cells were produced by incubation on low-density feeder cells that promote differentiation to neurectoderm (FIG. 1). Pluripotent and differentiated cells were distinguished first by location within pluripotent colonies and by cellular morphology (FIG. 1 A), by immunofluorescence for Oct-4 (pluripotency marker) and nestin (neurectoderm marker, FIG. 1 B).

Example 1

DNA Positional Persistence

Chromatin movement within the nucleus was measured by live cell, time-lapse confocal microscopy of chromatin labeled with the vital DNA dye, Syto-16. Time lapse confocal images of Syto-16-loaded pluripotent cells hESC, 2 day differentiated hESC and CF-1 mouse fibroblasts (5 cells per condition) were analyzed for the integrated intensity (area x intensity) of DNA domains that changed between 30 min time intervals (mobile DNA areas) or that were persistent during a 1 hr interval (persistent areas pluripotent cells. Whole cell movement was excluded by analyzing in the frame of reference of the center of the nucleus. Movement was shown by the integrated intensity of chromatin spots that were fixed in position (relative to the center of mass of the nucleus) for one, two or three images at 30 min intervals. Movement in pluripotent cells decreased 4-fold after 2 days of differentiation and was more than 1000-fold greater than in fibroblasts. Areas of persistent DNA increased 400 fold after 2 days differentiation. CF-1 fibroblasts were 4000 times more persistent than pluripotent cells.

Example 2

Reduced Speed but Increased Cohesion of Chromatin During Differentiation

Chromatin movement was further analyzed in hESC transfected with the fluorescent histone GFP-H2B (FIG. 4). Single confocal slices at 0.4 μm spacing (FIG. 4A) show density variations, including low-density voids (arrow in FIG. 4A, 0.4 μm).

The movement of cell-specific bright chromatin densities was analyzed by overlaying images at 0, 5 and 10 min, assigned to separate channels (FIGS. 4B-F) and by vector analysis where movement of bright spots was traced with a line at 1 min intervals and arrows were placed at the last position of the spot (FIG. 4G). Different kinds of nuclear movement were detected including internal mixing of chromatin, indicated by movement of bright chromatin domains without envelope deformation (pluripotent hESC, FIG. 4B), deformation of the envelope and chromatin (pluripotent hESC, FIG. 4C), and multidirectional streaming of chromatin (2 day differentiated hESC, FIG. 4D). Long-range coordination of chromatin movement was infrequent in hESC and prevalent, albeit at slower speeds, in differentiated cells. An increase in coherence length was most noticeable in 5-week differentiated hESC (FIG. 4E). In contrast, endothelial cells show small amplitude, sub-μm tethered stochastic movement (FIG. 4F) as reported previously for somatic cells (Marshall, Straight et al. 1997). There was no net movement of chromatin domains over 10 min, represented by the absence of arrows (FIG. 4G). Chromatin mobility did not result from cytoplasmic movement of the actin cytoskeleton since cytochalasin D produced a slight acceleration of chromatin mobility (not shown). Treatment of cells with microtubule depolymerizing agent, 1 mM nocodazole to disrupt microtubules similarly had no effect on chromatin mobility (not shown).

Example 3

Relative Mechanical Deformation of Stem Cells and Somatic Cell Nuclei

Nuclear organization and structure correlate with mechanical stiffness of stem cell nuclei. Single hESC were isolated by brief treatment with $Ca^{2+}/Mg^{2+}$ free HBSS with 1 mM EDTA and deposited in standard DSR media containing Hoechst 33342, Oregon 488 Wheat Germ Agglutinin and propidium iodide. Propidium iodide-positive cells were excluded, as were cells with clear cytoplasm, since this may indicate transient lysis during isolation. Cells were aspirated into pipettes (6-11 μm diameter) at fixed hydrostatic pressure for 1 min until steady state aspiration length was achieved. The steady state length of cell and nuclei dimpling into the pipette was measured. As cells differentiate for 2 and 6 days, nuclei become more solid and are not aspirated into the pipettes. A relative deformability was calculated by comparing the distance aspirated cells moved into the pipette. Cytoplasmic and nuclear aspirated length decreased upon differentiation. The length ratio γ represents the deformability of nuclei relative to the deformability of the cell. The relative aspiration lengths were independent of pipette diameter or total plasma membrane length, and data includes plasma membrane lengths from 25-300% of the pipette diameter. Pluripotent cells are unusually deformable, becoming 3-fold more rigid by the second day after differentiation (FIG. 5). By day 6, differentiated stem cell nuclei are 6-fold more rigid, nearly as rigid as mouse embryonic fibroblasts cells from the feeder layer. Differences were significant between pluripotent and 2-day, 2-day and 6-day, but not 6-day and fibroblasts $p<10^{-6}$, t-test), $p<10^{-5}$), and p=0.13) respectively. The application of constant force enables us to measure deformation of intranuclear markers during differentiation of stem cells. Our current method measures nuclear displacement over time, even without direct knowledge of the cellular forces being applied to deform the nucleus.

Example 4

Faster H2B FRAP Recovery in Pluripotent hESCs

Chromatin dynamics in pluripotent and differentiated hESC line UCO6 were evaluated by pattern photobleaching GFP-H2B using a scanning laser confocal microscope. Large portions of the nucleus were photobleached and movement during recovery was measured (FIG. 6). FRAP in pluripotent hESC occurred within 5-20 min (FIG. 6) while recovery slowed in 2-day (FIG. 6B) and 6-day (not shown) differentiated HESC to >1 and >10 hrs respectively. Ten FRAP repetitions in each cell type revealed recovery times consistently increased from minutes to hours during differentiation. The bleached zones provided fiducial marks on slowly exchanging chromatin, demonstrating chromatin mobility in conjunction with nuclear envelope deformation. FRAP was reproduced in HESC line WA07 that were stably transfected with GFP-H2B using lentivirus transfection. Confocal pattern photobleaching showed an 8.4-fold increase in FRAP half-times after differentiation for one week (FIG. 6).

Example 5

Faster H2B FLIP in Pluripotent hESCs

Histone H2B mobility was quantified by fluorescence loss outside of the bleached zone induced by photobleaching for 1 min in UC06 hESC. Bleaching conditions did not reduce fluorescence intensity in adjacent areas of differentiated hESC. FLIP in pluripotent hESC (56±35%) decreased nearly 4-fold in differentiated hESC (15±14%). The average fraction of FLIP significantly decreased in 2- and 6-day differentiated hESC $p<5\times10^{-4}$ (n=18) and $p<5\times10^{-6}$ (n=8) respectively when compared to pluripotent hESC (n=29). Histone mobility in endothelial and MEF cells (not shown) is 1-2 orders of magnitude slower than FLIP in pluripotent cells. Cells were cultured for 3-7 days post transfection which eliminated the brightest cells. Cells of similar, low intensity were selected and 10 serial confocal sections were bleached in half of the nucleus continuously for 6 min. A single slice at the equator of the nucleus was selected for analysis. Non-bleaching illumination was applied (left side of panels) to determine GFP-H3 content while high intensity bleaching illumination (right side of panels) was applied. In WA06 cells transfected with GFP-H3 in the vector pBOC we found significant differences in photobleaching between pluripotent and differentiated cells (FIG. 7), and in pluripotent cells there are 2 halftimes suggesting two binding states for H3 (FIG. 8). These results also suggest that GFP-H3 exchange is unusually fast in pluripotent cells.

Example 6

DNA and Histone Methylation Increase Upon Differentiation

Chromatin in pluripotent cells appears smooth and in neurectoderm, it appears aggregated or chunky. Texture analysis shows significant differences in aggregation during neurectoderm differentiation (FIG. 9).Here, in both figures, DNA was stained with Yoyo1 in single confocal sections. Pluripotent hESC were labeled with wheat germ agglutinin to indicate cell boundaries. The texture of 10 pluripotent and 10 differentiated cells was measured by wavelet analysis and the KL distance between all cells was calculated. Modifications that accompany heterochromatin condensation were evaluated including deacetylation of histone H3 at lysine 9 (H3K9), and methylation on H3K9 and of DNA on 5'-cytosine. Histone H3K9 is increasingly methylated at centromeres of mitotic and interphase cells during differentiation (FIG. 10). Total H3K9 trimethylation increased 5-fold during differentiation (n=40 cells) while centromere trimethylation increased from 40% to 90% within 2 days of differentiation (FIG. 10). Methylation of DNA and histone H3K9 increase during differentiation of hESC at colony edges (FIG. 11A). At the initiation of differentiation, DNA is first methylated at distal chromosome arms; distal to centromeres containing trimethylated H3K9 in prometaphase and metaphase cells (FIGS. 11B, C), suggesting that methylation of CpG islands is initiated at telomeric ends of chromosomes. Methylation of DNA in interphase cells is nearly undetectable in pluripotent cells (FIG. 11D), first appears at the nuclear periphery (FIG. 11E) and within the first 2-5 days extends throughout the nucleus, independent of methylated H3K9 (FIG. 11F) and finally appears in condensed heterochromatic spots (FIG. 11G). In interphase nuclei, pluripotent cells contain trimethylated H3K9 in small, low intensity spots (FIG. 11D) that coalesce into larger, brighter spots upon initiation of differentiation (FIG. 11E). By 10 days, methylated H3K9 is predominantly restricted to dense heterochromatin spots (FIG. 11G) and coincides with methylated DNA. Methylated DNA area in interphase nuclei significantly increases from 28 (pluripotent) to 987 (differentiated) pixels$^2$/nuclei upon differentiation (P<0.04) while methylated histone increase 50% from 570 to 775 pixels$^2$/nuclei (FIG. 12). Histone H3K9 transiently increases 50% upon differentiation, later returning to levels seen in pluripotent cells. The separation of methylated histones from methylated DNA decreased significantly during the formation of heterochromatin from 96% (pluripotent) to 34% (day 2-5, P<0.03) to 3% (day 10 P<0.001), all measurements calculated from 24 cells in three colonies per condition. DNA condensation, coinciding with the increased co-localization of methylated histone and DNA, suggests the absence of heterochromatin in pluripotent and early differentiating cells and its formation after differentiation has begun. Overall, we find that heterochromatin appears only after differentiation, and that chromatin and nuclear envelope of pluripotent cells lack the large-scale nuclear structures responsible for silencing of genes in somatic cells.

Example 7

Detergent- and Salt-differential Extraction of Chromatin Components to Reveal Differential Binding Patterns In situ detergent- and salt-extractable histones and heterochromatin binding proteins (HPs) HP1α, HP1β, and SUV39H (Cheutin, McNairn et al. 2003; Krouwels, Wiesmeijer et al. 2005; Williams, Azuara et al. 2006) may be assessed by confocal immunofluorescence for pluripotent and differentiated cells. In addition, bulk-chromatin extraction may be evaluated by SDSPAGE. It is expected that the strength of protein-DNA interaction for some chromatin elements, such as histones and HPs, would be more labile in undifferentiated cells than in differentiated ones. Preliminary experiments (FIG. 13) have shown that some chromatin components (i.e., HP1α, HP1β, GFP-H2B) can be extracted from hESC at lower salt stringency than from differentiated cells.

We will also compare more gentle extraction with Tween-20, because it is neutral and nonpolar, whereas Triton X-100 is neutral, but polarized.

Immunofluorescence of HP1b showed that detergent-lysed pluripotent cells (by morphology) contained no HP1β while differentiated cells had bright focal dots, not diffuse background. HP1β was absent in all salt concentrations (0.4, 0.7, 1.0 NaCl) while unlysed pluripotent cells had diffuse HP1b labeling. GFP-H2B was absent from all pluripotent cells in all salt concentrations. Lysis without salt also removed GFP-H2B from most pluripotent colonies although a few colonies showed a few cells with residual, high contrast staining in nuclei, or diffuse staining of cytoplasm. Differentiated cells at colony edges did not show distinguishable patterns.

Example 8

Measuring and Perturbing Enzymes that Modify Epigenetic State of Chromatin

Immunostaining for HDAC1 and 2 have produced results showing that both are absent from pluripotent hESC (line WA07) and are expressed very early in differentiation (FIG. 14). Technically, lack of HDACs provides confidence that stable lines of HDAC knockdown will not prove lethal to hESC. Additionally, since HDAC 1 & 2 are induced very early during differentiation, the necessity of deacetylases for differentiation can be tested. We have used plasmid based shRNAmir sequences RH1764-9193508 (HDAC1a), RH1764-9689921 (HDAC1b) or RH1764-9689349 (HDAC1c) respectively). Initial findings suggest that shRNAmir HDAC 1b is more effective than others tested (FIG. 15) and will be prepared in pGIPZ with the UBC promoter (see the General Methods). H3K9me3 staining was also absent from transfected cells (not shown). Negative control plasmid, RHS1704, will be used to test the off target effects of the transfected SMP2 plasmid alone. One day after transfection, selection medium containing 2 ug/ml of puromycin may be applied to the cells. Cell colonies which remain are enriched with the vector. After selection of stable knockdown lines, hESC will be measured for Oct4, Cdx2 or Nestin promoter deacetylation and protein synthesis, and cells will be challenged with either increasing doses of BMP4 to induce TE differentiation or BMP4 antagonist to induce NE differentiation. The effect of HDAC inhibitors in hESCs may not affect self-renewal and will be used as a control.

We anticipate that inhibition of deacetylase activity in pluripotent HESC will prevent differentiation as well as methylation in histones and DNA at centromeres. We anticipate that HDAC inhibition after differentiation will block or reverse formation of heterochromatin that is produced one week after formation of TE or NE. Further, we anticipate that inhibition of methyltransferases will inhibit commitment to a unique tissue fate as well as block formation of centromeric heterochromatin. Different methyltransferases may have a role in pluripotent or differentiated hESCs or in the induction or the maintenance of H3K9me3, so we will investigate both the pluripotent and differentiated states for changes in methylation. It is expected that pluripotency will be maintained after knockdown. Alternately it is possible that differentiation will proceed but in a less tissue-selective manner. After evaluating inhibition of forward differentiation, we will also test the capacity of inducible deacetylase and methylransferase knockdown to produce dedifferentiation of early TE and NE. It has been reported that TSA and 5Aza 2' deoxycytidine treatment of TE hypomethylates the Oct4 promoter and induces Oct4 expression (Hattori, Nishino et al. 2004). The role of chaperones in hESC differentiation has not been tested, but we anticipate that they will have a role in pluripotent cells based on H3 hyperdynamics that does not seem amenable to explanation by heterochromatin formation. Very short GFP-H3FLIP halftimes (20 s) suggests that alternate explanations be investigated. We hypothesize that competition for H3 binding with non-DNA binding sites such as histone chaperones may be an explanation for short halftimes and that reduced chaperone activity may have a role in increasing binding half-times after differentiation.

Example 9

Detection of High Chaperone Levels in Pluripotent hESC

Histone exchange on chromatin (increasing FRAP half time after differentiation on hESC) may be regulated by chaperone concentration in addition to chromatin condensation. FIG. 16, we show that the nuclear chaperones NAP1 and ASF1 are present in higher concentrations in pluripotent human embryonic stem cells (hESC) than in differentiated hESC.

Example 10

New Methods for Resolving Antigen Masking of Chromatin Binding Proteins in Condensed Chromatin A key method for detection of proteins is immunostaining to evaluate heterogeneous hESC colonies for chromatin reorganization during differentiation. However, we have noticed that control cells including HeLa and mouse embryonic fibroblasts stain inconsistently with chromatin antibodies (FIG. 17). As a first step in determining which antigen retrieval method would improve immunofluorescence results, both pH and temperature parameters were varied while the citrate buffer was held constant. Results from these experiments showed optimal HDAC staining with hot citrate at pH 6.0 for 30 min, but this condition produced poor immunostaining of H3K9-3Me. H3K9-3Me staining was optimal in cold citrate, pH 7.4 for 5 min. However, not all cells stained positively for H3K9-3Me despite the fact that the differentiated cells used should all contain heterochromatin. Given the above findings, it may be preferable to immunostain the two antigens separately. Another variable hypothesized to impact antigen retrieval included buffer type or denaturing agent. To determine which single condition would improve access to the desired antibodies (HDAC and H3K9-3Me) buffer type was varied along with pH and temperature between experiments. Follow up immunofluorescence studies revealed adequate antigen retrieval for a variety of antibodies using our methanol antigen retrieval protocol. These antibodies include H3K9me3, H3K9ach, HDAC1, HDAC2, Lamin, Crest, Oct-4, Nestin, HP1α, HP1β, NAP1, ASF1 lamin and emerin with almost 100% positive antigen staining and low cytoplasmic background staining.

Example 11

Quantitative Measurement of Heterochromatin Condensation in hESC

Chromatin condensation is significantly increased during differentiation. We made the observation that chromatin in human embryonic stem cells becomes more granular during differentiation. Further, we used known probability models for texture multiresolution decompositions to measure the granularity of stem cell colonies (Sammak, Abraham et al. 2008) and chromatin. However, there are no existing methods for determining whether textures were statistically different. We derived likelihood ratio test statistics and the probability density functions of these non-Gaussian statistics and use them to evaluate the performance of the classification test. (Mangoubi, Desai et al. 2008).See FIG. 18. The code indicates the significance level needed for rejecting the null hypothesis. The marker GFP-H2B is imaged in each of the 4 cells shown in FIG. 18 at 9 time points (Pluripotent cell A, 1-9; differentiated cell B, 10-18; differentiated cell C, 19-27; control endothelial cell D, 28-36). The results show that with a 0.95 confidence level or higher, or at the 0.05 significance level or lower, it is possible to distinguish between pluripotent class 1 and any of the other classes. The same level of success is realized with class 2, differentiated two days, which can be distinguished from any other class As for class 3, differentiated five weeks, and class 4, somatic endothelial cell, they are indistinguishable as expected, while nevertheless remaining distinguishable at the same confidence level from the two other classes. In addition, the variability of each cell's self comparison along the diagonal reveals that cells remain relatively constant over time, except for Class 1 (pluripotent cell; 1-9), suggesting that chromatin in pluripotent cells is dynamic over time, unlike the differentiated and somatic cell.

Example 12

Application of the Likelihood Ratio Statistic to Stem Cell Nuclei

Human embryonic stem cells (hESC, line UC06 from the NIH-approved registry) were grown under standard conditions on mouse feeder cells. Pluripotency of hESC was routinely confirmed by immunostaining for the pluripotency marker, Oct-4. hESCs were induced to differentiate for up to 5 weeks by plating on feeder cells at half the normal density, which induced differentiation to early neuronal lineages as determined by the neural marker, nestin. We visualized chromatin in living cells with a fluorescent histone that bound to DNA. Cells were transiently transfected with a plasmid expressing the histone H2B labeled with the fluorescent protein GFP. 4-D movies were acquired with a spinning disk microscope (Perkin Elmer) using a 40×1.3NA Nikon objective with a resolution of 0.2 µm. We observed that nuclei in pluripotent cells were small and chromatin was generally smooth textured (FIG. 18A). During differentiation (FIG. 18B) we found that chromatin became more granular and did not vary over time, unlike pluripotent cells. By 5 weeks (FIG. 18C), differentiated stem cells were nearly as granular as an adult human vascular endothelial cell (FIG. 18D). Pluripotent nuclei are physically very plastic and become less compliant during differentiation due in part to chromatin condensation. The bright fluorescent regions within the nuclei that we observed reflect compact chromatin supercoiling which limits accessibility of DNA to soluble proteins. Chromatin condensation is biologically significant because transcription factors and activators need to have access to DNA in order to express genes. The granularity of chromatin therefore reflects the segregation of the nucleus into domains of high density (bright areas, heterochromatin) and low density (dim areas, euchromatin). Since heterochromatin generally contains silenced genes, texture analysis provides a direct measure of the degree of gene silencing by chromatin remodeling. In the next step, the performance of the likelihood ratio statistic was evaluated.

FIG. 18E shows nuclear images of 4 cells at first time in a time-lapse series of 9 images over a 10-minute duration. The last two classes are very close and are expected to be indistinguishable. Of utmost importance is the ability to identify totally pluripotent nuclei, while minimizing false positives. FIG. 19 plots the probability of correctly identifying such a nucleus, against the probability of misclassifying a differentiated nucleus from each of the other three classes as pluripotent. Each differentiated class is shown by a separate curve. It is shown, for instance, that for a probability of misclassification of less than 0.05, we have a correct classification of larger than 0.95, for any of the three alternate classes.

Pairwise comparison of cells from various classes is shown in FIG. 20. The marker GFP-H 2B is imaged in each of the 4 cells shown in FIG. 18 at 9 time points (Pluripotent cell A; differentiated cell B; differentiated cell C; control endothelial cell D). Because the cells from each class carry the same color, and cells are segregated by colors, the results show that the likelihood ratio test's statistic described in Equation (11) enables clear separation between cells of distinct classes.

Example 13

Analysis of Object, Boundary, Region, Texture and Non-Homogeneous Textures that Vary Along a Radial Axis A simultaneous denoising and segmentation energy functional algorithm has been developed and applied to the stem cell images, as shown in FIG. 28. Top row images are for a differentiated cell and second row for a pluripotent cell. First column is raw image. Outputs of the algorithm are a pair of images: smoothed (second column) and an associated edge image (third column). Visual edge image comparison yields significant attributes of the raw image that can be exploited for characterizing the status of the cell. Cell boundary provides strong edges and an algorithm was developed to determine the segmentation of the image and the determination of cell boundary as shown in column 4. Such a delineation of cell boundary and its interior enables us to focus on the key parts of bigger image and derive attributes of cell such as (a) shape aspects of the boundary and (b) the image intensity attributes of the interior, besides the textural attributes also addressed in this report elsewhere. We also investigate the regional variation of edge map in the interior. We find that regional variation of map strength is the most distinguishing feature. The dominant effort has been to explore the border attributes and their difference between different classes of stem cells. The visual scan of movies of the two classes of cells shows the need to extract the shape features, such as deviation from spherical shape as well as protuberances from smooth ellipticity. FIGS. 29 and 30 show two such measures for images from movies of pluripotent and differentiated stem cells. The solidity measure is a measure of deviation from convexity and represents fraction of pixels of convex hull of region that are also in the region. Second measure is eccentricity (of the best fitting ellipse derived from second moments). These measures are integrated measures of the overall shape. Localized attributes of shape variation can be variously attempted. One such method was to associate distance from center of gravity of the border and it yields 1D signal with each point on the boundary. FIG. 31 shows the distance plots for pluripotent and differentiated cells. Various higher order attributes of variation also can be derived. FIG. 32 shows the wavelet attributes of variability of distance. Shown are the intensities of wavelet coefficient variations at different scales for the borders of images in the movies of the pluripotent and differentiated cells with x axis representing the order of images in the movie. The intensities are an integrated measure of the variability over entire border. Attributes at a finer level of variation along the border may be derived and can be variously used besides the static case of classification. These may be further used for kinetic studies. FIG. 33 shows the edge strength near a small region around the border of pluripotent and differentiated cells in the movies. The edge feature relates to chromatin distribution in the interior. FIG. 34 shows the attributes of the onion-layer analysis. Eroding length is the depth of erosion from R to R'.

Example 14

Classification of hESC Colonies Using Multiresolution Non-Gaussian Statistical Texture Methods Described herein is a hierarchical classification algorithm that fuses existing texture-based methods with a window-based decision algorithm that segments and classifies inhomogeneous colony images. Homogeneous biological images can be grouped according to texture by comparison of their statistical features at differing scales (i.e., statistical multiresolution analysis). We employ image windowing techniques in order to apply these texture-based classification methods to homogeneous subregions within inhomogeneous images. We validate this approach via examination of algorithm outputs from known pluripotent colonies and then accommodate observed textural variation within a class (e.g., the pluripotent cells) through the use of a colony texture library. Via comparison with this library, a k-nearest neighbor algorithm may be used to classify individual windows. Texturally inhomogeneous windows represent colony-level ambiguities in our classification algorithm, which we identify by introducing a spatial reasoning decision method which is based on prior biological and statistical information. We then resolve these ambiguities by further subdividing the affected windows for textural assessment at a finer scale. This hierarchical algorithm for window management allows us to rapidly segment and classify inhomogeneous hESC colony images without resorting to specialized and computationally intensive border-detection algorithms. Identification of pluripotent colony windows by this algorithm is highly accurate (~99% accurate).

Texture in hESC Colony Images

We classify hESC colonies according to texture, which we consider to be the variational pattern in image grey level intensity observed while traversing an image. Image texture analysis shows great promise for automatic classification of hESC colonies since visually apparent changes occur as a colony undergoes differentiation.

Compare the textural characteristics of the pluripotent and differentiated hESC colonies displayed in FIG. 21. These colonies are derived from hESC line and imaged via phase-contrast microscopy. The pluripotent colony (A) exhibits a fine-grained, homogeneous texture within a crisp, clearly defined, and nearly circular border, while the differentiated colony (B) exhibits a noticeably heterogeneous texture within a vague, irregularly shaped border. Indeed, the texture of (B) is characterized by well-defined cellular clumps separated by thin, loose regions. The textural variation may be illustrated numerically by the horizontal line scans in (C) and (D). While both scans display an essentially random series of peaks and valleys in image grey-scale level, the fine-grain of the pluripotent hESC colony is shown by the lesser mean distance between these peaks (i.e., higher frequency). We exploit the statistical variation in grey level of multiple image scales in order to classify the regions of an image according to texture.

This approach is validated through chemical testing, as is demonstrated in FIG. 1, which shows a single colony in which spontaneous differentiation has recently begun along the colony's border; this colony thus has both pluripotent and differentiated regions. This colony derived from hESC line UC06 and was grown on mouse fibroblast feeder cells. In (A), it has been imaged at low magnification (10× objective, bar is 100 µm) via phase-contrast microscopy. The white box in (A) is expanded in (B) and shown after immunocytochemistry in (C).

Applied immuno markers indicate pluripotency (Oct-4 transcription factor in the nucleus), differentiation (cytoplasmic intermediate filament protein, nestin characteristic of neurectoderm and neural stem cells), and nuclei (Toto3, a DNA binding die to show nuclei). The immuno markers applied in (C) confirm the previous observation that pluripotent cells are comparatively small and densely packed, forming a homogeneous, fine-grained colony texture, while the colony's differentiated regions appear loose and heterogeneous. These visually apparent changes in colony morphology are the direct result of the physical changes (e.g., size, shape, adhesivity, etc.) pluripotent cells undergo as they begin to spontaneously differentiate. Since visual characteristics correlate to cellular differentiation, visual inspection allows a trained microscopist to classify a colony according to quality. We leverage two of the characteristics used when visually gradnig hESC colony quality, textural homogeneity and tightness (i.e., fineness of grain) to distinguish pluripotent and differentiated hESC colony regions both from one another and from the colony's exterior.

Classification of images of hESC colonies, using a top-level hierarchical algorithm, may be performed in series of steps (FIG. 22):

Step 0: Image Texture Library

Before image classification begins, we develop an image texture library, which is a library of texture models corresponding to the pluripotent, differentiated, and exterior image regions will serve as an input to k-Nearest Neighbor Window Classification.

Since we intend to classify an image window via comparison with known examples, we create an image texture library prior to commencing the hierarchical classification algorithm. Thus, we specify a family of related texture models rather than relying upon a single, representative model for each textural class. The decision to employ a library is partly motivated by the textural heterogeneity of the differentiated windows, which makes it difficult to identify one representative texture. Furthermore, this removes the necessity to create a reference model for each texture encountered by the algorithm, e.g., certain exterior textures are not represented in our library. There is no need to include them since they resemble the library exterior to a greater degree than they resemble the pluripotent or differentiated windows.

FIG. 23 graphically illustrates an image texture library as a matrix in which color indicates the degree of textural similarity between windows. Color ranges from blue (similar) to red (very dissimilar); thus, the diagonal elements are each dark blue as each window is texturally identical to itself. (The color scale is determined by the summed KLD, described in Step 5, and is indicated on the right.). The various distinct textures contained in the library may be identified by the bluish blocks which cluster along the diagonal. From top left to bottom right, these blocks represent the differentiated texture, three distinct colony exterior textures, and two distinct pluripotent textures. Color variation outside the diagonal blocks indicates the degree of similarity between texture classes. Thus, the first class (differentiated) bears resemblance to the last class (a subclass of pluripotent). The color scheme also indicates the degree of homogeneity within a class. The pluripotent blocks (on the bottom right) are a relatively uniform blue and thus tend to "look like" one another, while the differentiated windows (top left block) exhibit significant variation.

In our implementation, we built our initial library from two randomly selected images, one pluripotent and one differentiated. Textural models were developed for each window in the image using the tools in Step 3 and then manually grouped into classes, comprising the first (differentiated), second (exterior), third (exterior), and fifth (pluripotent) blocks in FIG. 23. Preliminary analysis using this library revealed two distinct failure modes; recognizable pluripotent and exterior texture classes were absent from the library images and consistently misidentified as differentiated. In order to rectify this error, we randomly selected two images containing these textures. Representative windows were added to the library and comprise the fourth (exterior) and sixth (pluripotent) blocks.

Step 1: Multiresolution Decomposition of Input Image

We begin by calculating the input image's wavelet pyramid decomposition, which will be used in Step 3 to model the local texture of the image. Recent work has shown that image texture may be quite effectively characterized in terms of the statistical properties of an image's wavelet pyramid decomposition. Wavelet analysis decomposes a signal (e.g. texture, as represented by grey scale level) locally according to direction and scale. This is especially apt when characterizing image texture, which is defined by variations in grey level.

Rather than decompose each image window separately (cf. Step 2), we calculate one wavelet decomposition for the entire image and later isolate the subband coefficients corresponding to a particular window. This greatly enhances computational efficiency with little observed impact to texture modeling accuracy. Together, the choice of mother wavelet and maximum window size determine the maximum level of decomposition. In our current implementation, we use the Daubechies-4 wavelet and have a maximum window size of 256×256 pixels, yielding a maximum of five decomposition levels.

Step 2: Hierarchical Image Windowing

The texture modeling tools we employ in Step 3 assume that texture is uniform across the image under consideration. We introduce hierarchical image windowing in order to employ these techniques to heterogeneous hESC colony images. In our first pass through an image, we subdivide it into non-overlapping windows of equal size; windows that do not encompass a textural transition (e.g., the border between the colony exterior and interior) are texturally homogeneous and thus may be classified independently.

Texturally inhomogeneous windows present ambiguities to the classification algorithm; the feedback path in FIG. 22 exists to identify these ambiguities (Step 5) and resolve them via subsequent passes through the Step 2: Hierarchical Image Windowing and Step 4: k-Nearest Neighbor Classification algorithms. On subsequent passes, we further subdivide these inhomogeneous windows into smaller ones, which are still non-overlapping and of equal size. By hierarchically refining our windowing about textural transitions, we segment an image with as much precision as our smallest windows allow.

In our current implementation, we subdivide suspected inhomogeneous windows via quartering, and allow three total passes through the classification routines. Thus, we classify using window sizes of dimension 256×256, 128×128 and 64×64 pixels. Below this scale, the features characterizing the textures (e.g., cellular clumps in the differentiated texture or the white lines in certain pluripotent regions) become on the order of the window size and our textural model becomes inapplicable.

Step 3: Window Texture Modeling

We model texture according to the probabilistic distribution of the coefficients in the detail subbands of a window's wavelet decomposition. Since these distributions are unknown a priori, we follow [5] and [6] by modeling them using a Generalized Gaussian distribution (GGD):

$$p(x; \alpha, \beta) = \frac{\beta}{2\alpha\Gamma(1/\beta)} x^{-(|z|/\alpha)^x} \quad (25)$$

Here, x is a particular wavelet coefficient and $\alpha$ and $\beta$ are, respectively, the width factor and shape parameter of the GGD. As the image is normalized according to the mean and standard deviation of its gray-scale level prior to performing the wavelet decomposition, the location parameter, or process mean, is zero.

The GGD is an especially apt model for an unknown distribution as it may be used to represent a large family of symmetric, unimodal density functions. For instance, the parameters $(\alpha, \beta)=(\sqrt{2}\sigma, 2)$ yield the standard Gaussian density function, $(\alpha, \beta)=(\sqrt{2},1)$ returns the Laplacian density, and the GGD approaches the uniform density as $\sigma$ approaches infinity. Note that Q is the standard deviation; for a GGD process, it is may determined thus:

$$\sigma = \alpha \left( \frac{\Gamma(3/\beta)}{\Gamma(1/\beta)} \right)^{\frac{1}{2}} \quad (26)$$

Our parametric, statistical texture model, then, is simply the set of $\alpha$ and $\beta$ GGD parameters that best characterize the coefficients in each of the detail subbands of the image's wavelet decomposition. Since an n-level decomposition of an M×M pixel window yields 3n detail subbands, the window feature vector consists of 3n $\alpha$ and $\beta$ pairs (and hence is of length 6n) Various algorithms exist for estimating these parameters, including moment matching techniques [5] and iterative maximum likelihood estimation routines [6], [7]. In practice, we prefer the former; both techniques are of comparable accuracy, but the moment matching technique proves far more computationally tractable.

Note two assumptions that underlie the above model. The first is that wavelet detail coefficients are independent across subbands, and the second is that no useful texture information remains in the approximation subband. While recent research has attempted to lift the former assumption by employing hidden Markov models [8], hESC colony textures exhibit little of the directionality that such algorithms attempt to model. To approximate the second assumption as nearly as possible, we continue the wavelet decomposition to the maximum practical number of levels for a particular window size, thus minimizing the residual approximation space.

Step 4: k-Nearest Neighbor Window Classification

Using the image texture library developed above, we classify unknown windows via a k-nearest neighbor algorithm. Conceptually, such an algorithm is quite simple.

1. Compute the divergence from the unclassified window to each of the library windows.
2. Select the k library windows with the smallest distance to the unclassified window (i.e., the nearest neighbors) and allow them to "vote" on its class.
3. Assign the unknown window to the class which receives the most "votes."

In order to aid in rejecting ambiguous cases, we introduce an additional parameter $k_n$, such that the results of Step 3 are only accepted if the number of "votes" equals or exceeds $k_n$. (Naturally, we require that $k \geq k_n$.) Likewise, it is also prudent to screen out an unknown window whose KLD to the library windows exceeds a certain ceiling in order to reject a window whose texture is not defined in the library. In practice, however, we have found that classification is quite robust to the choice of k, $k_n$, and the KLD ceiling.

To address divergence between image texture models, we follow techniques developed for content-based image retrieval and compare the texture of two windows using the information divergence (i.e., Kullback-Leibler divergence or KLD) between the GGD processes represented by the feature vectors. While there are other divergence measures (e.g., the L1 divergence $\int |f1-f2|$), the information divergence is especially convenient as it admits a tractable closed form solution between two GGDs.

Consider a test window with feature vector $x_t$ and a library window with feature vector xt. The feature vectors are defined as above, so $x = \{\alpha^b \cup \beta^b\}$ for b=1, ..., 3n. For a given subband b, the KLD between the test and library GGD processes at that subband is [6]:

$$D(x_t^b \| x_l^b) = \int p(x; \alpha_t^b \cdot \beta_t^b) \log \frac{p(x; \alpha_t^b, \beta_t^b)}{p(x; \alpha_l^b, \beta_l^b)} dx \quad (27)$$

$$= \log\left(\frac{\beta_t^b \alpha_l^b \Gamma(1/\beta_l^b)}{\beta_l^b \alpha_t^b \Gamma(1/\beta_t^b)}\right) + \left(\frac{\alpha_t^b}{\alpha_l^b}\right)^{\beta_l^b} \frac{\Gamma((\beta_l^b+1)/\beta_t^b)}{\Gamma(1/\beta_t^b)} - \frac{1}{\beta_t^b}$$

The total distance between the two feature vectors, then, may be determined from the weighted sum of the individual KLDs at each subband:

$$KLD(x_t, x_l) = \sum_{b=1}^{3n} k_b (D(x_t^b \| x_l^b) + D(x_l^b \| x_t^b)) \quad (28)$$

Since, in general, $D(x\|y) \neq D(y\|x)$, the terms $D(x_t^b \| x_l^b)$ and $D(x_l^b \| x_t^b)$ are added together to regularize the distance. Likewise, $\{k\}$ is just the set of weights assigned to the particular subbands. We set these weights to one, but they could be used to emphasize or penalize particular subbands in response to prior knowledge possessed by the analyst. We refer to this metric as the "summed KLD."

At this stage, we may generate a classified image from the classified windows. However, image segmentation precision is limited by window size, since we can only detect a transition in texture (e.g., the transition between a texture characteristic of a colony exterior to a pluripotent hESC texture) at window borders. To increase the precision of image segmentation, we refine our classification, according to Steps 5 and 6.

Step 5: Spatial Reasoning for Texture Border Detection

We develop spatial reasoning rules to identify the ambiguous, texturally inhomogeneous windows which become candidates for assessment at reduced scale in subsequent passes through the classification algorithm. The first, most obvious, rule is to select any window that fails the k-nearest neighbor classification algorithm; inhomogeneity often leads to statistical anomalies in coefficient distribution which prevent a window from being reliably matched to any texture in the library. However, this rule alone is insufficient for accurate image segmentation. As differentiated hESC regions are, in fact, characterized by a certain textural looseness and inhomogeneity, windows which straddle a textural border are thus prone to being miscategorized as differentiated. Along the textural transition corresponding to the colony border, this is especially undesirable. Differentiation often begins in this region, and such all error is likely to cause a researcher to believe that colony-wide differentiation is imminent. This observation motivates our second, spatial reasoning rule: any window classified as differentiated that borders upon a window of another class is automatically selected for further analysis at finer scale. If desired, one could similarly target the pluripotent or exterior windows along a textural border, but our experience has shown that any improvement in performance is rarely justified in light of the increased computational expense.

Step 6: Go to Step 2, further subdividing the identified textural border windows.

Results

Hierarchical classification allows us to segment inhomogeneous images according to texture in a computationally efficient manner. By setting the initial window size to be fairly large, we may quickly identify texturally homogeneous regions. By identifying texture border windows and targeting them for further analysis, we may precisely segment an inhomogeneous image. The ultimate precision of this method is equal to the smallest size window employed, that is, the number of iterations of Step 6.

Our algorithm classifies inhomogeneous hESC colony images with a high degree of success. Pluripotent windows are identified with high accuracy (typically above 99%), and differentiated and exterior windows are identified at approximately 89% and 96% accuracy, respectively. As hESC colonies differentiate, they become more diffuse, making it difficult to distinguish the differentiated and exterior textures. This accounts for the lower differentiated success rate. Typical results are given in Table I. Furthermore, misclassified differentiated windows are almost invariably identified as colony exterior. The exterior texture is due to extracellular matrix protein needed to promote cell attachment to the glass or plastic substrate on which the cells are cultured. The visible protein aggregates are not necessary for attachment and result from non-uniformity of the extracellular matrix protein. For large scale hESC cultivation, it is important to prevent misidentified differentiated cells from contaminating pluripotent colonies. Table II shows a typical distribution of misclassified windows.

TABLE I

Typical Classification Accuracy; classification, parameters: k = 7, $k_n$ = 5, Daubechies-4 wavelet, window size is 64 × 64 pixels

|  | Accuracy | 90% Conf. Int. |
| --- | --- | --- |
| Pluripotent | 0.996 | [0.9812, 0.9986] |
| Differentiated | 0.892 | [0.8547, 0.9196] |
| Exterior | 0.968 | [0.9432, 0.9812] |

TABLE 11

Typical Misclassified Windows, Sample Size is 250; classification parameters: k = 7, $k_n$ = 5, Daubechies-4 wavelet, window size is 64 × 64 pixels

|  | Errors | Pluri. | Diff. | Ext. | Unknown |
|---|---|---|---|---|---|
| Pluripotent | 1 | — | 0 | 1 | 0 |
| Differentiated | 27 | 0 | — | 19 | 8 |
| Exterior | 8 | 5 | 3 | — | 0 |

Lastly, our algorithm serves to segment inhomogeneous hESC colony images according to texture with as much precision as the window size allows. If further precision is required, our algorithm may serve as an initial condition for another segmentation algorithm. See FIG. 24 for an example of a classified image.

These results were obtained from testing upon a set of twenty-five pluripotent and fourteen differentiated hESC colony images. As described in Step 0: Image Texture Library, library windows were taken from four images, three pluripotent and one differentiated, cultivated under the same conditions. After classifying each test image using our algorithm, we randomly sample 64×64 pixel windows from within this population to derive statistical results. Sample size is 250 windows, which is approximately 0.7% of the population.

A Demonstration of the Hierarchical Algorithm for Texture-Based hESC Colony Classification The course of the hierarchical algorithm for texture-based algorithm is illustrated in FIG. 25. The initial, heterogeneous image is given in (A). The first pass through Steps 1 through 4 uses 256×256 pixel windows and is illustrated in (B). Here, we colorize the image according to the output of Step 4: k—Nearest Neighbor Window Classification. In (C), we show the output from Step 5: Spatial Reasoning for Textural Border Detection; note that the spatial reasoning logic has reclassified the differentiated (green) windows as unknown (gold). In (D), we show the output from the second pass through Steps 2 through 4, which uses 128×128 pixel windows. Similarly, (E) shows the second pass through Step 5. On the third pass through Steps 2 through 4, the algorithm uses 64×64 pixel windows. This is the smallest window size we permit; consequently, the output from the third pass through Step 4 is the output of the entire algorithm and is shown in (F).

Algorithm Robustness to Variations in Classification and Modeling Parameters

The results given in Table I are fairly robust to variations in the classification and modeling parameters. This is demonstrated in Table III, which repeats this analysis while varying the k-nearest neighbor parameters k and $k_n$ (cf. Step 4: k-Nearest Neighbor Window Classification). Save for one exception, variation in classification accuracy is approximately one percent. That exception is the differentiated texture for k=$k_n$=3, i.e., the case in which the nearest three library textures to an unknown window must share the same class. As FIG. 23 demonstrates, several pluripotent and exterior library windows bear a resemblance to the differentiated texture making this requirement a difficult one. Similarly, Table IV shows robustness to the primary modeling parameter, the mother wavelet used for image decomposition. Again, classification performance for pluripotent and exterior is relatively constant, while the differentiated texture shows the most variation.

TABLE III

Robustness to Variation in Classification Parameters; window size is 64 × 64 pixels, Daubecheis-4 wavelet.

| k | $k_n$ | Pluripotent Accuracy | Pluripotent 90% Conf. Int. | Differentiated Accuracy | Differentiated 90% Conf. Int. | Exterior Accuracy | Exterior 90% Conf. Int. |
|---|---|---|---|---|---|---|---|
| 1 | 1 | 0.996 | [0.9812, 0.9986] | 0.900 | [0.8637, 0.9264] | 0.952 | [0.9237, 0.9691] |
| 3 | 3 | 0.996 | [0.9812, 0.9986] | 0.868 | [0.8282, 0.8987] | 0.964 | [0.9383, 0.9782] |
| 3 | 5 | 0.992 | [0.9751, 0.9967] | 0.908 | [0.8727, 0.9332] | 0.960 | [0.9334, 0.9752] |
| 5 | 7 | 0.996 | [0.9812, 0.9986] | 0.892 | [0.8547, 0.9196] | 0.968 | [0.9432, 0.9812] |

TABLE IV

Robustness to Variation in Modeling Parameter (Mother Wavelet); window size is 64 × 64 pixels, k = 7, $k_n$ = 5

| Wavelet | Filter Length | Pluripotent Accuracy | Pluripotent 90% Conf. Int. | Differentiated Accuracy | Differentiated 90% Conf. Int. | Exterior Accuracy | Exterior 90% Conf. Int. |
|---|---|---|---|---|---|---|---|
| Daubechies-2 | 4 | 0.976 | [0.9534, 0.9868] | 0.952 | [0.9237, 0.9691] | 0.976 | [0.9534, 0.9868] |
| Symlet-2 | 4 | 0.976 | [0.9534, 0.9868] | 0.952 | [0.9237, 0.9691] | 0.976 | [0.9534, 0.9868] |
| Biorthogonal 1.3 | 6 | 0.984 | [0.9639, 0.9921] | 0.892 | [0.8547, 0.9196] | 0.972 | [0.9483, 0.9840] |
| Coiflet-1 | 6 | 1.000 | — | 0.912 | [0.8772, 0.9366] | 0.972 | [0.9483, 0.9840] |
| Reverse Biorthogonal 1.3 | 6 | 1.000 | — | 0.908 | [0.8727, 0.9332] | 0.972 | [0.9483, 0.9840] |
| Daubechies-4 | 8 | 0.996 | [0.9812, 0.9986] | 0.892 | [0.8547, 0.9196] | 0.968 | [0.9432, 0.9812] |
| Symlet-4 | 8 | 0.996 | [0.9812, 0.9986] | 0.916 | [0.8818, 0.9399] | 0.972 | [0.9483, 0.9840] |
| Biorthogonal 2.4 | 10 | 0.992 | [0.9751, 0.9967] | 0.848 | [0.8063, 0.8810] | 0.964 | [0.9383, 0.9782] |
| Reverse Biorthogonal 2.4 | 10 | 0.992 | [0.9751, 0.9967] | 0.868 | [0.8282, 0.8087] | 0.964 | [0.9383, 0.9782] |

TABLE IV-continued

Robustness to Variation in Modeling Parameter (Mother Wavelet); window size is 64 × 64 pixels, k = 7, $k_n$ = 5

| Wavelet | Filter Length | Pluripotent | | Differentiated | | Exterior | |
|---|---|---|---|---|---|---|---|
| | | Accuracy | 90% Conf. Int. | Accuracy | 90% Conf. Int. | Accuracy | 90% Conf. Int. |
| Coiflet-2 | 12 | 0.984 | [0.9639, 0.9921] | 0.856 | [0.8150, 0.8881] | 0.956 | [0.9285, 0.9722] |
| Daubechies-8 | 16 | 0.980 | [0.9586, 0.9895] | 0.848 | [0.8063, 0.8810] | 0.956 | [0.9285, 0.9722] |

Segmentation of Classified Images

To classify an inhomogeneous hESC colony image, our hierarchical algorithm segments the image according to texture to the precision allowed by the smallest window size (64×64 pixels). While precise image segmentation is not our objective, rough segmentation is necessary to apply texture-based classification techniques to inhomogeneous hESC colony images. If further precision is required, the output from our algorithm may serve as an initial condition to some more sophisticated pixel-level segmentation algorithm. As examples of texture-based segmentation, see FIGS. 26 and 27.

Verification of the Hierarchical Classification Algorithm

To efficiently verify the hierarchical classification algorithm prior to laboratory use, we recommend Wald's Sequential Probability Ratio Test (SPRT) and will briefly review it below [9]. The SPRT is a hypothesis test; we use it to determine whether the true classification performance θ for some texture type (e.g., pluripotent) is above some acceptable threshold $\theta_1$ or below some unacceptable threshold $\theta_0$. Thus:

$H_0: \theta < \theta_0$ $H_1: \theta > \theta_1$ (29)

The region between $\theta_0$ and $\theta_1$ is termed the indifference region. The SPRT decides between the two hypotheses by testing randomly-chosen samples until their joint log-likelihood ratio exceeds some threshold. Testing in this manner economizes the number of required samples, which is especially important to hESC cultivation; sample evaluation is likely to require the destructive chemical testing of a portion of the colony.

We begin the SPRT by testing a randomly selected window (whether chemically or by visual inspection) against the algorithm output. There are two possible outcomes; either the test and algorithm agree ($x_i=1$) or they do not ($x_i=0$). This a Bernoulli trial, whose prior pdf for test i and hypothesis $\theta_j$ is:

$f(x_i|\theta_j) = \theta_j^{x_i}(1-\theta_j)^{1-x_i}$ (30)

Admissible values are x=0, 1.

For k samples, the log-likelihood ratio $\Lambda_k$ is:

$$\Lambda_k = \log\frac{p_1(\{x_k\})}{p_0(\{x_k\})}$$ (31)

$$= \log\sum_{i=1}^{k}\frac{\theta_1^{x_i}(1-\theta_1)^{1-x_i}}{\theta_0^{x_i}(1-\theta_0)^{1-x_i}}$$

Note that the term under summation admits two values, one negative for $x_i=0$ and one positive for $x_i=1$ (assuming that $\theta_1 > \theta_0$). These terms may be computed off-line, and $\theta_k$ may be updated after each iteration of the SPRT simply by adding or subtracting the correct term.

The SPRT begins by initializing $\theta_k=0$ and ends when it falls outside the interval [A,B]. These stopping criteria may be computed as functions of the probability α of a false positive (e.g., return $H_1$ when $H_0$) and the probability β of a miss (e.g., return $H_0$ when $H_1$). Wald gives the following approximation:

$$A = \log\frac{\beta}{1-\alpha}$$ (32)

$$B = \log\frac{1-\beta}{\alpha}$$

These bounds are calculated from inequalities and are thus slightly conservative.

For the above test, [10] estimates the expected test length N:

$$E\{N|H_0\} \approx \frac{1}{\mu 0}\left[(1-\alpha)\log\frac{\beta}{1-\alpha} + \alpha\log\frac{1-\beta}{\alpha}\right]$$ (33)

$$E\{N|H_1\} \approx \frac{1}{\mu 1}\left[\beta\log\frac{\beta}{1-\alpha} + (1-\beta)\log\frac{1-\beta}{\alpha}\right]$$

$$\mu_t = E\left\{\log\frac{p_1(x)}{p_0(x)}\bigg|H_t\right\}$$ (9)

Table V shows the expected test length as a function of α and β. Note that the test converges more rapidly given H0 since the magnitude of the log-likelihood term is greater for $x_i=0$ than for $x_i=1$.

TABLE V

Expected SPRT Test Length; $\theta_0$ = 0.8, $\theta_1$ = 0.95, to the left of the slash is expected test length assuming $H_0$, to the right assuming $H_1$

| α\β | 0.05 | 0.10 | 0.15 |
|---|---|---|---|
| 0.05 | 18.96/28.21 | 14.27/26.83 | 11.53/25.70 |
| 0.10 | 17.00/20.03 | 12.58/18.71 | 10.01/17.64 |
| 0.15 | 15.25/15.19 | 11.09/13.93 | 8.69/12.93 |

Example 15

Brightfield Time-Lapse Microscopy of mESC Colony Growth and Death

Mouse embryonic stem cell (mESC) division and death occur at high frequency during colony expansion. A small colony of adherent mESC cells was observed by time-lapse Hoffman modulation contrast microscopy for 41 hrs (FIG. 36). Total number of cells increase for 35 hours until the culture media is exhausted. Although mitotic indices were high, ranging from 11 to 36%, death rates were also high, limiting colony expansion. A majority of cell deaths occurred just after telophase.

Example 16

Change in Cell Volume During Differentiation

Cell volume changes during differentiation (FIG. 37). Human ESCs from line UC06 were grown on low-density feeder fibroblasts, after which they were observed to differentiate into neurectodermal cells.

HESC were labelled with Yoyo-1(DNA) and Wheat Germ Agglutinin ( plasma membrane marker) in a colony where differentiation had been initiated at the edges (top of FIG. 37A) and confocal images were acquired.

The confocal stack of nuclear images was reconstructed into 3-D volumes and the surface area and volume of individual cells and clusters were measured.

Example 17

Use of Confocal Microscopy to Measure Movement of Nuclei and Chromatin in hESC Pluripotent and differentiated nuclei show dramatic chromatin mobility over time, with an increase in stability of nuclei observed in differentiated cells. A time-lapse series over 60 min was acquired with confocal images of the fluorescently labeled histone, GFP-H2B. FIG. 38 shows images taken from pluripotent hESCs (FIG. 38A) and differentiated hESCs (FIG. 38B). Images are maximum projections of the confocal stack acquired with a spinning disk confocal microscope. The center of mass of the nuclear images was aligned to compensate for whole cell movement.

protein complexes can be measured by FRET-FLIM of fluorescent proteins and DNA (FIG. 41). In Hela cells, 62% of H2B is in tight proximity with other H2B molecules and with DNA, suggesting high levels of DNA compaction.

Materials and Methods

General Methods:

Cell culture and transfection: hESCs, lines UC06 (UCSF) and WA07 (Wisconsin) were maintained in DMEM high glucose with 20% Knock-Out Serum replacer and passaged as provider recommends. hESCs were grown on mitomycin-treated mouse embryo fibroblasts prepared from 14-d CF-1 embryos. Colonies were passaged mechanically in clusters of 50-100 cells on feeder layers. Media was changed every other day and colonies were passaged weekly at a 1:2 to 1:3 split. Differentiation on low-density feeder cells produced 90% neuronal progenitor cell cultures after 2-4 weeks. Stable transfections were produced by published methods (Vallier, Rugg-Gunn et al. 2004) using blasticidin as a selection marker for H2B transfectants. Stable stem cell lines produced by lentiviral transfection (transgene backbone with the ubiquitin promoter (Lois, Hong et al. 2002). Immunocytochemistry and confocal microscopy: Cells were grown in plastic dishes and fixed with 3.7% formaldehyde for 20 m, followed by 3× wash in PBS and permeablized in PBS containing 0.1% Triton X-100 for 20 min. Samples were blocked in PBS containing 5% goat serum and 0.3% BSA for 30 min and immunostained with primary antibody for 1 hr at 37 C. After a 3×PBS wash, secondary antibodies (Alexa 488/546 IgG, Molecular Probes) were applied for 1 hr at 37 C with the DNA dyes, Hoechst and TOTO-3. After 3× wash, cells were mounted with Vectaslield and #1 coverglass. Next, dish walls were removed and the bottom mounted on a microscope slide. Some samples were prepared on glass coverslips and mounted directly.

| Antigen | Location | Antibody | Source | Number | Dilution |
|---|---|---|---|---|---|
| CREST | Centromeres | Human polyclonal | Gift - Dr. Cal Simerly | | N/A |
| H3 acetyl lys9 | Euchromatin | Rabbit polyclonal | Upstate Biotech | 06-599 | 1:200 |
| H3 TriMe lys9 | Heterochromatin | Rabbit polyclonal | Upstate Biotech | 07-030 | 1:100 |
| lamin A/C | Nuclear laminae | Rabbit polyclonal | Santa Cruz | sc-20681 | 1:100 |
| nestin | Neural progenitor | Rabbit polyclonal | Ab Cam | AB 7659 | 1:100 |
| nuclear porins | Nuclear laminae | Mouse monoclonal | Covance/Babco | MAb414 | 1:250 |
| Oct-4 | Pluriotent stem cells | Mouse monoclonal | Santa Cruz | | 1:100 |
| Pax-6 | Neural progenitor | Rabbit polyclonal | Covance | PRB 278 P | 1:200 |

Example 18

Progressive Assemby of Heterochromatin in hESCs During Differentiation

Heterochromatin is progressively assembled in hESC during differentiation. In pluripotent cells, only half of pericentric domains contain H3K9me3 and almost no detectable MeCpG (FIG. 11). Regulatory enzymes responsible for histone and DNA modification change during differentiation. DNMT3a and b become undetectable in differentiated cells (FIGS. 39A, B) and HDAC 1 and 2 are spatially uncorrelated in pluripotent but not differentiated cells (FIGS. 41C, D) and increase 2-fold. MeCP2, the DNA binding protein that directs the HDAC-NuRD complex to methylated DNA, increases 3-fold during differentiation and may be responsible for the change in HDAC distribution by altering binding affinity of the complex for DNA (FIG. 40). The HMT, SUV39H1 decreases 3.5-fold during differentiation. DNMTs, HDACs and HMTs involved in initiation rather than maintenance of methylation are most active in pluripotent cells. Binding of Time Lapse Confocal Microscopy:

Live cells were imaged by real-time-spinning disk confocal microscopy (Perkin Elmer Ultraview LCI equipped with a Krypton-Argon ion laser) to minimize photobleaching and to discriminate nuclei movement in multilayered ES cell colonies. GFP-H2B transfected cell colonies in Matek glass bottomed 35 mm dishes were mounted in a chamber (Warner Instruments) perfused with humidified CO2. The Nikon TE2000E inverted microscope was enclosed in a LIS Systems temperature control chamber to eliminate thermal fluctuations and maintain focus for long-term experiments. Cells were imaged with 20× NA 0.45 plan fluor objectives, or 40× and 60× planapo 1.4 NA objectives.

Incorporation by Reference

All publications and patents mentioned herein are hereby incorporated by reference in their entirety as if each individual publication or patent was specifically and individually indicated to be incorporated by reference. In case of conflict, the present application, including any definitions herein, will control.

Equivalents

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

REFERENCES

Aapola, U., K. Maenpaa, et al. (2004). "Epigenetic modifications affect Dnmt3L expression." Biochem J 380(Pt 3): 705-13. Brockett, R., (1970) Finite Dimensional Linear Systems, Wiley, 1970.

Abeyta, M. J., A. T. Clark, et al. (2004). "Unique gene expression signatures of independently-derived human embryonic stem cell lines." Hum Mol Genet. 13(6): 601-8.

Adkins, M. W. and J. K. Tyler (2004). "The histone chaperone Asf1p mediates global chromatin disassembly in vivo." J Biol Chem 279(50): 52069-74.

Agustin, R. Mangoubi, R. S., Hain., R., and Adams, N. (1999), "Robust failure detection for reentry vehicle control systems", Journal of Guidance, Control, and Dynamics Vol. 22, No. 6.

Ahmad, K. and S. Henikoff (2002). "Histone H3 variants specify modes of chromatin assembly." Proc Natl Acad Sci USA 99 Suppl 4: 16477-84.

Armstrong, J. A. (2007). "Negotiating the nucleosome: factors that allow RNA polymerase II to elongate through chromatin." Biochem Cell Biol 85(4): 426-34.

Astrom, K (1994), Adaptive Control, Adison Wesley, 2nd Edition, Prentice Hall.

Belotserkovskaya, R., S. Oh, et al. (2003). "FACT Facilitates Transcription-Dependent Nucleosome Alteration." Science 301(5636): 1090-1093.

Bernstein, B. E., T. S. Mikkelsen, et al. (2006). "A bivalent chromatin structure marks key developmental genes in embryonic stem cells." Cell 125(2): 315-26.

Bhattacharya, B., T. Miura, et al. (2003). "Gene Expression in Human Embryonic Stem Cell Lines: Unique Molecular Signature." Blood.

Bloom, K. (2007). "Centromere dynamics." Curr Opin Genet Dev 17(2): 151-6.

Buehr, M. and A. Smith (2003). "Genesis of embryonic stem cells." Philos Trans R Soc Lond B Biol Sci 358 (1436): 1397-402; discussion 1402.

Cai, S., H. J. Han, et al. (2003). "Tissue-specific nuclear architecture and gene expression regulated by SATB1." Nat Genet. 34(1): 42-51.

Caiszar, I. (1991) "Why least squares and maximum entropy?" An axiomatic approach to inference for linear inverse problems," The Annals of Statistics, Vol. 8, No. 4, pp. 2032-2066.

Catez, F., H. Yang, et al. (2004). "Network of dynamic interactions between histone H1 and high-mobility-group proteins in chromatin." Mol Cell Biol 24(10): 4321-8.

Chellappa, R., Kayshap, R. L., and Manjunath, B. S., Model-based texture segmentation and classification, in Chen, C. H., Pau, L., F., and Wang, P. S., editors," Handbook of Pattern Recognition and Computer Vision," World Scientific, Singapore, 2$^{nd}$ edition, 1999: 249-282.

Cheutin, T., A. J. McNairn, et al. (2003). "Maintenance of stable heterochromatin domains by dynamic HP1 binding." Science 299(5607): 721-5.

Cheutin, T., S. A. Gorski, et al. (2004). "In vivo dynamics of Swi6 in yeast: evidence for a stochastic model of heterochromatin." Mol Cell Biol 24(8): 3157-67.

Constantinescu, D. H. L. Gray, P. J. Sammak, G. P. Schatten, and A. B. Csoka (2004), Lamin A/C expression is an early marker of mouse and human embryonic stem cell differentiation. Stem Cells.

Constantinescu, D., H. L. Gray, et al. (2005). "Lamin A/C Expression is a Marker of Mouse and Human Embryonic Stem Cell Differentiation." Stem Cells: 2004-0159.

Cremazy, F. G., E. M. Manders, et al. (2005). "Imaging in situ protein-DNA interactions in the cell nucleus using FRET-FLIM." Exp Cell Res 309(2): 390-6.

Dang, S. M. and P. W. Zandstra (2005). "Scalable production of embryonic stem cell-derived cells." Methods Mol Biol 290: 353-64.

Davey, R. E. and P. W. Zandstra (2004). "Signal processing underlying extrinsic control of stem cell fate." Curr Opin Hematol 11(2): 95-101.

Deasy, B. M., R. J. Jankowski, et al. (2003). "Modeling Stem Cell Population Growth: Incorporating Terms for Proliferative Heterogeneity." Stem Cells 21(5): 536-545.

Deasy, B. M., Jankowski, R. J., Payne, T. R., Cao, B., Goff, J. P., Greenberger, J. S., and Huard, J., (2003) "Modelling Stem Cell Population Growth: Incorporating Terms of Proliferating Heterogeneity, Stem Cells, 2003; 21:536-545.

Desai, M. (2003), "Method and apparatus for analyzing spatial and temporal processes of interaction", filed patent application No. 20030194815.

Desai, M., Mangoubi, R., and Pien (2005), H "Functional MRI Activity Characterization: An Estimation and Decision Theoretic Approach," Invited chapter for theme volumes on Medical Imaging Technology 5 volume series, World Scientific World Press edited by Prof. C. T. Leondes.

Desai, M., and Mangoubi, R. (2003)," Robust Gaussian and Non-Gaussian Subspace Detection", IEEE Trans. Signal Proc., Vol. 51, No. 12.

Desai, M., and Mangoubi, R. S. (2006-1), "Robust Constrained Non-Gaussian fMRI Detection", Proceedings of the 2006 IEEE International Symposium on Biomedical Imaging, Washington, D.C., Desai, M., and R. Mangoubi (2006-3), "Robust Subspace Learning and Detection in Laplacian Noise", IEEE Trans. Signal Processing.

Desai, M., Deckert, J., Deyst, J., Willsky, A., Chow, E. (1976), "Dual Redundant Sensor FDI Techniques Applied to the NASA F-8C DFBW Aircraft," Proc. AIAA Conference on Guidance and Control, San Diego, Calif.

Desai, M., Kennedy, D., Mangoubi, R., et al. (2002), "Diffusion Tensor Model based Smoothing", Proceedings of the 2002 IEEE International Symposium on Biomedical Imaging, Pg 705-708, Washington, D.C.

Desai, M., Kennedy, D., Mangoubi, R., et al. (2006-2), "Model based Variational Smoothing and Segmentation for Diffusion Tensor Imaging in the Brain", NeuroInformatics, Vol. 4, No. 3, Pp217-233, Desai, M., Mangoubi, R., et. al. (2002), "Functional MRI Activity Characterization Using Time Shifts Estimate from Curve Evolution", IEEE Trans. Medical Imaging, Vol. 21, No. 11

Desai, M., Mangoubi, R. S. (2004-2), Non-Gaussian Subspace Learning in the Presence of Interference, Proc. IEEE Sensor, Array, and Multichannel Sig. Proc. Workshop, June 2004, Barcelona, Spain Desai, M., Mangoubi. R. S. (2004-1), Subspace Learning in non-Gaussian Log-Concave Noise, Proc. Of 37th IEEE Asilomar Conf. on Signals, Systems, and Computer, Pacific Grove, Calif.

Do, M. and Vetterli, M. (2002), "Wavelet-Based texture retrieval using generalized Gaussian density and Kullback-Leibler distance". IEEE Transactions on Image Processing, 11(2): 146-158.

Drake, A., (1967) Fundamental of Applied Probability Theory, McGraw-Hill Classic Book Reissue, 1967, Ch. 4.

Egger, G., G. Liang, et al. (2004). "Epigenetics in human disease and prospects for epigenetic therapy." *Nature* 429(6990): 457-463.

Ekwall, K. (2007). "Epigenetic Control of Centromere Behavior." *Annu Rev Genet.*

Fay, F. S., K. L. Taneja, et al. (1997). "Quantitative digital analysis of diffuse and concentrated nuclear distributions of nascent transcripts, SC35 and poly(A)." *Exp Cell Res* 231(1): 27-37.

Feuerbach, F., V. Galy, et al. (2002). "Nuclear architecture and spatial positioning help establish transcriptional states of telomeres in yeast." *Nat Cell Biol* 4(3): 214-21.

Furuyama, T., Y. Dalal, et al. (2006). "Chaperone-mediated assembly of centromeric chromatin in vitro." *Proc Natl Acad Sci USA* 103(16): 6172-7.

Gerlich, D., J. Beaudouin, et al. (2003). "Global chromosome positions are transmitted through mitosis in mammalian cells." Cell 112(6): 751-64.

Gerlich, D., J. Beaudouin, et al. (2003). "Global chromosome positions are transmitted through mitosis in mammalian cells." *Cell* 112(6): 751-64.

Grewal, S. I. S. and D. Moazed (2003). "Heterochromatin and Epigenetic Control of Gene Expression." *Science* 301(5634): 798-802.

Hake, S. B., A. Xiao, et al. (2004). "Linking the epigenetic 'language' of covalent histone modifications to cancer." Br J *Cancer* 90(4): 761-9.

Hanlon, S. E., D. N. Norris, et al. (2003). "Depletion of H2A-H2B dimers in *Saccharomyces cerevisiae* triggers meiotic arrest by reducing IME1 expression and activating the BUB2-dependent branch of the spindle checkpoint." *Genetics* 164(4): 1333-44.

Hassan, A. B., R. J. Errington, et al. (1994). "Replication and transcription sites are colocalized in human cells." *J Cell Sci* 107 (Pt 2): 425-34.

Hattori, N., K. Nishino, et al. (2004). "Epigenetic Control of mouse Oct-4 Gene Expression in Embryonic Stem Cells and Trophoblast Stem Cells." J Biol Chem 279 (17): 17063-9

Hattori, N., K. Nishino, et al. (2004). "Epigenetic control of mouse Oct-4 gene expression in embryonic stem cells and trophoblast stem cells." *J Biol Chem* 279(17): 17063-9.

Hirschhorn, J. N., S. A. Brown, et al. (1992). "Evidence that SNF2/SWI2 and SNF5 activate transcription in yeast by altering chromatin structure." *Genes Dev* 6(12A): 2288-98.

Huang, S., H. Zhou, et al. (2005). "Rtt106p is a histone chaperone involved in heterochromatin-mediated silencing." *Proc Natl Acad Sci USA* 102(38): 13410-5.

Huang, S., H. Zhou, et al. (2007). "A novel role for histone chaperones CAF-1 and Rtt106p in heterochromatin silencing." *Embo J* 26(9): 2274-83.

Hyvaerinen, A, Karhunen, J, and Erki, O., (2001) Independent Component Analysis, Wiley-Interscience.

Ivanova, N. B., J. T. Dimos, et al. (2002). "A stem cell molecular signature." *Science* 298(5593): 601-4.

Iversen, P. W., B. J. Eastwood, et al. (2006). "A comparison of assay performance measures in screening assays: signal window, Z' factor, and assay variability ratio." *J Biomol Screen* 11(3): 247-52.

Jeffreys, C. (2004), Support Vector Machine and Parametric Wavelet-Based Texture Classification of Stem Cell Images, Masters thesis, Operations Research Center, MIT, Cambridge, Mass.

Jenuwein, T. and C. D. Allis (2001). "Translating the Histone Code." *Science* 293(5532): 1074-1080.

Kay, S. (1999), Modern Spectral Estimation: Theory and Application, Prentice Hall. Koski, T (2002), Hidden Markov Models of Bioinformatics, Kluwer Academics, 2002.

Kim, H. J., J. H. Seol, et al. (2007). "Histone chaperones regulate histone exchange during transcription." *Embo J.*

Kimura, H. and P. R. Cook (2001). "Kinetics of core histones in living human cells: little exchange of H3 and H4 and some rapid exchange of H2B." *J Cell Biol* 153(7): 1341-53.

Kimura, H. and P. R. Cook (2001). "Kinetics of core histones in living human cells: little exchange of H3 and H4 and some rapid exchange of H2B." *J Cell Biol* 153(7): 1341-53.

Korber, P. and W. Horz (2004). "SWRred not shaken; mixing the histones." *Cell* 117(1): 5-7.

Krouwels, I. M., K. Wiesmeijer, et al. (2005). "A glue for heterochromatin maintenance: stable SUV39H1 binding to heterochromatin is reinforced by the SET domain." *J Cell Biol* 170(4): 537-49.

Krupadanam, A., Annaswamy, A, and Mangoubi, R. S. (2002), "Multivariable Adaptive Control Design with Application to Autonomous Helicopters", Journal of Guidance and Control, Vol 25, No. 5.

Lachner, M. and T. Jenuwein (2002). "The many faces of histone lysine methylation." *Current Opinion in Cell Biology* 14(3): 286-298.

Lam, A. L., C. D. Boivin, et al. (2006). "Human centromeric chromatin is a dynamic chromosomal domain that can spread over noncentromeric DNA." *Proc Natl Acad Sci USA* 103(11): 4186-91.

Lam, A. L., D. E. Pazin, et al. (2005). "Control of gene expression and assembly of chromosomal subdomains by chromatin regulators with antagonistic functions." *Chromosoma* 114(4): 242-51.

Laribee, R. N., S. M. Fuchs, et al. (2007). "H2B ubiquitylation in transcriptional control: a FACT-finding mission." *Genes Dev* 21(7): 737-43.

Lee, A-L. Hart, S. R., et al. (2004). "Histone deacetylase activity is required for embryonic stem cell differentiation." Genesis 38(1): 32-8

Levenstein, M. E., T. E. Ludwig, et al. (2005). "Basic FGF Support of Human Embryonic Stem Cell Self-Renewal." *Stem Cells.*

Li, J., and Gray, R., (2000), Image segmentation and Compression Using Hidden Markov Models, Kluwer.

Li, L., H. Katsuyama, et al. (2007). "Abundant expression of nucleosome assembly protein 1 (NAP1) gene in goldfish scale with lateral line." *J Toxicol Sci* 32(4): 359-65.

Lois, C., E. J. Hong, et al. (2002). "Germline transmission and tissue-specific expression of transgenes delivered by lentiviral vectors." *Science* 295(5556): 868-72.

Lowry, N., Mangoubi, R., Desai, M., Sammak, P. (2009) Classification of Human Embryonic Stem Cell Colonies Using Multiresolution Non-Gaussian Statistical Texture Models. Submitted.

Ludwig, T. E., M. E. Levenstein, et al. (2006). "Derivation of human embryonic stem cells in defined conditions." *Nat Biotechnol* 24(2): 185-187.

Maciejowski, M. (2002) Predictive Control with Constraints. Prentice Hall.

Mangoubi, R., C. Jeffreys, A. Copeland, M. Desai, and P. Sammak, (2007) "Texture and Border Analysis for Cell Classification", IEEE Int'l Sympos. Biomed. Imaging.

Mangoubi, R., M. Desai, et al. (2008). *Performance Evaluation Of Multiresolution Texture Analysis Of Stem Cell Chromatin*. Fifth IEEE International Symposium of Biomedical Imaging, Washington, D.C.

Mangoubi, R. S. (1998), Robust Estiamtion and Failure Detection: A Concise Treatment. Springer Verlag.

Mangoubi, R. S., Appleby, B., Verghese, G., and Vander-Welde, W. (1995) "A robust failure detection and isolation algorithm," in Proc. IEEE Conf. On Dec. and Cont., New Orleans, La., pp. 2377-2382.

Mangoubi, R. S., Appleby, B., Verghese, G., and Vander-Welde, W. (1995) "A robust failure detection and isolation algorithm," in Proc. IEEE Conf. On Dec. and Cont., New Orleans, La., pp. 2377-2382.

Mangoubi, R. S., Jeffreys, C. Copeland, A., Desai, M, Jane, E., and Sammak, P., (2005) "Non-Invasive Texture-Based Classification of Stem Cell Colonies Using Support Vector Machine and Parametric Classifiers", for IEEE Trans. on Biomedical Engineering.

Marshall, W. F., A. Straight, et al. (1997). "Interphase chromosomes undergo constrained diffusional motion in living cells." *Curr Biol* 7(12): 930-9.

Marshall, W. F., A. Straight, et al. (1997). "Interphase chromosomes undergo constrained diffusional motion in living cells." *Curr Biol* 7(12): 930-9.

Meshorer, E., D. Yellajoshula, et al. (2006). "Hyperdynamic plasticity of chromatin proteins in pluripotent embryonic stem cells." *Dev Cell* 10(1): 105-16.

Mikkelsen, T. S., M. Ku, et al. (2007). "Genome-wide maps of chromatin state in pluripotent and lineage-committed cells." *Nature*.

Misteli, T. (2004). "Spatial positioning; a new dimension in genome function." *Cell* 119(2): 153-6.

Misteli, T. (2005). "Concepts in nuclear architecture." *Bioessays* 27(5): 477-87.

Mizuguchi, G., X. Shen, et al. (2004). "ATP-driven exchange of histone H2AZ variant catalyzed by SWR1 chromatin remodeling complex." *Science* 303(5656): 343-8.

Mousson, F., A. Lautrette, et al. (2005). "Structural basis for the interaction of Asf1 with histone H3 and its functional implications." *Proc Natl Acad Sci USA* 102(17): 5975-80.

O'Neill, A., and Schaffer, S., (2004) The Biology and Engineering of Stem-cell Control, Biotech. Appl of Biochem., 40, pp. 5-16.

O'Brien, T. P., C. J. Bult, et al. (2003). "Genome Function and Nuclear Architecture: From Gene Expression to Nanoscience." *Genome Res.* 13(6a): 1029-1041.

Oliver, B. and T. Misteli (2005). "A non-random walk through the genome." *Genome Biol* 6(4): 214.

Osher, S., and Paragios, N., (2003), Geometric Level Set Methods in Imaging, Vision, and Graphics, Springer Verlag. Poor, V. (1998), An Introduction to Signal Detection and Estimation, $2^{nd}$. Edition, Springer Verlag, 1998.

Osuna, E., (1998) Support Vector Machines: Training and Applications. PhD thesis, Massachusetts Institute of Technology.

Pajerowski, J. D., K. N. Dahl, et al. (2007). "From the Cover: Physical plasticity of the nucleus in stem cell differentiation." *Proc Natl Acad Sci USA* 104(40): 15619-24.

Pal-Bhadra, M., B. A. Leibovitch, et al. (2004). "Heterochromatic Silencing and HP1 Localization in *Drosophila* Are Dependent on the RNAi Machinery." *Science* 303(5658): 669-672.

Parada, L. A., P. G. McQueen, et al. (2004). "Tissue-specific spatial organization of genomes." *Genome Biol* 5(7): R44.

Parada, L. A., S. Sotiriou, et al. (2004). "Spatial genome organization." *Exp Cell Res* 296(1): 64-70.

Parada, L. and T. Misteli (2002). "Chromosome positioning in the interphase nucleus." *Trends Cell Biol* 12(9): 425-32.

Park, Y. J., S. J. McBryant, et al. (2008). "A beta-hairpin comprising the nuclear localization sequence sustains the self-associated states of nucleosome assembly protein 1." *J Mol Biol* 375(4): 1076-85.

Peltz, S. W. and J. Ross (1987). "Autogenous regulation of histone mRNA decay by histone proteins in a cell-free system." *Mol Cell Biol* 7(12): 4345-56.

Perry, P., S. Sauer, et al. (2004). "A dynamic switch in the replication timing of key regulator genes in embryonic stem cells upon neural induction." *Cell Cycle* 3(12): 1645-50.

Pesce, M., X. Wang, et al. (1998). "Differential expression of the Oct-4 transcription factor during mouse germ cell differentiation." *Mech Dev* 71(1-2): 89-98.

Peters, A. H., S. Kubicek, et al. (2003). "Partitioning and plasticity of repressive histone methylation states in mammalian chromatin." *Mol Cell* 12(6): 1577-89.

Ramalho-Santos, M., S. Yoon, et al. (2002). ""Stemness": transcriptional profiling of embryonic and adult stem cells." *Science* 298(5593): 597-600.

Recht, J., T. Tsubota, et al. (2006). "Histone chaperone Asf1 is required for histone H3 lysine 56 acetylation, a modification associated with S phase in mitosis and meiosis." *Proc Natl Acad Sci USA* 103(18): 6988-93.

Renyi, A. (1961), "On Measures of entropy and information", Proc. $4^{th}$ Berkley Symp. on Math Statistics and Probability, vol 1, pp 547-561, U. Calif. Press, 1961

Richardson, R. T., 0. M. Alekseev, et al. (2006). "Nuclear autoantigenic sperm protein (NASP), a linker histone chaperone that is required for cell proliferation." *J Biol Chem* 281(30): 21526-34.

Rifkin, R. (2002). Everything Old is New Again: A Fresh Look at Historical Approaches in Machine Learning. PhD thesis, Massachusetts Institute of Technology, September 2002.

Rodriguez, P., J. Pelletier, et al. (2000). "NAP-2: histone chaperone function and phosphorylation state through the cell cycle." *J Mol Biol* 298(2): 225-38.

Sammak, P. J. and G. G. Borisy (1988). "Detection of single fluorescent microtubules and methods for determining their dynamics in living cells." *Cell Motil Cytoskeleton* 10(1-2): 237-45.

Sammak, P. J. and G. G. Borisy (1988). "Direct observation of microtubule dynamics in living cells." *Nature* 332 (6166): 724-6.

Sammak, P. J., E. P. Jane, et al. (2005). "Pluripotent Embryonic Stem Cells Have Plastic Chromatin and Nuclei that Stabilize Upon Differentiation." *Developmental Cell*

Sammak, P. J., K. N. Dahl, et al. (2006). "Nuclear Stabilization, Assembly Of Heterochromatin and Envelope in Embryonic Stem Cells." *PLoS Biology (in second review)*.

Sammak, P. J., L. E. Hinman, et al. (1997). "How do injured cells communicate with the surviving cell monolayer?" *J Cell Sci* 110 (Pt 4): 465-75.

Sammak, P. J., V. Abraham, et al. (2008). High Content Analysis of Human Embryonic Stem Cell Growth and Differentiation. *High Content Screening: Science, Techniques, and Applications*. S. A. Hanney. Hoboken, N.J., John Wiley.

Sammak, P., Mangoubi, R. S., Desai, M., and Jeffreys, C. (2004), patent: Methods and Systems for Classifying Cellular Structures. Provisional application No. 60/570,650, filed May 13, 2004. Patent application filed May 13, 2005.

Schneider, R., A. J. Bannister, et al. (2004). "Histone H3 lysine 4 methylation patterns in higher eukaryotic genes." *Nat Cell Biol* 6(1): 73-7.

Shah, J. (2005) Grayscale skeletons and segmentation of shapes, accepted for publication in the Journal of Computer Vision and Image Understanding.

Sharkawi, R. R. Mangoubi, T. AbdelGalil, M. Salama, and P. Varnikas, "SVM Classification of Contaminating Particles in Liquid Dielectrics Using Higher Order Statistics of Electrical and Acoustic PD Measurements", IEEE Trans. Dielectrics and Electrical Insulation. In Revision.

Snowden, A. W., P. D. Gregory, et al. (2002). "Gene-specific targeting of H3K9 methylation is sufficient for initiating repression in vivo." *Curr Biol* 12(24): 2159-66.

Sperger, J. M., X. Chen, et al. (2003). "Gene expression patterns in human embryonic stem cells and human pluripotent germ cell tumors." *Proc Natl Acad Sci USA* 100(23): 13350-5.

Tanaka, T. S., T. Kunath, et al. (2002). "Gene expression profiling of embryo-derived stem cells reveals candidate genes associated with pluripotency and lineage specificity." *Genome Res* 12(12): 1921-8.

Teixeira, M. T., B. Dujon, et al. (2002). "Genome-wide nuclear morphology screen identifies novel genes involved in nuclear architecture and gene-silencing in *Saccharomyces cerevisiae*." *J Mol Biol* 321(4): 551-61.

Thomson, I., S. Gilchrist, et al. (2004). "The radial positioning of chromatin is not inherited through mitosis but is established de novo in early G1." *Curr Biol* 14(2): 166-72.

Thomson, J. A., J. Itskovitz-Eldor, et al. (1998). "Embryonic stem cell lines derived from human blastocysts." *Science* 282(5391): 1145-7.

Vallier, L., P. J. Rugg-Gunn, et al. (2004). "Enhancing and diminishing gene function in human embryonic stem cells." *Stem Cells* 22(1): 2-11.

Van de Wouwer, G., Scheunders, P., and Van Dyck, D. Statistical texture characterization from discrete wavelet representation. IEEE Transactions on Image Processing, 8(4):592-598, April 1999.

van Driel, R., P. F. Fransz, et al. (2003). "The eukaryotic genome: a system regulated at different hierarchical levels." *J Cell Sci* 116(20): 4067-4075.

Van Trees, H. L. (2002), Optimum Array Processing, Part IV of Detection, Estimation, and Modulation Theory, Wiley.

Vapnik, V N (2000), The Nature of Statistical Learning Theory. Springer-Verlag, New York, Second edition Viswanathan, S., and Zandstra, P., (2003) "Towards Predictive Models of Stem Cell Fate", Cytotechnology, 41, pp. 75-92, 2003.

Wachsmuth, M., T. Weidemann, et al. (2003). "Analyzing intracellular binding and diffusion with continuous fluorescence photobleaching." *Biophys J* 84(5): 3353-63.

Wachsmuth, M., T. Weidemann, et al. (2003). "Analyzing intracellular binding and diffusion with continuous fluorescence photobleaching." *Biophys J* 84(5): 3353-63.

Walfridsson, J., O. Khorosjutina, et al. (2007). "A genome-wide role for CHD remodelling factors and Nap1 in nucleosome disassembly." *Embo J* 26(12): 2868-79.

Walter, J., L. Schermelleh, et al. (2003). "Chromosome order in HeLa cells changes during mitosis and early G1, but is stably maintained during subsequent interphase stages." *J Cell Biol* 160(5): 685-97.

Walter, J., L. Schermelleh, et al. (2003). "Chromosome order in HeLa cells changes during mitosis and early G1, but is stably maintained during subsequent interphase stages." *J Cell Biol* 160(5): 685-97.

Williams, R. R., V. Azuara, et al. (2006). "Neural induction promotes large-scale chromatin reorganisation of the Mash1 locus." *J Cell Sci* 119(Pt 1): 132-40.

Willsky, A. S. (2002), "Multiresolution Markov models for signal and image processing", Proceedings of IEEE, Vol. 90, No. 8, pp. 1396-1458.

Xu, R. H., R. M. Peck, et al. (2005). "Basic FGF and suppression of BMP signaling sustain undifferentiated proliferation of human ES cells." *Nat Methods* 2(3): 185-90.

Yang, L, and Griffith, E. (2003), "Flex Controller Interaction During Space Station Rebdost", Proc. AAS/AIAA Astrodynamics Specialists Conference, AAS Publications Office, August, 2003, Big Sky, Mont.

Zhang, J.-H., T. D. Y. Chung, et al. (1999). "A Simple Statistical Parameter for Use in Evaluation and Validation of High Throughput Screening Assays." *J Biomol Screen* 4(2): 67-73.

Zlatanova, J., C. Seebart, et al. (2007). "Nap1: taking a closer look at ajuggler protein of extraordinary skills." *Faseb J* 21(7): 1294-310.

We claim:

1. A method for determining a characteristic of one or more test cells, comprising:
   (a) obtaining an image of one or more test cells;
   (b) representing said image as a multiplicity of pixels;
   (c) using a processor to extract one or more image features from said multiplicity of pixels, wherein extraction of image features comprises dividing said image into a plurality of windows and calculating one or more of frequency and spatial content within said plurality of windows;
   (d) identifying texturally inhomogeneous windows within said plurality of windows; and
   (e) comparing said one or more image features with image features derived from one or more reference cells that are representative of predetermined characteristics, wherein the processor applies one or more statistical comparison methods to compare the image features;
   whereby the characteristic of said one or more test cells is determined.

2. The method of claim 1, wherein said one or more statistical comparison methods comprise a likelihood ratio statistic, a comparison of probability density functions, or an information divergence method.

3. The method of claim 1, wherein said one or more image features are extracted using a wavelet decomposition algorithm or a data-driven algorithm.

4. The method of claim 3, wherein the data-driven algorithm is a subspace learning algorithm.

5. The method of claim 1, further comprising
(f) performing simultaneous smoothing and segmentation of said image;
(g) determining one or more boundaries of said cell;
(h) identifying a region or subregion near to said one or more boundaries;
(i) deriving one or more attributes of region or subregion;
(j) analyzing variation in said one or more attributes;
wherein said one or more image features comprise components of said one or more attributes.

6. The method of claim 5, wherein said one or more attributes include one or more of shape aspects of said cell boundary, edge strength, image intensity attributes of the interior of said cell, and textural attributes of said cell.

7. The method of claim 6, wherein said shape aspects may comprise extent of shape deviation from a spherical shape or protuberances from smooth ellipticity.

8. The method of claim 1, further comprising dividing said texturally inhomogeneous windows into subwindows.

9. The method of claim 1, further comprising
(f) defining one or more borders of said one or more test cells according to border smoothness and border diffusivity,
wherein said one or more image features comprise parameters of said one or more borders.

10. The method of claim 1, further comprising
(f) obtaining a plurality of images of said one or more test cells at intervals;
(g) performing simultaneous smoothing and segmentation of said image features, whereby a characteristic of said one or more test cells is monitored over time.

11. A method for determining transitions in one or more of epigenetic state and differentiation state of test cells, comprising:
(a) culturing said test cells in an environment;
(b) varying the environment of said test cells;
(c) collecting images of said test cells after varying the environment;
(d) measuring one or more feature dynamics of test cells in said images;
(e) using a processor to model said one or more feature dynamics as a function of time; and
(f) comparing models of feature dynamics from said test cells with models of dynamics derived from reference cells undergoing the transitions;
whereby the transitions in one or more of epigenetic state and differentiation state of said test cells can be determined.

12. The method of claim 11, wherein said one or more feature dynamics is a change in a level or a distribution of one or more proteins in said test cell.

13. A method for determining an epigenetic state of a test cell, comprising:
(a) obtaining an image of a nucleus in said test cell;
(b) using a processor to measure one or more characteristics in said images, wherein said characteristic is selected from:
    (i) one or more textural features,
    (ii) extent, distribution, or localization of chromatin condensation in said nucleus,
    (iii) level of methylation of DNA or protein in said test cell,
    (iv) rate of chromatin movement in said test cell,
    (v) magnitude of chromatin intensity in said test cell, and
    (vi) level of chaperone proteins NAP1 and ASF1 in said test cell; and
(c) comparing said one or more characteristics with corresponding characteristics derived from one or more reference cells which are representative of predetermined epigenetic states,
whereby the epigenetic state of the test cell is determined.

14. The method of claim 13, wherein said test cell is selected from a pluripotent stem cell, multipotent stem cell, a terminally differentiated cell, a pluripotent cell induced to differentiate, a cancer cell, or a cancer stem cell which is dedifferentiated from the normal somatic state.

15. The method of claim 13, wherein said images are acquired optically by a fluorescent microscope and a light detector to detect fluorescence or by a brightfield microscope and a light detector to detect absorbing dyes.

16. The method of claim 13, wherein said test cells are stably transfected with a fluorescent marker associated with a cellular protein or labeled with an antibody directed against a nuclear protein.

17. The method of claim 13, wherein said characteristic is one or more textural features, and presence of high granularity in said one or more textural features is indicative of an advanced state of differentiation.

18. The method of claim 13, wherein said characteristic is a level of methylation of DNA or protein in said test cell, and wherein measuring said level of methylation comprises one or more of measuring the level of methylation on Histone H3, lysine 9(H3K9) and measuring the level of methylation of cytosine on DNA in said test cell.

19. The method of claim 18, wherein one or more of an increased level of methylation on H3K9, an increased level of methylation of DNA, and an increased level of colocalization of methylated DNA and methylated H3K9 in the test cells relative to a pluripotent stem cell is indicative of cell differentiation.

20. The method of claim 18, wherein methylation of DNA at distal chromosome arms during interphase, prophase or during anaphase or methylation of DNA at centromeric and pericentromeric domains on chromosomes during interphase, prophase or during anaphase in the test cell is indicative of cell differentiation.

21. The method of claim 13, wherein said characteristic is a rate of chromatin movement in said test cell, and wherein said rate of chromatin movement comprises movement of chromatin component molecules on and off a chromatin complex.

22. The method of claim 21, wherein faster movements or an increased number of multi-directional movements of chromatin in a test cell as compared with a differentiated cell are indicative of a pluripotent cell.

23. The method of claim 13, wherein the cell is transfected with a protein associated with a fluorescent label.

24. The method of claim 23, wherein the protein is GFP-Histone 2B (GFP-H2B) or GFP-Histone 3(GFP-H3).

25. The method of claim 23, wherein measuring the rate of chromatin component exchange comprises photobleaching the nucleus of the cell and measuring changes in fluorescence.

26. The method of claim 25, wherein a more rapid recovery of a photobleached region or a more rapid loss of fluorescence outside of the photobleached region in a test cell relative to a differentiated cell is indicative of a pluripotent cell.

27. The method of claim 13, further comprising
(d) mechanically deforming a nucleus in said test cell;
(e) using a processor to determine a magnitude of deformation of said nucleus in response to a deforming force; and
(f) comparing the magnitude of deformation of said nucleus to corresponding measurements derived from one or more reference nuclei representative of predetermined differentiation states;

whereby the epigenetic state of said test cell is determined.

* * * * *

UNITED STATES PATENT AND TRADEMARK OFFICE
CERTIFICATE OF CORRECTION

| | | |
|---|---|---|
| PATENT NO. | : 7,907,769 B2 | Page 1 of 1 |
| APPLICATION NO. | : 12/321360 | |
| DATED | : March 15, 2011 | |
| INVENTOR(S) | : Paul J. Sammak et al. | |

It is certified that error appears in the above-identified patent and that said Letters Patent is hereby corrected as shown below:

In the Specifications:

Please replace Column 1, Lines 21 -24 with the following:

--This invention was made with Government support under Grant No. 1 RO1 EB006161-01A2 awarded by the NIH. The Government has certain rights in the invention.--

Signed and Sealed this
Seventh Day of May, 2013

Teresa Stanek Rea
*Acting Director of the United States Patent and Trademark Office*